Figure 1:
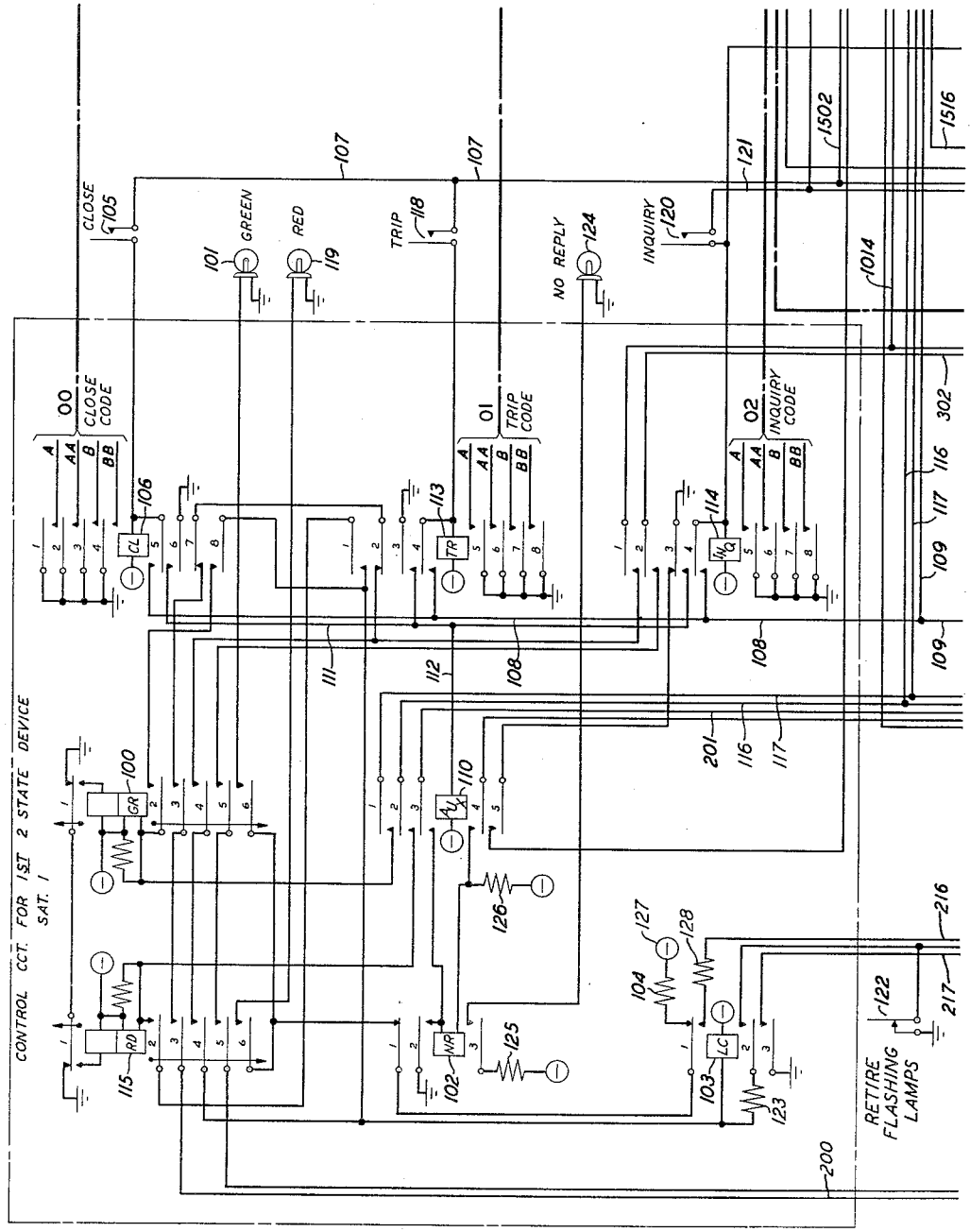

INVENTORS
R. D. DEMING
E. JACOBITTI
J. B. KENNEDY
W. V. K. LARGE
H. M. PRUDEN
BY A. M. Hassell
ATTORNEY

FIG. 18

July 24, 1962

R. D. DEMING ETAL 3,046,525

SUPERVISORY CONTROL SYSTEM

Filed Sept. 16, 1958

39 Sheets-Sheet 19

INVENTORS
R. D. DEMING
E. JACOBITTI
J. B. KENNEDY
W. V. K. LARGE
H. M. PRUDEN

BY
R. M. Hassell
ATTORNEY

July 24, 1962   R. D. DEMING ETAL   3,046,525
SUPERVISORY CONTROL SYSTEM
Filed Sept. 16, 1958   39 Sheets-Sheet 24

INVENTORS
R.D. DEMING
E. JACOBITTI
J.B. KENNEDY
W.V.K. LARGE
H.M. PRUDEN
BY A.M. Hassell
ATTORNEY July 24, 1962

R. D. DEMING ETAL 3,046,525

SUPERVISORY CONTROL SYSTEM

Filed Sept. 16, 1958

39 Sheets-Sheet 29

INVENTORS
R. D. DEMING
E. JACOBITTI
J. B. KENNEDY
W. V. K. LARGE
H. M. PRUDEN

BY A. M. Hassell

ATTORNEY

July 24, 1962

R. D. DEMING ETAL 3,046,525

SUPERVISORY CONTROL SYSTEM

Filed Sept. 16, 1958

39 Sheets-Sheet 31

INVENTORS
R.D. DEMING
E. JACOBITTI
J.B. KENNEDY
W.V.K. LARGE
H.M. PRUDEN

BY

ATTORNEY

July 24, 1962 R. D. DEMING ETAL 3,046,525
SUPERVISORY CONTROL SYSTEM
Filed Sept. 16, 1958 39 Sheets-Sheet 36

INVENTORS
R. D. DEMING
E. JACOBITTI
J. B. KENNEDY
W. V. K. LARGE
H. M. PRUDEN

BY
A. M. Hassell
ATTORNEY

July 24, 1962  R. D. DEMING ETAL  3,046,525
SUPERVISORY CONTROL SYSTEM
Filed Sept. 16, 1958  39 Sheets-Sheet 37

INVENTORS
R. D. DEMING
E. JACOBITTI
J. B. KENNEDY
W. V. K. LARGE
H. M. PRUDEN
BY
ATTORNEY

INVENTORS
R. D. DEMING
E. JACOBITTI
J. B. KENNEDY
W. V. K. LARGE
H. M. PRUDEN

BY A. M. Hassell
ATTORNEY

July 24, 1962

R. D. DEMING ETAL 3,046,525

SUPERVISORY CONTROL SYSTEM

Filed Sept. 16, 1958

39 Sheets-Sheet 39

INVENTORS
R. D. DEMING
E. JACOBITTI
J. B. KENNEDY
W. V. K LARGE
H. M. PRUDEN

BY  R m Hussell

ATTORNEY 3,046,525
SUPERVISORY CONTROL SYSTEM
Royce D. Deming, Hollis, N.Y., Edward Jacobitti, Newark, N.J., James B. Kennedy, Brooklyn, and Wayne V. K. Large, Locust Valley, N.Y., and Harold M. Pruden, Maplewood, N.J., assignors to Bell Telephone Laboratories, Incorporated, New York, N.Y., a corporation of New York
Filed Sept. 16, 1958, Ser. No. 761,386
27 Claims. (Cl. 340—163)

This invention relates to electrical control apparatus. Although the principles underlying the invention may be advantageously exploited in a variety of physical adaptations, the particular adaptation herein selected for an illustrative embodiment relates to a selective remote control system.

A variety of complex electrical control systems are well known in the art, illustrative of which is that disclosed in Patent 2,679,637, granted to William H. Blashfield and Lemuel R. Breese on May 25, 1954. Such systems have ordinarily been directed to the solution of specific control problems, thereby rendering them somewhat limited in their versatility and scope of operation.

Others have required multitrunk connections between central control points and the controlled satellites.

Still others have been particularly susceptible to malfunctioning and have thereby been at times unreliable in operation.

It is one general object of this invention to improve control apparatus.

It is another object of this invention to achieve an improvement in versatility and flexibility.

It is yet another object of this invention to provide a high degree of reliability and to include visual supervisory indication at a control station for each controlled device.

It is a further object of this invention to provide for the interconnection of individual control stations to provide coordinated operation therebetween, thereby in effect uniting them into one larger overall control system.

It is yet another object of this invention to render control apparatus suitable for the utilization of signaling impulses having electrical characteristics such that they may be transmitted reliably either over the least expensive type of transmission facility where low speed of transmission is acceptable, or over a higher speed transmission facility when more rapid response is required.

Accordingly, in accordance with one feature of the invention, certain of the control, coding, and signal-producing devices are arranged to serve as common control units, thereby providing flexibility and decreasing circuit complexity and cost.

In accordance with another feature of the invention, selective decimal time-division-order codes are advantageously employed for signaling, thereby permitting the utilization of information-representing impulses suitable for transmission over conventional direct-current telegraph circuits.

In accordance with yet another feature of the invention, whenever an order or inquiry signal is transmitted from a control station, a signal is returned indicating either that the desired control operation was performed or that it was not. If, for any reason such signal is not returned, an alarm is actuated at the control station and the identity of the particular device in question is visually displayed thereat.

In accordance with yet another feature of the invention, a continuous visual display of the conditions of all the controlled devices is constantly maintained at a central control station and continual accuracy of such display is assured by a periodic sequential check of each device.

In accordance with yet another feature of the invention, the aforementioned answering signal is either a long or a short pulse and these two pulses are commonly employed by each controlled device, thereby eliminating complex coding and logic circuits which might otherwise be required.

In accordance with still a further feature of the invention, group codes are employed whenever it is desired to simultaneously control a plurality of remote devices and the identity of the particular devices which respond to such codes is determined by a prearranged connection of certain of the controlling circuits.

Figure 29:
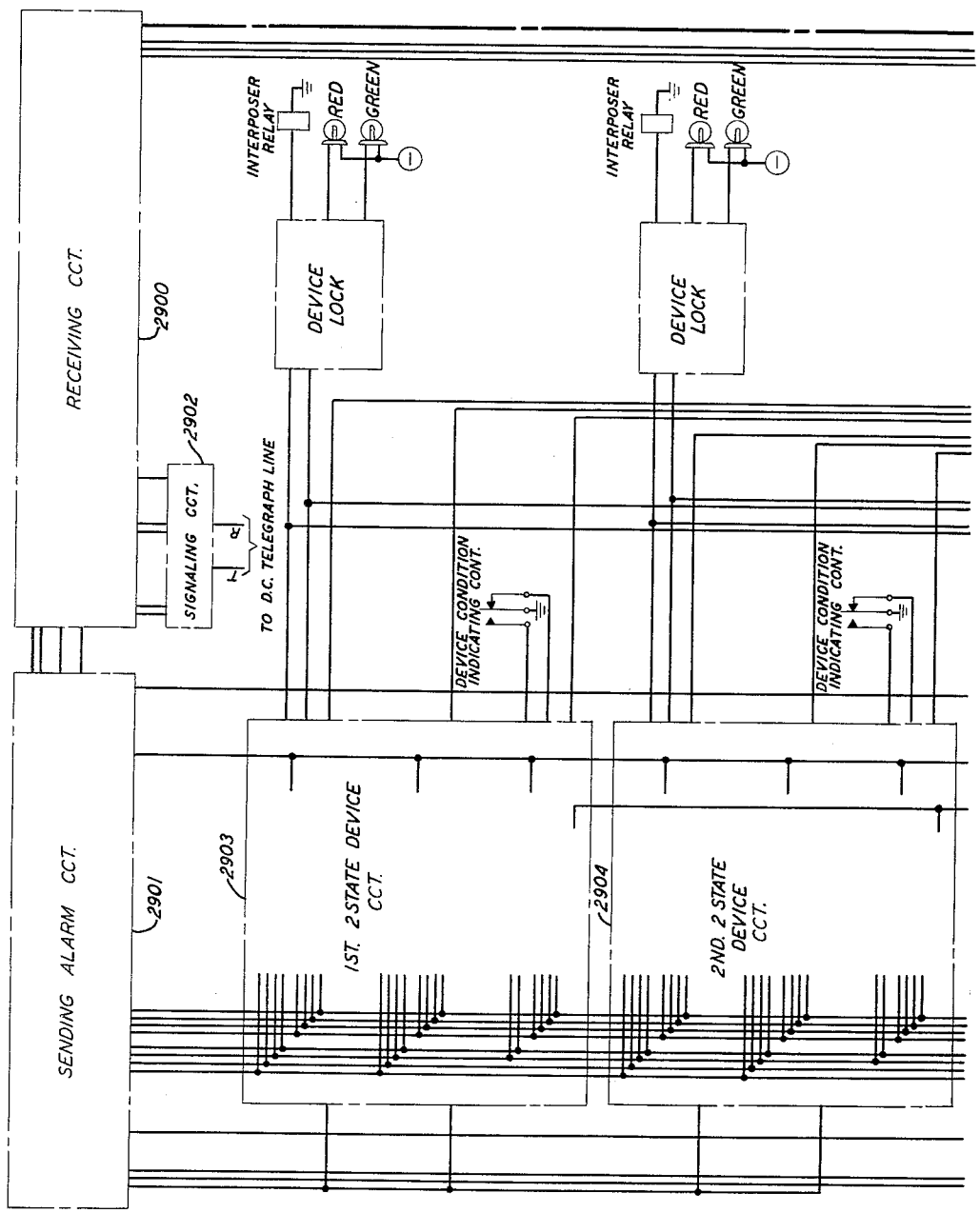
Figure 30:
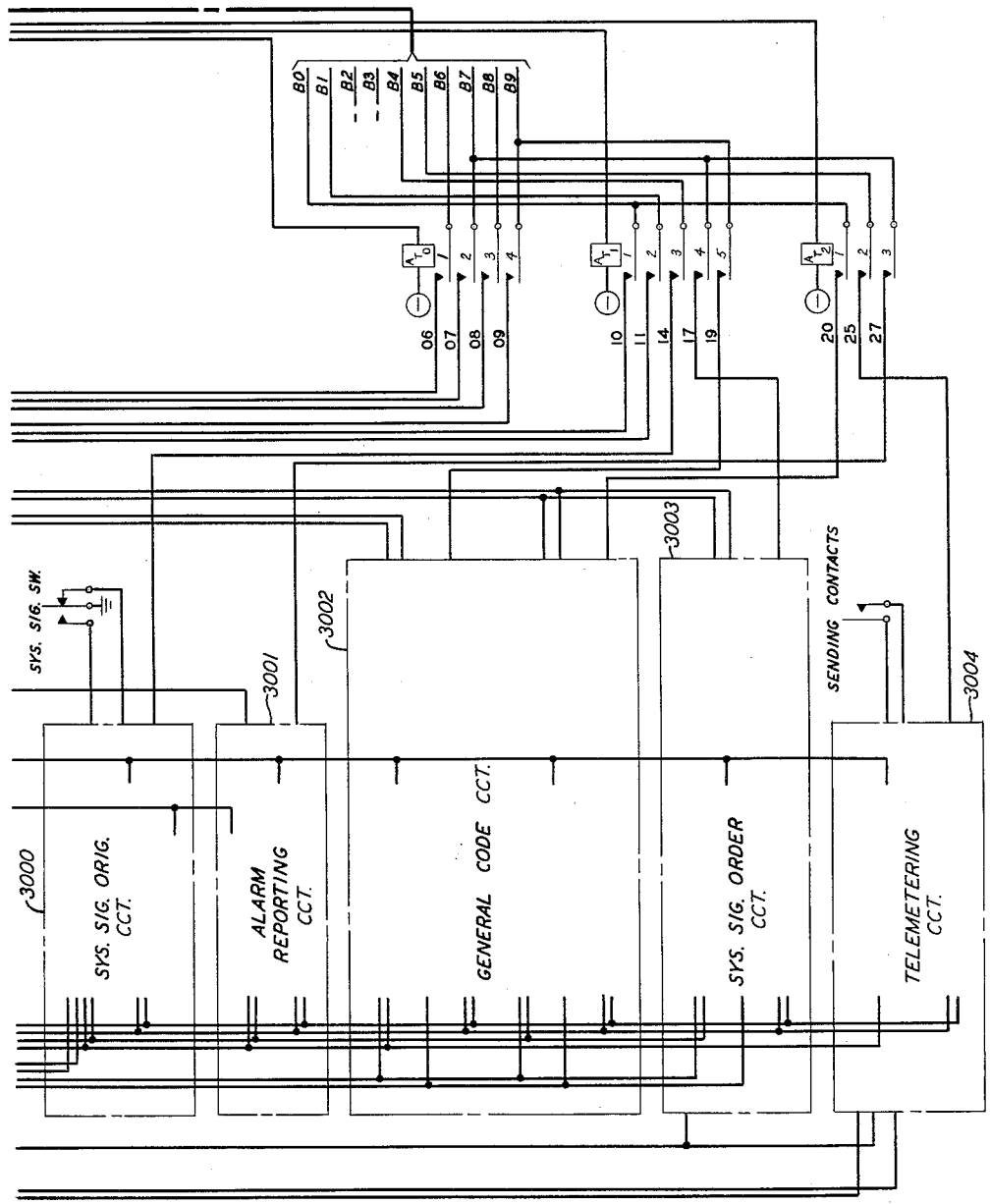

Other objects and features of the invention will be apparent from the following detailed description, by way of example, with reference to the drawing in which FIGS. 1–18 disclose circuits of a main control station; FIGS. 19–28, those of a first satellite station; FIGS. 29 and 30, those of a second satellite station; FIGS. 31–38, those of a monitor station; FIG. 39 is a diagram depicting the correct physical relationship of FIGS. 1–38; and FIG. 40 is a diagram in block form depicting an illustrative embodiment of the invention.

Figure 2:
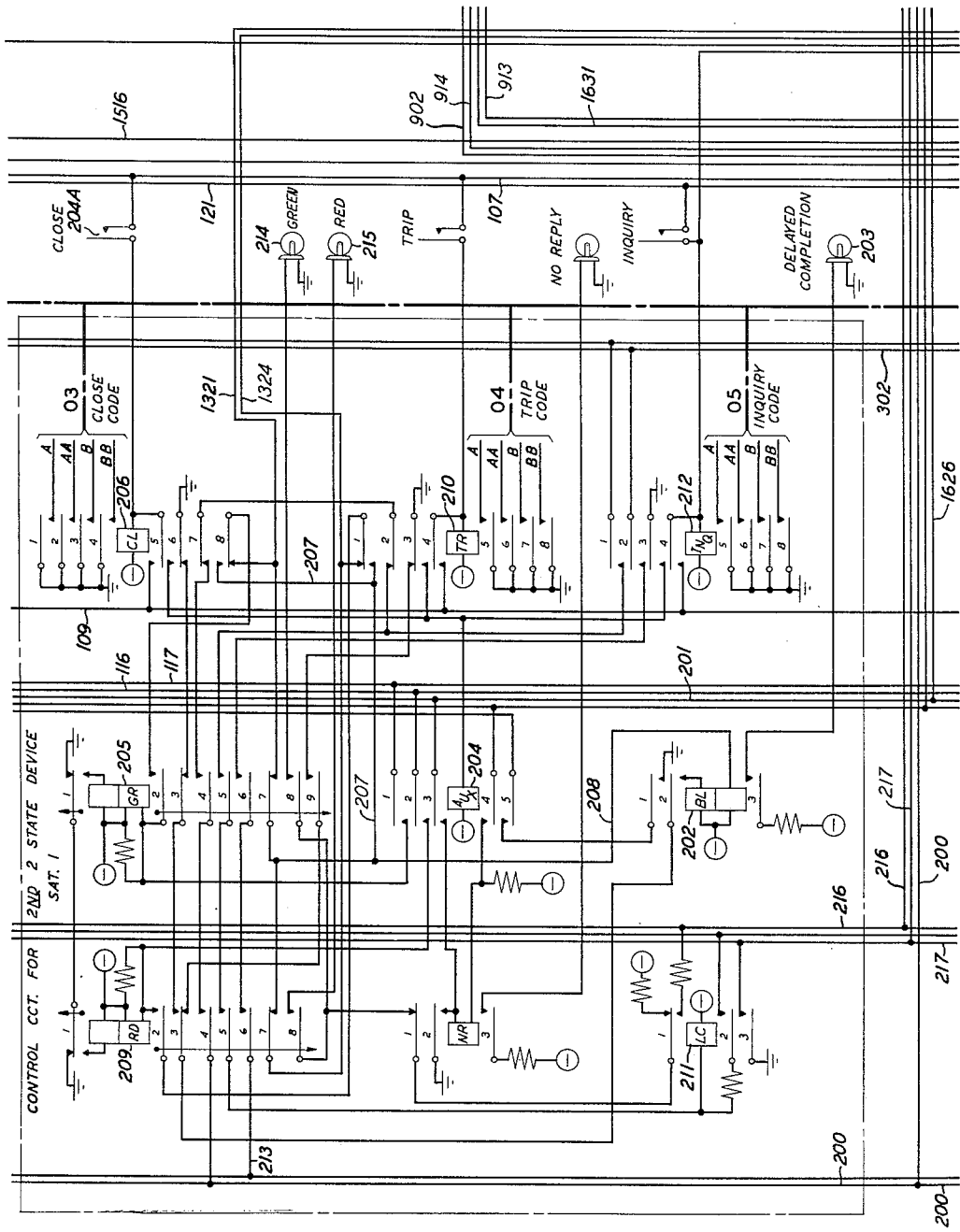
Figure 3:
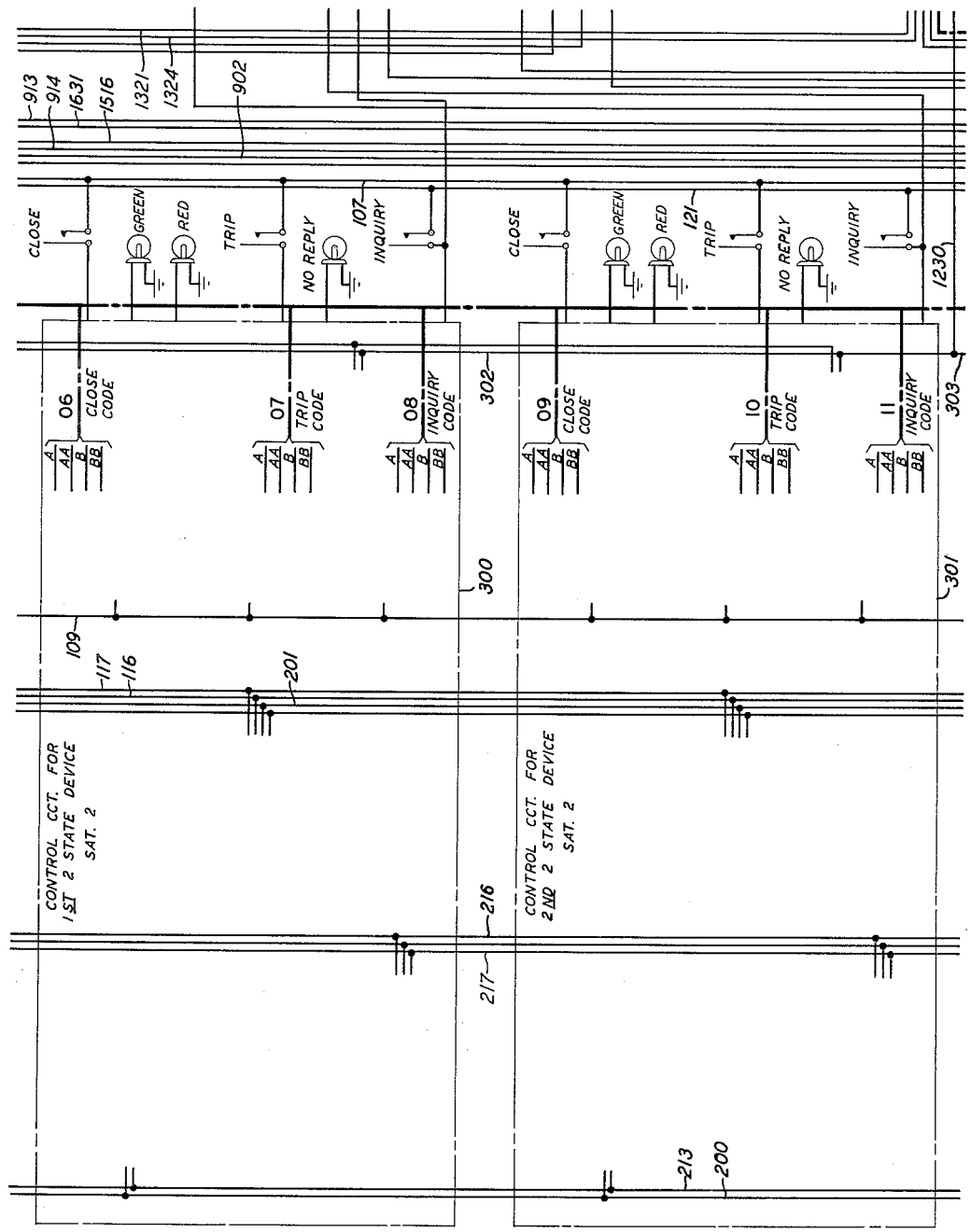
Figure 4:
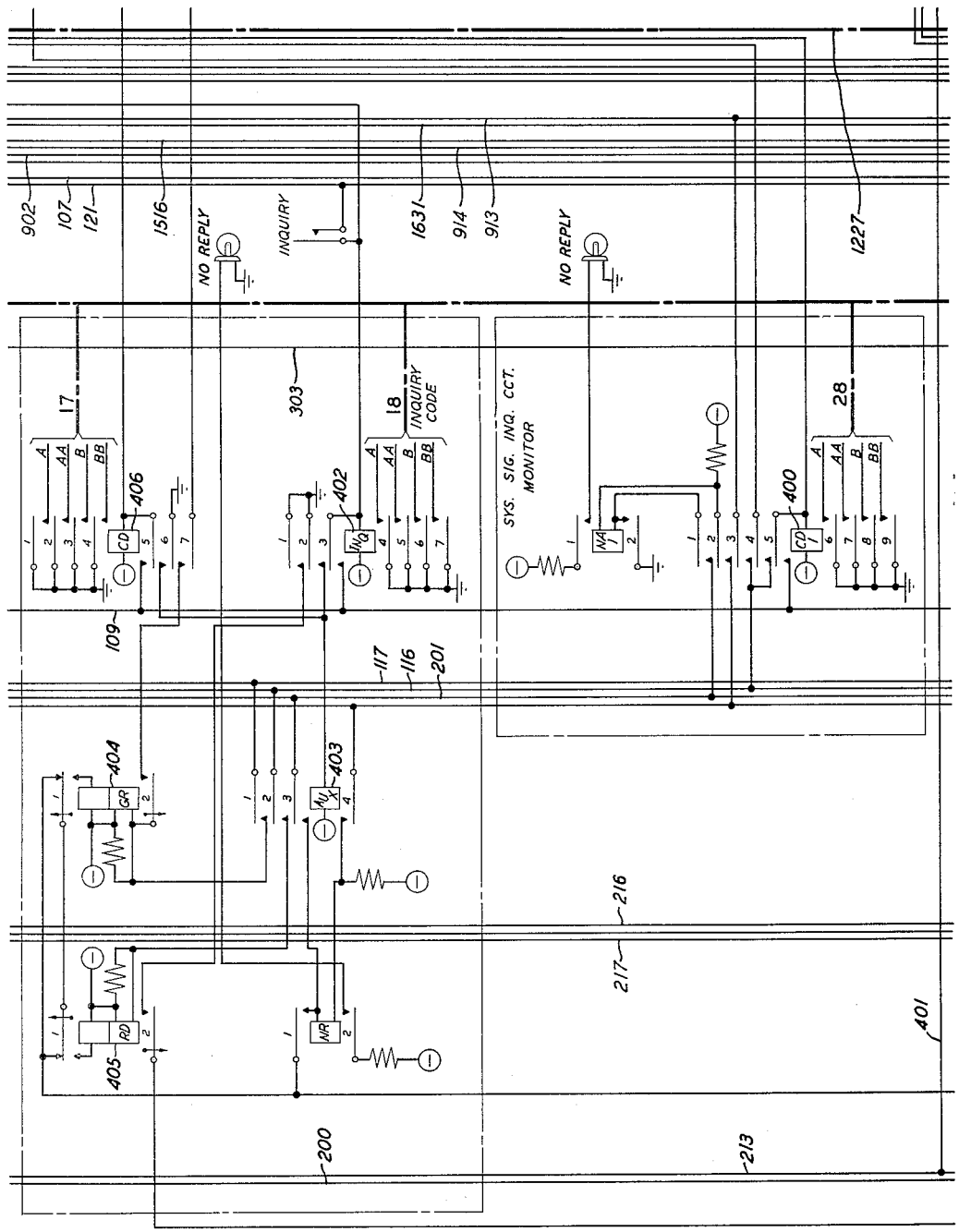
Figure 5:
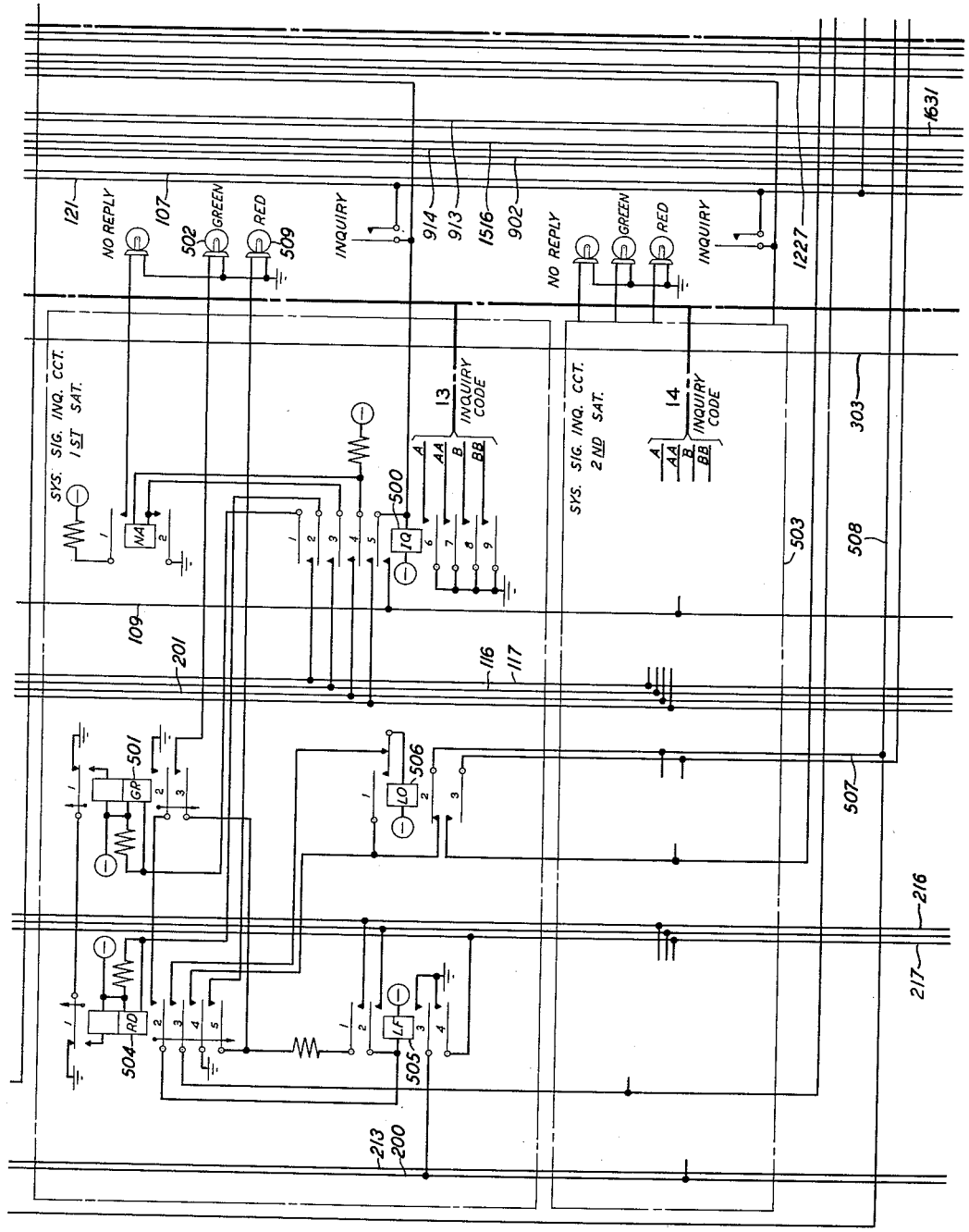
Figure 6:
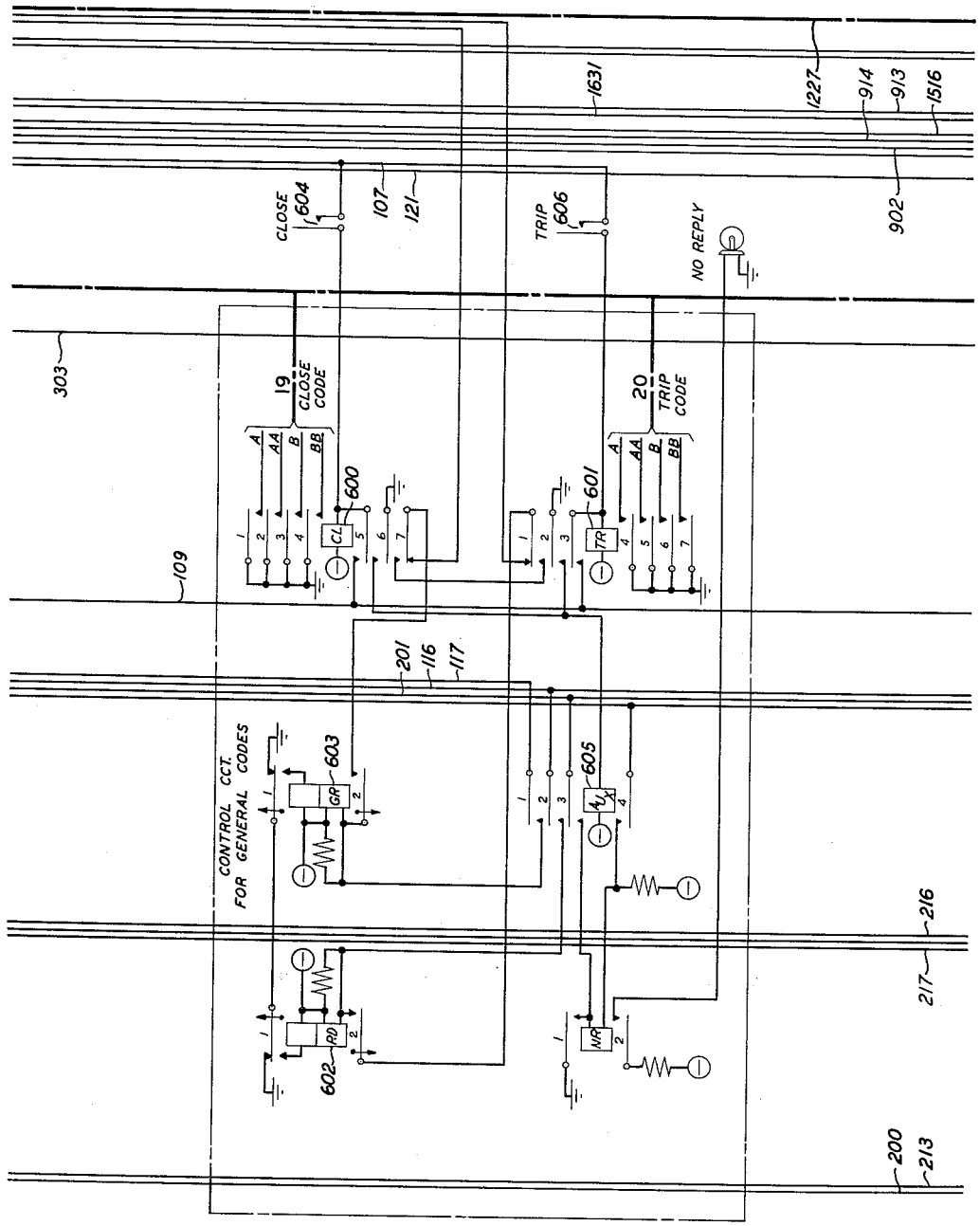
Figure 7:
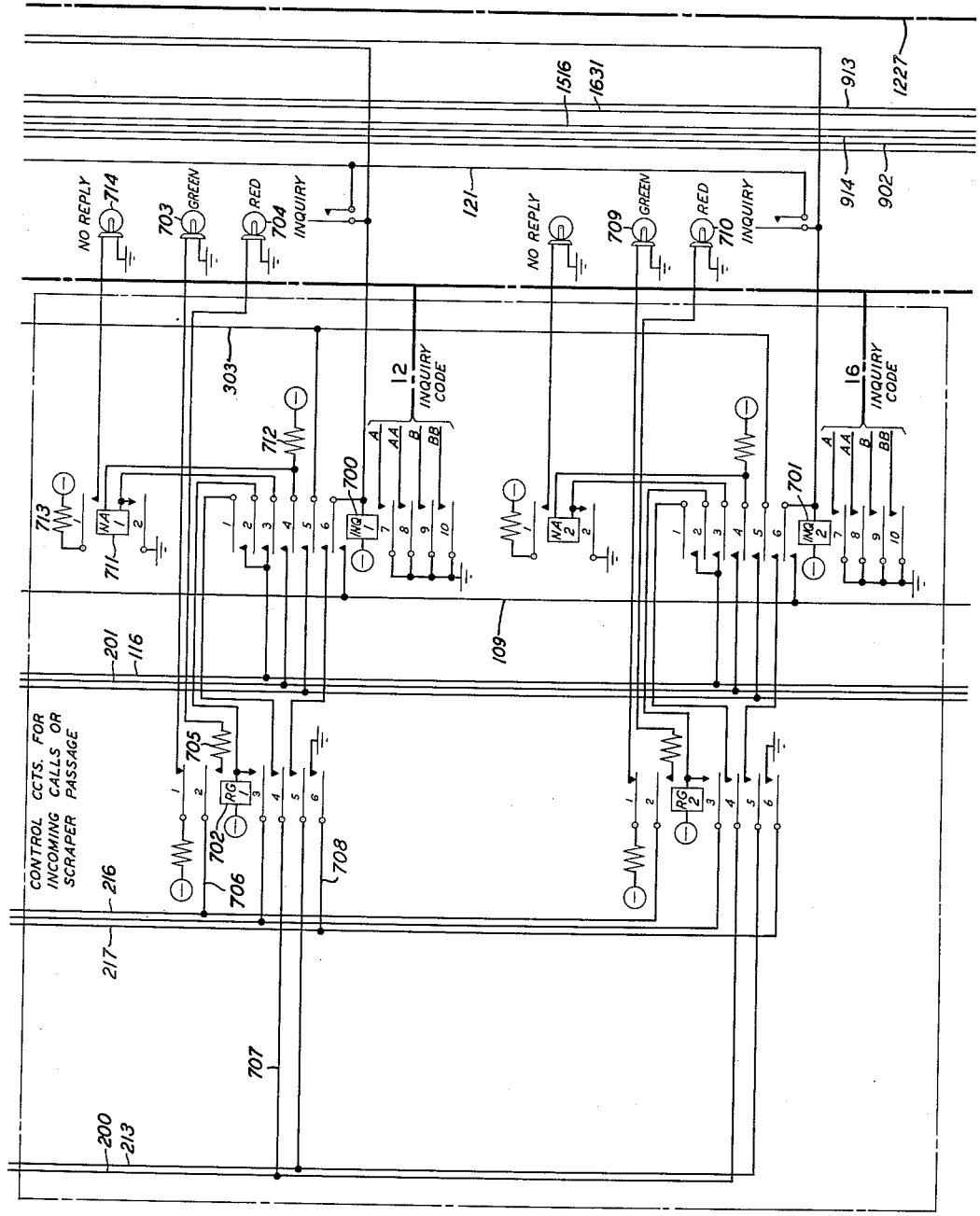
Figure 8:
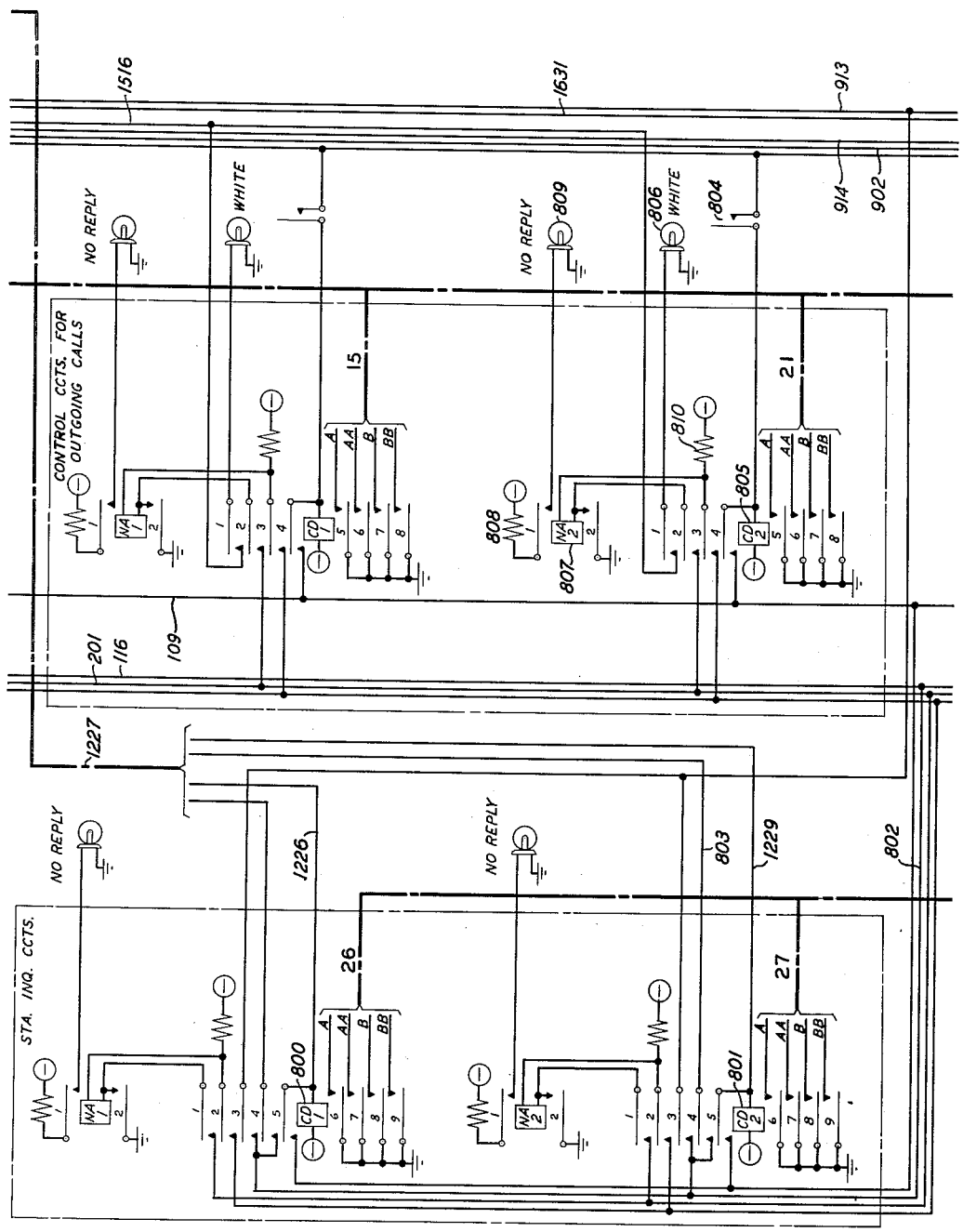
Figure 9:
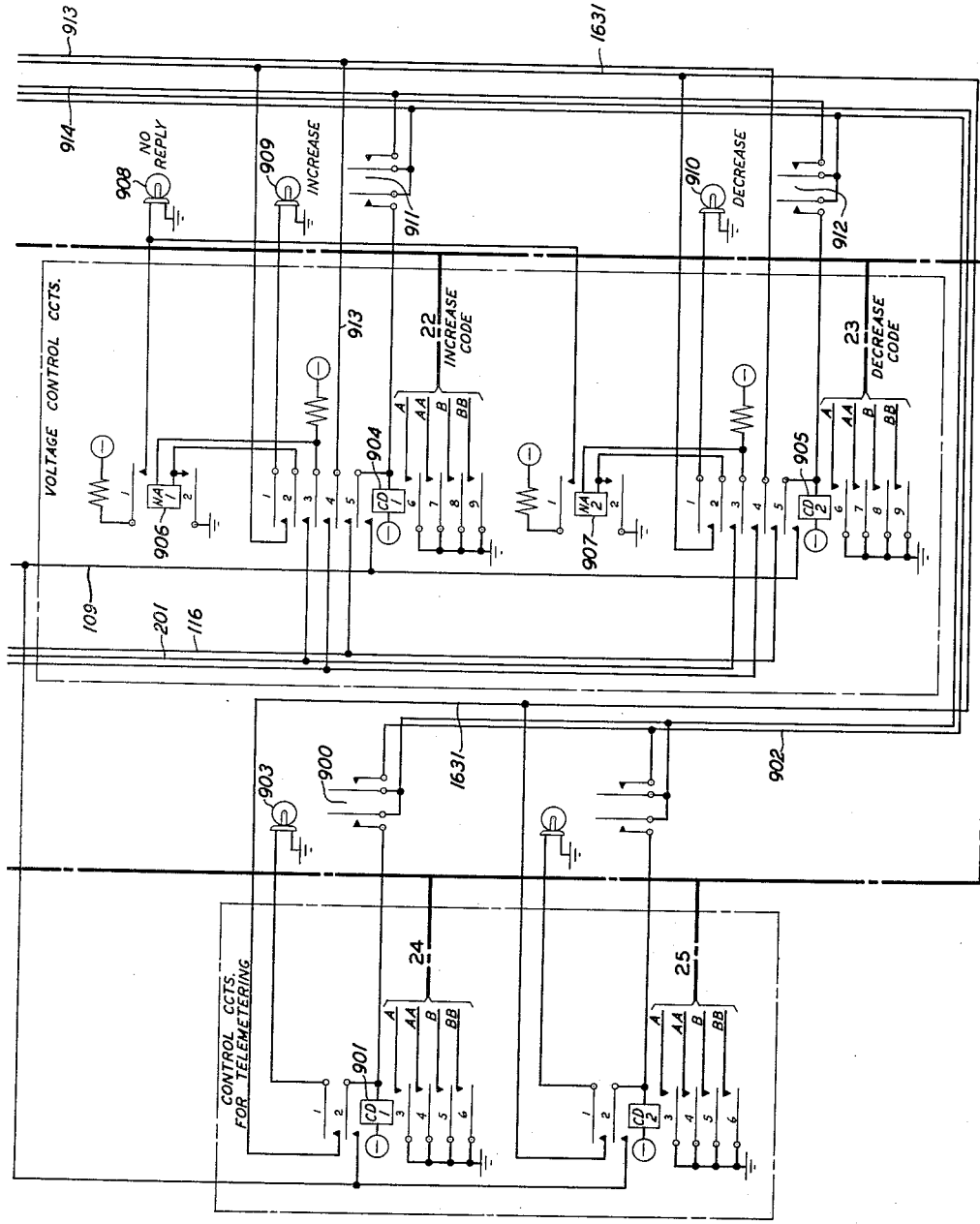
Figure 10:
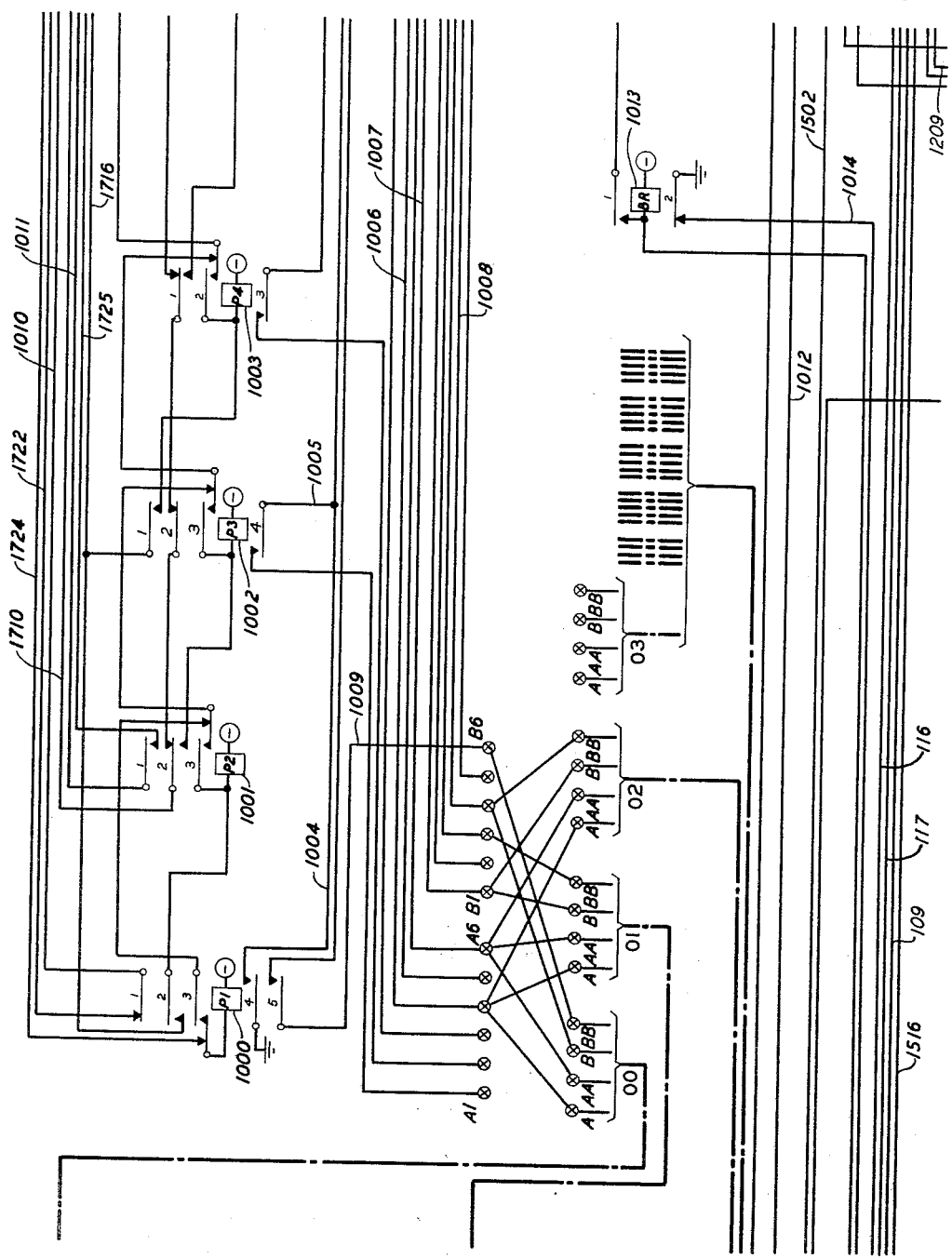
Figure 11:
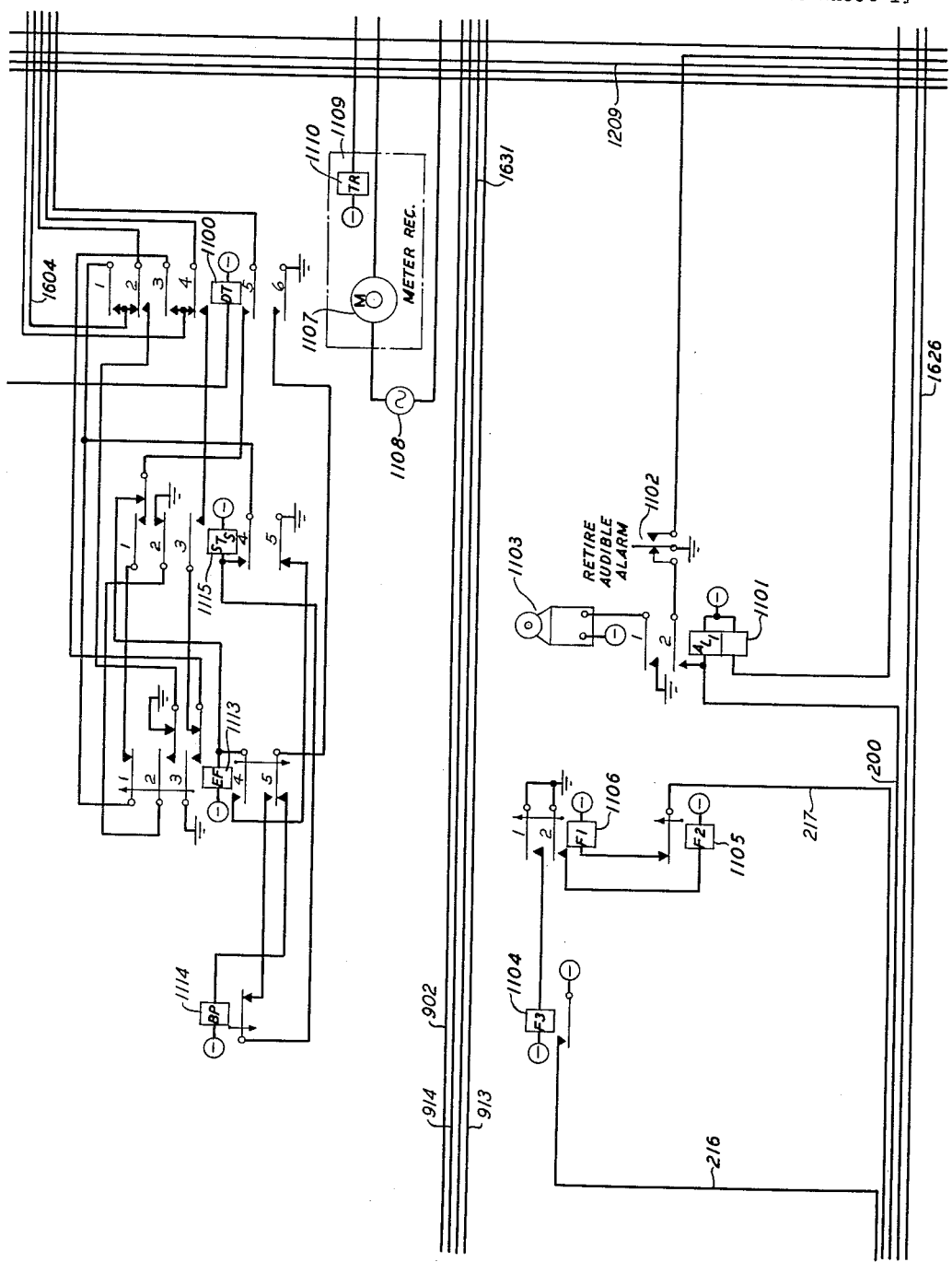
Figure 12:
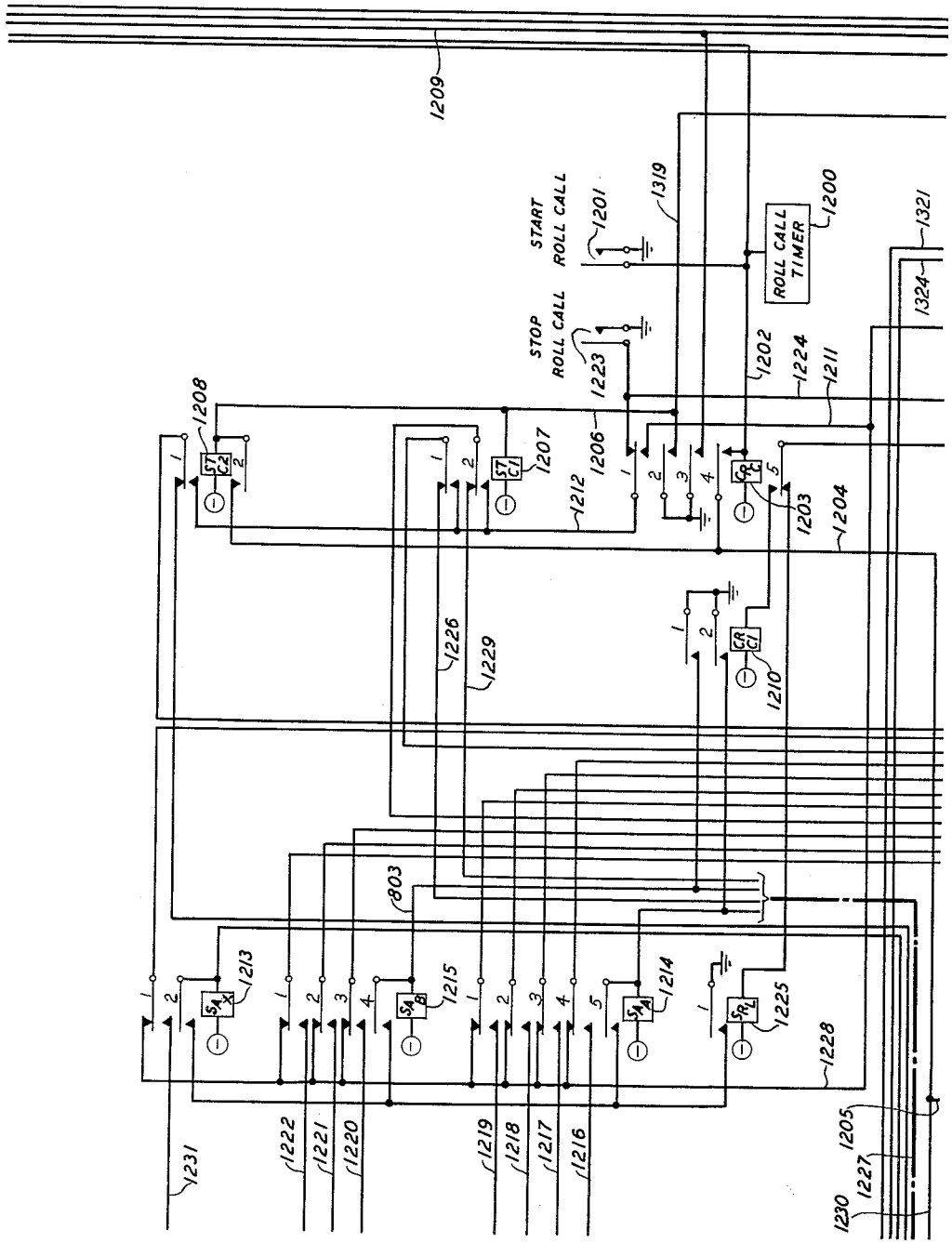
Figure 13:
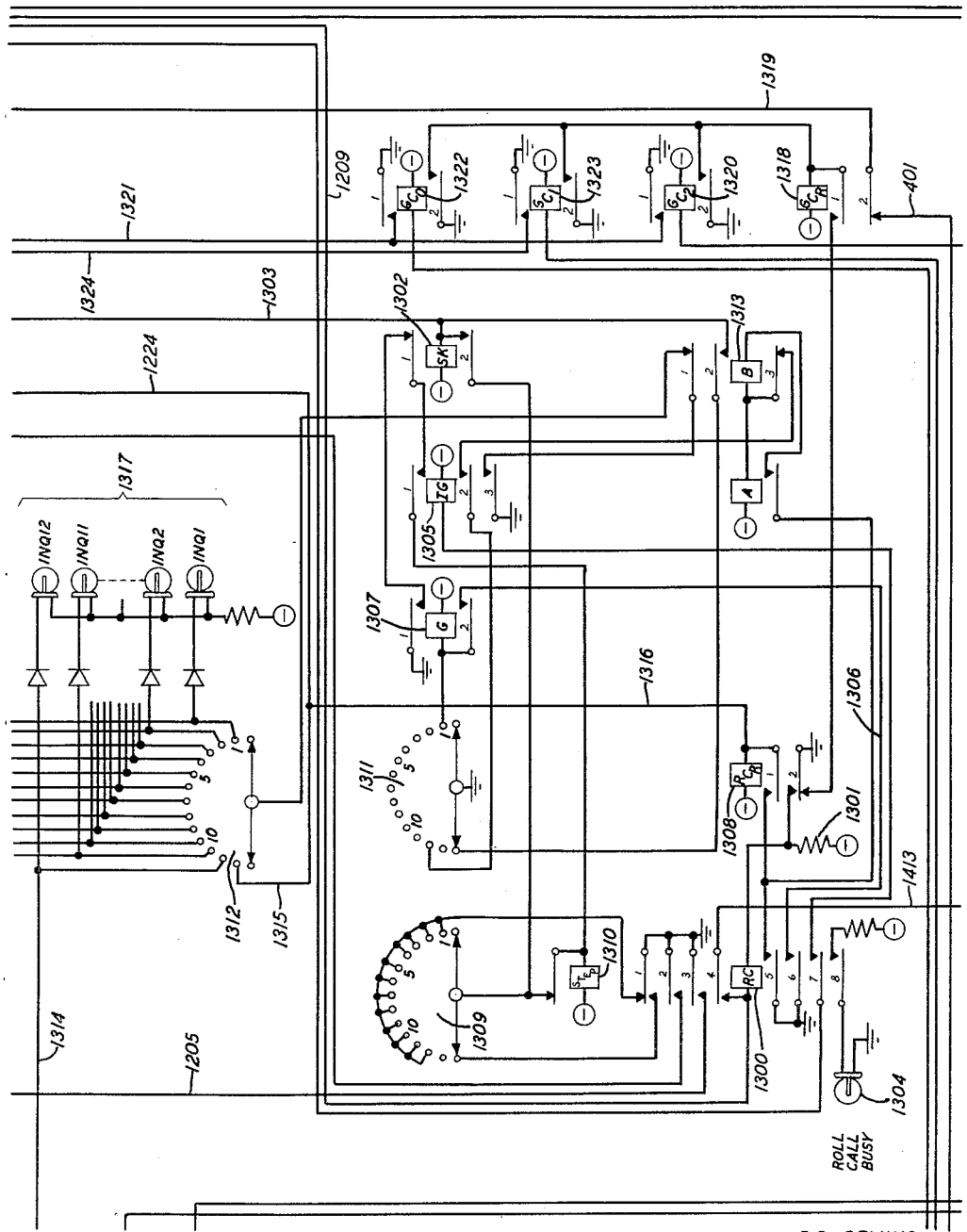
Figure 14:
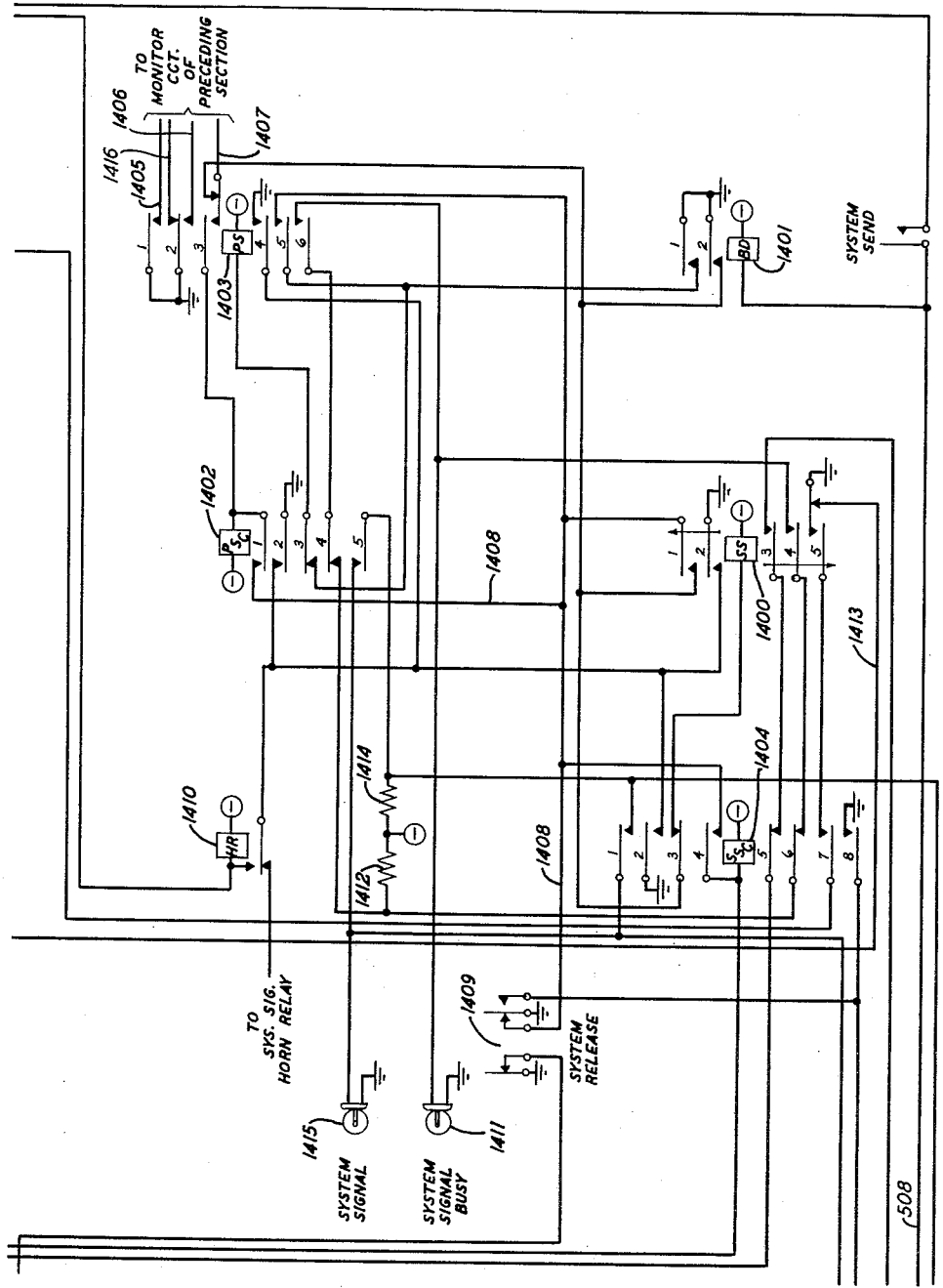
Figure 15:
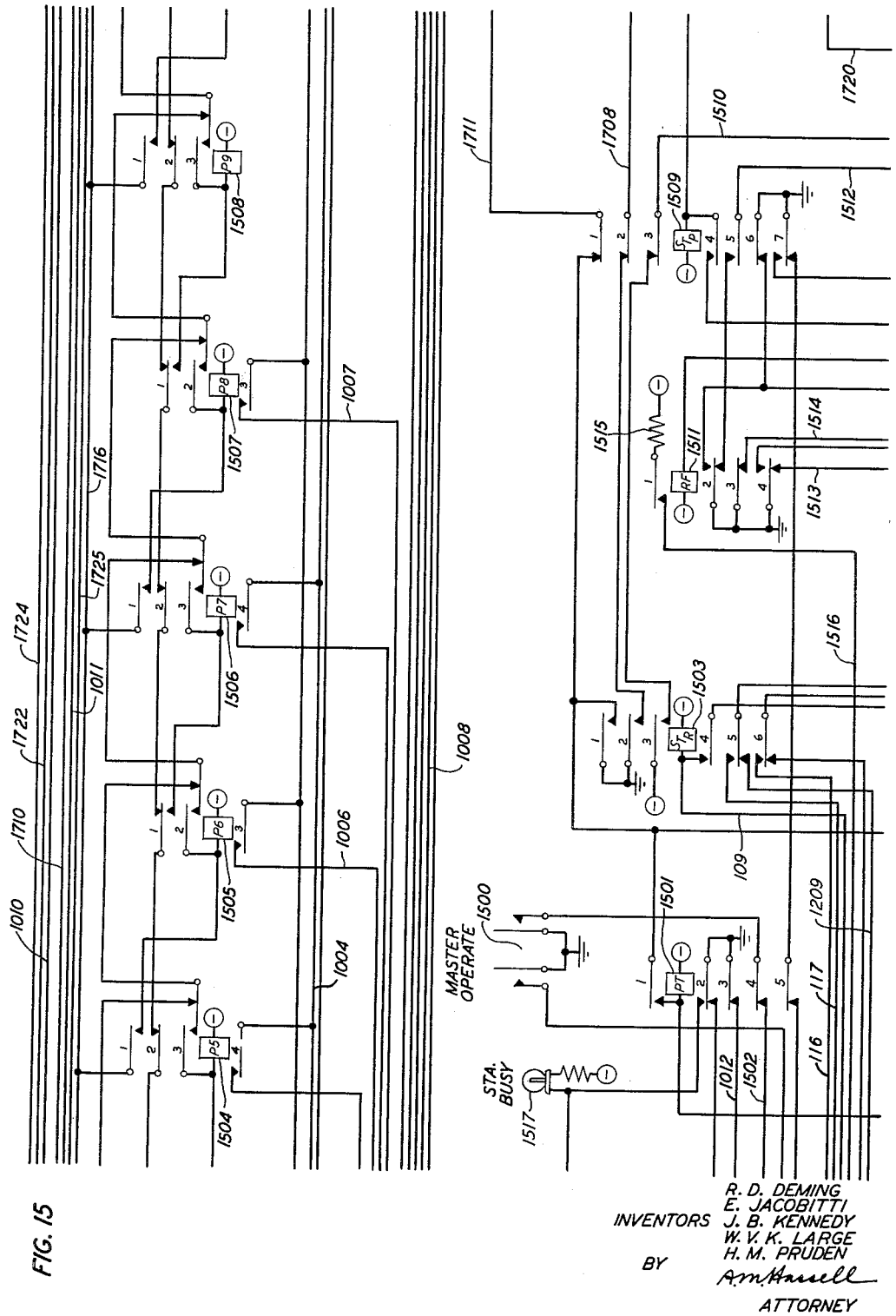
Figure 16:
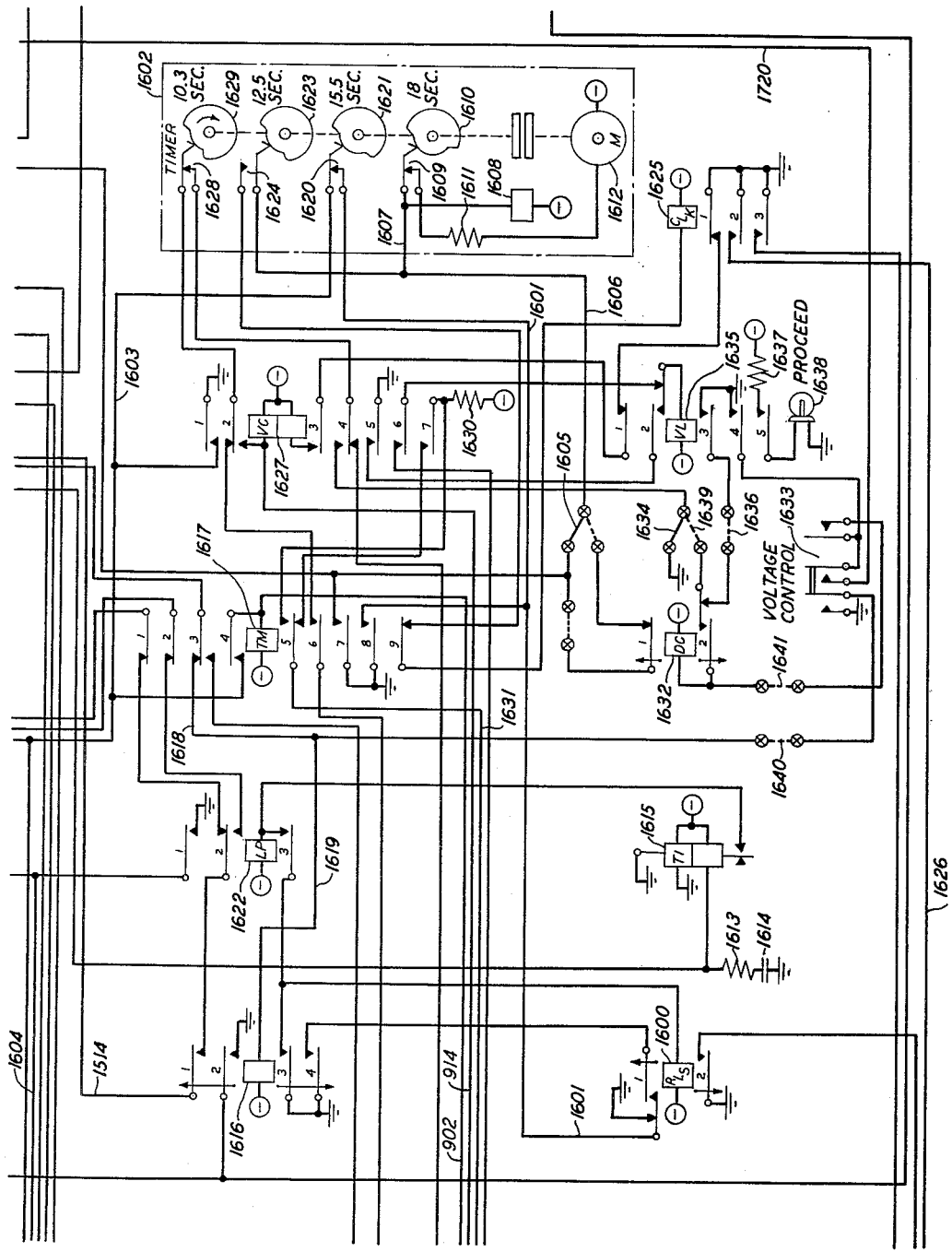
Figure 17:
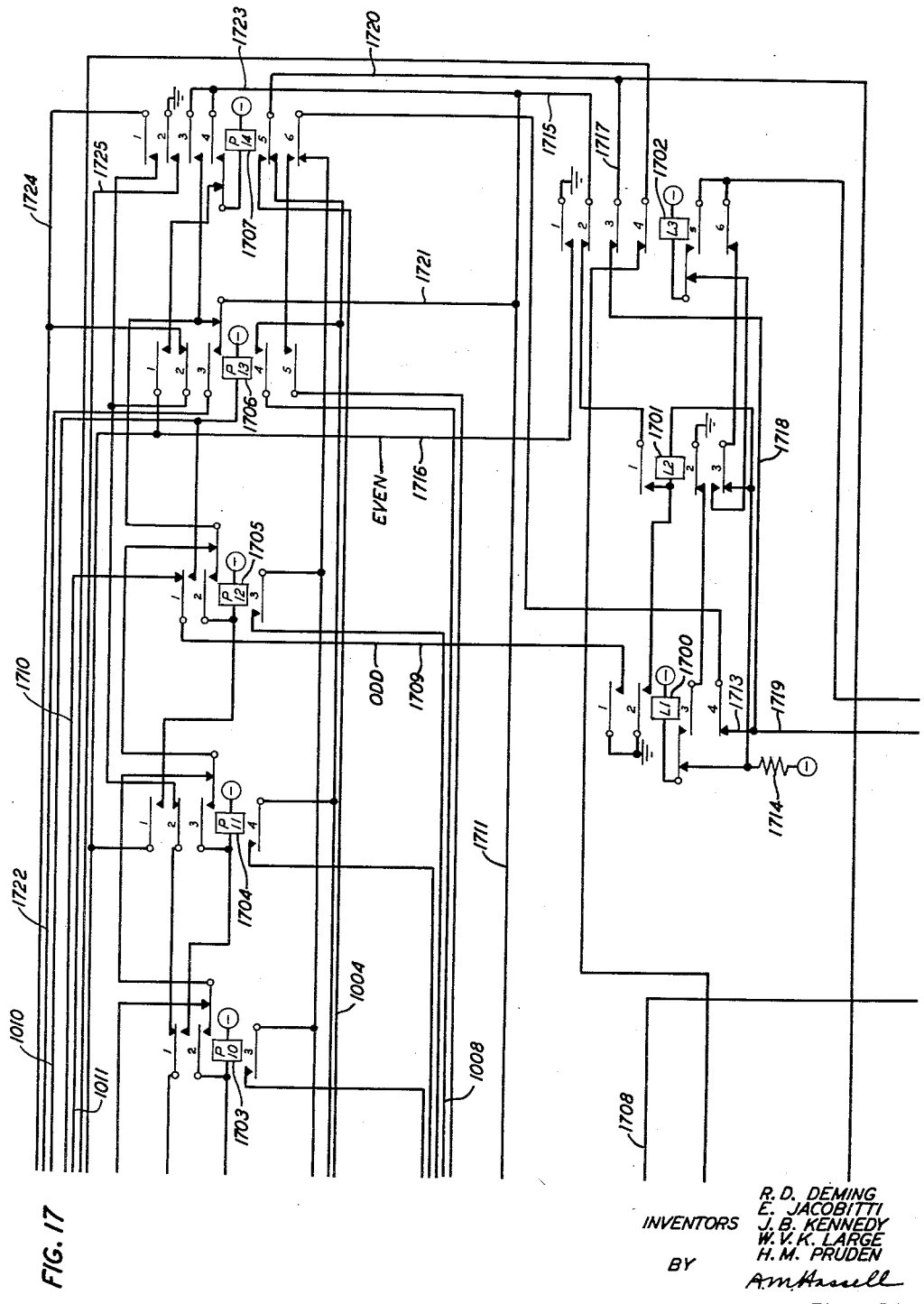
Figure 19:
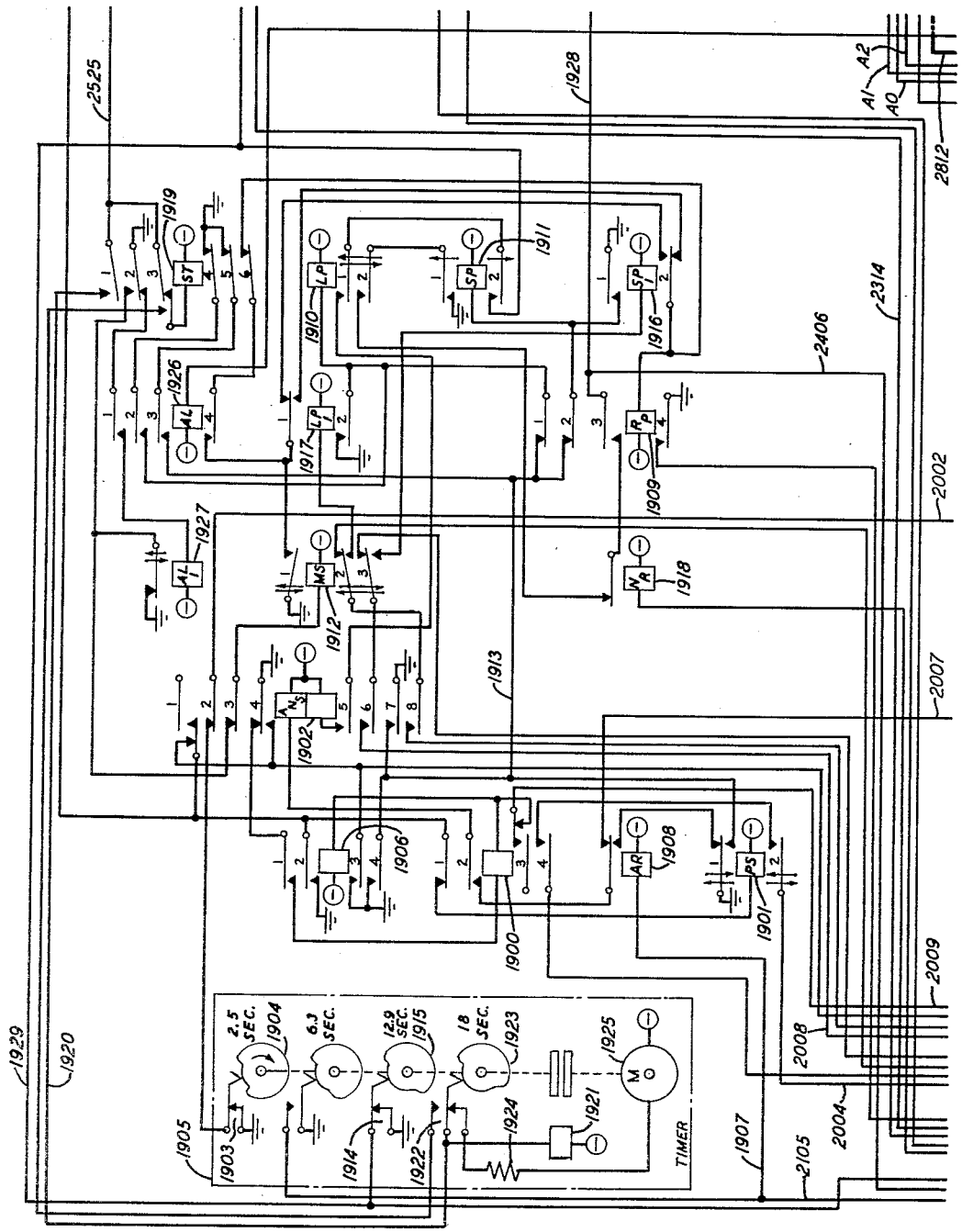
Figure 20:
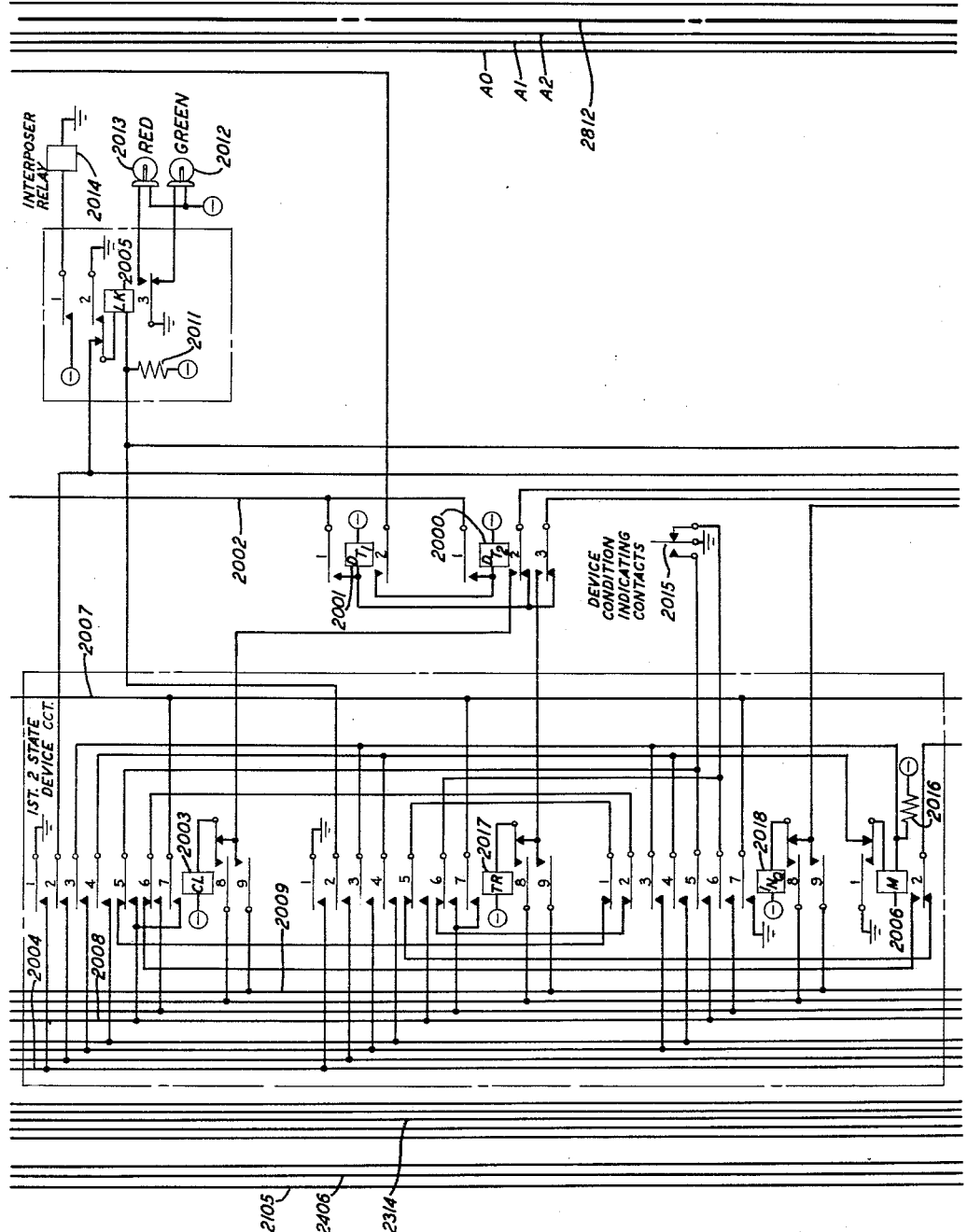
Figure 21:
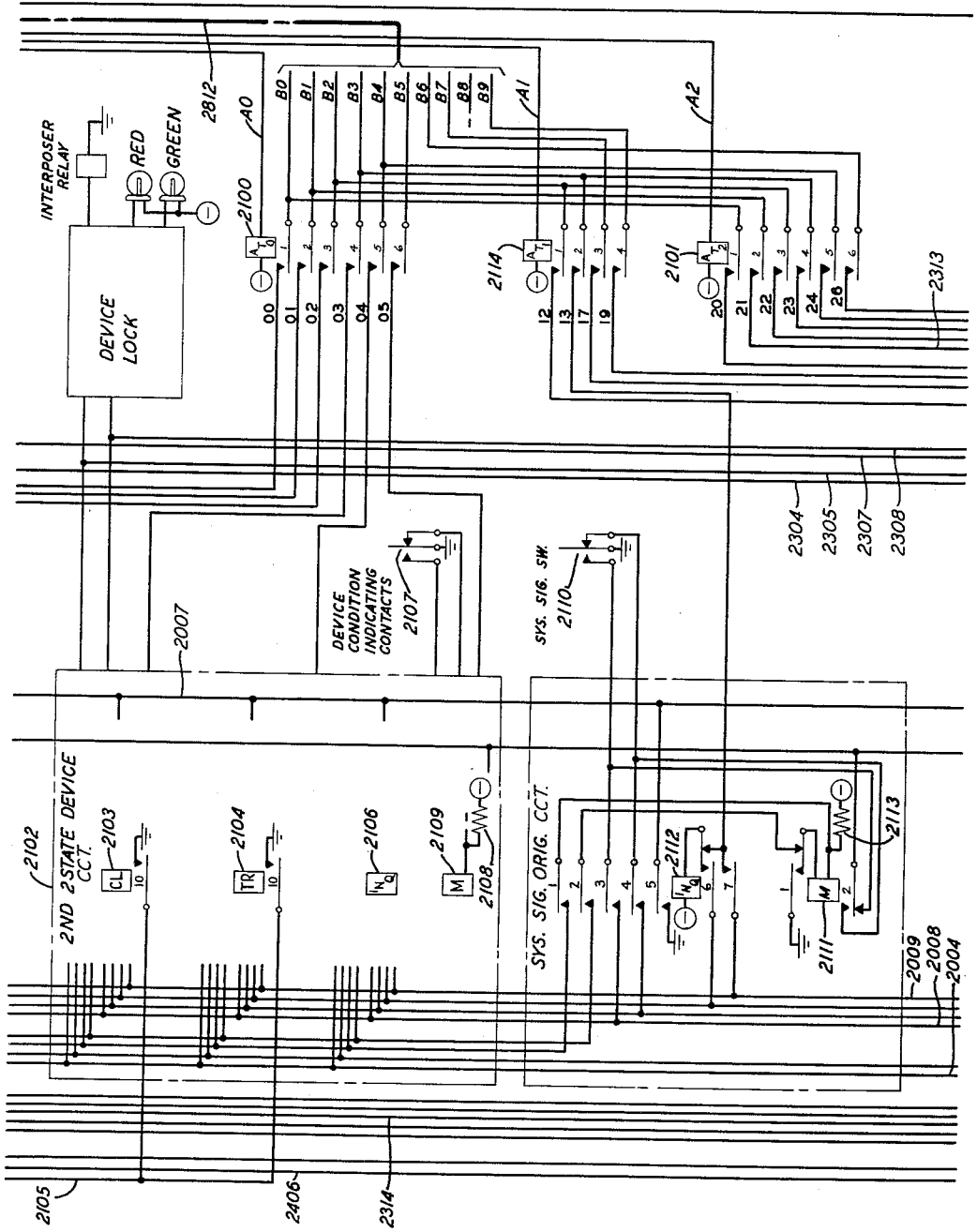

More particularly, FIGS. 1–3 disclose circuits for the selective control of remote two-state devices;

FIGS. 4 and 5 show system signal circuits;

FIG. 6 discloses general code circuits;

FIGS. 7, 8 and 9 show various control and indicating circuits;

FIGS. 10, 15 and 17 contain control and pulsing circuits;

FIG. 11 discloses double code transmission, alarm and telemetering circuits;

FIGS. 12 and 13 show certain roll-call control circuits;

FIG. 14 contains system signal circuits;

FIG. 16 shows certain common control circuits;

Figure 18:
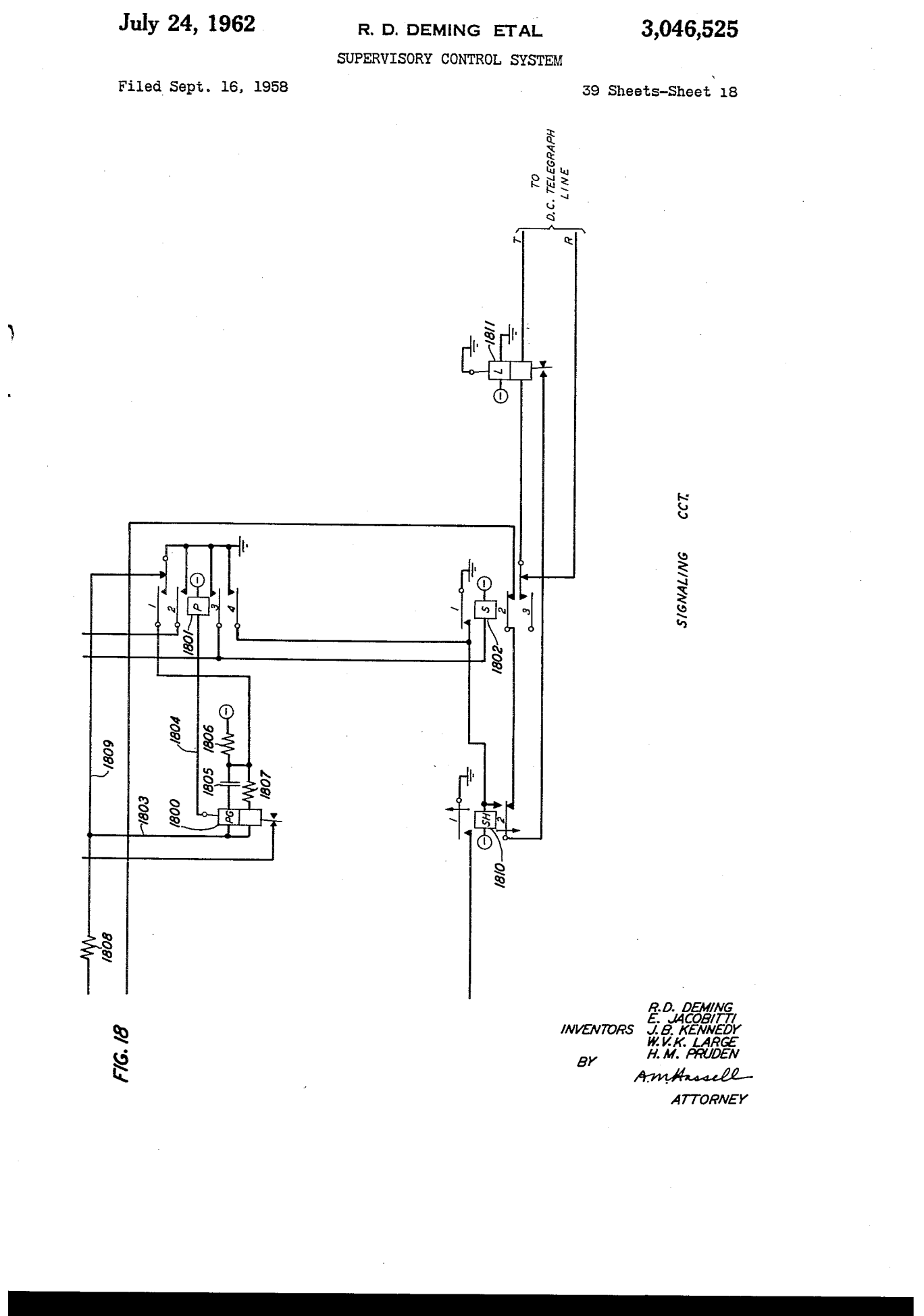

FIG. 18 discloses composite sending and receiving circuits;

FIG. 19 shows certain common control circuits;

FIG. 20 contains two-state device control circuits;

FIG. 21 discloses system signal originating circuits together with control circuits for an additional two-state device.

Figure 22:
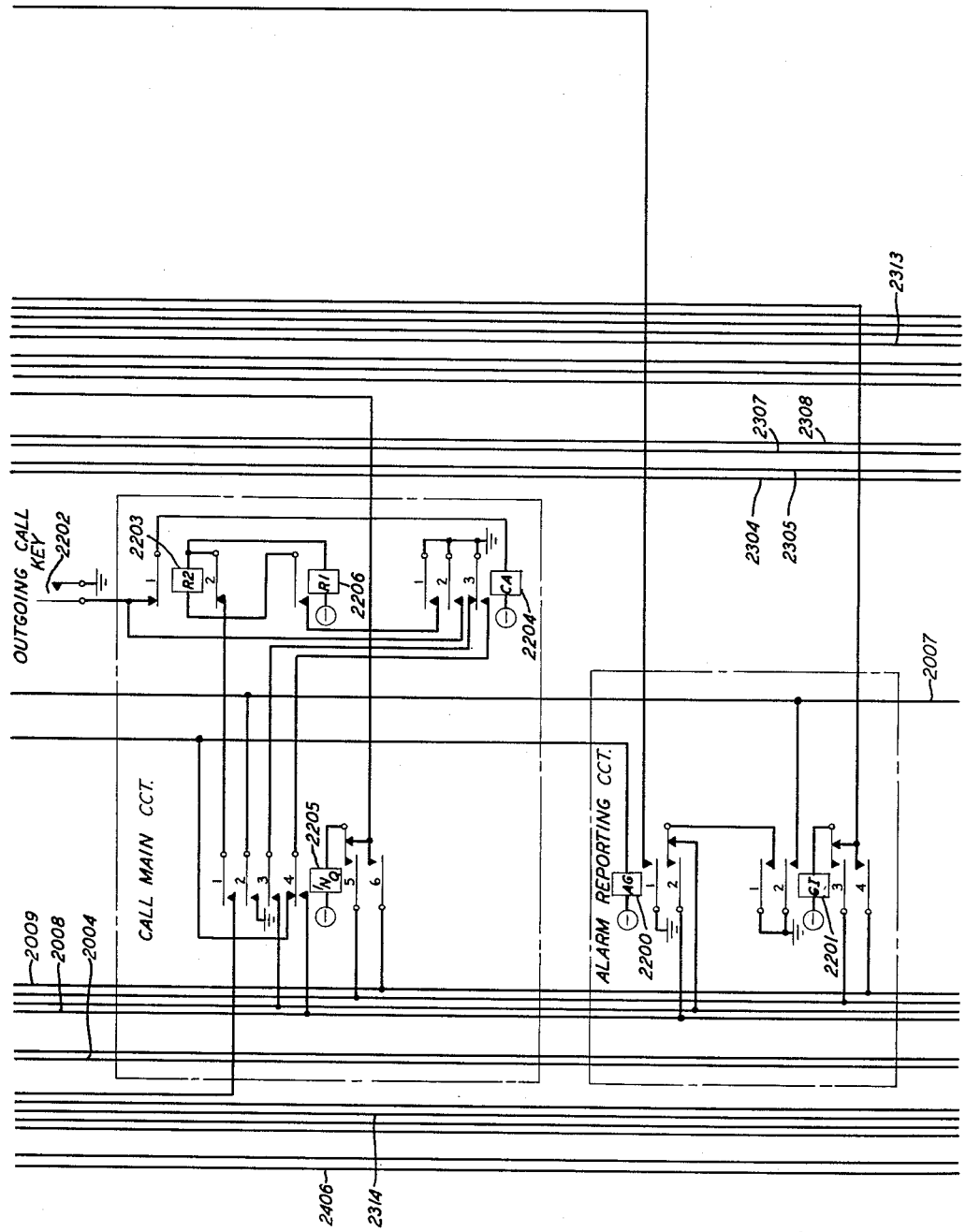
Figure 23:
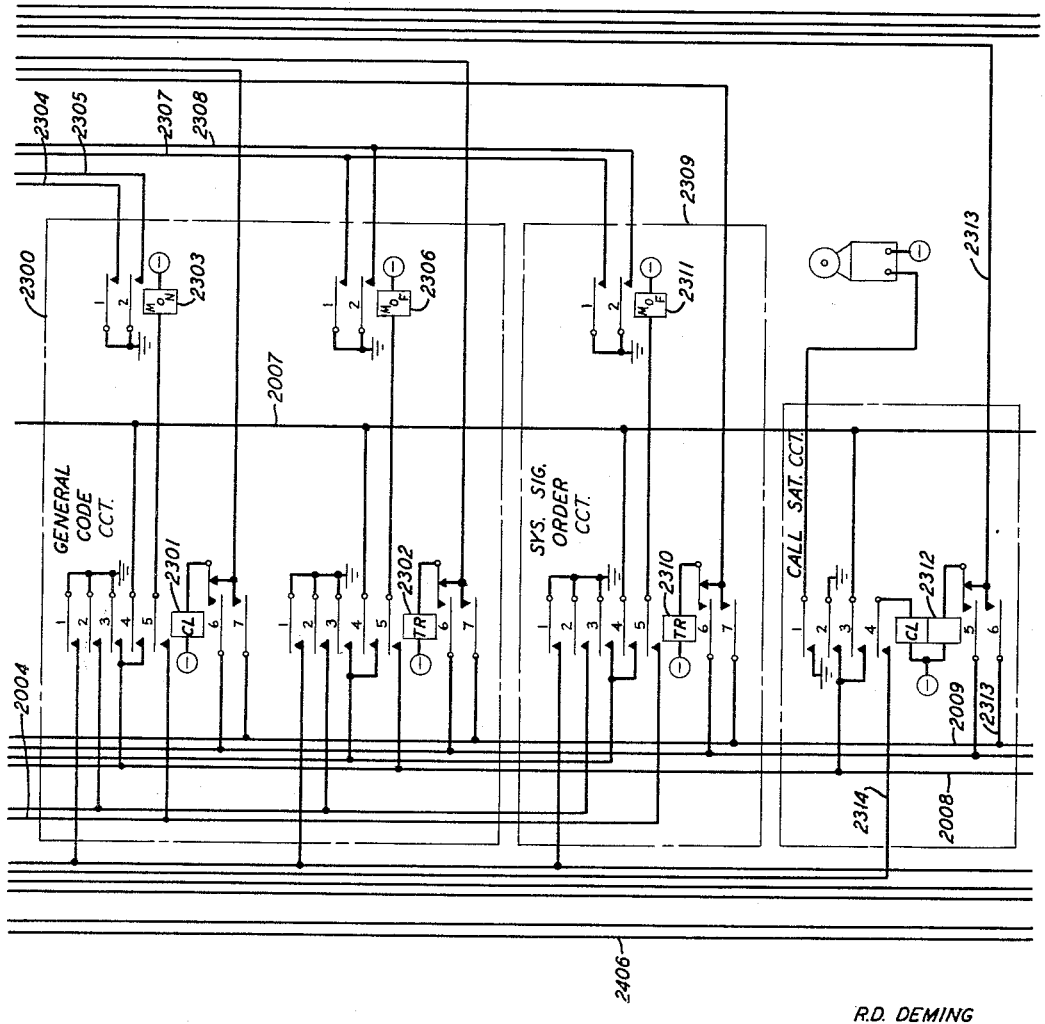
Figure 24:
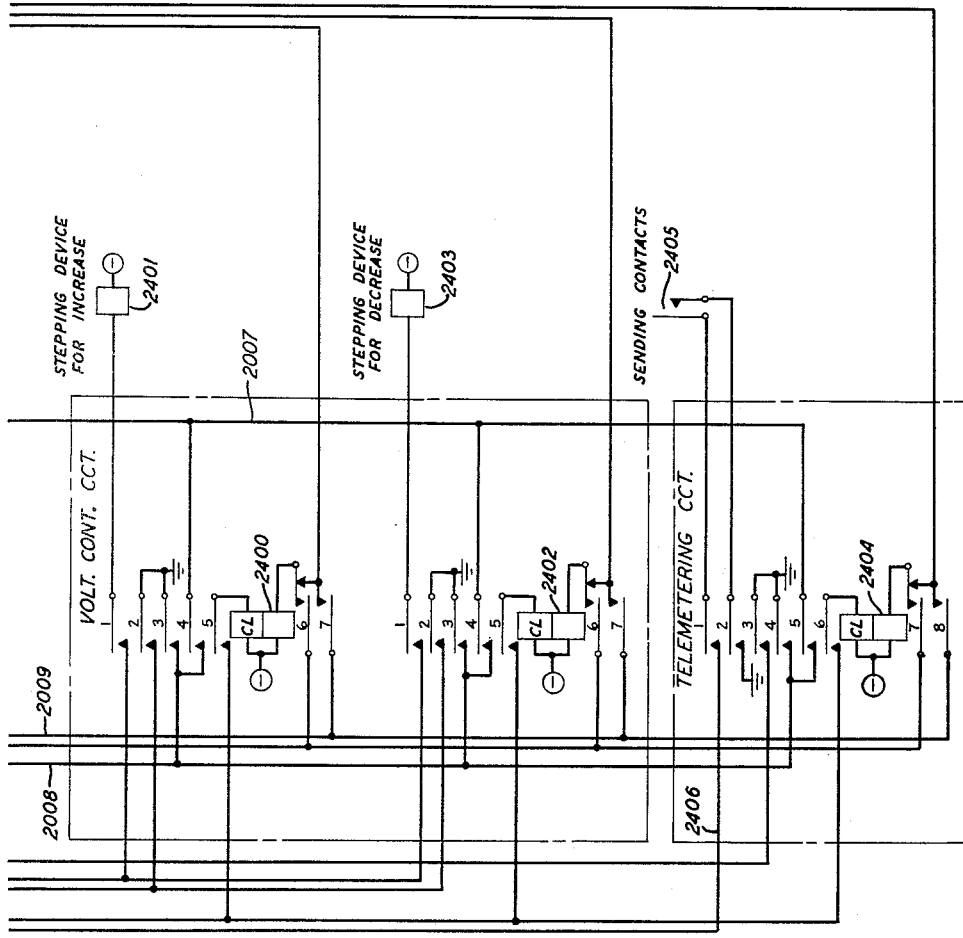
Figure 25:
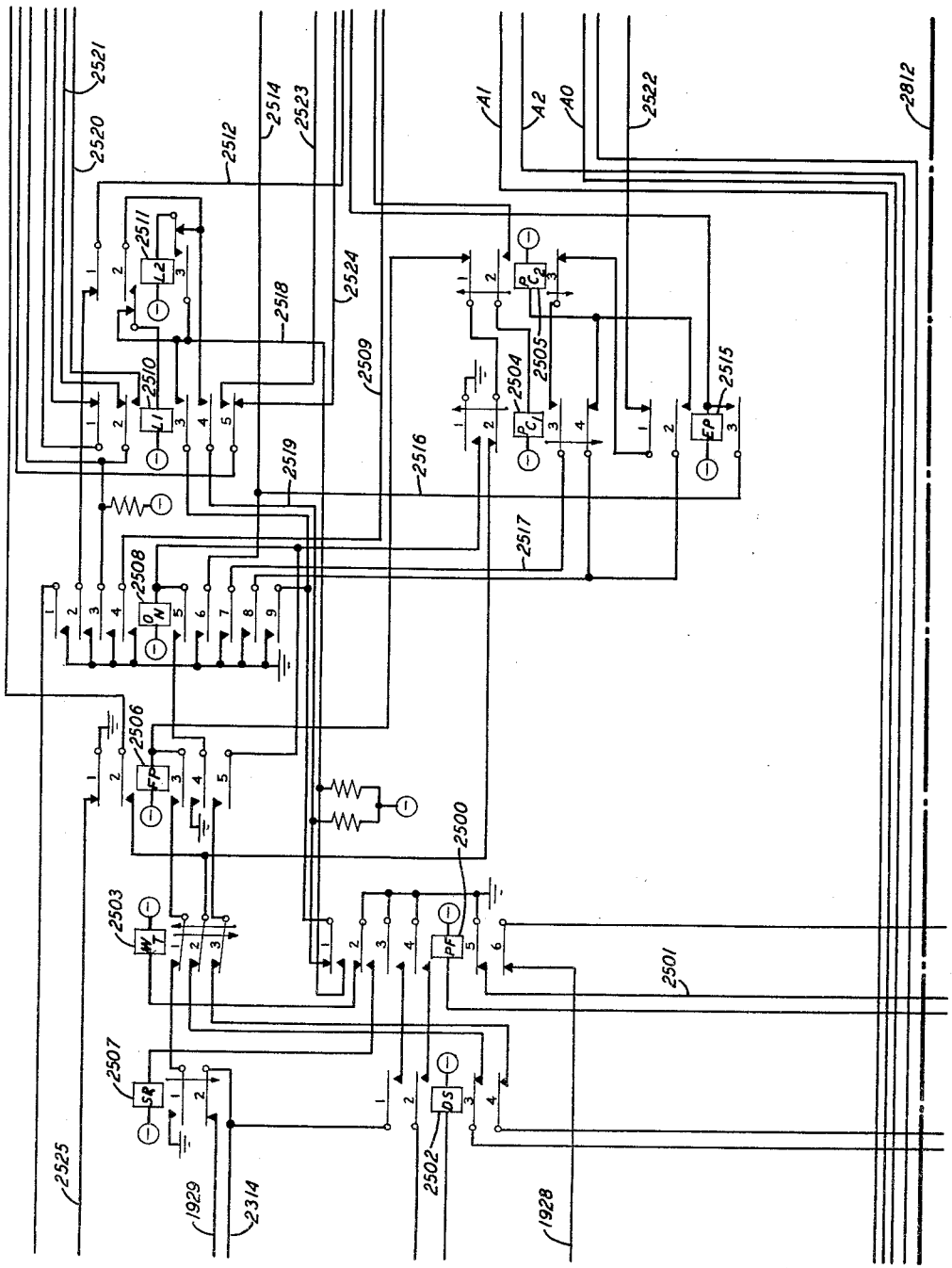
Figure 26:
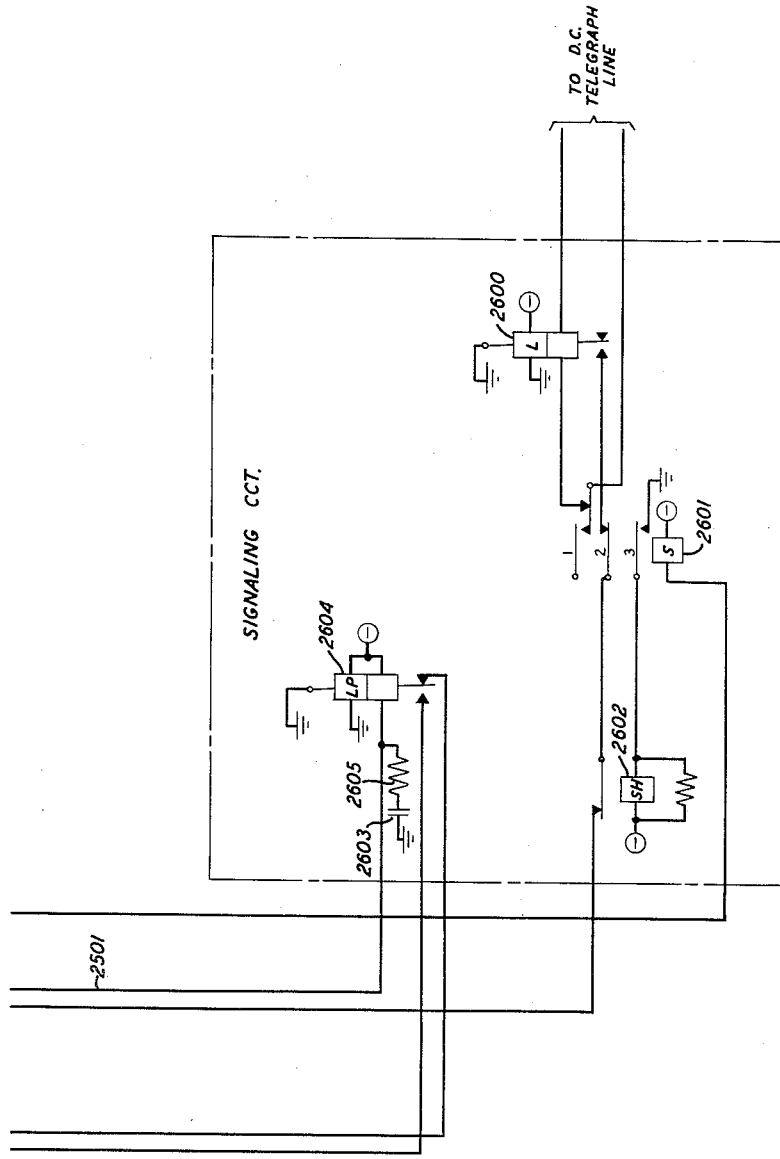
Figure 27:
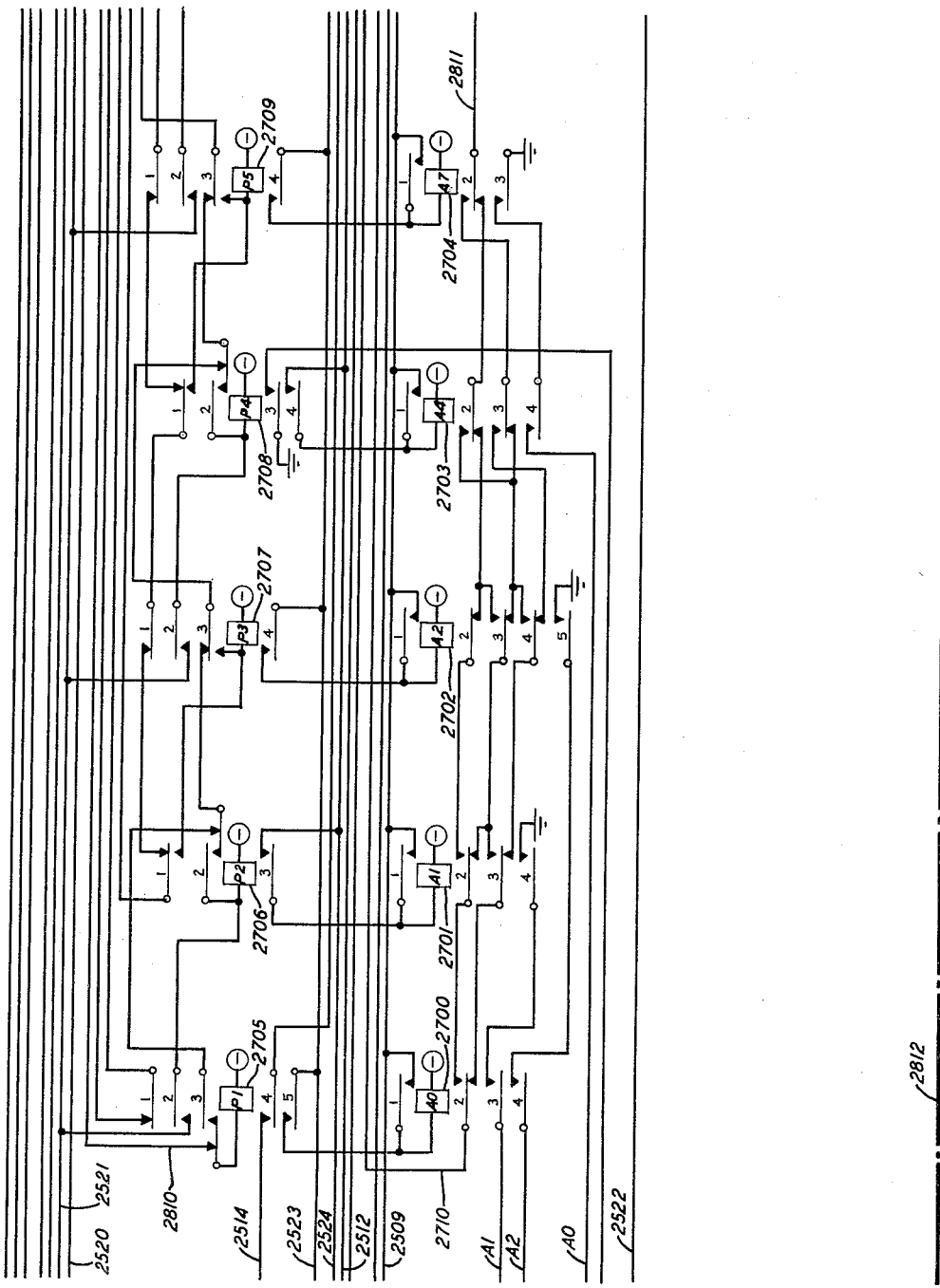
Figure 28:
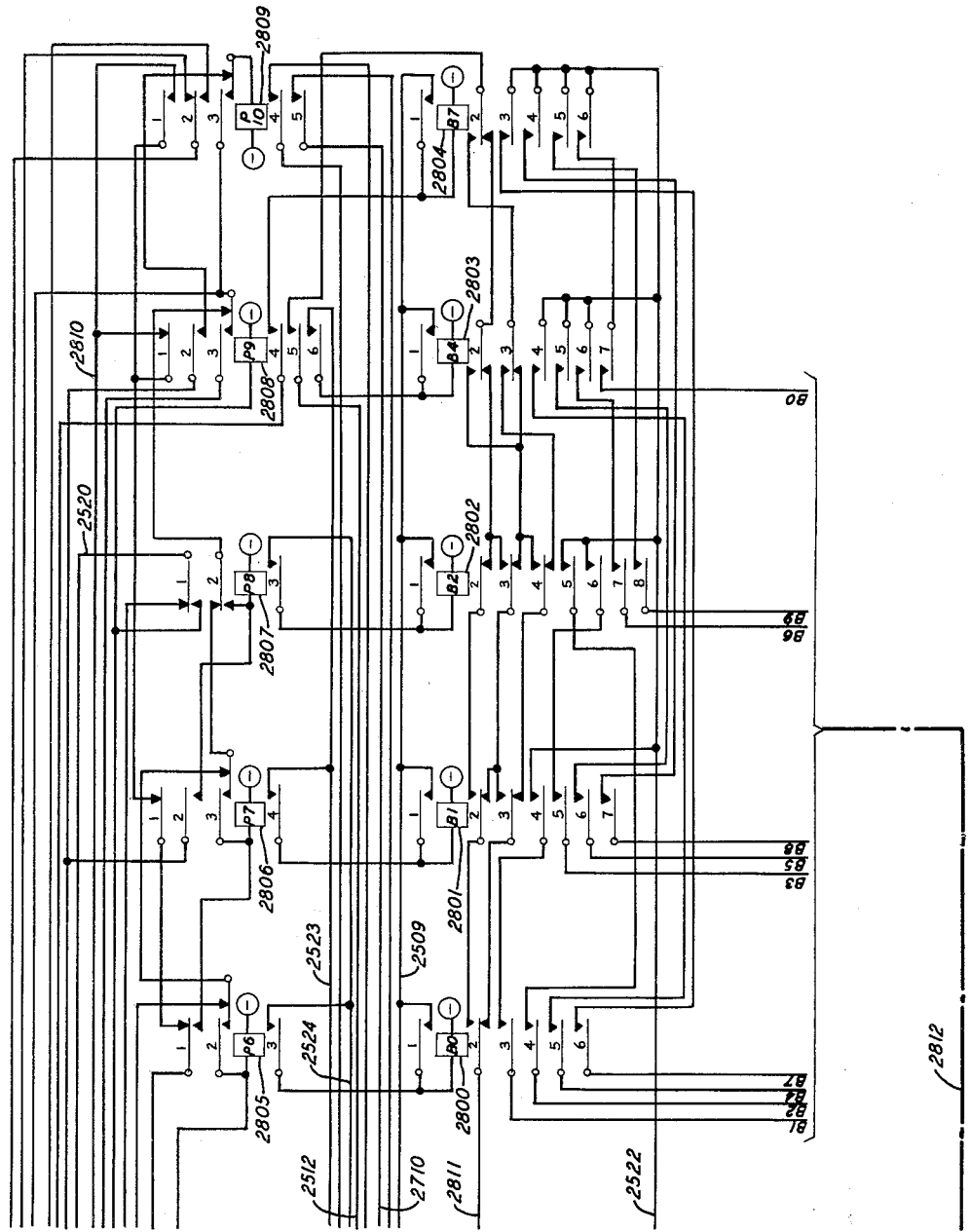
Figure 31:
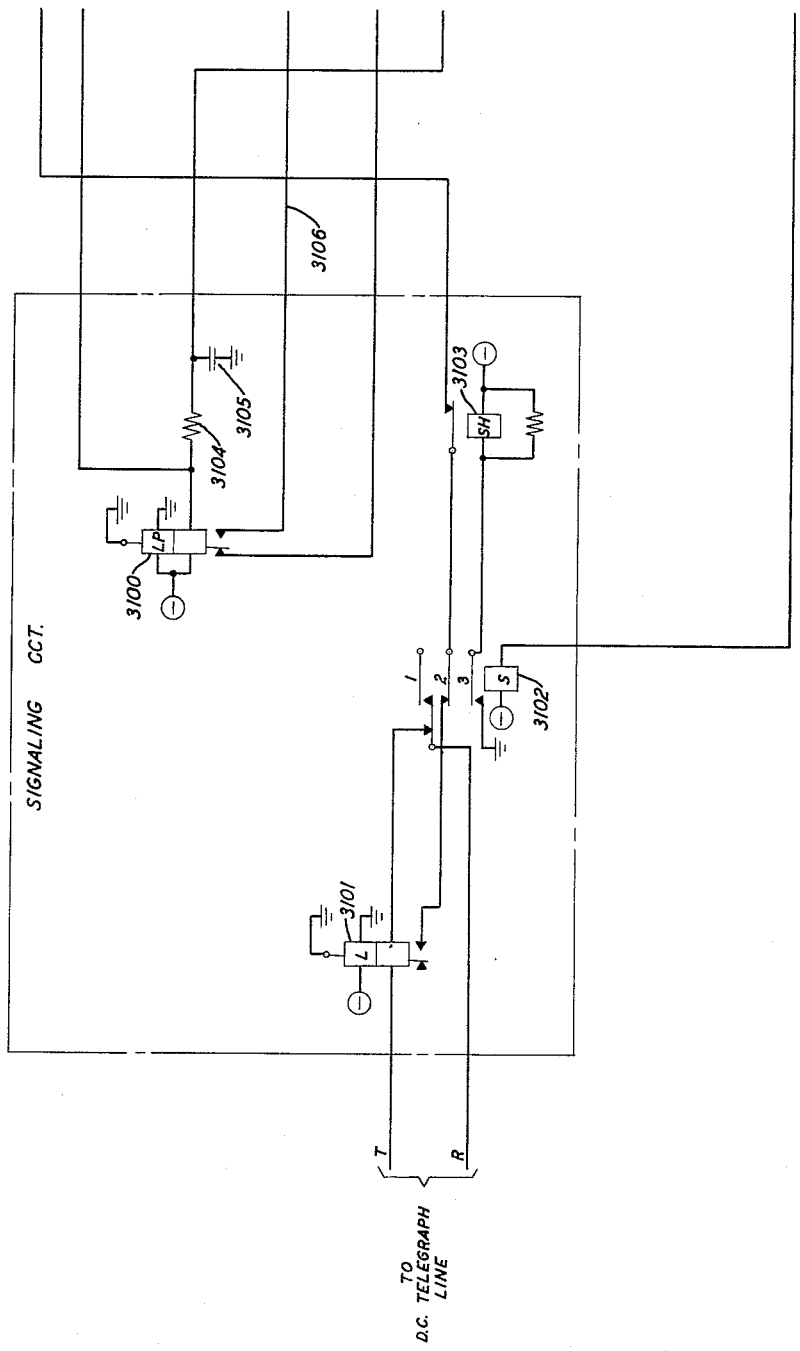
Figure 32:
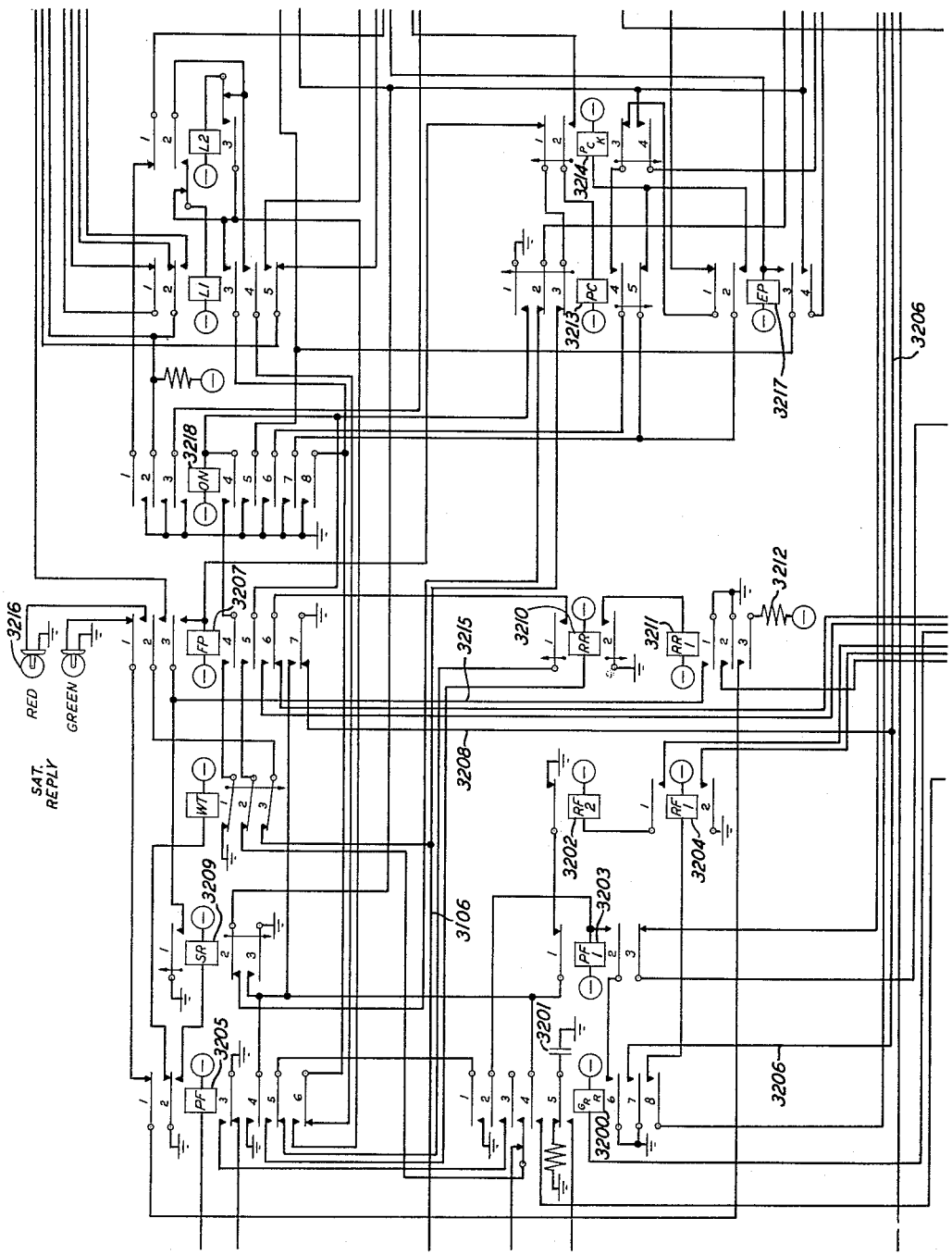
Figure 33:
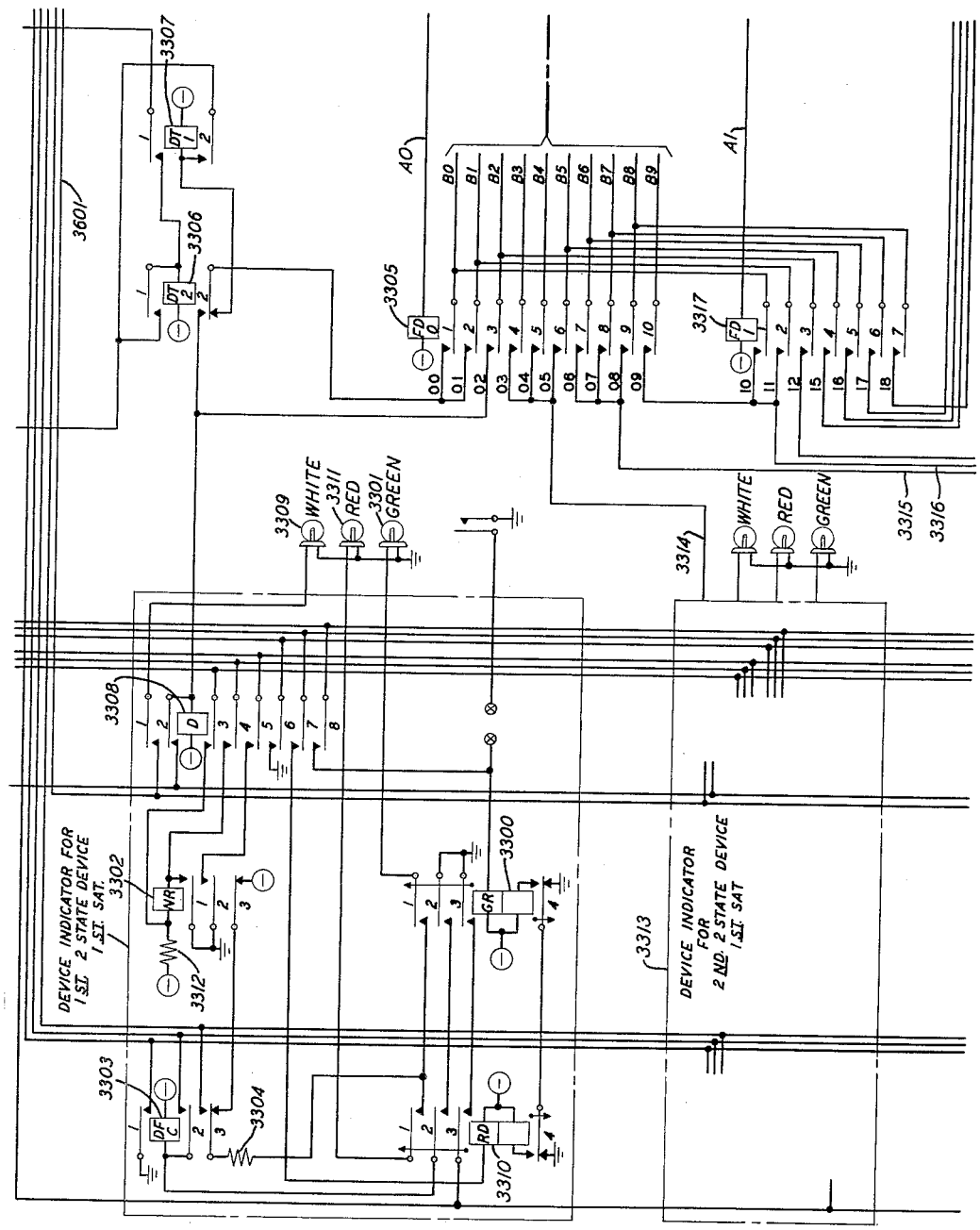
Figure 34:
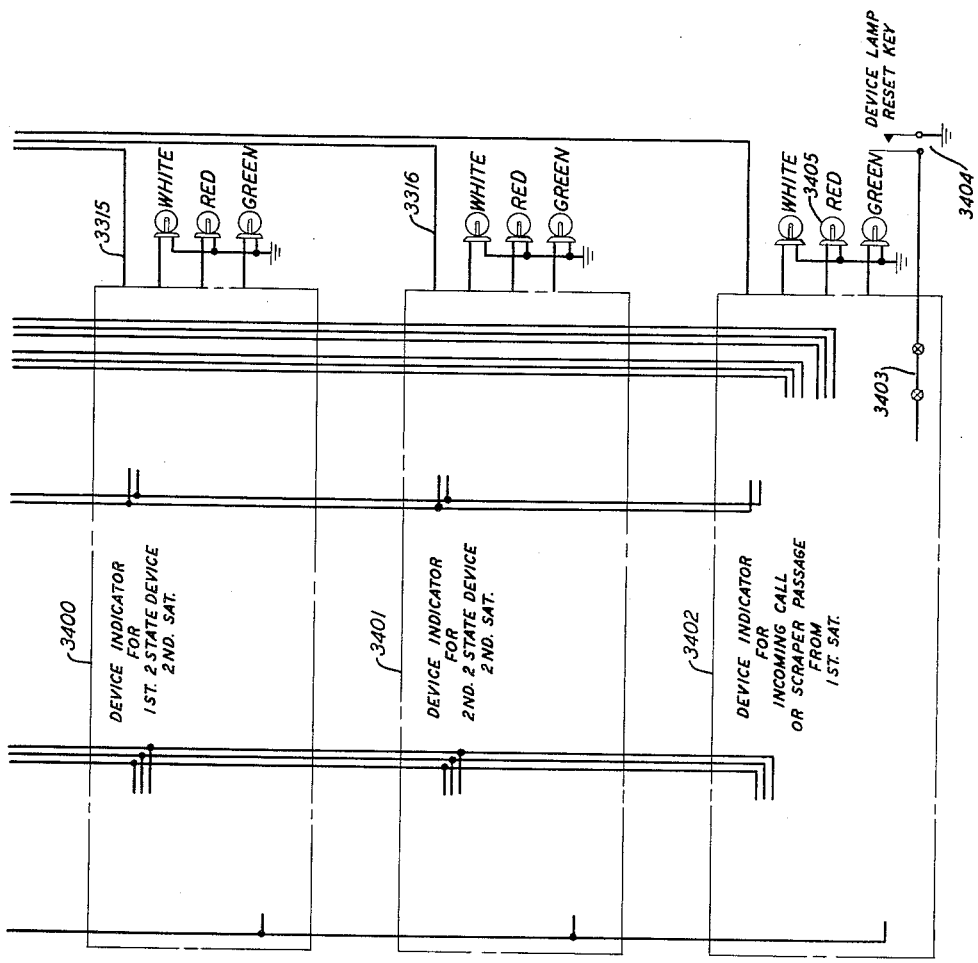
Figure 35:
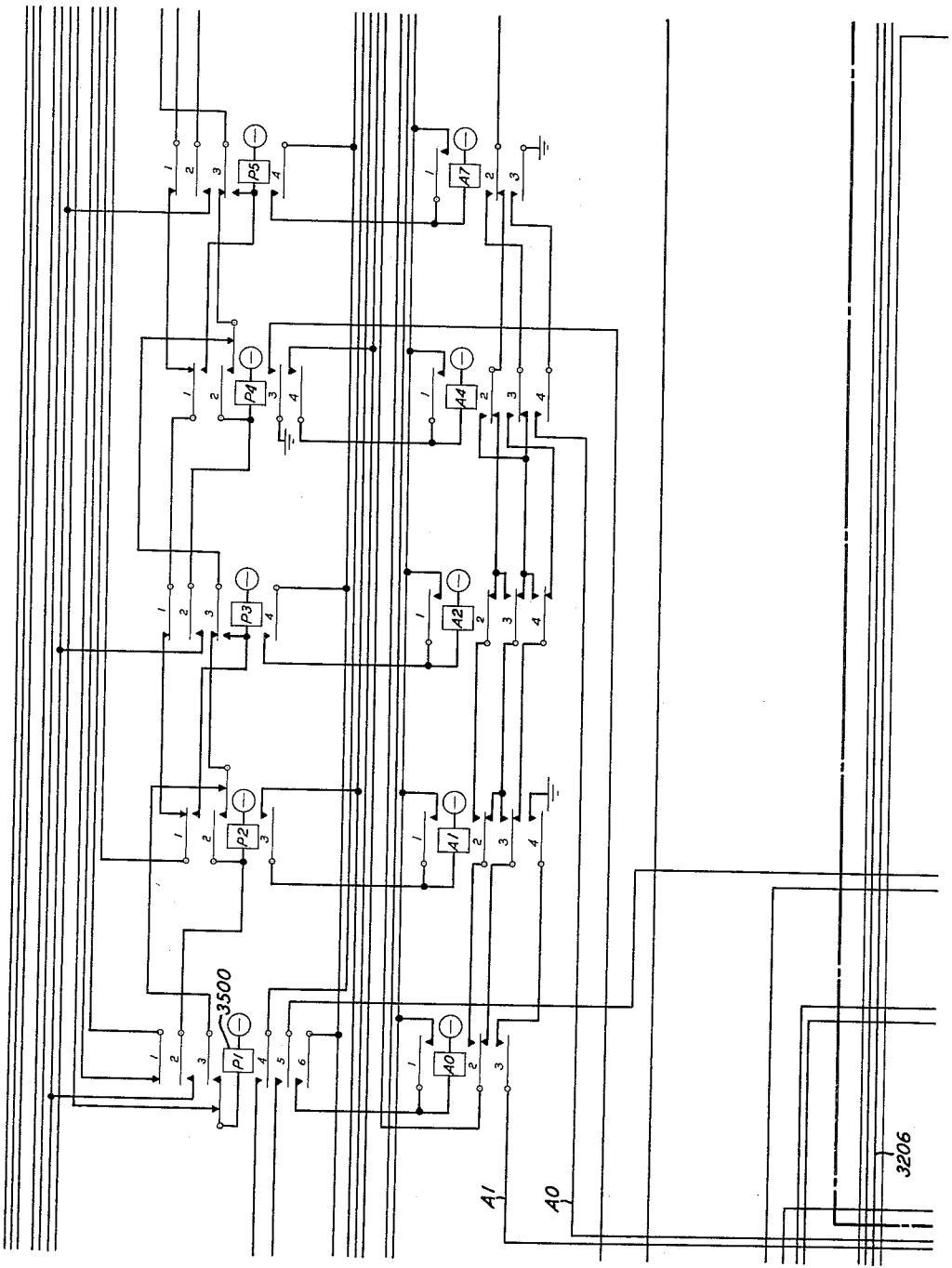
Figure 37:
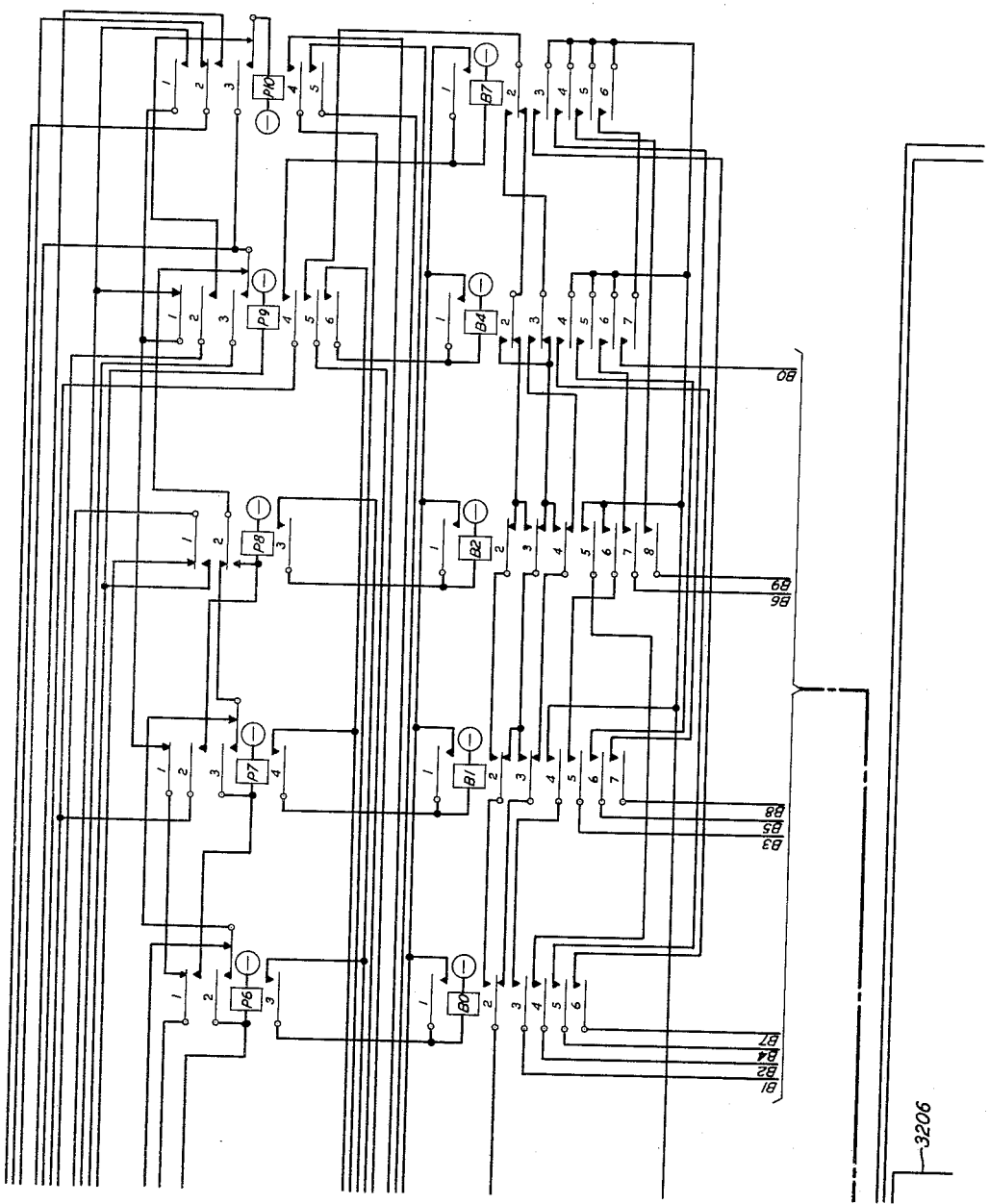

FIGS. 22–24 show miscellaneous circuits;

FIGS. 25, 27 and 28 contain pulsing and decoding circuits;

FIG. 26 discloses signaling circuits;

FIGS. 29 and 30 contain representations of certain circuits;

FIG. 31 shows composite sending and receiving circuits;

FIGS. 32, 35 and 37 disclose pulsing and decoding circuits;

FIGS. 33 and 34 contain indicating circuits for various devices; and

Figure 36:
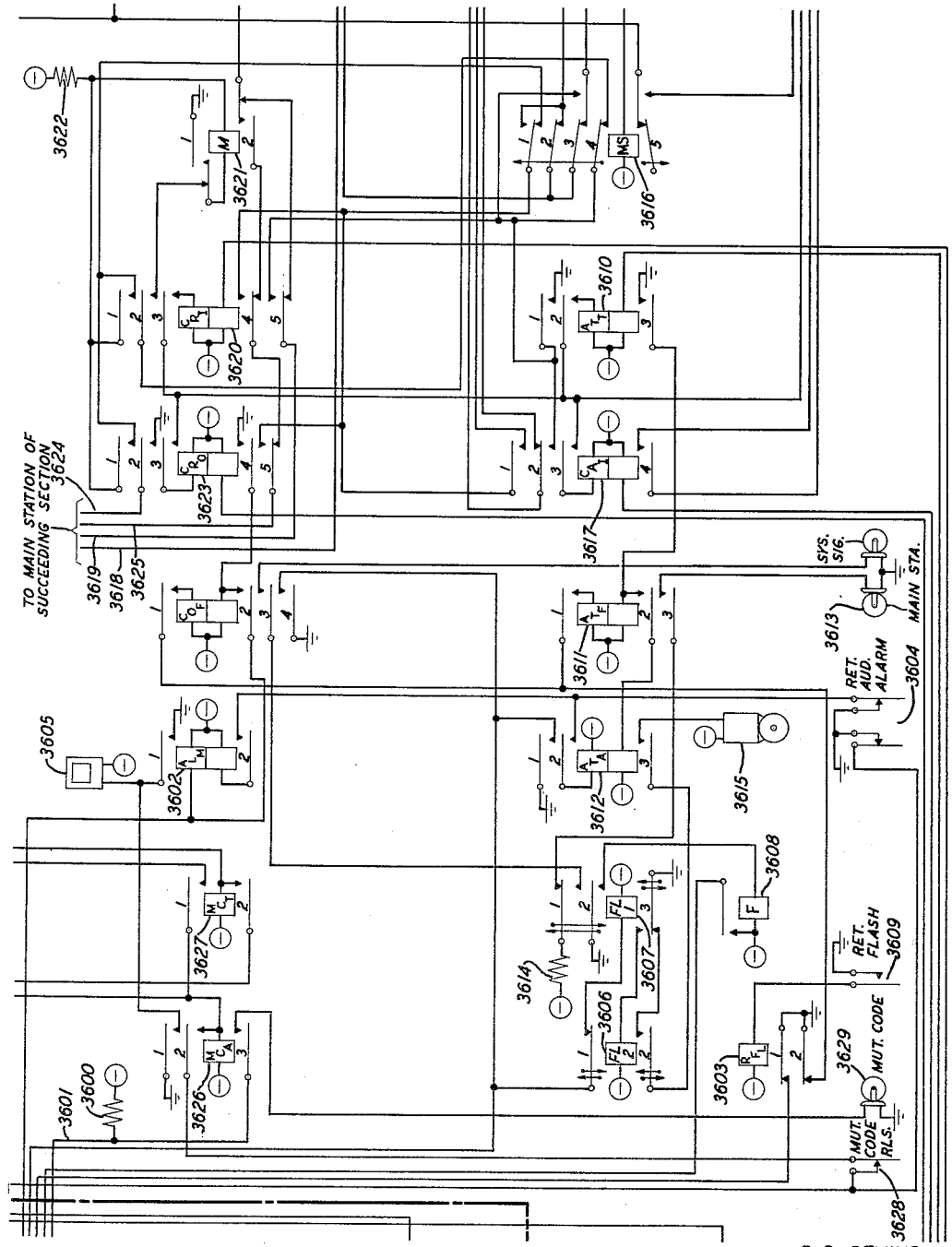
Figure 38:
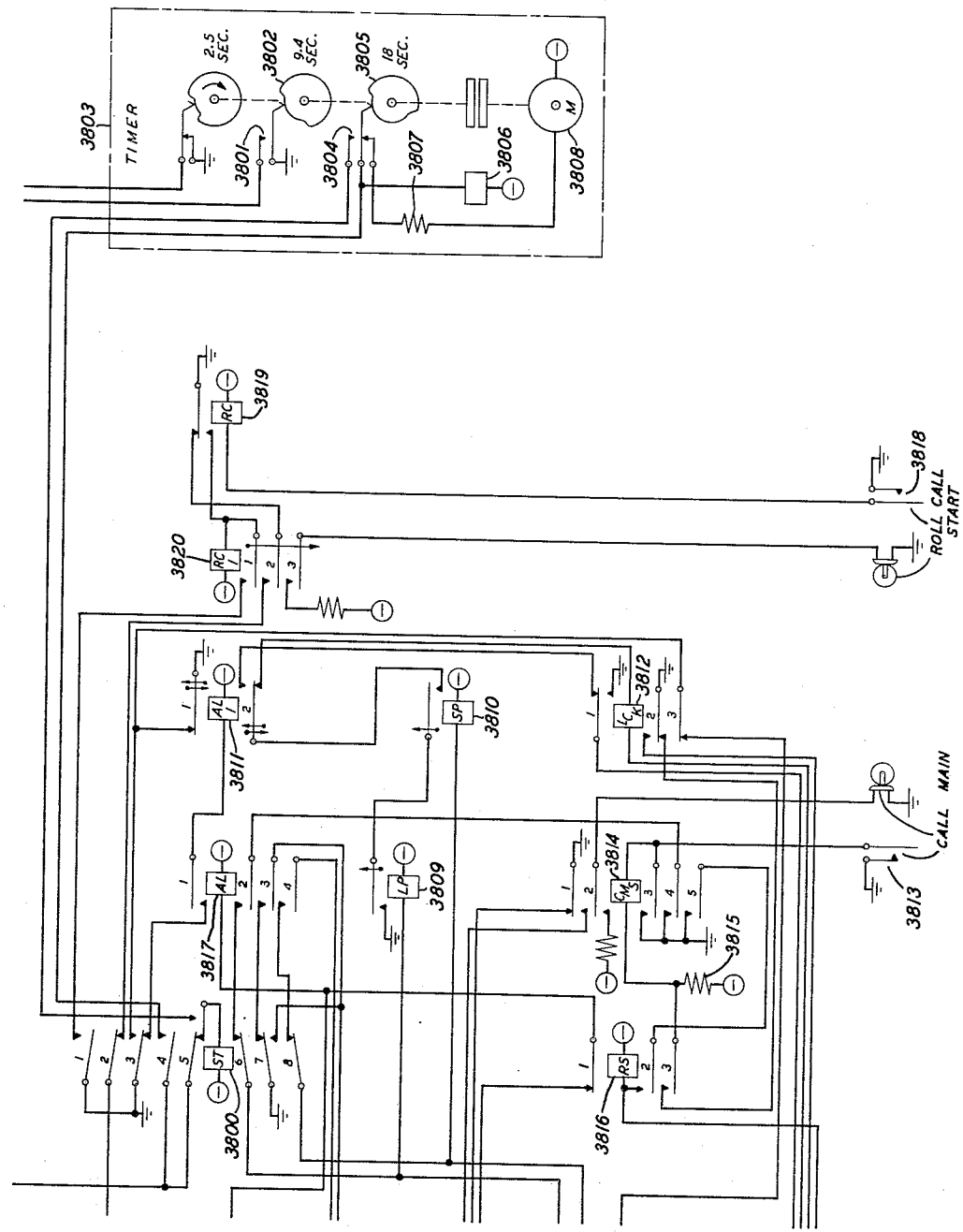
Figures 39, 40:
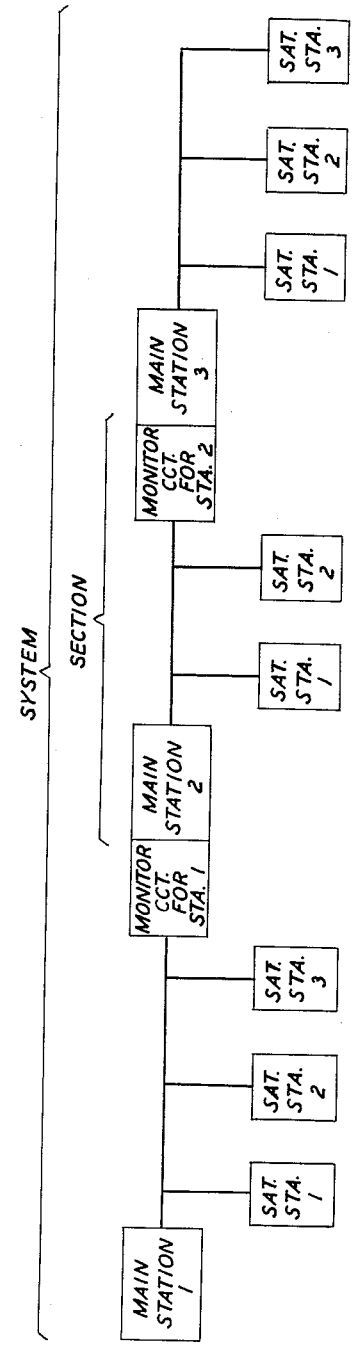

FIGS. 36 and 38 show common control circuits.

Next, considering the general operation of the circuits in brief, it may be noted by reference to FIG. 40 that the system herein selected for illustrative description comprises a plurality of main stations which are identified with the numerals 1, 2 and 3. Although three such stations are shown, it will be apparent from the following description that only one main station could be employed or that other main stations could be added as desired, for the system could be readily extended or contracted without departing from the principles that underlie it.

Each main station together with its satellite stations and a monitor (when required) comprises a section, and these sections may be connected in tandem (as shown) or they may be interconnected according to a variety of other arrangements suitable for the particular installation to which the apparatus is adapted.

In order that the following description may be more interesting and understandable to the reader, it has been assumed that the system is adapted to control right-of-way equipment such as an oil pipeline. When thus adapted, each main station will control a section of the line which may vary in length over quite a wide range. Each satellite may advantageously be located at a pumping station at which there may be located a number of pumps, valves, pressure indicators, alarm devices, and other apparatus which it is desired to control from the main station. The main stations are in turn interconnected in such manner that they may form a cohesive system which retains some degree of isolation and independence of operation but which additionally advantageously exhibits desired coordination in operation.

Needless to say, the apparatus could be advantageously employed in a variety of different installations and it is emphasized that the adaptation of the apparatus to pipeline control has been undertaken to aid in the description thereof.

As illustrated in FIG. 40, main stations 2 and 3 are each provided with a monitor. These monitors display by visual indicating lamps (and if desired by other means such as indicating instruments) the states of the various devices controlled from the preceding main station. This particular arrangement is deemed advantageous when the apparatus is adapted for pipeline control, the main stations being numbered in consecutive order in the direction of flow. Although in the present embodiment one monitor is provided at each main station except the first, additional monitor stations could readily be employed and arranged for cooperative association with any of the main stations thereby, for example, to provide indication of both preceding and succeeding line sections.

For purposes of this illustrative embodiment it may be assumed that one or more of the satellite stations is located at a point remote from that of the dominating main station and that interconnection therebetween may take place over conventional telegraph facilities. These facilities are by no means critical in respect to the requirements for transmission since the apparatus is adapted to respond to simple electrical impulses which do not require unusual band widths. Accordingly, conventional direct-current telegraph signaling may be employed. Of course, other types of signaling may be used; for example, carrier, radio, etc.

Now turning to the general operation of the apparatus, it may be of interest to note that each main station may include a console or other control panel on which may be mounted a plurality of indicating lamps, control switches or buttons, alarm devices, telemetering receivers, and other devices as required for the particular installation under consideration. The indicating lamps are arranged to be selectively associated with the control devices thus providing an individual indication of the state of each remote device. Similarly, the control switches or buttons are individually associated with the indicating lamps and individually control the remote devices, thus permitting the selective operation of any one of them.

An inquiry button or switch is provided for each two-state device in order that an operator may check the condition of any such device without changing the state thereof, and apparatus is provided for periodically checking these states thereby ensuring the continued accuracy of the visual display.

Common control apparatus is provided at each main station to generate the various coded signals which are utilized to affect the remote control operations. Each operation is represented by a different code and reliability of operation is thus enhanced. As an example, for a given two-state device, one coded set of impulses is generated when it is desired to activate the device and a different set of impulses is generated when it is desired to deactivate it. Other coded impulses are employed to effect special operations such as the connection of telemetering devices to the signaling circuits, to effect emergency operations, etc.

In operation, control of the various devices is effected by operating the suitable control key and at the same time closing a master operate key. The common control apparatus thereupon generates the required coded signals which are transmitted over the communication loop to all of the satellite stations. The signals are processed in each satellite and if they are recognized as being related to an item of control apparatus at the particular satellite, other apparatus is activated to actuate the required circuit breaker (or other element) to effect the desired operation.

Reliability of control is enhanced by the utilization of a time-division-order code. Each digit of the code transmitted from a main satellite station consists of two long and three short pulses preceded by a long "prepare" pulse. Self-checking two-out-of-five codes have been used widely in a variety of applications in the past and are here employed because of the reliability of operation they afford. These codes have been advantageously adapted to embody the time-division principle and present a means by which errors can be readily detected. In addition, the satellite receiving apparatus is arranged to not only detect errors in transmitted codes but to reject any orders or inquiries which may be represented by incorrect code groups. Thus, when a spurious code is received, apparatus at the satellite does not effectively respond and when the lack of such response is recognized at the main station, it is called to the operator's attention by suitable indication as is hereinafter more fully explained.

In addition to the control keys heretofore mentioned, either three or four indicating lamps are provided for each remote two-state device. These normally would be of different colors in order that they might be more readily distinguished, and for convenience of description it may be said that a red lamp shows the active condition of the device, a green lamp shows the inactive condition, and the remaining one or two lamps show special conditions which are discussed below.

Assuming that keys are used for control, the depression of one of the three keys associated with a two-state device results in the transmission of the aforementioned coded signal to place the remote unit in the active condition, whereupon the red indicating lamp is lit. The depression of another of the keys results in the transmission of a different code which changes the remote device to the inactive state. The third key, when depressed, results in the transmission of an inquiry code which in effect interrogates the device to determine its state. If it is in the state shown by the indicating lamps, no change is made. If, on the other hand it is in the other state, the indicating lamps are changed to show the correct condition.

The aforementioned third lamp which may be of amber or other suitable color, is lighted if no return signal is received from a satellite within a predetermined period after an order signal has been transmitted thereto; and the fourth lamp which is provided for each "delayed action" two-state device, is lit during the delayed action phase of its operation.

Thus, for example, certain types of devices operate almost instantaneously and an answer-back signal is transmitted almost immediately after an order signal is received at a satellite. However, certain devices require a substantial period of time for completing their operation, devices such as large motors which may take thirty seconds to gain full speed, motor-operated valves, etc. Accordingly, an answer-back signal, if transmitted during a predetermined interval of say twelve seconds, would show non-compliance by the apparatus with the order given, and since this might be misleading, the apparatus is adapted to recognize such condition and to arrange for a subsequent interrogation of the delayed answer devices to ascertain whether or not the device has completed the desired operation. At this time, the delayed completion lamp (which may be white in color, for example) will be extinguished, the lamp which indicated the former state of the device will additionally be extinguished, and the new status lamp will be lit.

In order to provide an additional margin of reliability and safety in operation, a master switch is provided. This switch, or master key as it will hereinafter be called, must be depressed before the apparatus will respond to the depression of any one of the individual control keys, thereby preventing or greatly lessening the possibility of an undesired operation.

Safety and control interlock circuits at the satellite stations may cause one or more of the devices thereat to change state automatically. In such event, an "uninvited pulse" is generated at the satellite and transmitted to the master station. This uninvited pulse activates apparatus which sends out inquiry codes in sequence to each satellite to determine at which satellite the pulse originated. As each satellite is thus questioned, it transmits a signal which in effect says "no." However, when the signal-originating satellite is reached, it transmits a signal which identifies it as being the proper one, and the master station then sequentially transmits interrogating signals relating to each device thereat. Immediately after each device is interrogated, the satellite apparatus transmits one of two signals which indicates either the active or the passive state of the device in question. The master station apparatus accepts these signals and responds by causing the display lamps to assume the proper conditions.

The remaining keys and lamps are utilized for control of single state devices, the manual starting and stopping of apparatus which results in the sequential interrogation of remote apparatus (hereinafter designated as a "roll call"), and system controls.

As previously mentioned, only two signals are generated at the satellites. One of these is a relatively short pulse and the other is one of somewhat greater duration which may be denominated a long pulse. By utilizing only two pulses, the control and logic circuits at each satellite are advantageously rendered less complex than would be required otherwise, and the circuits are endowed with greater reliability and flexibility.

During a roll call, an inquiry code is transmitted over the common signaling loop from the main station for each remote device just as though the inquiry key for that device had been operated. This code is received at each satellite but results in an effective interrogation of only the particular device to which it relates. The satellite at which it is located transmits either a long or a short pulse in reply, and the main station responds by changing the condition of the display lamps if a new condition is indicated or by leaving the indicating lamps in their previous conditions where no change has taken place. When this has been done, an inquiry code for this next device is transmitted and thereafter the next. This sequence continues until all of the remote devices have been thus checked.

Roll calls may be initiated by any one of the four following conditions: by reception of an uninvited pulse from a satellite station; by closure of contacts on a program clock whereby roll calls may be made periodically; by manual operation of a roll call start pushbutton; or by the receipt of a predetermined signal from a monitor to indicate a special condition.

As mentioned before, the apparatus may be arranged to first check each satellite to determine if an uninvited pulse originated therein, eliminating the necessity for individually checking many of the remote devices. However, if it is desired to individually check each device, such may be accomplished by modifying the circuits in accordance with principles hereinafter explained in detail.

Provision is made for terminating a roll call at any point therein in order that an operator may initiate some other control operation if it is deemed desirable. Thereafter, he may manually restart the roll call sequence. In addition, if an alarm condition arises in a satellite while a roll call is in progress, it may either manifest itself by indicating the change when its position in the roll call is reached, or if it occurs after its position has been reached the alarm signal will be stored in the satellite until the roll call is completed and then transmitted in the form of a suitable signal to the main station. In the latter event, the transmitted signal initiates a new roll call which then identifies the particular condition which gave rise to the alarm signal.

Apparatus is also provided for two different types of telemetering either or both of which may be included in any given installation. According to the first type, telemetering of the timed interval type is provided for operation over the regular signaling channel. When it is desired to ascertain the remote indication, a suitable key is depressed. This results in the transmission of a code by the master station which, when it is received by the satellite, is effective to connect a telemeter generator to the signaling loop. Signals from this generator then flow over the loop during a following interval of predetermined duration to produce the desired deflection on a telemeter receiver unit which may be located at the master station.

A second type of operation is provided for continuous telemetering wherein a separate circuit is provided for transmission of the information-representing signal. In operation, the depression of a suitable key results in the transmission of a coded signal which is effective at the satellite to cause connection of the proper telemeter generator to the separate circuit. At the same time, a corresponding receiver is connected to the separate circuit at the master station terminal and such connections are not interrupted until a disconnect operation is initiated either by the depression of a disconnect button or the depression of a different telemeter connect button.

Additional control functions are provided, among which are those of raising and lowering voltages, partially opening or closing valves, or effecting other changes of a similar nature. Here again, two different types are available. In both, the depression of a suitable key results in the effective connection of an auxiliary key at the main station to a controlled device at the designated satellite. However, in accordance with one type, the length of time during which the auxiliary key is depressed is a function of the degree of change effected at the controlled device, whereas according to the other type, the auxiliary key is depressed momentarily once for each incremental degree of change desired. As will be readily apparent, the latter type is particularly adapted to devices which are of the incremental type.

Although at the end of a predetermined interval of time, the signaling path is restored to normal thereby disconnecting the controlled device, a separate circuit could be provided if it were desired that such connection be retained for an indefinite period of time. However, since the common signaling circuit may be required for other control operations, it is not deemed desirable to divert it from availability for normal signaling functions except for very brief intervals of time.

Although a given coded signal ordinarily relates to a control function of only one device, the circuits may be readily adapted to provide simultaneous response of any number of devices to a preselected set of coded impulses. This may be particularly advantageous when it is desired to activate or deactivate a plurality of devices simultaneously, as for example a plurality of tandemly connected pumps, valves, line switches, etc. This feature is advantageously employed to provide what is hereinafter called a systems signal which may be used to shut down an entire section or perhaps an entire system when the failure or automatic shutdown of one pump, for example, will necessitate the immediate stopping of a plurality of preceding pumps which would otherwise continue to pump liquid in the direction of the disabled equipment.

Of course, this principle could be advantageously employed in other applications of the apparatus. Thus, for example, in an electrical power distribution system, a system signal could be advantageously employed to simultaneously trip a plurality of circuit breakers to interrupt the flow of current to a line fault.

When a plurality of sections is connected together, it may be desired to monitor one or more of such sections from another section. As mentioned above, provision is made for the inclusion of monitor panels at any one of the main stations, and these monitor panels provide visual display of the several conditions of the devices controlled from the monitored main stations. In addition, they form a convenient medium for interconnecting the several sections in order that overall system coordination may be obtained. In particular, they recognize a systems signal condition arising in any given section and cause additional sections (as required) to effectively respond thereto in the desired manner.

As mentioned above, the well-known two-out-of-five code is employed for the transmission of order and inquiry information from the main to satellite stations. Ordinarily, when the total number of individual order and inquiry codes is small, each will consist of two digits. However, if the number of such order and inquiry codes exceeds a given number (for example where decimal digits are used, 100) a three-digit number may be readily employed by simply extending the principles underlying the pulse-counting, decoding and common control circuits; and if the number of codes should be still further increased four, five, or even more digits could be readily employed.

For installations in which extreme accuracy and reliability of operation are required, the circuits are arranged for double code transmission. According to this type of operation, a given order code is transmitted twice in sequence and apparatus at the satellites compares both in order to make certain that they are in agreement before proceeding to perform the operation to which the signal relates. In the event the two do not agree, no operation is performed and the master station is alerted at the end of a brief interval of predetermined duration thereby to provide a visual indication of noncompliance to the controlling operator.

It is emphasized that ordinarily only one signaling channel is required for the interconnection of a main station and its associated satellites, and this channel may be of a relatively inexpensive narrow band type. Only in the event that continuous telemetering is required will it be necessary to provide an additional channel, for normal telemetering requirements can be met over the single interconnecting transmission path.

It will now be apparent that the circuits provide a wide variety of features, that they are exceedingly versatile and adaptable, and are highly reliable.

The following detailed description is specifically related to the center section of the system shown in block diagram form in FIG. 40. Two satellites, main station No. 2, and a monitor circuit for station 2 make up this section. Although the adjacent sections each have three satellites, it will be apparent as the detailed description proceeds that each of these sections employs principles identical to those underlying the center section including main station No. 2.

Now considering the circuits at the main station and initially those that relate to the control of a first two-state device at satellite 1, it may be assumed for purposes of this description that such device is in its inactive (i.e., stopped or open) condition, the "green" relay 100 will be operated and the green lamp 101 will be lit over a path which may be traced from ground thereon and thence over the operated No. 6 front contacts of relay 100, the No. 1 back contacts of No Reply relay 102, the No. 1 back contacts of Lamp Control relay 103, and resistor 104 to battery.

In order to activate the device, it will be necessary to depress two keys, the Master Operate key 1500 in FIG. 15 and Close key 105 in FIG. 1. An operating path for Close relay 106 is thereby extended from ground over the right-hand contacts of Master Operate key 1500 and thence over the No. 4 back contacts of Prevent Transmission relay 1501, conductors 1502 and 107 and the contacts of Close key 105 to the operating winding of Close relay 106 and battery. Relay 106 operates in this circuit and extends paths from ground over contacts 1–4 and conductors A, AA, B and BB to correspondingly designated cross connection terminals in FIG. 10. In addition it operates Start relay 1503 in a circuit which extends from ground over the previously traced path via Close key 105 and thence over the No. 5 front contacts of relay 106 and conductors 108 and 109 to the operating winding of relay 1503 and battery. Relay 1503, in operating, locks both itself and Close relay 106 over a path which may be traced from ground at Release relay 1600 over back transfer contacts thereof, conductor 1601, contacts No. 1620 of the 15.5 second cam of timer 1602, conductor 1603 and the No. 4 front contacts of Start relay 1503. Relay 106, in operating, additionally operates auxiliary relay 110 from ground at the No. 6 front contacts of relay 106 over conductors 111 and 112.

When relay 110 operates, it completes a path from ground via the No. 3 back contacts of relay 114 and the No. 5 front contacts of relay 110 to the operating winding of Double Transmission relay 1100 and battery. Relay 1100 operates and at its No. 6 front contacts extends a path from ground via the No. 5 back contacts of End First Transmission relay 1113 to the winding of Between Pulsing relay 1114 and battery, thereby operating relay 1114.

Relays 1800 and 1801 form a pulse generator which together with the frequency dividing relay circuit of relays 1700–1702 generates impulses required by the code chain relays 1000–1003, 1504–1508, and 1703–1707 of FIGS. 10, 15, and 17. These code chain relays are arranged to advantageously produce sets of coded impulses which are utilized to selectively control the various remote devices. As will be presently seen, the particular codes employed are determined by the cross connections made at the cross connecting terminals of FIG. 10.

Now returning to the operation of Start relay 1503, it will be noted that paths for the activation of the aforementioned pulse generating circuits are selectively extended from both ground and battery thereto: from ground over the No. 2 front contacts thereof and thence via the No. 2 back contacts of Stop relay 1509 and conductor 1703 to the left-hand contacts of pulse generating relay 1800; from battery via the No. 3 front contacts of relay 1503, the No. 3 back contacts of relay 1509, conductor 1510, resistor 1808, and conductor 1803 to the two windings of relay 1800. It should be noted, however, that this extension of battery potential is rendered ineffective by ground which is extended over the No. 1 back transfer contacts of relay 1801 to conductor 1809 and the right-hand terminal of resistor 1808.

When the pulse generating circuits are at rest, the armature of relay 1800 engages its left-hand contacts and relay 1801 is unoperated. Accordingly, ground at the aforementioned contacts of relay 1800 is extended therefrom over conductor 1804 to the operating winding of relay 1801 and battery thereby operating the latter. When relay 1801 operates, ground is extended over the No. 1 front transfer contacts thereof to both the lower right-hand terminals of resistor 1807 and the junction between capacitor 1805 and resistor 1806. In addition, ground is removed from the left-hand terminals of the operating windings of relay 1800 by the opening of the No. 1 back transfer contacts of relay 1801.

Before relay 1801 operated, current flowed from battery through resistors 1806 and 1807 through the lower "secondary" winding of relay 1800 and thence via conductors 1803 and 1809 through the No. 1 back transfer contacts of relay 1801 to ground. Little or no current flowed through the upper "primary" winding of relay 1800 because capacitor 1805 will have assumed a completely charged state. However, when relay 1801 operated to switch the above-described paths from ground to the circuits of relay 1800, the direction of current flow through the lower winding of relay 1800 was reversed and the discharging and subsequent recharging to opposite polarity of capacitor 1805 was initiated. The reversal of current through the lower winding may be traced over the above described path from battery at the contacts of Start relay 1503 to the lower winding of relay 1800 and thence through resistor 1807 to ground supplied at the right-hand terminal thereof. Similarly, the path for the reversal of charge polarity of capacitor 1805 may be traced over identical paths except that here the circuit is extended through the upper winding of relay 1800.

For a brief interval of duration determined by the values of capacitor 1805, the resistances of the upper windings of relay 1800 and resistor 1808 together with the associated circuit parameters, the recharging current of capacitor 1805 is sufficient to prevent the change in state of relay 1800 by the reversed current flowing through the lower winding thereof. However, at the end of such predetermined interval, the capacitor current decays to a point at which it can no longer overcome the lower winding current. At this time, the armature of relay 1800 moves to engage its right-hand contacts.

When the armature of relay 1800 moves to the right-hand position, the operating path hereinbefore described for the activation of relay 1801 is broken. Accordingly, relay 1801 releases and ground is retransferred to the paths heretofore described to restore relay 1800 to its original condition. However, the discharge and recharging current flowing to capacitor 1805 through the upper winding of relay 1800 prevents the armature of relay 1800 from returning to its left-hand contacts until the charging interval is substantially terminated. At this time, the contacts complete their travel and a similar cycle is again initiated.

It will now be seen that relays 1800 and 1801 generate pulses whose characteristics may be shaped through the selection of values of capacitor 1805 and the remaining circuit parameters. These pulse characteristics may be readily controlled to provide pulses which have make-to-break ratios of approximately one to one in order that the frequency-dividing-circuit relays 1700–1702 may be most advantageously activated.

The aforementioned parameters also control the rate at which the pulses will be generated (i.e., the frequency thereof) and such rate may be readily changed in accordance with the rate at which it is desired to transmit signaling information over the transmission loop to which reference is hereinafter more particularly made.

Each time relay 1801 operates, an operating path for Send relay 1802 is extended from ground over the No. 3 front contacts of relay 1801 to the operating winding of relay 1802 and battery. In addition, an operating path for Send-Hold relay 1810 is extended from ground over the No. 4 front contacts of relay 1801. A path for the operation of relay 1700 is extended from ground over the No. 2 front contacts of relay 1801 and thence over the No. 6 back contacts of relay 1702, the No. 3 back contacts of relay 1701 and the No. 3 back transfer contacts of relay 1700 to the operating winding thereof and battery.

When relay 1802 is operated, the tip and ring conductors are disconnected at the No. 3 back transfer contacts thereof, thereby interrupting the line loop and causing Line Receiving relay 1811 to move its armature to the left-hand contact thereof. At the same time, Send-Hold relay 1810 is operated by current which flows from ground at the No. 1 front contacts of relay 1802 through the winding of relay 1810 to battery. Relay 1810 locks over its own No. 2 front contacts to ground supplied via the left-hand contacts of relay 1811. In addition, relay 1810 extends ground over its No. 1 front contacts to the winding of Prevent Transmission relay 1501 thereby operating it. Station Busy lamp 1517 is lit by current which flows from ground to the filament thereof via the No. 2 front contacts of relay 1502; and the Master Operate key 1500 is effectively disconnected from the various individual control keys at the No. 4 back contacts of relay 1501, thereby preventing response of the circuits to operation of another one of the control keys until after the current cycle of operations is completed.

It will now be seen that without additional circuit operation, the line loop would be opened with each operation of relay 1801. However, as hereinbefore mentioned, signaling information is transmitted in a two-out-of-five code and it is therefore necessary that the regular repetitive operation of relay 1802 be modified to provide periods of interrupted line loop current flow which are sufficiently different in duration to permit the distinction thereof from the remaining normal interrupted periods. This is accomplished by holding relay 1802 operated during one of the normal periods in which it would otherwise be unoperated, and it will be apparent that as a result of such modified operation, line loop current flow will be interrupted during a period approximately three times as great as that of the normal interval. Circuits which control the points at which such modification is made in the normal sequential transmission of impulses includes the relays 1700–1702 together with the aforementioned code chain relays 1000–1003, 1504–1508 and 1703–1707 whose operation will now be explained in detail.

In order that receiving circuits at the monitor and satellite stations may be alerted to respond to bona fide signaling impulses, circuits at the main station are arranged to emit a long preparatory pulse. This pulse is transmitted in every instance in advance of the transmission of a coded signal and results from the elimination of the first pulse of line loop current that would otherwise flow over the loop when relay 1802 releases for the first time during a signaling sequence.

As hereinbefore mentioned, the first operation of relay 1801 results in the extension of an operating path (hereinbefore traced) for relay 1700. When the latter operates, it locks to ground over its own No. 3 front continuity contacts and the No. 2 back contacts of relay 1701. In operating, relay 1700 completes a path from ground over the No. 2 front contacts thereof to the left-hand terminal of the winding of relay 1701. However, relay 1701 does not operate at this time because ground is conducted to the right-hand terminal thereof over the No. 2 front contacts of relay 1801, the No. 6 back contacts of relay 1702 and the No. 3 back contacts of relay 1701. In operating, relay 1700 also extends ground over its No. 1 front contacts to the ODD lead 1709 through the No. 1 back contacts of relay 1705 and conductor 1710, the No. 2 back contacts of relay 1001, the No. 2 back contacts of relay 1002, the No. 1 back contacts of relay 1003, the No. 2 back contacts of relay 1504, the No. 1 back contacts of relay 1505, the No. 2 back contacts of relay 1506, the No. 1 back contacts of relay 1507, the No. 2 back contacts of relay 1508, the No. 1 back contacts of relay 1703, the No. 2 back contacts of relay 1704 and thence through the No. 2 back contacts of relay 1706 and the No. 3 back continuity contacts of relay 1000 to the operating winding thereof and battery. Relay 1000 operates in this circuit and locks to ground at start relay 1503 over a path which may be traced from the winding of relay 1000 and thence over the No. 3 front continuity contacts thereof, the No. 3 back contacts of relays 1001 and 1002, the No. 2 back continuity contacts of relay 1003, the No. 3 back continuity contacts of relay 1504, the No. 2 back continuity contacts of relay 1505, the No. 3 back continuity contacts of relay 1506, the No. 2 back continuity contacts of relay 1507, the No. 3 back continuity contacts of relay 1508, the No. 2 back continuity contacts of relay 1703, the No. 3 back continuity contacts of relay 1704, the No. 2 back continuity contacts of relay 1705, the No. 3 back continuity contacts of relay 1706, conductor 1711, the No. 1 back contacts of Stop relay 1509 and the No. 1 front contacts of Start relay 1503 to ground.

One additional operation resulting from the actuation of relay 1700 is the opening of the No. 4 back contacts thereof which are interposed serially in the path interconnecting conductors 1712 and 1713. These contacts are thus interposed to advantageously assist in pulse shaping according to the manner hereinafter more fully described.

As mentioned before, relay 1701 is prevented from operating until relay 1801 is released. When release occurs, ground is removed over the above traced path to the right-hand terminal of relay 1701, and relay 1701 thereupon operates in a circuit which may be traced from ground over the No. 2 front contacts of relay 1700 and thence through the operating winding of relay 1701 and resistor 1714 to battery. Relay 1701 locks operated over its No. 1 front contacts, the No. 2 back contacts of relay 1702, and conductor 1715 to ground previously traced on conductors 1711.

Relay 1701, in operating, opens its No. 2 back contacts, thereby interrupting the locking circuit for relay 1700. In addition, it provides an operating circuit for relay 1702 in order that the latter may respond to the next subsequent operation of relay 1801. This circuit may be traced from ground via the No. 2 front contacts of relay 1801, the No. 6 back contacts of relay 1702, the No. 3 front contacts of relay 1701 and the No. 5 back transfer contacts of relay 1702 to the operating winding thereof and battery. When relay 1801 reoperates, the circuit is completed and relay 1702 operates therein, thereby interrupting the locking circuit for relay 1701 by opening the No. 2 back contacts of relay 1702. In addition, a path is extended from ground over the No. 1 front contacts of relay 1702, EVEN lead 1716 and the No. 2 front contacts of relay 1000 to the operating winding of relay 1001 and battery. Relay 1001 operates. In addition, relay 1702 opens its No. 3 back contacts which are serially interposed in signaling leads 1717 and 1718. These No. 3 contacts are advantageously employed to assist in shaping pulses which operate Send relay 1802.

When relay 1801 next releases, it in turn releases relay 1702 by interrupting the locking circuit thereof at the No. 2 front contacts of the former, and the frequency dividing relays 1700–1702 are restored to their original states to await the next subsequent operation of relay 1801.

It will now be seen that two (1000, 1001) of the code chain relays (1000–1003, 1504–1508 and 1703–1707) have been operated during the first cyclical operation of relays 1700–1702, and during each subsequent cycle two additional code chain relays are operated in numbered sequence. These code chain relays effectively produce the above described modification of the periods during which the signaling line is open-circuited thereby to modify the signaling pulses to represent the required codes.

As mentioned before, when no data is being transmitted in either direction of the line loop, the loop is closed and is opened at the main station end by the operation of relay 1802 under the control of relay 1801. While signaling impulses (actually line interruptions) are being transmitted from the main station, the remainder of the line loop continues in a closed circuit condition, and since each operation of relay 1801 establishes an operating path for relay 1802, and since relay 1801 follows a regular repetitive pulsing sequence, the line current would be interrupted at spaced intervals having a make-to-break ratio of approximately one to one were it not for the aforementioned pulse modifying circuits.

When relay 1801 operates for the first time, the sending relay 1802 follows it and opens the line loop. However, it is desired that relay 1802 not release under the control of relay 1801 during the first release of the latter; and to effect this operation, ground is supplied to the winding of relay 1802 over an alternate path bypassing the ground which would be otherwise interrupted by the opening of the No. 3 front contacts of relay 1801. This alternate ground is supplied over the No. 4 front contacts of relay 1000 and thence over conductor 1004, the No. 5 back contacts of relay 1707, conductors 1720 and 1717, the No. 3 back contacts of relay 1702, conductor 1718, conductor 1719, and the operating winding of relay 1802. Since relay 1000 is operated by relay 1700 (substantially coincident with the initial operation of relay 1801) and since relay 1000 remains in the operated condition during the entire time that relay 1801 is released for the first time after activation, it will be seen that ground is supplied to retain relay 1802 in its operated state for a period of time at least equal to three times the normal line interruption interval. The line is prevented from staying open for a period of time greater than this by the release of relay 1000 which occurs to interrupt the aforementioned alternate ground path when relay 1001 is actuated. As will be recalled, relay 1001 is operated when relay 1702 operates under the control of relay 1801. It will thus be seen that whenever the pulsing relays 1800 and 1801 are initially activated, a preparatory signal consisting of a relatively long line loop interruption is transmitted over the signaling circuits.

When the frequency dividing relays 1700–1702 begin their second cycle of operation, relay 1000 is deenergized and relay 1001 is locked operated over its own No. 3 front continuity contacts and the remaining portion of the circuit heretofore described in respect to the locking of relay 1000. Accordingly, when ground is connected to ODD conductor 1709 by relay 1700, it is extended over the path heretofore traced via conductor 1710 and thence over the No. 2 front contacts of relay 1001 to the operating winding of relay 1002 and battery. Relay 1002 operates in this circuit interrupting the locking circuit for relay 1001 and locking itself over its own No. 3 front continuity contacts and the remaining portion of the aforementioned locking circuit. The interruption of the locking circuit for relay 1001 results in the release thereof.

An inspection of the circuits will now reveal that if ground were present at terminal A1 of the cross connecting set of terminals, it would be extended over the No. 4 front contacts of relay 1002 and thence over conductors 1005 and 1004 through the No. 5 back contacts of relay 1707, conductors 1720 and 1717, and thence to the operating winding of relay 1802 over a path heretofore traced via back contacts No. 3 of relay 1702. Accordingly, an alternate source of ground would be supplied to retain sending relay 1802 in an operated condition during an interval in which relay 1801 is deenergized. A further inspection of the paths leading from the remaining A2–A6 and B1–B6 terminals reveals that these are each individually connected through front contacts of relays 1003, 1504–1507, 1703–1706 and relay 1000. Since, as mentioned before, the several relays in the code chain are sequentially operated in synchronism with the pulses emitted by pulse generating relays 1800 and 1801, it will be apparent that the positions in the pulse train at which line loop interruptions are increased in duration will depend upon the ones of terminals A1–A6 and B1–B6 which are grounded over the cross connections extended thereto from the corresponding lower terminals.

Now returning to the operation of these circuits which results from the grounding of conductors A, AA, B and BB in FIG. 1 by the operation of close relay 106, it will be seen that ground will be selectively extended to conductors 1006–1009 via the depicted cross connections and the obvious paths leading from front contacts 1–4 of relay 106. These grounds appear at the front contacts of relays 1505, 1507, 1706 and 1000 respectively. Accordingly, whenever any one of these four relays is operated, an alternate source of ground is connected to the operating winding of relay 1802 to retain it in its operated state.

The particular relationship between decimal digits and the code representations thereof is by no means critical, and the particular relationship embodied by the circuits herein described is merely illustrative of one arrangement that has been advantageously employed. However, it will be apparent to one skilled in the art that the positions of the extended interruptions of line current in the pulse trains could vary and that the circuits could be readily modified to provide corresponding operation without departing from the principles thereof.

In the particular illustrative embodiment herein selected for description, the decimal digits are each represented by the conventional two-out-of-five code counterparts. Thus, for example, the digit 1 is represented by the two elements 0 and 1, the digit 2 by the elements 0 and 2 . . . and the digit 0 by the elements 4 and 7. Since the code elements are transmitted sequentially (rather than simultaneously), the value of the element is determined by the position in the pulse train in which it appears. In order that this may be more clearly understood, it may be considered that were it not for the provision of the above-described alternate paths from ground to hold sending relay 1802 operated, relay 1802 would interrupt the flow of line current during seven equally spaced intervals in each digit train. However, under control of the code chain relays, sending relay 1802 is prevented from restoring loop continuity during two of the periods in which it would otherwise do so and, therefore, instead of there being seven line interruptions of equal duration, there are two interruptions of extended duration and three interruptions of normal duration. The positions of the extended interruptions in the sequence of five interruptions determines the particular decimal digit to which such sequence of interruption appertains. Thus, for example, if the first two interruptions of a digit sequence are of extended duration, the series of interruptions represent the digit 1, if the first and third interruptions are of extended duration, the represented digit is 2 . . . and if the fourth and fifth interruptions are of extended duration the represented digit is 0.

The following tabulation sets forth decimal digits, the corresponding code elements, the sequential positions of the extended pulses which are representative thereof, and the corresponding cross connections required in FIG. 10.

by ground supplied to the operating winding thereof over EVEN lead 1716. The ground conducted over the aforementioned cross connections is extended via conductor 1006 through the No. 3 front contacts of relay 1505 and thence over the path hereinbefore traced via contacts of relay 1707 and the circuitry which follows to the operating winding of relay 1802. The alternate path to ground thus provided retains relay 1802 in its operated state during the next released period of relay 1801, thereby producing an extended line interruption in the fourth position.

During the extended interruption, relay 1506 is operated thereby releasing relay 1505, but not until after relay 1801 is reactuated. When the next subsequent release of relay 1801 occurs, relay 1802 repsonds by again establishing continuity of the line loop, and when relay 1801 is reactuated, relay 1507 is operated by ground supplied thereto over EVEN conductor 1716. Since a path is thereby completed from ground at conductor 1007 via the No. 3 front contacts of relay 1507 and the path heretofore traced to the operating winding of relay 1802, it will be apparent that relay 1802 will not release in response to the next subsequent release of relay 1801. Accordingly, the line interruption is extended and the second element of the digit representing code is effectively transmitted.

An inspection of the remaining code relays in FIG. 1, i.e., relays 113 and 114, will reveal that cross connections to the appropriate terminals of the two groups A1–A6 and B1–B6 will result in the establishment of alternate operating paths for relay 1802 at the appropriate points in the pulse trains to result in the transmission of digit-representing trains characterized in accordance with the above tabulation.

It will be noted from an inspection of the circuits that after the sequence of operation of the code chain relays has progressed to relay 1707, it returns to relays 1000 and 1001. Thus, operation of the code chain relays conforms to the description hereinbefore set forth until relay 1706 is actuated. However, at this point, a change in the operation of the remaining two relays (i.e., 1706 and 1707) takes place in order to prepare the chain for the second operation of relays 1000 and 1001. Whereas, when the preceding code chain relays each operated they individ-

| Decimal digit | Two out of five code elements | Positions of long pulses in digit train | Cross-connections (Fig. 10) | | | | | | | | | | | |
|---|---|---|---|---|---|---|---|---|---|---|---|---|---|---|
| | | | First digit | | | | | | Second digit | | | | | |
| | | | A1 | A2 | A3 | A4 | A5 | A6 | B1 | B2 | B3 | B4 | B5 | B6 |
| 0 | 4, 7 | 4, 5 | | | | A | | AA | | | | B | | BB |
| 1 | 0, 1 | 1, 2 | A | | AA | | | AA | B | | BB | B | | BB |
| 2 | 0, 2 | 1, 3 | A | | | AA | | | B | | | BB | | |
| 3 | 1, 2 | 2, 3 | | A | | AA | | | | B | | BB | | |
| 4 | 0, 4 | 1, 4 | A | | | | AA | | B | | | | BB | |
| 5 | 1, 4 | 2, 4 | | A | | | AA | | | B | | | BB | |
| 6 | 2, 4 | 3, 4 | | | A | | AA | | | | B | | BB | |
| 7 | 0, 7 | 1, 5 | A | | | | | AA | B | | | | | BB |
| 8 | 1, 7 | 2, 5 | | A | | | | AA | | B | | | | BB |
| 9 | 2, 7 | 3, 5 | | | A | | | AA | | | B | | | BB |

The above description of the positions of the extended pulses in each digit representing train should not be confused with the position of the initial long pulse which bears no relationship to the identity of any particular digit but merely serves to alert the receiving circuits and to authenticate the following digit trains.

Now returning to the operation of the code chain relays and Send relay 1802 which take place as a result of the operation of Close relay 106, it will be seen that after transmission of the above described preparatory pulse, Send relay 1802 will operate under the exclusive control of relay 1801 until relay 1505 is actuated. Accordingly, the first three digit-representing pulses will be of normal duration. However, when the line current is interrupted for the fourth time in the series, relay 1505 is operated ually locked to ground over their own front continuity contacts and the remaining portion of the locking circuit leading through back continuity contacts of the succeeding relays to ground on conductor 1711, relay 1705, when operated by ground conducted to the operating winding thereof via ODD lead 1709 and the No. 1 front contacts of relay 1705, locks to ground over a path which may be traced from ground at relay 1503 over the No. 1 front contacts thereof, the No. 1 back contacts of Stop relay 1509, conductors 1711 and 1721, the No. 3 front transfer contacts of relay 1706, conductor 1722, the No. 1 back contacts of relay 1000 and conductor 1010 to the operating winding of relay 1706. Accordingly, when relay 1707 operates, in response to the actuation of relay 1702, the locking circuit for relay 1706 remains unbroken, and relay 1706 is not released until relay 1000 is reoperated in the manner now to be described.

When relay 1707 operates, it is locked to ground on conductor 1711 but over a different path from that heretofore described with respect to relay 1706. This locking path for relay 1707 may be traced from ground on conductor 1711 over conductor 1723 and the No. 4 front continuity contacts of relay 1707 to the operating winding thereof. Accordingly, it will be seen that relay 1707 will remain in an operated state until stop relay 1509 is operated.

When ground is next applied to ODD lead 1709 by relay 1700, it is conducted through the No. 1 back contacts of relay 1705 to conductor 1710 and thence over the heretofore traced path through serially connected back contacts of relays 1001–1003, 1504–1508 and 1703–1704, the No. 1 front contacts of relay 1707 and conductor 1724 through the No. 3 back continuity contacts of relay 1000 to the operating winding thereof and battery. Relay 1000 operates in this circuit and locks to ground on conductor 1711 over its own No. 3 front continuity contacts, serially connected back contacts of each of relays 1001–1003, 1504–1508 and 1703–1705, and thence through the No. 3 front contacts of relay 1707 and conductor 1723 to conductor 1711.

As mentioned before, when relay 1000 operates, it opens the heretofore-traced locking circuit for relay 1706 at the No. 1 back contacts of relay 1000, thereby causing relay 1706 to revert to its released condition. Relays 1707 and 1000, however, continue operated.

When ground is next applied to EVEN lead 1716, it is conducted in the manner heretofore described to the operating winding of relay 1001, thereby causing the relay to operate. Relay 1000 is released by the interruption of the aforementioned locking circuit at the No. 3 back continuity contacts of relay 1001. Relay 1707 however continues to reside in its operated state. Accordingly, when relay 1702 next releases, a path is established for the operation of stop relay 1509 from ground at relay 1707 over the No. 2 front contacts thereof, conductor 1725, the No. 1 front contacts of relay 1001, conductor 1011 and the No. 4 back contacts of relay 1702 to the operating winding of relay 1509 and battery. Relay 1509 operates in this circuit and at its No. 7 front contacts extends ground via the No. 5 front contacts of Double Transmission relay 1100 and the No. 1 back continuity contacts of Start Second Transmission relay 1115 to the winding of End First Transmission relay 1113 and battery. Relay 1113 operates and locks over its own No. 4 front contacts to ground at the No. 5 back contacts of relay 1115. At its No. 2 front continuity contacts, relay 1113 completes a locking circuit for Stop relay 1509 which may be traced from ground at the No. 2 back contacts of relay 1115 via the No. 2 front continuity contacts of relay 1113, the No. 2 front contacts of relay 1100 and the No. 4 front contacts of relay 1509 to the operating winding thereof and battery. At its No. 3 front contacts, relay 1113 establishes an alternate locking path for Start relay 1503 which extends from ground at the No. 3 front continuity contacts of relay 1113 via the No. 3 front contacts of relay 1100 to the No. 4 front contacts of Start relay 1503, the winding thereof and battery. At its No. 5 contacts, relay 1113 transfers ground from the winding of relay 1114 to the stationary contact thereof.

Now returning to Stop relay 1509, it will be seen that in operating it performs several functions. At its No. 1 back contacts it interrupts the above-traced locking path for relays 1001 and 1707 thereby releasing them and preparing the code chain for a second transmission of the code. It terminates operation of pulse-generating relays 1800 and 1801 by removing ground from conductor 1708 and by removing battery from conductor 1803 over paths hereinbefore traced through the Nos. 2 and 3 back contacts of relay 1509. In addition, it actuates timer 1602 over a path from ground at the No. 2 back contacts of Receive-Follow relay 1511 via the No. 5 front contacts of stop relay 1509, conductor 1512, cross connection conductor 1605 which bridges cross connecting terminals d and c, conductors 1606 and 1607 and thence in two directions: one through the winding of clutch-operating magnet 1608, and the other through the normally closed contacts 1609 of the 18-second cam 1610 through resistor 1611 to the windings of timer driving motor 1612. Both motor 1612 and clutch engaging magnet 1608 operate in this circuit. Accordingly, rotation of the cams begins.

As will be noted from a visual inspection of the timer cams, each thereof is arranged to change the condition of its associated contacts after a definite predetermined interval. The various periods of time to which these cams are related are selected to coordinate the operation of various of the remaining circuit elements in the manner hereinafter more fully described.

Now returning to relay 1114, it will be seen that it is of the slow release type. Accordingly, after a brief interval of time its contacts complete their travel. A path is then completed from ground via the No. 6 front contacts of relay 1100, the No. 5 front contacts of relay 1113 and the back contacts of relay 1114 to the winding of Start Second Transmission relay 1115 and battery. Relay 1115 operates and locks over its own No. 4 front contacts and the No. 1 front contacts of relay 1100 to ground at the No. 1 front contacts of Start relay 1503. At its No. 1 continuity contacts it interrupts the heretofore traced operating circuit for relay 1113; and at its No. 5 back contacts it interrupts the locking circuit therefor, thereby causing relay 1113 to release. At its No. 2 contacts, relay 1115 opens the locking circuit for Stop relay 1509 thereby initiating its release.

When Stop relay 1509 releases, it re-applies ground to conductor 1708 and battery to conductor 1803, thereby to initiate a second generation and transmission of the code in a manner similar to that heretofore described. Very shortly after relay 1509 releases, the contacts of relay 1113 complete their travel whereupon a path for the future locking of Stop relay 1509 is prepared (in order that relay 1509 may be locked when it reoperates at the end of the second code transmission). This future locking path may be traced from ground at the No. 2 back continuity contacts of relay 1113 and thence via the No. 2 front contacts of relay 1100 to the No. 4 stationary contact of relay 1509.

It will be recalled that normally Start relay 1503 is locked operated to ground through back contacts of Stop relay 1509. Therefore, were it not for the heretofore described alternate locking path established via the No. 3 front continuity contacts of relay 1113 at the end of the first transmission of the code, the operation of Stop relay 1509 would result in the release of Start relay 1503 with a resulting reset of all the circuits to their normal idle condition. Since Start relay 1503 is held operated, the release of relay 1509 results in the reactivation of the code generating and transmitting circuits. However, it is desired that the circuits become reset after the code is retransmitted and therefore relay 1113 is prevented from again operating by opening its operating circuit at the No. 1 front continuity contacts of relay 1115. As heretofore mentioned, relay 1115 locks to ground at the No. 1 front contacts of Start relay 1503 thus ensuring continued operation until relay 1503 is released.

Provision is made for interrupting one of the locking paths for Start relay 1503 when Stop relay 1509 reoperates. This locking path was established from ground at the No. 6 back contacts of relay 1509 via the No. 4 front contacts of relay 1100, the No. 3 front contacts of relay 1115, the No. 3 back continuity contacts of relay 1113, the No. 3 front contacts of relay 1100 and the No. 4 front contacts of relay 1503 to the operating winding thereof and battery. However, when relay 1509 reoperates, relay 1503 does not release since it is held operated over an alternate locking path which may be traced from ground at the No. 4 front contacts of relay 1616 via the No. 1 front continuity contacts of relay 1600, contacts 1620 of the 15.5 second cam 1621, conductor 1603, and the No. 4 front contacts of Start relay 1503 to the operating winding thereof and battery. Accordingly, Close relay 106, Auxiliary relay 110, Double Transmission relay 1100, Start Second Transmission relay 1115 and relay 1114 (Relay 1114 will have been reoperated when relay 1113 released) will remain operated until relay 1503 subsequently releases.

In summary, it may be said that in response to the operation of Close relay 106, the sending circuits twice transmit one prepare pulse and two sets of digit representing pulses over the transmission circuits extending to the monitor station and to each satellite controlled directly from the main station.

If the circuits of FIG. 1 had been arranged for single instead of double code transmission (as is the case with the circuits of FIG. 2), the Auxiliary relay 110 would not have established an operating circuit for Double Transmission relay 1100. Accordingly, none of relays 1100, 1113, 1114 and 1115 would have been operated, and when Stop relay 1509 operated at the end of the first transmission of the code it would have remained locked to relay 1503 and would not have released to initiate a second transmission of the code. Accordingly, the code would have been transmitted once instead of twice.

It will be recalled that relay 106 relates to a first two-state device at satellite 1. The receiving and decoding circuits at satellite 1 respond to effect activation of circuits which results in closing of the first device, whereupon they are effective to open the line loop for an extended interval of time to produce what may be called a long pulse. The particular manner in which such operations are carried out will be described in detail in the following section of this specification. It may be sufficient at this point to understand merely that such extended interval of line interruption indicates that the device is actuated. It should be stated that the long pulse does not necessarily indicate that the device operated in accordance with the transmitted code but is merely indicative of the state of the device.

The satellite circuits are arranged to transmit such indication within a predetermined interval of time which, for the purposes of this illustrative embodiment, may be said to approximate six seconds. Since it has been assumed that the required operation has taken place at the satellite station, the aforementioned line interruption of extended duration will occur at approximately this time. Accordingly, none of the cams in timer 1602 will have been effective to change the conditions of their associated contacts.

During the interval of line interruption, line relay 1811 is effective to extend a path from ground thereat over its left-hand contacts, the No. 2 slow release back contacts of relay 1810 and the No. 2 back contacts of relay 1802 to the operating winding of relay 1511 and battery. Relay 1511 operates in this circuit and since it has no locking circuit, remains operated only for the duration of the line interruption. However, during such interval it performs a number of important functions. The first of these is the removal of ground from RC timing circuit 1613–1614 over a path which may be traced from the No. 4 back contacts of relay 1511 and thence over conductor 1513 to the junction of resistor 1613 and the lower winding of timing relay 1615. Another is the application of ground to the operating winding of relay 1616 over the No. 4 front contacts of relay 1511, the No. 3 back contacts of Telemetering relay 1617 and conductors 1618 and 1619 to the operating winding of relay 1616 and battery. Yet another is the removal of ground from conductor 1514 which is necessary to prevent a premature operation of one of relays 100 and 115. Still another is the deactivation of timer 1602 which results from the removal of ground from the timer circuits by the opening of the No. 2 back contacts of relay 1511. Still a further operation is the establishment of an alternate locking circuit for relay 1503 from ground over the No. 2 front contacts of relay 1511 and thence over the No. 4 back contacts of relay 1100 and the No. 4 front contacts of relay 1503 to the operating winding thereof.

When relay 1616 operates, Release relay 1600 is actuated over a path which extends from ground over the No. 3 front contacts of relay 1616 to the operating winding of relay 1600 and battery. A locking circuit is thus provided for relay 1503 and may be traced from the No. 4 front contacts thereof over conductor 1603, contacts 1620 of the 15.5 second cam 1621 and thence over conductor 1601, the No. 1 front transfer contacts of relay 1600 and the No. 4 front contacts of relay 1616 to ground. As will hereinafter be seen, this locking path is provided in order to cause the desired sequence of release in certain of the relays in order to restore them to their normal idle condition.

Timing relay 1615 and its associated Long Pulse relay 1622 are provided to distinguish between a long and a short interruption of line continuity. If the interruption is of brief duration, relay 1615 does not time out, i.e., the capacitor 1614 does not have time to charge sufficiently to cause the current through the lower winding of relay 1615 to decrease to a point at which the contacts will move to the right-hand position. On the other hand, if the line interruption is of extended duration, Timing relay 1615 will operate and will extend a path from ground over its normally open contacts to the operating winding of relay 1622 thereby causing it to operate and lock to ground over its own No. 3 front contacts and the No. 3 front contacts of relay 1616.

When continuity is restored to the line loop, Line relay 1811 opens its contacts and removes ground from the winding of relay 1511. Accordingly, relay 1511 releases and in turn releases relay 1616. However, for a brief period of predetermined duration, the contacts of relay 1616 remain closed and therefore a momentary path will be established from ground at relay 1511 over conductor 1514 and the No. 1 front contacts of relay 1616 to the No. 2 armature of relay 1622. If, as has been assumed, the break in line continuity has been of extended duration, the path is further extended over the No. 2 front contacts of relay 1622 and thence via the No. 2 back contacts of relay 1617, the No. 6 front contacts of Start relay 1503, conductor 116 and the No. 2 front contacts of relay 110 to the operating winding of Red relay 115. Relay 115 operates in this circuit and interrupts the locking circuit for Green relay 100 which had extended from ground over the No. 1 back contacts of relay 115 and the No. 1 front contacts of relay 100 to the locking winding of the latter. Accordingly, relay 100 releases and establishes a locking path for relay 115 which now extends from ground over the No. 1 back contacts of relay 100 and the No. 1 front contacts of relay 115 to the locking winding thereof. Relay 115, in operating, extends an obvious path over its No. 6 front contacts to light red lamp 119.

If the line interruption had been of brief duration the above traced path over the contacts of relay 1622 would have extended over the No. 2 back contacts thereof (instead of over the No. 2 front contacts as described above) and such path would have been traced over the No. 1 back contacts of relay 1617 and the No. 5 front contacts of relay 1503 to conductor 117 whence it would have been extended over the No. 1 front contacts of relay 110 to the operating winding of relay 100. Since relay 100 would have been already operated, the ground extended thereto from conductor 117 would produce no change thereat. However, this ground would be extended over the No. 2 front contacts of relay 100 and the No. 8 front contacts of relay 106 to the operating winding of Lamp Control relay 103 and battery. Relay 103 would operate and lock to ground at Retire Flashing Lamps key 122 via resistor 123, the No. 2 front contacts of relay 103 and the normally closed contacts of key 122. Accordingly, indicating lamp 101 would be disconnected at the No. 1 back contacts of relay 103 from battery 127 and would be connected instead to flashing potential via the front contacts of Flasher relay 1104, conductor 216, resistor 128, the No. 1 front contacts of relay 103, the No. 1 back contacts of relay 102 and the No. 6 front contacts of relay 100. The operation of the Flasher relays 1104–1106 is explained in detail in the section entitled "Transmission of Inquiry Code to Ascertain State of Remote Device."

Now returning to the operations that take place in response to the extended interruption of line continuity, it will be recalled that relay 115 has been operated, that relay 100 has been released, that relay 1811 and relay 1511 have been released, that relay 1622 is thus far retained in an operated condition even though relay 1615 has been reset by the restoration of ground to the timing circuit thereof by the release of relay 1511, and that relay 1616, although deenergized, has yet retained its contacts in their closed positions. These latter contacts now open and interrupt the sole remaining locking path for relay 1503 and relay 106. At the same time, the operating path for relay 1600 and the locking path for relay 1622 is opened at the No. 3 front contacts of relay 1616. Relay 1622 releases immediately but relay 1600 retains its contacts in their pre-existing states for an additional brief interval of time, thus ensuring that relay 1503 will completely release before ground is restored to conductor 1601 over the No. 1 back continuity contacts of relay 1600. The circuits are now completely restored to their normal idle condition.

*Deactivation of Remote Device*

When it is desired to deactivate (i.e., release) the remote device, the Master Operate key 1500 and Trip key 118 are depressed to establish a path for the operation of Trip relay 113 and Start relay 1503 from ground at Master Operate key 1500 via the No. 4 back contacts of Prevent Transmission relay 1501, conductors 1502 and 107 and the contacts of Trip key 118 to the operating winding of Trip relay 113 and battery. Relay 113 operates and extends ground through the No. 4 front contacts thereof and thence over conductors 108 and 109 to the operating winding of Start relay 1503 and battery. Relay 1503 operates. Trip relay 113 locks over its No. 4 front contacts to ground which is supplied to conductor 108 from the No. 1 back continuity contacts of relay 1600 over the path hereinbefore described. Accordingly, trip code conductors A, AA, B and BB are grounded to provide coding control for the code chain relays in the manner described in relation to the closing sequence. In addition, ground is extended over the No. 3 front contacts of relay 113 to conductor 112 to operate Auxiliary relay 110.

The operation of start relay 1503 results in an identical operation of the code-generating and transmission circuits (except for the specific code which here is different because of the application of ground potential to different ones of the cross coding terminals) up until the point at which the satellite station interrupts the flow of current over the line loop for either a brief or extended interval. Since a brief interruption indicates a deactivated condition of the device in question, and since for the purposes of this description it may be assumed that the remote device released in accordance with the trip code which was transmitted over the line loop, the satellite apparatus will interrupt line continuity for a brief interval thereby retaining relay 1511 in its operated state for a period of time insufficient to result in the operation of Timing relay 1615. Accordingly, Long Pulse relay 1622 does not operate and the alternate path to which reference was hereinbefore made is established over the No. 2 back contacts of relay 1622 and thence to the operating winding of relay 100. Relay 100 operates and at its No. 1 back contacts interrupts the path from ground to the locking winding of relay 115 thereby causing it to release and establish a locking path from ground over its No. 1 back contacts through the No. 1 front contacts of relay 100 to the locking winding thereof and battery. Relay 100 is now operated and locked. Green lamp 101 is lit and red lamp 119 is extinguished.

The remainder of the operating sequence, that is the restoration of the circuits to a normal idle condition, is identical to that which has heretofore been described in respect to the closing sequence.

*Transmission of Inquiry Code to Ascertain State of Remote Device*

Occasions may arise when the state of a remote device is in doubt and provision is therefore made for the individual interrogation of each remote device on a selective basis. Accordingly, an inquiry key is provided for each such device thereby to provide a means for the initiation of an inquiry sequence.

Inquiry key 120, when closed, establishes a path for the operation of Inquiry relay 114 from ground over the No. 3 back contacts of relay 1501, conductors 1012 and 121, and the contacts of Inquiry key 120 to the operating coil of Inquiry relay 114 and battery. Relay 114 operates in this circuit and extends a path over its own No. 4 front contacts for the operation of relay 1503 via conductors 108 and 109. Relay 1503 operates and locks both itself and relay 114 to ground at relay 1600 in a manner identical to that heretofore explained with respetc to Close and Trip relays 106 and 113. The operation of Start relay 1503 results in activation of the pulse generating circuits, and the operation of relay 114 provides the required ground to appropriately control the codes in accordance with the above described principles.

The inquiry code for the first two-state device is now transmitted over the line loop and is effective at satellite 1 to actuate circuits thereat which respond by opening the line loop for an extended period if the device in question is operated or by interrupting line continuity for a relatively brief interval if the device is unactuated. Relay 1811 correspondingly operates and relay 1622 again closes its contacts only if the line interruption has been of extended duration. The hereinbefore traced paths will be extended over the No. 2 back contacts thereof if the queried device is unactuated but over the No. 2 front contacts if such device is operated. If relay 100 is operated thereby indicating the device to be unactuated, and if the return signal from the satellite indicates this to be the correct state, ground is extended over the No. 2 back contacts of relay 1622 and thence over the above described path to the operating winding of relay 100. However, since relay 100 is already operated, such ground produces no change thereat. The apparatus now resets itself to the normal idle condition.

If, on the other hand, the line interruption had been of extended duration (thereby indicating the device in question to be operated) the above mentioned path would have been extended to the operating winding of relay 115 thereby operating it and releasing relay 100. Since the remote device has been shown to reside in a condition different from that indicated by the lamps, a flashing condition thereof will ensue, for Lamp Control relay 103 will have been operated by ground which is extended to the operating winding thereof during the brief interval when the slow release contacts of both the red and green relays 115 and 100 are operated. This path may be traced from ground at relay 1013 over the No. 2 back contacts thereof, conductors 1014 and 121, and No. 1 front contacts of relay 114, the No. 4 slow release front contacts of relays 100 and 115 to the operating winding of relay 103 and battery. Relay 103 operates in this circuit and locks to ground at Retire Flashing Lamp's key 122 via resistor 123, the No. 2 front contacts of relay 103 and the normally closed contacts of key 122. Green indicating lamp 101 will be extinguished and red indicating lamp 119 will be flashed repetitively by potential conducted thereto from the flasher circuits now to be described.

When relay 103 operates, it extends ground over its No. 3 front contacts, conductors 217 and the slow release back contacts of relay 1105 to the winding of Flasher relay 1106 and battery. Relay 1106 operates and over its Nos. 1 and 2 slow release front contacts completes paths from ground to the windings of relays 1104 and 1105. Relays 1104 and 1105 operate. Relay 1104 completes a path from battery via conductor 216, resistor 128, the No. 1 front contacts of relay 103, the No. 1 back contacts of relay 102 and the No. 6 front contacts of relay 115 to the filament of red lamp 119 and ground. Relay 1105 operates thereby opening its contacts and interrupting the heretofore-traced operating circuit for relay 1106. Because of their slow release characteristics, the contacts of relay 1106 remain closed for a brief interval after which they open. Relays 1104 and 1105 release, the energizing path for the lamp 119 is broken, the energizing path for relay 1106 is restored, and the cycle is begun again. Thus, as long as relay 103 is operated, the indicating lamp will be flashed off and on.

If the remote device is operated, if the red lamp is lit, and if in response to the inquiry code a long reply pulse is received, operation similar to that described above will result, except that here an extended interval of line interruption (long pulse) will effect no change whereas a relatively short interval of interruption (short pulse) will cause the circuits to extinguish the red lamp and to produce a flashing indication of the green lamp.

Not only will relay 103 operate to impart a flashing lamp condition when a reply to an inquiry code shows the device to be in a state different from that indicated by the lamp display, but in addition an audible alarm is sounded. This is accomplished by providing a path for the operation of Alarm relay 1101 from ground at relay 1013 via conductors 1014 and 121, the No. 1 front contacts of relay 114, the No. 2 back contacts of relay 113, the No. 7 back contacts of relay 106, the No. 3 front contacts of relays 100 and 115 and conductor 200 to the operating winding of alarm relay 1101 and battery. Alarm relay 1101 operates in this circuit and locks over its own No. 2 front contacts to ground at the normally closed contacts of Retire Audible Alarm key 1102. Accordingly, alarm bell 1103 is activated over the obvious path and will continue in an actuated state until the relay 1101 is released by operation of key 1102. The lamp will continue to flash until Lamp Control relay 103 is released by the opening of Retire Flashing Lamp's key 122.

*Operation When No Reply Is Received From Satellite*

If no reply is received in response to a close, trip or inquiry signal, the 12.5-second cam 1623 of timer 1602 closes its associated contacts 1624 to complete a circuit for the operation of Clock relay 1625. This circuit may be traced from ground over the No. 2 back contacts of relay 1511, the No. 5 front contacts of relay 1509, conductor 1512, cross connecting lead 1605, conductor 1606, contacts 1624 of 12.5-second cam 1623 and the No. 9 back contacts of relay 1617 to the operating winding of Clock relay 1625 and battery.

When relay 1625 operates, ground is extended over the No. 2 front contacts thereof, conductor 1626, conductor 201 and the No. 3 front contacts of auxiliary relay 110 to the operating winding of No-Reply relay 102 and thence to battery through resistor 126. Relay 102 operates in this circuit and locks over its own No. 2 front contacts to ground. It also completes a circuit for the lighting of No-Reply lamp 124 which may be traced from battery through resistor 125 and the No. 3 front contacts of relay 102 to the No-Reply lamp 124. In addition, it interrupts the circuit over which the green and red indicating lamps are lighted by opening its No. 1 back contacts.

In addition to operating relay 102, relay 1625 at its No. 3 front contacts extends ground to an operating winding of Alarm relay 1101. Relay 1101 operates and locks to ground over its No. 2 front contacts and the normally closed contacts of Retire Audible Alarm key 1102.

When the 15.5-second cam 1621 opens its associated contacts 1620, the hereinbefore traced locking path for Start relay 1503 and the Close, Trip and Inquiry relays 106, 113 and 114 is interrupted. Accordingly, except for No-Reply relay 102 and its associated circuits, the apparatus is reset to its normal idle condition. With respect to relay 102, a visual inspection of the circuits will indicate that this relay can only be released when its operating winding is shunted down by the application of ground thereto over the No. 4 front contacts of relay 110 and the No. 2 slow release front contacts of relay 1600. Accordingly, No-Reply lamp 124 will remain lighted until a response is received to a close, trip or inquiry code transmitted in relation to this same device.

*Delayed Completion Operation*

As mentioned before, certain of the remotely controlled devices may be characterized by having an exceptionally long operating or releasing time. Thus, for example, certain large motors or valves may require 30 seconds or more to come up to speed or otherwise complete their operations. Accordingly, apparatus is provided which is advantageously employed to coordinate operation of the control circuits in such a manner that they do not produce a misleading indication for such devices. This apparatus is included in the circuits of FIG. 2 which relate to a second two-state device located at satellite 1 and having a delayed completion characteristic for both activation and deactivation.

A visual inspection of the circuits of FIG. 2 will indicate that they are basically similar to those of FIG. 1 except for the double code transmission feature and except for certain elements which have been added to provide for the aforementioned delayed completion. These added elements comprise Blue relay 202, Delayed Completion Lamp 203 and the associated circuits.

In operation, the Close and Master Operate keys 204A and 1500 result in initiation of a code emission cycle similar to that hereinbefore described with respect to FIG. 1 except that the code is transmitted once rather than twice.

As will be recalled, the control or inquiry code transmission results in a return signal within a period of approximately six seconds. This return signal which is transmitted from the satellite at which the controlled device is located indicates the condition of that device as of the time at which the return signal is transmitted. Since, in the case of a delayed completion activation, the device will not have completed its operation at the end of the six-second interval, the return signal will be of relatively brief duration and were it not for the modifications made to the controlling circuits, such return signal would result in the establishment of a flashing green lamp. However, Blue relay 202 and its associated circuits are arranged to prevent such occurrence in the manner now to be particularly described.

When the aforementioned path is completed over the No. 2 back contacts of Long Pulse relay 1622, it is conducted thence over the hereinbefore traced path to conductor 117 whence it is extended over the No. 1 front contacts of Auxiliary relay 204 to the operating winding of Green relay 205. Since relay 205 is already operated, this additional path has no effect thereupon. However, when extended over the No. 2 front contacts thereof and the No. 8 front contacts of Close relay 206, it is effective to operate Blue relay 202 over conductors 207 and 208.

It will now be seen that a major difference in the operation of the apparatus in FIGS. 1 and 2 results from the difference in connections in the above traced path which, in FIG. 1, leads to the operating coil of Lamp Control relay 103 but which in the circuits of FIG. 2 leads to the operating coil of Blue relay 202.

When relay 202 operates, it locks over a path which includes its own No. 2 front contacts, the No. 3 back contacts of Red relay 209, the No. 9 front contacts of Green relay 205, and the No. 3 back contacts of Trip relay 210 to ground thereat. In addition, it lights Delayed Completion lamp 203 from battery over its No. 3 front contacts and the interconnecting obvious path. It also extends a path from ground over its No. 1 front contacts and the No. 5 front contacts of relay 204 to the operating winding of relay 1013 and battery. Relay 1013 operates in this circuit and locks to ground over its own No. 1 front contacts and the No. 2 front contacts of relay 1501.

The code transmitting and receiving circuits are restored to their normal idle conditions in a manner identical to that hereinbefore described. After the remote device has finally completed its operation, the satellite at which it is located transmits a signal to the main station and this signal results in the sequential transmission of a series of inquiry codes (hereinafter denoted a Roll Call) to identify the satellite at which the signal originated. After the satellite is identified, the main station circuits transmit additional inquiry codes to identify the particular device involved and to determine its then-existing state. The sequence of operations that result in the transmission of these codes and the responses thereto will hereinafter be described in detail in the sections entitled "Roll Call" and "Rapid Roll Call."

It will be sufficient now to know that when the delayed completion device is reached in the roll call sequence, a pulse indicating its then-existing state is transmitted to the main station. In the case of the above-described example (i.e., actuation of the second two-state device in satellite 1), this pulse will be of relatively long duration, and the above-traced alternate path from ground will be extended to the operating winding of red relay 209 thereby actuating it and causing it to release green relay 205 and blue relay 202.

The converse operation of these circuits (that is, delayed completion trip or deactivation of device) is identical to that with respect to the operation thereof except that a long pulse will be returned from the satellite station at the end of the six-second interval. This pulse will be effective over the above-traced path through the No. 2 front contacts of Long Pulse relay 1622 to extend ground to the operating winding of red relay 209 instead of green relay 205. Accordingly, the locking circuit for relay 202 extends through the No. 3 front contacts of relay 209 and the No. 3 black contacts of relay 205 to ground at the No. 6 back contacts of relay 206. The code transmitting and receiving circuits are again reset to their normal idle states, and the red and blue relays 209 and 202 remain operated until during a subsequent roll call the deactivation of the device is confirmed.

A cursory consideration of the circuits of FIG. 2 might lead to the incorrect conclusion that Lamp Control relay 211 is ineffective to produce a flashing condition of the lamps under any condition. This, however, is not the case. Although blue relay 202 is effective to prevent activation of relay 211 when a delayed completion sequence is in progress, it will be seen that other conditions may result in its operation. Thus, for example, if no delayed completion order has been given (i.e., if neither the Close nor Trip relays 206 or 210 has been operated), and if the Inquiry relay 212 is actuated, relay 202 will not be operated; and under these conditions if a return signal is received from the satellite to indicate a device state other than that reported by the operated one of green and red relays 205 and 209, a path for the operation of Lamp Control relay 211 will be extended from ground at relay 1013 over the No. 2 back contacts thereof, conductors 1014 and 121, the No. 1 front contacts of relay 212, the No. 5 front contacts of relays 205 and 209 to the operating winding of relay 211 and battery.

A visual inspection of the circuits of FIG. 2 will reveal that operation when no reply is received is identical to that heretofore described with respect to the circuits of FIG. 1, and reference is hereby made to that description for a complete understanding thereof.

Referring now to FIG. 3, it will be seen that shown therein are representations of two circuits for the control of a first and a second two-state device at satellite 2. The circuits are similar to those of FIG. 1 except that double code transmission is not provided. Accordingly, paths for the activation of double transmission relay 1100 would be eliminated from inquiry relays and auxiliary relays corresponding to Inquiry relay 114 and Auxiliary relay 110 of FIG. 1. As will be recalled, the control circuits of FIG. 3, although substantially identical to those of FIG. 1, are effective to produce selective codes different therefrom because of differing cross connections which are extended between the cross connecting terminals in FIG. 10.

Roll Call

It will be recalled that coded signals generated at the main station are transmitted over the communication circuits to each satellite in the section. Although these signals are received at each such satellite, the circuits thereof are arranged to effectively respond only to those codes which relate to items of apparatus located thereat. This feature is advantageously utilized by circuits at the main station which are arranged to sequentially transmit the inquiry code of each two-state device (and other codes which will be explained) to periodically check the conditions of such devices. This sequential polling of the various devices is known as a roll call. In order that a desired interrogation may be more rapidly completed under certain circumstances, two different types of roll call operation are provided. The first of these is a regular sequential check of every two-state device which is controlled from the master station, and this type of roll call is initiated at regular intervals by clock apparatus which may be adjusted to institute such operation at any desired interval. This general roll call may be initiated by two other operations. One of these is the manual operation of a Start Roll Call key located at the main station, and the other is the depression of a corresponding key at the associated monitor. It should be borne in mind that this associated monitor is that which is connected to the main station over the transmission circuits but which ordinarily is physically located at or adjacent to another main station.

The second type of roll call is one which does not necessarily interrogate all of the two-state devices, since its function is to locate a particular device or ascertain the identity and significance of some unusual change within the system. This will be more clearly seen when it is understood that the automatic change of any two-state device (that is, a change not directed by the circuits at the main station) will result in the transmission of a signal from the affected satellite. Since this signal is not returned in response to the operation of a bona fide order, it is conveniently termed "uninvited pulse."

Other system conditions in addition to the automatic operation of a two-state device will result in the emission of such an uninvited pulse, and since certain of these conditions require the utmost speed in ascertaining the source and identity thereof, the roll call circuits follow a modified sequence of operations to first check the monitor and each satellite within the section to ascertain whether or not such uninvited pulse originated thereat. If it is determined that the pulse did not originate at the monitor or satellite being polled, the individual devices and sources thereat are not individually interrogated, and the roll call proceeds to the next satellite thereby advantageously shortening the length of time required to locate the source in question. When, during such operation, the monitor or satellite at which the source is located is reached, a corresponding signal is transmitted to the main station and is effective thereat to produce an individual interrogation of each device at the monitor or satellite in question until the source of the uninvited pulse is specifically identified. For purposes of later reference, this second type of sequential interrogation may be termed "rapid roll call."

Now returning to the general roll call, it will be remembered that it can be initiated either by the operation of a clock or by the depression of start keys at the main station and the monitor. Referring to FIG. 12, it will be seen that Roll Call Timer 1200 and Start Roll Call key 1201 are both connected to conductor 1202 and the operating winding of Complete Roll Call relay 1203. Accordingly, the depression of key 1201 or the timing out of timer 1200 will result in the operation of relay 1203 which will later lock over its own No. 4 front contacts and conductors 1204 and 1205 to ground over the No. 3 front contacts of Roll Call relay 1300 when the latter operates. In addition, relay 1203 in operating extends ground over its No. 2 front contacts and conductor 1206 to the operating windings of Station Control relays 1207 and 1208 thereby operating them. In addition, it operates Roll Call relay 1300 over a path which may be traced from ground at relay 1203 over the No. 3 front contacts thereof and conductor 1209 to the winding of Roll Call relay 1300, resistor 1301 and battery. Relay 1300 operates and locks to ground over the No. 5 back continuity contacts of Succeeding Section relay 1400. In addition, it completes the aforementioned locking circuit for relay 1203 over the above-traced path.

Now returning to Complete Roll Call relay 1203, it will be seen that two functions other than those heretofore described result when the relay operates. One of these is the operation of Complete Roll Call auxiliary relay 1210 over the path from ground at relay 1300 over the No. 2 front contacts thereof and the No. 5 front contacts of relay 1203 to the winding of relay 1210 and battery. When relay 1210 operates, it extends paths from ground over its Nos. 1 and 2 front contacts to the windings of relays 1214 and 1215 thereby operating them. In addition, relay 1203 at its No. 1 front contacts extends a path for the future operation of Skip relay 1302 over conductors 1303, 1211 and 1212 from whence the path will be additionally traced in connection with the description of a later section of the operating sequence below.

In addition to those functions heretofore described, Roll Call relay 1300 completes a path over its own No. 8 front contacts to light Roll Call Busy lamp 1304. It also extends a path for the operation of Interrupted Ground relay 1305 from ground over the No. 7 back contacts of Stop relay 1509, the No. 5 back contacts of relay 1501 and the No. 7 front contacts of relay 1300 to the winding of relay 1305 and battery. Relay 1300 also provides a ground over its No. 6 front contacts and conductor 1306 to which relay 1307 later locks. It prepares at its No. 5 front contacts a path from ground over which Roll Call Release relay 1308 later locks, and it connects ground over its No. 1 front contacts through the last terminal in the first bank 1309 of the stepping switch and back contacts of Step Magnet 1310 to the winding thereof and battery. Step magnet 1310 operates in this circuit and moves the brush contacts of all its banks 1309, 1311 and 1312 one position. Accordingly, the ground which resulted in the initial operation of step magnet 1310 is removed by the disconnection of the brush contact of bank 1309 from the No. 14 terminal thereof and ground for its reactivation must be conducted thereto over some other path. Since Roll Call relay 1300 is operated, no ground will appear on any one of the strapped terminals 1–12 of bank 1309, and therefore ground for the reactivation of step magnet 1310 can only be conducted thereto over two paths which may in the future be completed. One of these will be completed when relay 1302 is operated, and the other will be completed when relay 1305 and relay 1307 are operated and skip relay 1302 is released.

In order that operation of the hereinafterdescribed functions may be more clearly understood, it will be helpful to know that the brushes do not change position when the step magnet is energized. Instead, they are prepared for stepping by the actuation of the step magnet but do not actually change position until the step magnet releases. Therefore, when the brushes engage the first terminals and relay 1307 is operated over the obvious path, the brushes do not step to the second set of terminals even though the above-traced path to step magnet 1310 is completed over the No. 1 front contacts of relay 1307, the No. 1 back contacts of relay 1302 and the No. 1 front contacts of relay 1305. Accordingly, a path will continue to exist for an additional interval of time from ground at relay 1305 over the No. 3 front contacts thereof, the No. 1 back contacts of relay 1313, the brush and No. 1 contacts of bank 1312, the No. 1 front contacts of relay 1208, conductor 1212, the No. 1 front contacts of relay 1203, conductor 1211 and conductor 1303 to the operating winging of Skip relay 1302 and battery. Relay 1302 operates in this circuit thereby interrupting the above-traced operating path for Step relay 1310. Accordingly, relay 1310 releases and the brushes of the stepping switch advance in unison to the No. 2 contacts of banks 309, 311, and 1312. Interruption of the ground path through terminal 1 of bank 1312 causes Skip relay 1302 to release, thereby again completing the path for the operation of Step relay 1310.

Ground is now conducted over the No. 2 contacts of bank 1312 and thence over the No. 1 back contacts of relay 1213 and conductor 1303 to again operate Skip relay 1302. Accordingly, the above-described sequence repeats itself and the brushes are stepped to the third set of terminals. Ground will now be conducted from terminal 3 of bank 1312 over the No. 1 front contacts of relay 1207 and then via the above-traced path to again operate Skip relay 1302. The switch brushes now advance to the fourth set of terminals whereupon ground is extended over the fourth terminal of bank 1312 and thence via the No. 4 front contacts of relay 1214 and conductor 1216 to Inquiry relay 500. Relay 500 operates in this circuit and extends ground over its No. 5 front contacts to conductor 108 and thence over the hereinbefore-traced path via conductor 109 to the winding of start relay 1503 thereby operating it and initiating the above-described sequence of operations which result in the transmission of an inquiry code over the line loop. The particular code transmitted is effective to interrogate system-signal-originating apparatus at the first satellite to ascertain whether or not it is in an activated state. The significance of the term "system signal" and the detailed operation of the circuits of FIG. 5 that relate thereto will be explained fully in the following section thus entitled. It will be sufficient at this point to understand that in response to a system signal inquiry code transmission, apparatus at the satellite to which it relates (here satellite 1) responds by opening the line loop for either a brief or extended interval. When the system signal apparatus at the satellite is inactive, the line interruption will be of brief duration, but if activated, then for an extended interval. The operation of the roll call circuits will vary depending upon which of these is recognized. The difference will be explained in detail in the following description of this specification which relates specifically to system signal operation. In order that the roll call circuits may be more clearly understood, it may now be assumed that the satellite reply is of brief duration thereby indicating that a system signal apparatus thereat is in an inactive state.

When the system signal inquiry code was being transmitted, a relay 1501 was operated by ground conducted thereto over the No. 1 front contacts of relay 1810. It will have locked to ground over the No. 1 front contacts of relay 1503 and it will have interrupted the above-traced path over which ground was conducted to operate relay 1305. Accordingly, the path over the No. 1 front contacts of relay 1305 is broken and step magnet 1310 is released, thereby advancing the switch brushes to the fifth set of bank terminals. It should be noted, however, that at this point in the sequence of operations, no ground is available at the brush of bank 1312 since the path thereto from ground is broken at the No. 3 front contacts of relay 1305. It should be further noted that this ground will not be again conducted thereover until relay 1305 re-operates after a return signal is received from the interrogated satellite. Circuits which effect this sequence of operations include back contacts of relay 1501, and it is these contacts in particular which do not close to re-operate relay 1305 until the code transmitting and receiving circuits are reset to their normal idle conditions subsequent to the receipt of the return pulse. The roll call circuits therefore effectively wait until such reply is received and thereafter will initiate transmission of the next inquiry code by the code transmitting and receiving circuits.

As has been hereinbefore assumed, the return reply relating to the system signal inquiry code (first satellite) consists of a short pulse (brief line interruption). Accordingly, a path will be extended over the No. 2 back contacts of relay 1622 and thence via circuit elements heretofore traced, conductor 117 and the No. 1 front contacts of inquiry relay 500 to the operating winding of Green relay 501. Since relay 501 is already operated (it being assumed that the indicating lamp 502 is lit), no change in the circuits of FIG. 5 is effected thereby. Since a reply pulse has been received, the coding and control circuits will have been reset, relay 1305 will have been operated, and ground will have been re-established at the brush of bank 1312. Ground is therefore extended over the No. 5 terminal thereof and thence via the No. 3 front contacts of relay 1214 and conductor 1217 to the winding of Inquiry relay 114.

The inquiry code relating to the first two-state device of satellite 1 is now transmitted over the line loop in the same manner that it would have been transmitted had the inquiry key 120 been depressed. The code transmitting and receiving circuits await the return of the appropriate reply. During this waiting period, relay 1305 is again de-energized thereby preventing initiation of transmission of a code relating to the sixth terminal of bank 1312 until after the reply is received.

The reply produces effects identical to those which such reply would produce in response to an inquiry code in-initiated by the depression of the inquiry key 120; and since the various alternatives have been explained in detail in connection with the operation of such key, they will not now be repeated. Irrespective of whether the reply indicates a conditions different from that shown by the indicating lamps, the roll call circuits proceed to the initiation of the next interrogating code by extending the aforementioned ground from the No. 6 terminal of bank 1312 and thence over the No. 2 front contacts of relay 1214 and conductor 1218 to the winding of Inquiry relay 212.

The sequence of operations that results from the operation of Inquiry relay 212 is identical to that heretofore described with respect to the operation of Inquiry relay 114 in circuits of FIG. 1 except that the particular code employed is different. This is true even though the circuits relating to the second two-state device differ from those relating to the first two-state device in respect to the delayed completion operation and double code transmission for trip and close orders. It may be helpful in considering this last statement to recall that the double code transmission feature, when provided, relates to close and trip codes but does not apply to inquiry codes.

After the reply has been received from the satellite station, relay 1305 is again de-energized, thereby interrupting the operating path for step magnet 1310 and advancing the brushes to the next, that is, the seventh position. Inquiry relay 700 is actuated by ground which is extended to the winding thereof over the No. 7 contacts of switch bank 1312, the No. 1 front contacts of relay 1214 and conductor 1219. Accordingly, the circuits of FIG. 7 are activated to cause the code chain relays of FIGS. 10, 15 and 17 together with the pulse generating and control circuits of FIGS. 16 and 18 to emit a coded signal which is effective to determine whether or not there is an incoming call condition at the first satellite. The significance of the term "incoming call" together with the detailed operation of the circuits of FIG. 7 will be hereinafter explained in detail in a later section of this specification entitled "Incoming Call to Main Station" and it will be sufficient for the purposes of the roll call description to know merely that if there is an incoming call condition at the satellite, a long pulse will be transmitted therefrom, whereas if there is no such condition a short pulse will result.

When the reply is received from the satellite, it is effective to cause the bank contacts of the stepping switch to advance to the eighth position and a path is therefore extended over terminal 8 of bank 1312, the No. 2 front contacts of relay 1207, conductor 1212, the No. 1 front contacts of relay 1203, conductor 1211, and conductor 1303 to the winding of relay 1302. Relay 1302 operates and causes the brushes to advance to the next position thereby effectively skipping operation of the circuits to which terminal 8 would relate in a rapid roll call (that is, station inquiry, second satellite).

With the brushes in contact with terminal 9, a path is extended therefrom over the No. 3 front contacts of relay 1215 and thence via conductor 1220 to the inquiry relay (not shown) for the system signal second satellite apparatus of FIG. 5. Although these circuits are not shown in detail, they are identical, except for coding, to those set forth immediately above in FIG. 5 for the system signal inquiry, first satellite; and it is therefore deemed desirable in the interest of reducing circuit complexity to merely depict a representation of the circuits within the dashed rectangle 503.

When a reply is received in response to the transmission of the code relating to the system signal inquiry second satellite, the brushes of the stepping switch are advanced to the tenth set of bank terminals and a path is extended therefrom via the No. 2 front contacts of relay 1215 and conductor 1221 to the inquiry relay (not shown) of the first two-state device, second satellite. Since the circuits for the first and second two-state devices of the second satellite (shown in FIG. 3 as mere representations of circuits within the dashed rectangles 300 and 301) are arranged for single code transmission only, the circuits therein would not include a path from the auxiliary relay corresponding to relay 110 in FIG. 1 for the activation of Double Transmission relay 1100 but would in all other respects be identical, except for coding, to the circuits of FIG. 1.

When the inquiry relay of the first two-state device of the second satellite operates, the appropriate code is transmitted over the line loop and when the reply is received, it is effective to cause the stepping switch brushes to advance to the No. 11 bank terminals. Accordingly, a path is established therefrom over the No. 1 front contacts of relay 1215 and thence over conductor 1222 to the inquiry relay (not shown) of the circuits for the second two-state device, second satellite, represented by the dashed rectangle 301 in FIG. 3. The inquiry code therefore is transmitted and when the reply is received, the switch brushes advance to the twelfth set of terminals. A path is extended therefrom via conduit 1314 to Inquiry relay 701 of the circuits which relate to an incoming call from the monitor. As was stated with respect to certain of the other circuits mentioned in connection with operation of the roll call, the significance of the term "incoming call from monitor" together with the detailed operation of the circuits which relate thereto will be described in a subsequent section of this specification entitled "Incoming Call to Main Station"; and it will be sufficient at this time to understand that in response to the transmission of an inquiry code relating to an incoming call from the monitor, apparatus at the monitor will be effective to transmit either a long or a short pulse depending upon whether or not it is in an activated state.

When the reply pulse is received, it is effective to advance the brushes to the thirteenth set of switch terminals whereupon a path is extended therefrom over conductors 1315 and 1316 to the winding of Roll Call Release relay 1308 and battery. Relay 1308 operates in this circuit and momentarily locks to ground over its own No. 1 front contacts and the No. 5 front contacts of relay 1300. However, in operating, relay 1308 extends ground over its No. 2 front contacts to the junction of the right-hand terminal of relay 1300 and resistor 1301, thereby shunting down relay 1300 and causing it to release. Accordingly, various paths for the continued operation of the heretofore described relays of FIGS. 12 and 13 are interrupted and the roll call apparatus is reset to its original idle condition. In addition, the resulting interruption of the path for the operation of step magnet 1310 results in the advancement of the switch brushes to the fourteenth terminals to await the initiation of a subsequent roll call sequence.

Provision is made for the visual observation of roll call progress and for the stopping thereof at any desired point. Thus, it will be seen that in FIG. 13 a plurality of indicating lamps 1317 are selectively connected to the above-described terminals of bank 1312. Since the activation of each terminal results in the interrogation of the particular related device, the lighting of the associated indicating lamp indicates the point of sequence to which the roll call has progressed.

Further observation of the circuits will reveal the Stop Roll Call key 1223 which is effective to extend an alternate path from ground over conductor 1224 to operate Roll Call Release relay 1308. Thus, relay 1308 may be operated at any desired point in the roll call sequence to reset the roll call circuits to a normal idle condition.

Rapid Roll Call

As heretofore mentioned, the monitor and satellite circuits are arranged to transmit an "uninvited pulse" whenever any one of certain predetermined unusual conditions exist. These conditions are of such importance that it is desirable to ascertain their identity and source immediately and in order to hasten such identification, the roll call circuits are arranged to respond to such pulse by initially interrogating each station (monitor or satellite) to determine whether or not the device in question is located thereat. If the received reply is in the negative, the roll call apparatus skips over the individual devices within that station and then interrogates the next station in sequence. When a reply is received indicating that the device is in the polled station, the reply received therefrom is effective to cause the main station roll call apparatus to then interrogate each device within that station. During such sequence the identity of any device having a changed condition together with its new state will be observed by appropriate changes in the conditions of the device indicating lamps. Such changes will also be accompanied by actuation of the heretofore mentioned alarm circuits.

In order that rapid roll call operation may be more easily understood, the following description thereof will be divided into two parts. One of these describes the sequence of operations that results when an uninvited pulse is received either as the result of a delayed answer operation or in response to the automatic operation of some device at a remote point. The other will relate to an alternate sequence of operations that takes place when a plurality of devices operate in response to the transmission of a general code. Although the term "general code" has not heretofore been used in connection with this description, it is intended to designate a code similar to those employed for other two-state operations but which is expressly reserved to simultaneously effect a change by more than one device at one or a number of stations. Circuits to control the generation of such a code are shown in FIG. 6 to which reference will hereinafter be made. Since this general code is employed only within a given section, it may be functionally described as section control.

Now returning to the first of the above-mentioned types of rapid roll call, it may be assumed that an uninvited pulse is received over the line loop. Since the monitor and satellite circuits are prevented from emitting such a pulse during one of the normal cycles of operation, the uninvited pulse will find the main station circuits in their normal idle conditions. Accordingly, when line relay 1811 operates to actuate relay 1511, relays 1616, 1501 and 1606 are actuated. Since the uninvited pulse is always of short duration, timing relay 1615 does not operate, and when relay 1511 is deenergized at the conclusion of the pulse, a path is extended from ground over the No. 3 back contacts of relay 1511, conductor 1514, the No. 1 front contacts of relay 1616, the No. 2 back contacts of relay 1622, the No. 1 back contacts of relay 1617, the No. 5 back contacts of relay 1503 and conductor 1209 to the operating winding of Roll Call relay 1300. Relay 1300 operates in this circuit and locks over its own No. 4 front contacts to ground at the No. 5 back continuity contacts of relay 1400. Relay 1300 at its No. 1 front contacts prepares a heretofore described path for the initiation of operation of stepping magnet 1310. In addition it completes a circuit for the operation of relay 1225 over a path from ground through the No. 2 front contacts of relay 1300 and the No. 5 back contacts of relay 1203 to the winding of relay 1225 and battery. Relay 1225 operates in this circuit and extends a ground for the possible future locking of one or more of relays 1213, 1214 and 1215 from ground over the front contacts of relay 1225 and thence to front contacts of each of the relays 1213–1215.

It should be especially noted that Complete Roll Call relay 1203 and the associated relays 1207, 1208 and 1210 are not operated, and it is this condition which principally distinguishes the operation of the rapid roll call sequence from that which pertains during a complete roll call. Of course, other differences exist but it will be helpful in an understanding of the rapid roll call sequence to bear this in mind.

When the brush contacts of the second bank 1312 are advanced to the No. 1 terminal thereof, ground is extended therefrom but over a path different from that heretofore traced during a complete roll call. Whereas before, it was extended to Skip relay 1302 to further advance the switch brushes, it is now extended over the No. 1 back contacts of relay 1208 to the winding of Coding relay 400. Relay 400 operates in this circuit and extends a path over its No. 5 front contacts to conductor 109 whence it is further extended to the winding of Start relay 1503 thereby to initiate operation of the code transmitting and receiving circuits to emit pulses whose characteristics are determined by grounds extended through contacts of relay 400. The particular code that results is recognized as that which relates to a system signal inquiry and the reply that is received will reflect the state of system signal apparatus at the remote location. Thus, for example, if a system signal condition exists the reply will be of relatively extended duration whereas if no such condition exists the reply will be brief. Although the operation of the system signal apparatus in FIG. 4 will differ depending upon which of these two replies is received, it will be assumed for the purposes of this roll call description that the received reply is of brief duration. The alternate operation that results when the received reply is of extended duration will be hereinafter fully described in a subsequent section of this specification entitled "System Signal."

Now assuming that the reply received is of brief duration, it will be seen that relays 1511, 1616, 1600 and 1501 are again operated, and since the received reply was of brief duration, the aforementioned path is extended over the No. 2 back contacts of relay 1622 and thence via the No. 1 back contacts of relay 1617, the No. 5 front contacts of relay 1503 to conductor 117. If the Monitor Inquiry System Signal circuits of FIG. 4 included a "green" relay such as, for example, relay 100 or relay 205, such path would be extended to the winding thereof. However, an inspection of the circuits of FIG. 4 will reveal that no such relay is provided and the extension of this path therefore is of no effect. However, when relay 1305 is reoperated at the conclusion of the reply, ground is extended in the manner heretofore described to the brushes of bank 1312 and thence from the No. 2 terminal thereof through the No. 1 back contacts of relay 1213 and thence via conductors 1228 and 1303 to the winding of relay 1302 and battery. Relay 1302 operates and results in the stepping of the brushes to the No. 3 terminals, whereupon a path is extended from ground at the No. 3 terminal of bank 1312 and thence over the No. 1 back contacts of relay 1207, conductor 1226 in cable 1227 to the winding of Coding relay 800 and battery. Relay 800 operates in this circuit and extends a path over its own No. 5 front contacts for the operation of start relay 1503. Accordingly, a signal having a code determined by grounds extended through contacts of relay 800 is transmitted over the communication circuits to the satellite and monitor. This code is effective at the first satellite to cause apparatus thereat to respond by emitting a long pulse if one of the devices thereat is responsible for the emission of the original uninvited pulse but to otherwise emit a short pulse. On the other hand, the main station circuits will respond to the receipt of a short pulse by skipping over the remaining items relating to apparatus at the first satellite, but will respond differently to a long pulse by individually interrogating each.

For the purposes of this descriptive explanation, it may be assumed that the device responsible for the uninvited pulse is resident in the second satellite and therefore in the following sequence the roll call will skip over the individual devices in satellite 1 and will in turn individually poll the devices in satellite 2.

Now turning specifically to the operations that result from the receipt of a short pulse in response to the transmission of the station inquiry first satellite code, it will be noted that the operations are identical to those that resulted from the receipt of a short pulse in response to the transmission of a system signal code. Accordingly, the stepping switch brushes are advanced to the No. 4 position and at the end of the pulse the aforementioned ground is reapplied to the brushes in bank 1312 and thence conducted over the No. 4 back contacts of relay 1214 and conductors 1228 and 1303 to the winding of relay 1302. The brushes are advanced to the fifth set of terminals and ground is extended from the No. 5 terminal in bank 1312 over the No. 3 back contacts of relay 1214 and conductors 1228 and 1303 to the winding of relay 1302. Accordingly, the brushes are advanced to the sixth position and ground is extended from the No. 6 terminal of bank 1312 over the No. 2 back contacts of relay 1214 and the aforementioned conductors to the winding of relay 1302. The brushes are advanced to the seventh position and ground is extended from the No. 7 terminal of bank 1312 over the No. 1 back contacts of relay 1214 and thence again to the winding of relay 1302. The brushes are then advanced to the eighth position and ground is extended from terminal 8 of bank 1312 over the No. 2 back contacts of relay 1207 and thence over conductor 1229 in cable 1227 to the winding of Coding relay 801. Relay 801 operates and extends over its own No. 5 front contacts a path for the operation of Start relay 1503. It also extends grounds which control the code transmitted over the communication circuits to the remote stations. This code although distinct from every other code, is nevertheless similar to the code resulting from the operation of relay 800 in that they each result in the effective interrogation of one of the satellite stations. The code resulting from the operation of relay 801 is effective to cause satellite 2 to respond by emitting a long pulse if a device thereat is responsible for the emission of the aforementioned uninvited pulse and, since it has been assumed that such is the case, each individual device within the second satellite will now be polled.

When the long pulse is received, it is effective to cause Long Pulse relay 1622 to operate. Accordingly, at the end of the pulse a path is extended from ground at relay 1511 over the No. 3 back contacts thereof, conductor 1514, the No. 1 front contacts of relay 1616, the No. 2 front contacts of relay 1622, the No. 2 back contacts of relay 1617, the No. 6 front contacts of relay 1503, conductor 116, conductor 802, the No. 4 front contacts of relay 801 and conductor 803 in cable 1227 to the winding of relay 1215 and battery. Relay 1215 operates in this circuit and locks over its own No. 4 front contacts to ground via the front contacts of relay 1225.

Ground is now reapplied to the brushes of bank 1312 and is extended via the No. 9 terminal thereof, the No. 3 front contacts of relay 1215 and conductor 1220 to the inquiry relay (not shown) within the rectangle 503. The actuation of this relay will result in circuit operations identical to those heretofore described and when a reply is received the stepping switch brushes will be advanced to the next set of terminals. The remainder of the sequential operation is also identical to that heretofore described and the circuits finally reset themselves to their normal idle states.

If the device which was responsible for the initiation of the uninvited pulse is located within the first satellite (rather than the second as assumed above), the operation of the circuits would have been slightly different. Here, the receipt of a long pulse in response to the transmission of the first satellite station inquiry code would have resulted in the activation of relay 1214 (rather than relay 1215) and the hereinbefore traced path from terminal No. 7 of bank 1312 via back contacts of relay 1214 to relay 1302 would have been diverted over conductors 1216-1219 to the individual inquiry relays to which reference was made during description of the general roll call above. Accordingly, individual interrogating codes would have been transmitted in relation to each of the devices at the first satellite, and if an affirmative reply (i.e., a long pulse) had been received in relation to any one of the four, a path for the operation of relays 1207 and 1208 would have been extended from ground at the No. 3 front contacts of relay 1300 and thence over conductors 1205, 1230 and 302 through front contacts of the operated inquiry relay, front contacts of the associated green relay, front contacts of the associated red relay (relays 212, 205 and 209 in FIG. 2, for example) conductors 213 and 401, the No. 2 back contacts of relay 1318 and conductors 1319 and 1206 to the winding of relays 1207 and 1208. Accordingly, the path which would otherwise be extended from terminal 8 (which relates to the second satellite station inquiry) would be diverted away from the winding of the associated inquiry relay and would be instead extended via the No. 2 front contacts of relay 1207, conductor 1212, the No. 1 back contacts of relay 1203 and conductors 1224 and 1316 to the winding of Roll Call Release relay 1308 thereby terminating the operation of the roll call and resetting the circuits thereof to their normal idle conditions.

Although it would ordinarily be expected that a "changed condition" reply would be received when the individual devices are polled in response to a "yes" reply from a satellite inquiry, it is possible that through improper operation each individual reply might indicate no change. Accordingly, circuit provision is made to continue interrogation of specific satellites (rather than to reset the roll call circuits) after the individual polling of devices within a satellite if each individual reply indicates no change. In this event, there will have been no simultaneous operation of a pair of red and green relays, relays 1207 and 1208 will have remained de-energized, and the path from terminal 8, for example, will then be extended via the No. 2 back contacts of relay 1207 to the winding of the coding relay relating to next satellite station.

As heretofore mentioned, provision is made in the circuits for the employment of general codes to effect simultaneous change in any predetermined number of remote devices. Since these devices may be distributed among several satellites (where several are controlled from a given main station) and since one or more of these may be of the delayed completion type, provision is made for a further modified operation of the rapid roll call sequence to prevent the termination of the roll call after the changed condition of an individual device is ascertained. This modified operation is brought about by operating relay 1318, thereby interrupting the heretofore traced path for the operation of relays 1207 and 1208. Accordingly, although the devices within a given satellite are individually polled only if a yes reply is received when the satellite itself is interrogated, the receipt of a changed condition reply from one of such individual devices does not result in the termination of the roll call, and the sequence proceeds to interrogate the next satellite just as if a "no change" reply had been received.

System Signal

As heretofore mentioned in connection with the description of roll call operation, a system signal condition may be initiated in any one of the control sections. Thus, for example, it may be initiated in the section under consideration in which event one sequence of operations will result. Again, it may be initiated in a section preceding the considered section or it may originate in a succeeding section, the terms preceding and succeeding relating to the direction of flow along the line in this example. In the event it arises in a preceding section, the monitor physically located adjacent to the main station under consideration signals the main station directly that a system signal condition exists, and the main station responds by transmitting a system signal code to its satellites and monitor to shut down (or perform some other type of crash program) the various devices thereat and, in addition, to activate system signal apparatus in the monitor. Similar operation takes place in the following sections until the system signal has been effectively transmitted along the entire length of the system.

If, on the other hand, the system signal originates in a succeeding section, it results in the transmission from the monitor of an uninvited pulse which is effective to initiate a rapid roll call at the main station in question. If during such roll call a system signal reply is received twice in succession from the monitor, the main station apparatus responds by correspondingly activating apparatus in the monitor of the preceding section and by transmitting a system signal code to each of its own satellite stations. Since each of the three conditions (that is, system signal arising in the succeeding section, preceding section, or the section under consideration) results in a different sequence of operations, they may perhaps be best understood when considered separately. Accordingly, each will now be described under its own heading.

System Signal Originating in Succeeding Section

When a system signal originates in a succeeding section, it is effective to establish an activated condition of system signal apparatus at the monitor of the section under consideration. Accordingly, the monitor emits an uninvited pulse which, in the manner heretofore described, is effective to initiate a rapid roll call. When the roll call circuits were described in detail, it was assumed for purposes of clarity in description thereof that the reply received to a system signal monitor inquiry indicated that no such condition existed. However, it will now be assumed that the received reply indicates that there is a system signal condition thereat and this reply will take the form of a line interruption (pulse) of extended duration.

It will be recalled that at the time the inquiry code was transmitted, the brushes of bank 1312 were in contact with the first terminal thereof and that the brushes were advanced to the second terminal to await the reconnection of ground when relay 1305 reoperated at the end of the reply pulse. That ground was effective over a heretofore-described path via back contacts of relay 1213 to operate Skip relay 1302 thereby to advance the brushes to the third set of bank terminals. However, when the received reply indicates the existence of a system signal condition, a circuit for the operation of relay 1213 will be established from ground over the No. 3 back contacts of relay 1511, conductor 1514, the No. 1 front contacts of relay 1616, the No. 2 front contacts of relay 1622, the No. 2 back contacts of relay 1617, the No. 6 front contacts of relay 1503, conductor 116 and the No. 4 front contacts of relay 400 to the winding of relay 1213 and battery. Relay 1213 operates in this circuit and locks over its own No. 2 front contacts to ground at the front contacts of relay 1225. Accordingly, when ground is reapplied to the brush contacts of bank 1312, it is conducted from the No. 2 terminal thereof and thence via the No. 1 front contacts of relay 1213 and conductor 1231 to the winding of Inquiry relay 402 and battery. Relay 402 operates in this circuit and extends ground over its own No. 3 front contacts and conductor 109 to initiate operation of the common control circuits of FIGS. 10 and 15–18. Accordingly, a code is transmitted which is effective to interrogate the monitor a second time as to whether or not a system signal condition exists thereat. If a negative reply is received (i.e., a short pulse) ground is conducted over the heretofore traced path via the No. 2 back contacts of relay 1622 to conductor 117 and thence over the No. 1 front contacts of Auxiliary relay 403 to the operating winding of Green relay 404. However, since relay 404 is already in its operated state, no change occurs and when the reply pulse terminates, ground is applied to the No. 3 terminal of bank 1312 whence it is extended over heretofore traced paths via conductor 1226 to operate the first satellite Station Inquiry Coding relay 800. The remainder of the circuit operations now follow a normal rapid roll call sequence which terminates when the circuits reset themselves to their normal idle condition. In the event, however, the reply confirms that a system signal condition exists at the monitor, a different path is established and this path extends via conductor 116 and thence over the No. 2 front contacts of relay 403 to the winding of Red relay 405 thereby operating it. A path is now established from ground over the No. 1 front contacts of relay 402 and the No. 2 front contacts of relay 405 to the operating winding of Both Directions relay 1401 thereby operating it. Both Directions relay 1401 is thus named to indicate that its operation results in the transmission of a system signal in both the upstream and downstream directions; in the upstream direction via the monitor circuit of the preceding section and in the downstream direction over the signaling loop to the connected satellites.

When relay 1401 operates, it extends ground over its No. 1 front contacts and the No. 3 back contacts of Preceding Section Complete relay 1402 to the winding of Preceding Section relay 1403 and battery. It also extends ground over its No. 2 front contacts through the No. 3 back contacts of Succeeding Section Complete relay 1404 to the winding of Succeeding Section relay 1400 and battery. Relays 1403 and 1400 now operate and ground is extended via the Nos. 1 and 2 front contacts of relay 1403 and conductors 1405 and 1406 to the monitor circuit of the preceding section. The preceding section monitor will respond by emitting an uninvited pulse to its main station to initiate a sequence of operations similar to those which take place in the main station at hand. After the main station of the preceding section has initiated its roll call, ascertained that a system signal condition exists, and transmits a system signal code, the preceding section monitor applies ground to conductor 1407 whence it is extended over the No. 3 front transfer contacts of relay 1403 to operate Preceding Section Complete relay 1402. Relay 1402 locks over its No. 1 front contacts and conductor 1408 to ground through normally closed contacts of System Release key 1409. In addition, it releases relay 1403 by opening the operating circuit thereof at the No. 3 back contacts of relay 1402.

In the meantime, a number of operations take place in response to the operation of relay 1400. Thus, for example, relay 1400 establishes a locking path for itself over its own No. 1 front contacts and the No. 3 back contacts of relay 1404 from ground on conductor 1408. In addition, it extends a path from ground over its No. 2 front contacts and the back contacts of Horn Retire relay 1410 to operate a system signal horn relay (not shown). It also extends ground from conductor 121 via its No. 3 front contacts and the No. 5 back contacts of relay 1404 to the operating coil of System Signaling Code relay 406 to initiate transmission of a system signal code over the line loop. It also establishes a path for the activation of System Signal Busy lamp 1411 from battery via resistor 1412, the No. 6 back contacts of relay 1404 and the No. 4 front contacts of relay 1400 to lamp 1411 and ground. In addition, it transfers ground from conductor 1413 to which Roll Call relay 1300 was locked thereby terminating the roll call and resetting the roll call circuits to their normal idle conditions.

The system signal code has now been transmitted and the monitor is arranged to respond by emitting a brief reply pulse. This is effective to connect ground over conductor 117 and the No. 1 front contacts of relay 403 to the winding of relay 404, thereby actuating relay 404 and returning relay 405 to its inactive state. When relay 404 operates, it further extends the ground over its No. 2 front contacts and the No. 7 front contacts of relay 406 to the winding of relay 1404. Relay 1404 operates and locks to ground on conductor 1408. It extends a path from battery via resistor 1414 and its No. 1 front contacts to the System Signal Indicating lamp 1415. It establishes an alternate path from ground over its No. 2 front contacts and the back contacts of relay 1410 to the System Signal Horn relay (not shown). It opens its No. 3 back contacts to interrupt the operating path for relay 1400. It opens its No. 5 back contacts to interrupt the operating circuit for System Signal Code relay 406. It also opens its No. 6 back contacts to interrupt a path for the operation of System Signal Busy Lamp 1411. It closes its No. 7 front contacts to momentarily extend a path from ground over the No. 5 slow release front contacts of relay 1400 and the No. 7 front contacts of relay 1404 to the winding of relay 1320 and battery. It also extends ground over its No. 8 front contacts to the No. 3 armature of Red relay 504. However, since relay 504 is unoperated, this ground produces no effect.

The heretofore traced path via the No. 5 front slow release contacts of relay 1400 and the No. 7 front contacts of relay 1404 is completed for a brief interval only. This interval is terminated when the slow release armatures of relay 1400 complete their movements, but this interval is sufficient to permit the actuation of relay 1320. Accordingly, a path is extended from ground over the No. 2 front contacts of relay 1320 to the winding of relay 1318 and battery. Relay 1318 operates in this circuit and locks over its own No. 1 front contacts to ground at the No. 2 back contacts of relay 1308. Accordingly, the heretofore-traced path via conductors 401 and 1319 for the operation of relays 1207 and 1208 is interrupted at the No. 2 back contacts of relay 1318. This is done in order to prevent the diversion of ground from succeeding satellite inquiry code relays after a changed condition reply has been received during the individual polling of devices at one end of the satellites during the ensuing roll call. Although the diversion is advantageously employed in a rapid roll call, when a system signal condition exists, a plurality of devices distributed among the satellites may have changed condition and it is therefore desired that each satellite be polled during the ensuing roll call in order that the new states of each of the changed devices may be ascertained.

Now returning to relay 1320, it will be seen that an additional path is established when it operates. This path extends over its No. 1 front contacts and thence via conductor 1321 to the circuits of FIG. 2. This path is provided in order to effect operation of the delayed completion lamp associated with each device having a delayed completion characteristic for tripping (here only the second two-state device of the first satellite) and the path is therefore further extended in FIG. 2 from conductor 1321 over the No. 7 back contacts of relay 205 to the operating winding of relay 202 and battery. Accordingly, Blue relay 202 operates and extends a path over its No. 3 front contacts from battery to the Delayed Completion lamp 203.

When the first of the remote devices changes state in response to the receipt of the system signal code, an uninvited pulse is returned to the main station and this pulse results in the initiation of a modified rapid roll call, the modification consisting of the heretofore described disablement of the ground-diverting path. Accordingly, each remote station is polled even though an affirmative reply and a changed condition reply may have been received from a satellite and one of its individual devices respectively. After the roll call has been completed, the circuits thereof are returned to their normal idle conditions. The system signal circuits may be completely reset to their idle conditions by the depression of the System Release key 1409 and the Retire Audible Alarm key 1102 at any time after the System Signal Busy lamp 1411 has been extinguished. Of course, if such keys are depressed before the roll call has completed its sequence, they will have no effect thereupon and the roll call circuits will continue to operate in sequence until they have completed the interrogation of each satellite.

The roll call initiated by receipt of the first uninvited pulse subsequent to the transmission of the system signal may have been completed before certain of the delayed answer devices have assumed the required states. Accordingly an additional pulse or pulses may be received subsequently and the circuits will respond thereto by initiating another roll call which will proceed to ascertain the new states of such devices. Since Roll Call Release relay 1308 will have been operated at the end of the preceding roll call, the heretofore mentioned alternate ground path will have been reestablished over the No. 2 back contacts of relay 1318 and the receipt of a changed condition reply from one of the individual devices will result in the diversion of ground to reset the roll call apparatus instead of polling the next station in sequence.

*System Signal Originating in Preceding Section*

When a system signal has originated in a preceding section, it results in the application of ground by the preceding section monitor to conductor 1407. Since Both Directions relay 1401 will be deenergized, the ground on conductor 1407 will be extended via the No. 3 back continuity contacts of relay 1403 and the No. 1 back contacts of relay 1404 to the winding of relay 1400 and battery. Relay 1400 operates in this circuit, thereby lighting System Signal Busy lamp 1411. In addition, it completes the above-traced circuit for the operation of System Signal Code relay 406, it actuates the System Signal Horn relay (not shown) and it locks itself to ground at System Release key 1409 over a path which may be traced via conductor 1408, the No. 1 front contacts of relay 1400 and the No. 3 back contacts of relay 1404 to the winding of relay 1400 and battery. It also disconnects ground from conductor 1413, thereby interrupting the locking path for Roll Call relay 1300 and interrupting any roll call that may have then been in progress. In thus interrupting this locking path, ground is transferred from conductor 1413 to the No. 5 armature of relay 1400 thereby partially preparing a path for the future operation of relay 1320 when relay 1404 operates.

When a reply is received to the system signal code, the code transmitting and receiving circuits are effective to extend ground over lead 117 and thence via the No. 1 front contacts of relay 403, the No. 2 front contacts of relay 404 and the No. 7 front contacts of System Signal Code relay 406 to the operating winding of relay 1404 and battery. Relay 1404 operates in this circuit and locks itself to ground over its own No. 4 front contacts, conductor 1408 and normally closed contacts of System Release key 1409. Operations similar to those heretofore described now occur. Thus, for example, the System Signal lamp 1415 is energized, the System Signal Busy lamp 1411 is extinguished, relay 1400 and relay 406 are de-energized and the heretofore mentioned path via the No. 7 front contacts of relay 1404 is momentarily completed to operate relay 1320. As before, relay 1320 operates relay 1318, thereby interrupting the heretofore-mentioned diversion path for the operation of relays 1207 and 1208. Accordingly, when one of the remote devices responds to the system signal by changing its condition, the resulting pulse is effective to initiate a modified rapid roll call identical to that heretofore described in connection with the origin of the system signal in a succeeding section.

It will now be seen that each succeeding section will receive a system signal indication from the monitor of the preceding section and such signal will therefore be effectively extended to the end of the entire system.

*System Signal Originating in Section at Hand*

When a system signal condition originates in one of the satellites connected to the main station, an uninvited pulse is transmitted over the line loop and is effective at he main station to initiate a rapid roll call in the manner heretofore described. Since it has been assumed that this condition originated in a satellite, a negative reply is received when the monitor is queried and the brushes of bank 1312 will effectively sweep past the second position to initiate an inquiry to the first satellite. If the reply from the first satellite indicates a changed condition of one of its devices, the roll call apparatus will proceed to interrogate such devices individually. The first of such relates to a system signal condition, originating within the first satellite and if such exists, a relatively long pulse will be returned to the main station. The code transmitting and receiving circuits respond to this long pulse by applying ground to lead 116 whence it is extended via the No. 2 front contacts of the first satellite system signal inquiry relay 500 to the operating winding of Red relay 504 and battery. Accordingly, relay 504 operates, releases Green relay 501 and then locks itself over its No. 1 front contacts to ground at the No. 1 back contacts of relay 501. It causes Red lamp 509 to light by extending a path from battery over the No. 1 back contacts of relay 505 and the No. 5 front contacts of relay 504 to the Red lamp 509 and ground. In addition, it momentarily extends a path from ground over the No. 2 slow release front contacts of relay 501 and the No. 2 front contacts of relay 504 to the winding of Lamp Flashing relay 505. In addition, it partially prepares a circuit for the future operation of Lockout relay 506 by extending a path from the winding and No. 1 back continuity contacts thereof via the No. 3 front contacts of relay 504 to the No. 8 front contacts of relay 1404. It also extends a path from ground over its No. 4 front contacts for the future locking of relay 506 and the current operation of relay 1401. This path may be further traced from the No. 4 front contacts of relay 504 and thence in two directions: one, to the armature of the No. 1 continuity contacts of relay 506; the other, via the No. 2 back contacts of relay 506 and conductors 507 and 508 to the operating winding of relay 1401 and battery. Relay 1401 operates in this circuit thereby extending the heretofore-traced paths for the operation of relay 1403 and relay 1400. Accordingly, in the manner heretofore described in detail, a system signal code is generated and transmitted over the line loop to effect system signal changes in the remote devices. In addition, the monitor circuit of the preceding section is signaled over conductors 1405 and 1406 and it proceeds to alert its main station by emitting an uninvited pulse thereto.

When the system signal code is received from the main station by the monitor of the section in which the system signal condition has originated (i.e., in this example the monitor of the section at hand) it is effective thereat to produce operations therein identical to those produced when the same system signal code is generated by its main station as a result of the initiation of the system signal condition in a succeeding section. Although the operation within the monitor circuits themselves is exactly the same, it produces a different effect in the main station of the succeeding section and this difference in operation is related to the condition of the relay therein which corresponds to Preceding Section relay 1403. Whereas, if the system signal condition had originated in a succeeding section, the aforementioned relay corresponding to relay 1403 would have been operated and ground applied by the monitor over the conductor corresponding to lead 1407 would have been effective to activate a relay corresponding to Preceding Section Complete relay 1402. When the system signal condition originates in the section at hand the relay corresponding to relay 1403 will be de-energized and the same ground applied to the conductor corresponding to lead 1407 will be instead diverted to operate a relay corresponding to Succeeding Section relay 1400. It will therefore be seen that the monitor of the section at hand responds in an identical manner to a system signal code transmitted from its main station irrespective of whether the original system signal condition occurred in the section at hand, the preceding section or the succeeding section, and the difference in overall system operation results from the difference in condition of the relay in the following main station corresponding to relay 1403.

Now returning to the operation of the circuits of FIG. 4, it will be seen that when a short pulse is received from the monitor, ground is extended over conductor 117 and thence via the No. 1 front contacts of relay 403, the No. 2 front contacts of relay 404, and the No. 7 front contacts of relay 406 to the winding of relay 1404. Relay 1404 operates in this circuit and locks over its No. 4 front contacts to ground on conductor 1408. It interrupts the heretofore-traced path for the operation of relay 406. It completes a circuit for the operation of Lockout relay 506 from ground over the No. 8 front contacts of relay 1404, the No. 3 front contacts of relay 504 and the No. 1 back transfer contacts of relay 506 to the winding thereof and battery. Relay 506 operates in this circuit and locks over its No. 1 front continuity contacts to ground via the No. 4 front contacts of relay 504. Relay 1404 also momentarily establishes the heretofore-traced path for the operation of relay 1320, extinguishes System Signal Busy lamp 1411 and actuates the System Signal Horn relay (not shown).

Relay 506, in operating, opens its No. 2 back contacts thereby releasing relay 1401 and completing an additional circuit for the activation of System Signal lamp 1415 from battery via resistor 1414 and the No. 3 front contacts of relay 506 to lamp 1415 and ground.

Since the first satellite circuits of FIG. 5 relate to a system signal condition thereat, and since it is desired that the circuits continue to display the system signal condition until a contrary indication is subsequently received from the affected satellite, the Red relay 504 may continue in its operated state for an indefinite period of time. In order to prevent reactivation of relay 1401 by the circuits of FIG. 5 over the heretofore traced path via contacts of relay 504, the aforementioned No. 2 back contacts of Lockout relay 506 are serially interposed in this path. Accordingly, the first satellite station circuits of FIG. 5 are prevented from adversely affecting the remainder of the main station circuits and the remainder of the main station circuits are released for normal operations.

Although the first satellite system signal circuits continue to display a red condition, the remainder of the main station circuits, except for the System Signal lamp 1415, are reset to their normal idle conditions. Accordingly, various control operations may be initiated if desired at the main station in the normal manner. However, as mentioned above, the red condition of the circuits of FIG. 5 cannot be retired except by a changed condition reply received during a roll call, and provision is therefore made at the affected satellite to emit an uninvited pulse when the system signal condition is eliminated. When this uninvited pulse is received at the main station, it results in the application of ground over the No. 5 back contacts of relay 1503 to the winding of relay 1300 thereby initiating a roll call sequence. When the roll call advances to the affected satellite to determine if a change of state has occurred thereat, the affirmative reply is effective to cause an individual interrogation of each of the devices. When, for example, the first satellite system signal inquiry code is transmitted, the satellite apparatus will respond to indicate an elimination of the system signal condition and the short pulse emitted will result in the application of ground to lead 117 whence it is further extended via the No. 1 front contacts of Inquiry relay 500 to the operating winding of Green relay 501 and battery. Relay 501 operates thereby de-energizing Red relay 504 and locking itself over its own No. 1 front contacts to ground at the No. 1 back contacts of relay 504. The operating path for lamp 509 is interrupted at the No. 5 front contacts of relay 504 and the System Signal lamp 1415 is extinguished by the opening of the No. 3 front contacts of relay 506. Accordingly, the circuits of FIG. 5 and the System Signal lamp 1415 are returned to their normal idle conditions.

If an attendant at the main station should desire to initiate a system signal condition, he may do so by simultaneously depressing the Master Operate Key 1500 and the System Signal Send Key 1417. Ground is then applied over the obvious path to the operating winding of relay 1401. Relay 1401 operates and initiates a cycle of operations similar to that heretofore described as resulting from the operation of relay 1401 above.

*General Code Operations*

As heretofore mentioned, provision is made for the simultaneous response of a plurality of devices to a single general code. These devices may be arranged to respond by performing any predetermined combination of close and trip operations; and they may be severally scattered among the satellite stations. The apparatus at the main station which is employed to control the generation of the general code (circuits of FIG. 6 in this illustrative embodiment) is substantially identical to that employed to control the generation of codes for any one of the single code immediate operation two-state devices. However, it differs in two principle aspects. Whereas circuits provided for the control of ordinary two-state devices include lamp control and inquiry relays, the circuits of FIG. 6 do not require such. The circuits of FIG. 6 additionally differ in that they include circuits for the operation of relays 1322 and 1323 whose functions will be more particularly explained below.

Now turning to the operation of the circuits of FIG. 6, it will be seen that relays 600 and 601 are identified with the letters CL and TR respectively. Although in the interests of consistency these relays will be referred to as close and trip relays, it should be recognized that the terms "close" and "trip" as here employed have no significance as regards the operations that result from the actuation thereof since, for example, operation of Close relay 600 may result in the starting or other activation of some devices and the stopping or deactivation of other devices.

It will be seen that the only indicating lamp provided in FIG. 6 is that which relates to a no reply condition. The reason for this is that close and trip lamps, if provided, would not indicate the states of the individual general code devices but would merely indicate the condition of Red and Green relays 602 and 603.

Operation of Close key 604 and Master Operate key 1500 results in the actuation of relay 600 over the obvious path and the extension of ground in the manner heretofore described to initiate the operation of the code transmitting and receiving circuits of FIGS. 10 and 15–18. Accordingly, a code is transmitted over the communication circuits and the most distant satellite responds by returning a relatively long pulse. This long pulse does not indicate that any one of the individual general code devices has operated but instead merely acknowledges receipt of the general code signal at the most distant satellite. The pulse is, however, effective to extend ground to Red lead 116 whence it travels via the No. 2 front contacts of Auxiliary relay 605 to the winding of Red relay 602 and battery. Relay 602 may already be operated since the individual devices that respond to the general code may have been placed in a general code condition and then subsequently changed individually by the operation of their trip keys (or other means) rather than collectively by the operation of Trip key 606. However, if Red relay 602 is already operated, the aforementioned ground effects no change thereof; whereas if the Green relay is operated, the ground extended to Red relay 602 operates it thereby releasing Green relay 603. At the same time, the ground from Red lead 116 is further extended via the No. 2 front contacts of relay 602 and the No. 1 back contacts of relay 601 to the operating winding of General Code relay 1323. Relay 1323 operates thereby extending a path over its No. 2 front contacts from ground to the winding of relay 1318 and battery. Relay 1318 operates in this circuit and locks itself over its No. 1 front contacts to ground through the No. 2 back contacts of relay 1308. Accordingly, the heretofore described diversionary path over which ground is sometimes extended during a roll call to hasten the termination thereof is interrupted at the No. 2 back contacts of relay 1318 and the roll call which later results will be effective to interrogate each satellite irrespective of whether a changed condition reply is received from any one of the individual devices.

Now returning to relay 1323, it will be seen that a ground is extended over the No. 1 front contacts thereof via conductor 1324 and the No. 7 back contacts of relay 209 and conductor 208 to the winding of relay 202. Relay 202 operates in this circuit and locks itself over its No. 2 front contacts, the No. 3 back contacts of relay 209, the No. 9 front contacts of relay 205 and the No. 3 back contacts of relay 210 to ground. In addition, relay 202 extends an obvious path over its No. 3 front contacts to light Delayed Completion Lamp 203.

It may be helpful to know that relay 1323 is included in order to provide delayed completion lamp operation for each two-state device which will be delayed in effecting its change in response to the general code. Accordingly, if circuits for additional delayed completion devices were shown, if such devices were to change state in response to this general code, and if they were delayed in completing such change, multiple circuits extending from conductor 1324 would be selectively extended to the control circuit relays thereof which correspond to relay 202.

It should be noted that the circuits of FIG. 2 are of the delayed completion type in both close and trip. Accordingly, as will be later explained, a path is extended to operate relay 202 when the general trip code is transmitted. However, it should be borne in mind that the relationship of a close response of an individual device to a close general code does not necessarily pertain and that if other devices were arranged in a different manner so that they were to trip in response to a close general code, then paths for the operation of relays thereof corresponding to relay 202 would be arranged correspondingly. Such arrangement will be apparent when the complete operation of both the relays 1322 and 1323 have been fully described.

Now returning to the operations that result in this specific embodiment from the operation of Close key 604, it will be recalled that a close general code has been transmitted and an acknowledgment replay received. Relay 1318 has been locked operated to relay 1308, and relay 202 has been locked operated via contacts of relays 209, 205 and 210. The circuits now await the receipt of an uninvited pulse which will be transmitted when one of the devices changes state, and this uninvited pulse is effective to initiate a modified rapid roll call during which each satellite station will be interrogated. The changed states of the immediate response devices (if any) will be reflected by corresponding changed states of the indicating lamp relating thereto. However, for those devices that have a long delay characteristic, additional subsequent roll calls may be required. When such latter devices finally complete their operations, one or more uninvited pulses are transmitted to the main station to effect an additional roll call.

Now turning to the circuits of FIG. 2, when a roll call reply is received indicating that the related device has operated, ground is extended over Red lead 116 in the manner heretofore described to operate Red relay 209. Accordingly, the locking path for relay 202 is interrupted at the No. 3 contacts of relay 209, and relay 202 therefore releases. The Delayed Completion Lamp 203 is extinguished and the Green and Red lamps 214 and 215 assume states corresponding to an operated condition of relay 209 and an unoperated condition of relay 205.

It should be noted that during the heretofore described sequence of operations, the indicating lamps do not intermittently flash since lamp control relay 211 is not energized. Although a path may be traced from the winding of relay 211 via the No. 5 front contacts of relays 209 and 205, the No. 1 front contacts of relay 212 and conductor 121 to conductor 1014, conductor 1014 is disconnected from ground at the No. 2 back contacts of relay 1013 during the very brief interval of time in which both the No. 5 back contacts of relays 209 and 205 are engaged. Therefore ground is not supplied to the winding of relay 211 and it does not operate.

If, instead of operating Close key 604, Trip key 606 is depressed, a trip general code is transmitted to the satellite stations and a related, though different, sequence of operations results. This sequence of operations is similar to that of the close sequence in that they both include the transmission of a general code which results in the simultaneous change of state by more than one device. Howevery, they differ in that the operation of the Trip key 606 results in the actuation of relay 1322 (instead of 1323) thereby resulting in the extension of ground over conductor 1321 rather than conductor 1324. The ground on conductor 1321 is further extended via the No. 7 back contacts of relay 205 and conductor 208 to the winding of relay 202 and battery. Accordingly, the Delayed Completion Lamp 203 is again lighted.

The main station circuits now await receipt of a short acknowledgement pulse from the most distant satellite and when this pulse is received it is extended over the Green lead 117 and the No. 1 front contacts of relay 605 to the winding of Green relay 603 thereby causing it to operate if it is not already in an operated condition. The roll call that will be initiated when the first uninvited pulse is received performs in a manner similar to that hereinbefore described and the circuits finally reset themselves to a normal idle condition.

Incoming Call to Main Station

It may be desired to signal the main station to indicate the occurrence of some unusual condition, to indicate a desire for an operator at the main station to contact an operator at a remote location via telephone or other means, or for any one of a plurality of reasons that will be apparent to one skilled in the art. Thus, for example, when the circuits are specifically applied to pipeline control, it may be desired to indicate the arrival at a satellite of a fluid separating device such as a scraper. Accordingly, circuits are provided at the main station which are effective during a roll call to interrogate the satellite stations and monitor to determine whether or not such a condition exists thereat and such circuits are particularly set forth by way of illustrative example in FIG. 7.

Now turning particularly to FIG. 7 it will be seen that in the upper half thereof there are disclosed three relays, three indicating lamps and associated circuits. It will be immediately noted that individual red and green relays do not appear and that corresponding close and trip relays also are not included. One reason for this is that it is necessary to provide but one code, that is, an inquiry code, whereas for the majority of devices heretofore considered it has been necessary to include provision for close, trip and inquiry codes.

Now considering operation of the circuits, the occurrence of the unusual event (the signaling by the operator at a satellite or monitor to get the attention of the operator at the main station, etc.), results in the emission of an uninvited pulse from the originating station. This pulse is effective in the manner heretofore described to initiate a standard rapid roll call during which each satellite is interrogated. If a changed condition exists at one of these satellites, the individual devices thereat are polled in the manner heretofore described. Since apparatus is included at the satellite to recognize the aforementioned unusual condition and to respond to such condition by emitting a condition-representing signal during such individual polling, the corresponding circuits at the main station will be activated and the rapid roll call will be terminated without proceeding beyond interrogation of the satellite at hand. On the other hand, if no such condition exists at any one of the satellites, the roll call proceeds to a position which is effective to result in the transmission of an interrogating code to the monitor to determine whether or not such condition exists thereat. Apparatus at the main station responds to a reply (which under these circumstances should indicate the existence of such condition) by sounding an alarm, by extinguishing a green lamp, and by establishing a flashing condition of a red lamp on the main station control console.

Now assuming that such condition originates at the first satellite, an uninvited pulse will be received over the line loop and the main station circuits will initiate a rapid roll call in the manner heretofore described. When, during this rapid roll call, the brushes of bank 1312 engage the No. 3 terminal thereof and ground is applied thereto, circuits are rendered effective to transmit an interrogating code to the first satellite to inquire whether or not a changed condition exists thereat. The reply received is in the affirmative and the roll call then proceeds to individually interrogate the devices thereat. When, during such individual interrogation the brushes of bank 1312 advanced to terminal 7, a code is transmitted to individually interrogate apparatus at the first satellite which will respond by initiating an affirmative reply. Accordingly, ground will be applied to lead 116 and will be extended therefrom via the No. 2 front contacts of Inquiry relay 700 to the winding of Red-Green relay 702 and battery.

Relay 702 operates and locks to ground over its own No. 3 front contacts and the contacts of Retire Flashing Lamp key 122. It interrupts at its No. 1 back contacts the obvious circuit for the activation of Green lamp 703. It partially completes a path for the future cyclic flashing of Red Lamp 704 from the lamp through resistor 705, the No. 2 front contacts of relay 702, conductors 706 and 216 to the No. 1 front contacts of Flasher Relay 1104. Relay 702 also extends ground from conductor 116 over the No. 1 front contacts of Inquiry relay 700 via the No. 4 front contacts of relay 702, conductors 707 and 200 to the winding of Alarm relay 1101 and battery. In addition, it extends a path from ground via the No. 3 front contacts of relay 1300, conductors 1205, 1230 and 303, the No. 5 front contacts of Inquiry relay 700, the No. 5 front contacts of relay 702, conductors 213 and 401, the No. 2 back contacts of relay 1318, conductors 1319 and 1206 to the windings of relays 1207 and 1208 and battery; and finally, relay 702 extends ground over its No. 6 front contacts, conductors 708 and 217 and the back contacts of Flasher relay 1105 to the winding of Flasher relay 1106 and battery. As a result of these operations, alarm relay 1101 operatees to actuate the heretofore-described alarm circuits and the flasher circuits are operated to alternately apply and remove battery from conductor 216 over the front contacts of relay 1104. Accordingly, Red Lamp 704 flashes off and on thereby to more noticeably attract the attention of the main station operator.

Since relays 1207 and 1208 are operated, the aforementioned diverting circuit will be effective to terminate the roll call when it completes interrogation of the individual devices within the first satellite. Accordingly, except for the flasher circuits, the alarm circuits, the Red-Green relay 702 and the associated indicating lamps, the main station circuits are reset to their normal idle conditions. Relay 702 may be released by operating the Retire Flashing Lamps key 122 whereupon Red Lamp 704 is extinguished and Green Lamp 703 reactivated. The flasher circuits are restored when the above-traced path is interrupted over contacts of relay 702, and the alarm circuits may be retired by depressing the Retire Audible Alarm key 1102.

In this description it has been assumed that a reply is received. If, however, no reply is received when the inquiry code is transmitted, the timing circuits of FIG. 16 will operate to extend ground over the No. 2 back contacts of relay 1511, the No. 5 front contacts of relay 1509, conductor 1512, alternate path 1605, conductor 1606, the normally disengaged contacts 1624 of the 12.5-second cam 1623 and the No. 9 back contacts of Telemetering relay 1617 to the winding of relay 1625. Accordingly, ground is extended over the No. 2 front contacts of relay 1625 and then via conductors 1626 and 201 and the No. 3 front contacts of Inquiry relay 700 to the operating winding of No Answer relay 711, resistor 712 and battery. Relay 711 operates and locks to ground over its own No. 2 front contacts. In operating, it extends over its own No. 1 front contacts an obvious path for the operation of No Reply Lamp 714 via resistor 713.

A visual inspection of the circuits will reveal that relay 711 can only be released by being shunted down by a subsequent simultaneous operation of Inquiry relay 700 and Release relay 1600. Accordingly, the No Reply Lamp 714 will continue in an activated state until a reply relating thereto has been received in response to its interrogating code.

The lower half of FIG. 7 is devoted to circuits similar to those of the upper half but which are reserved for the generation of a code used to ascertain whether or not an outgoing call condition exists at the monitor (i.e., an incoming call condition at the main station). Since these circuits are similar to those heretofore described in connection with a corresponding condition at the first satellite, they will not be described in detail. It should be understood, however, that the only principal difference between the circuits of the upper and lower halves of FIG. 7 resides in the codes that are generated as a result of different cross connections at the terminals of FIG. 10 and a difference in the roll call sequence which results from the receipt of the uninvited pulse.

Although not shown, an additional circuit would be provided for the second satellite if it were desired to include provision for an incoming call therefrom. In addition, if it were desired to provide additional individual indications at the main station for other unusual conditions, other circuits similar to those of FIG. 7 could be included as required.

Outgoing Calls to Satellites and Monitor

Provision is made to enable an operator at the main station to signal an operator at satellite 1 or at the monitor. This is accomplished by the circuits of FIG. 8. Referring to the figure, it will be seen that these circuits lie in the right-hand part thereof, the circuits for calling the monitor being in the upper right-hand part and those for satellite 1 being in the lower.

When it is desired to initiate a call to satellite 1, for example, key 804 is depressed thereby to activate Coding relay 805. In the manner heretofore explained, a code is transmitted over the line and the circuits at satellite 1 respond by emitting a reply pulse of extended duration. This long pulse is effective for its duration to light White lamp 806 thereby providing visual indication to the operator that the signal has been received at the intended satellite. When the pulse terminates, the lamp is extinguished and coding relay 805 is reset to its normal inactive state. These operations will be detailed as follows.

After the signaling code has been transmitted, the long pulse reply operates relay 1511 in the manner heretofore described. Accordingly, a path is extended from battery via resistor 1515, the No. 1 front contacts of relay 1511, conductor 1516 and the No. 1 front contacts of relay 805 to lamp 806 and ground. Since relay 1511 is operated only for the duration of the pulse, and since relay 805 is released at the end of the pulse, it will be observed that the path for the activation of lamp 806 is completed only for the duration of the pulse. Accordingly, the circuits are restored to their normal idle conditions.

Now if it is assumed that no reply is received, relay 1625 will be operated at the end of the 12.5-second interval and the heretofore-traced path will be extended from ground over the No. 2 front contacts of relay 1625 via conductors 1626 and 201 and thence via the No. 2 front contacts of relay 805 to the winding of No Answer relay 807, resistor 810 and battery. Relay 807 operates and locks to ground over its own No. 2 front contacts. At its No. 1 front contacts it completes a path from battery via resistor 808 for the lighting of No Reply lamp 809. Since, as described with respect to No Answer relay 711 of FIG. 7, No Answer relay 807 can only be released by being shunted down, it will remain in an actuated state until both of relays 805 and 1600 are simultaneously operated. Therefore, lamp 809 will not be extinguished until a reply is received in response to the subsequent transmission of the code relating to an outgoing call to the first satellite.

The circuits located in FIG. 8 immediately above those just described relate to an outgoing call to the monitor and operate in a manner identical to those relating to satellite 1 except for the particular code employed which is determined by the cross connections in FIG. 10. Accordingly, no further explanation thereof will be made. An additional circuit may be added, if desired, to provide a means for selectively signaling satellite 2.

Telemetering

There may be times when it is desired to obtain at the main station a reading relating to a condition existing at one of the remote stations. Accordingly, provision is made for effectively connecting telemetering devices over the line on a selective basis in order that for a brief interval of time the line may be used for the transmission of a telemetering signal whose length is a measure of the magnitude of the quantity to be measured. Although as the description of the telemetering circuits proceeds a variety of modifications and adaptations will become apparent to one skilled in the art, the particular circuits herein disclosed for an illustrative description are arranged to seize the line for a relatively brief interval during which the aforementioned magnitude-representing pulse is transmitted. Thus, for example, when it is desired to ascertain the magnitude of a remote quantity, a key relating thereto at the main station is depressed and a corresponding code is transmitted over the line to the satellites and monitor. This code is effective at the desired station to connect a telemetering transmitter to the line, and this transmitter during the subsequent 10.3 seconds operates to interrupt the line continuity for an interval, the duration of which is proportional to the magnitude of the desired quantity. After a subsequent brief interval, the circuits are restored to their normal idle conditions and are again available for any one of the herein-described circuit operations.

Now turning specifically to the detailed operation of the circuits, it will be seen that the left-hand section of FIG. 9 contains circuits for the initiation of a telemetering operation at either the first or second satellite. Since they both operate in a similar manner, only the upper circuit (satellite 1) will be described in detail.

As heretofore mentioned, a telemetering operation is initiated by the depression of a telemetering key 900. A path is established over the contacts thereof from ground at the No. 2 back contacts of relay 1501 and thence through the contacts of key 900 in two directions: one, to operate Coding relay 901 and to extend ground over the No. 2 front contacts thereof to operate Start relay 1503; and the other via conductor 902 to the winding of Telemetering relay 1617 and battery. When relay 1617 operates, it establishes a locking circuit for itself and Start relay 1503. This locking circuit may be traced from ground over the No. 8 front contacts of relay 1617, conductor 1601, and cam-operated contacts 1620 and conductor 1603 to the No. 4 front contacts of relays 1503 and 1617. Relay 1617 completes a circuit from ground over its No. 7 front contacts, optional wiring 1605, conductors 1606 and 1607, contacts 1609 and resistor 1611 to the winding of timer motor 1612 and battery. In addition, it extends a path from conductor 1607 through the clutch magnet 1608 to battery thereby to initiate operation of timer 1602. Relay 1617 also completes a circuit for the operation of Telemeter Receiver Motor 1107 over a path which may be traced from the right-hand terminal thereof via the No. 6 front contacts of relay 1617, the No. 2 back contacts of Voltage Control relay 1627, contacts 1628 of timer cam 1629 and the No. 4 back contacts of relay 1627 to source of motor operating potential 1108. Accordingly, Telemeter Receiver 1109 is actuated and is prepared to effectively respond when its relay 1110 subsequently operates for the duration of the telemetering pulse.

Relay 1617, in operating, performs several additional functions. It interrupts the heretofore-traced path for the operation of relay 1616 thereby preventing it from operating during a telemetering sequence. It also extends a path for the operation of Telemetering Lamp 903 from battery via resistor 1630, the No. 5 front contacts of relay 1617, conductor 1631 and the No. 1 front contacts of relay 901 to Lamp 903 and to ground. In addition, at its No. 9 back contacts relay 1617 interrupts a possible path for the operation of relay 1625 thereby preventing the initiation of an alarm if a reply is not received to the telemetered code within the aforementioned 12.5 second interval.

Apparatus at the satellite station responds to the telemetering code by activating apparatus which senses the magnitude of the desired quantity and converts it into a reply pulse whose length is proportional to the quantity magnitude. When this pulse is received at the main station, Line relay 1811 responds and extends a path from ground over its left-hand contacts and the No. 2 back contacts of relays 1810 and 1802 to the winding of relay 1511 and battery. Relay 1511 does not lock and therefore follows the operation of Line relay 1811. Accordingly, it remains operated for the duration of the pulse and over its No. 4 front contacts extends a path from ground via the No. 3 front contacts of relay 1617 to the winding of Telemeter Receiver relay 1110 and battery. Relay 1110 does not lock and therefore follows the operation of relay 1511. Since the telemeter receiver apparatus 1109 is effective to convert the length of time during which relay 1110 is operated into a scale indication of quantity magnitude, retransformation is accomplished therein and a visual indication of the magnitude of the telemetered quantity will appear.

At the end of the reply pulse, line relay 1811 returns its contacts to the right-hand position, but the circuits in FIG. 16 remain in their previous condition to await a repetition of the telemetering pulse. The circuits at the satellite are arranged to send a second pulse indication of the quantity and when such is received the line relay 1811 again operates thereby reoperating relays 1511 and 1110. When the second pulse terminates, relays 1811, 1511 and 1110 assume their inactive states but the remainder of the circuits continue in their previous conditions to await completion of the timing interval of 10.3 seconds. At this time, contacts 1628 open thereby interrupting the heretofore-traced path for the actuation of Telemeter Receiver Motor 1107. At the end of 12.5 seconds, contacts 1624 close. However, since the circuit which they would otherwise complete is open at the No. 9 back contacts of relay 1617, no circuit operations result therefrom. At the end of 15.5 seconds, contacts 1620 open and interrupt the heretofore-traced locking circuit for both relay 1503 and relay 1617, thereby restoring them to their normal idle conditions. When relay 1617 releases, it interrupts at its No. 7 front contacts the heretofore-traced path for the actuation of the Timer Motor 1612 and Clutch 1608 thereby returning the timer to its original state. The circuits are now completely reset to their normal idle conditions.

In FIG. 9 immediately below the telemetering circuits for satellite 1 there are shown similar circuits for telemetering from satellite 2. Since these circuits operate in an identical manner except for the particular code employed, they will not be further described. It should be noted, however, that these circuits are not inherently peculiar to the satellite with which they are identified and they both could relate to telemetering devices at the same satellite if it were desired to thus employ them. Correspondingly, other similar circuits could be included if it were desired to telemeter additional quantities; there being required one coding relay similar to relay 901 one key similar to key 900 and one lamp similar to lamp 903 for each such individual quantity.

It should also be understood that continuous telemetering could be readily employed by utilizing a two-state type control circuit (such as that disclosed in FIG. 1) to connect a telemetering device over an additional circuit channel to a telemeter receiver and since such adaptation is readily apparent to one skilled in the art it will not herein be explained in detail.

*Voltage Control—Step Type*

At times it may be desired to effect a change of some kind which does not fall into one of the categories heretofore described. Thus, for example, it may be desired to effect a small change in some piece of remote apparatus such as a voltage control rheostat or a valve. Whereas the circuits heretofore described are arranged to either open a valve or close it, they are not suited for the partial operation thereof, that is, the inching thereof. Accordingly, circuits are provided to effect the controlled partial operation of remote devices and such circuits are disclosed in the right-hand section of FIG. 9.

Now turning particularly to the circuits of FIG. 9, it will be seen that they include two Coding relays 904 and 905, two No Answer relays 906 and 907, a No Reply lamp 908, Increase and Decrease lamps 909 and 910, Increase key 911 and Decrease key 912. The terms "increase" and "decrease" are used in connection with this illustration since it is directed specifically to the raising or lowering of voltage via control of a remote rheostat. If such control were directed to the opening and closing of a valve, for example, these terms might be advantageously replaced by the words "open" and "close," respectively. Therefore, no particular significance should be attached to the terms themselves other than to indicate an operation in one direction and an operation in the reverse direction.

As mentioned before, certain optional paths are shown in FIG. 16. Thus, for example, link 1605 is an optional connection which would be made in the event a step type control is to be included. Here, relay 1632 would be eliminated together with two of the three sets of contacts on Voltage Control key 1633. Since the step type of control is now to be described, it will be assumed for the purposes of such description that relay 1632 and the aforementioned contacts of key 1633 are eliminated. The part that these circuit elements play will be hereinafter described under the heading "Voltage Control—Continuous Type."

Now, if it is assumed that a remote device is not at its upper limit and that it is desired to increase it (raise, partially open, etc.), the Increase key 911 will be closed thereby to operate Coding relay 904 over the obvious path and to extend such path in the manner heretofore described to initiate operation of the Start relay and associated devices of FIG. 16. In addition, key 911 operates relay 1627 over a path through the right-hand contacts of Increase key 911 and conductor 914 to the winding thereof and battery. Accordingly, a code is transmitted over the line loop to the satellites and is effective at the satellite being considered (satellite 1) to actuate circuits thereat which will later respond to line pulses transmitted from the main station in response to the operation of Voltage Control key 1633. When the apparatus at the satellite is prepared for response, a long pulse is returned over the line loop to the main station.

Now returning to the operation of relay 1627, it will be seen that it locks itself over its own No. 2 front contacts, contacts 1628 of the 10.3 second cam 1629 and the No. 4 front contacts of relay 1627 to ground via optional link 1634. In addition, it prepares over its No. 1 front contacts an alternate locking circuit for Start relay 1503.

It completes a path from Red lead 116 via the No. 4 front contacts of Coding relay 904, conductor 913, the No. 6 front contacts of relay 1627, and the No. 2 back continuity contacts of relay 1635 for the subsequent operation of relay 1635 when a long response pulse is received from a satellite station. Relay 1627 also prepares a future locking circuit for relay 1635. Relay 1627 extends a path over its No. 7 front contacts from battery and resistor 1630 through the No. 5 back contacts of relay 1617, conductor 1631 and the No. 1 front contacts of Coding relay 904 to Increase lamp 909 and ground thereby lighting it.

When the aforementioned reply is received from the satellite station thereby indicating that the circuits thereat are prepared to receive the voltage control pulse or pulses, the extended line interruption (long pulse) effectively causes ground to be applied to the Red lead 116 whence it is extended over the heretofore traced path to the winding of relay 1635. Relay 1635 operates and locks to ground over its No. 2 front continuity contacts and the No. 5 front contacts of relay 1627 to ground. At its No. 1 back contacts it opens an alternate locking circuit from the lower winding of relay 1627 to ground via the No. 1 back contacts of relay 1625. At its No. 4 front contacts relay 1635 extends ground to the contacts of key 1633; and at its No. 5 front contacts it extends battery through resistor 1637 to Proceed Lamp 1638 and ground thereby lighting it. The circuits are now prepared for the transmission of an inching pulse which, irrespective of the length of time during which the voltage control key is operated (unless it should exceed a limit imposed by the cams of timer 1602) is effective to cause a single incremental change in the increase direction of the device at the satellite. If the desired change is to comprise more than one such increment the key may be successively depressed the desired number of times so long as the last depression takes place within a 10.3-second interval subsequent to the operation of Stop relay 1509.

Referring now in detail to key 1633 it will be seen that when its contacts are closed, a path is extended from ground at the No. 4 front contacts of relay 1635 and thence via conductors 1720 and 1717, the No. 3 back contacts of relay 1702 and conductors 1718 and 1719 to the winding of Send relay 1802. Accordingly, relay 1802 is operated and at its No. 3 transfer contacts opens the line. It will now be seen that each time key 1633 is depressed, the satellite involved responds by effecting an incremental change in the device being considered.

When the aforementioned 10.3-second interval has transpired, the locking circuit for relay 1627 is interrupted at contacts 1628 of the 10.3-second cam 1629. Accordingly, relay 1627 releases, thereby opening the locking circuit for Start relay 1503. Relay 1627 at its No. 5 front contacts interrupts the locking circuit for relay 1635 thereby restoring it to normal. Relay 1503 releases relay 1509 thereby interrupting at the No. 5 front contacts of the latter the path from ground to the motor 1612 and clutch magnet 1608 of timer 1602. The remainder of the circuit elements are now reset in the usual manner and the apparatus is returned to its normal idle condition.

If it had been desired to effect a change in the opposite direction, that is, decreasing instead of increasing, the circuits of the lower right-hand section of FIG. 9 would have been used. Except for this, and except for the difference in the code which would have been transmitted, operation of the circuits would be identical and no further explanation is deemed necessary.

*Voltage Control—Continuous Type*

If instead of desiring to effect equal incremental changes, it is desired to effect one or more changes of variable magnitude, the continuous type of control is employed. Here, the circuits of the right-hand section of FIG. 9 are again employed, but the difference in operation results from the inclusion of relay 1632, the two outer sets of contacts on Voltage Control key 1633 and the indicated optional wiring. As before, the increase or decrease key is operated depending upon the direction in which the change is to be made. The appropriate code is transmitted and the long reply is received. When relay 1627 operates at the time the increase or decrease key is depressed, it locks to ground over its No. 3 front contacts, the No. 1 back contacts of relay 1635 and the No. 1 back contacts of relay 1625. When the long pulse reply is received and ground is extended over the heretofore traced path to operate relay 1635, the last-traced locking path for relay 1627 is interrupted and a different locking path therefore is established over the No. 2 front contacts of relay 1627, contacts 1628 of the 10.3-second cam 1629, the No. 4 front contacts of relay 1627, optional link 1639, the No. 2 back continuity contacts of relay 1632, optional link 1636 and the No. 3 front contacts of relay 1635 to ground. Proceed Lamp 1638 is now lit and the circuits are prepared to emit a pulse whose duration will be proportional to the length of time during which key 1633 is depressed.

When key 1633 is depressed, the heretofore-traced path is extended via conductor 1720 to operate Send relay 1802 and interrupt the line continuity. In addition, a path is extended from ground over the left-hand contacts of key 1633 and thence via optional link 1640 to the winding of relay 1616 and battery. Relay 1616 operates, thereby operating relay 1600 and transferring ground on conductor 1601 via the No. 4 front contacts of relay 1616 and the No. 1 front continuity contacts of relay 1600. Accordingly, an alternate locking path for Start relay 1503 is extended from conductor 1601 via contact 1620 of the 15.5-second cam 1621 and conductor 1603 to the No. 4 front contacts of Start relay 1503.

In addition to the above, Voltage Control key 1633 extends a path from ground at the No. 4 front contacts of relay 1635 and optional link 1641 to the winding of relay 1632 and battery. Relay 1632 operates, interrupting at its No. 2 back continuity contacts the ground previously conducted via optional link 1639 and other circuit elements to lock relay 1627. Instead, ground is extended over the No. 2 front contacts of relay 1632 and thence via link 1639 and the heretofore-traced path to lock relay 1627.

When the Voltage Control key 1633 has been depressed for the desired interval it is released, whereupon relays 1616 and 1600 release. The line pulse is terminated and ground is removed from optional link 1639 for a sufficient interval of time (due to the slow release characteristic of the contacts of relay 1632) to deenergize relay 1627. Accordingly, relay 1635 is released over the obvious path and ground is removed from conductor 1601 for a sufficient interval of time (due to the slow release characteristics of relays 1616 and 1600) to allow Start relay 1503 to release. The remainder of the circuits are now restored to their normal idle conditions to await subsequent operations. No Answer relays 906 and 907 are included in order to provide a means for lighting No Reply Lamp 908 and sounding an alarm if no reply is received to the above-mentioned codes. Since the operation of the No Answer relays 906 and 907 is identical to that heretofore described with respect to other No Answer relays, no further description of the operation thereof will be given.

Satellites—General Considerations

As heretofore mentioned, it has been assumed that two satellite stations are connected to the line extending from the main station. These satellites have been identified with the numbers 1 and 2, and the circuits for satellite 1 are shown in FIGS. 19–29 whereas the circuits for satellite 2 are shown in FIGS. 29 and 30. In order to simplify the drawings, dot-dash rectangular representations have been freely employed where practicable. For example, in FIG. 21 the circuits for the second two-state device are represented by a rectangle since, except for the double code transmission and delayed answer features, they operate in a manner similar to the circuits shown in detail in FIG. 20.

It will be recalled that the detailed description of the main station circuits includes operations thereat which are effective to cause transmission of close, trip and inquiry codes for a first two-state device at satellite 1. These codes are transmitted over the line loop and it was stated that replies are received at the main station from the satellite in response to these codes. The detailed circuit operations that take place at the satellite will now be explained.

It will be recalled that each code is preceded by a long prepare pulse. When this pulse (actually a line interruption of extended duration) is received at the satellite signaling circuit (FIG. 26), it is effective to move the armature of line relay 2600 to its left-hand contacts thereby extending a path from ground over these contacts, the No. 2 back contacts of Send relay 2601 and the back contacts of Send-Hold relay 2602 to the winding of Pulse Follower relay 2500 and battery. Relay 2500 operates in this circuit and at its No. 5 back contacts removes ground from conductor 2501 which initiates a flow of charging current to capacitor 2603. This charging current continues to hold the armature of relay 2604 in its right-hand position until its magnitude increases to a point at which current flowing through the upper winding predominates. At this point, relay 2604 moves its armature to its left-hand position and extends a path from ground over the No. 3 back contacts of Device Sending relay 2502, the No. 2 front contacts of Work Timer relay 2503, the No. 2 back contacts of First Parity Check relay 2504 and the No. 1 back contacts of Second Parity Check relay 2505 to the winding of First Pulse relay 2506 and battery.

Now returning to the remaining circuit changes that are effected by the operation of relay 2500, it will be seen that a path is extended from ground over the No. 2 front contacts of relay 2500 to the winding of slow release relay 2507 and battery thereby operating it. A locking circuit for relay 2506 is therefore established from ground over the No. 1 front contacts of relay 2507, the No. 1 front contacts of relay 2503 and the No. 3 front contacts of relay 2506.

At the end of the long prepare pulse, relay 2600 releases thereby deenergizing relay 2500 over the heretofore-mentioned path. Accordingly, ground is reapplied over the No. 5 back contacts of relay 2500 and conductor 2501 to the operating winding of relay 2604 thereby causing its armature to engage its right-hand contacts. Accordingly, a path is extended from ground via the right-hand contacts of relay 2604, the No. 4 back contacts of relay 2502, the No. 3 front contacts of relay 2503 and the No. 5 front contacts of relay 2506 to the winding of Off-Normal relay 2508 and battery. Relay 2508 operates in this circuit and locks itself over its own No. 5 front contacts to ground via the No. 4 front contacts of relay 2506. Accordingly, the circuits are now prepared to effectively respond to the following coded impulses.

If the received pulse had been short instead of long, a different sequence of operations would have resulted in which the circuits would have not effectively responded but would have reset themselves to their normal idle conditions to await receipt of a bona fide signal. Thus, for example, ground from the No. 5 back contacts of relay 2500 would not have been removed from Timing Capacitor 2603 for a sufficient interval of time to have allowed relay 2604 to operate. Accordingly, the circuit for the operation of relay 2506 would not have been established and at the end of the pulse, relays 2500 and 2507 would have reverted to their normal idle conditions. Relay 2500 would have returned to its normal condition, ground would have been reapplied to conductor 2501, and the circuits would have been completely reset. It will therefore be seen that in order for the circuits to be rendered effective to respond to coded signals it is necessary that such signals be preceded by a relatively long prepare pulse.

Now returning to the operation that results when a bona fide prepare pulse is received, it will be recalled that relays 2503 and 2506–2508 are operated thereby to render the circuits responsive to the subsequent pulse train. In addition to locking itself over the heretofore-traced path, relay 2508 performs a number of important functions. These include the extension of ground over its No. 1 front contacts and the No. 1 back contacts of relay 1900, to the operating winding of Pulse Shortening relay 1901 and battery. Relay 1901 will operate thereby extending ground over its No. 1 slow operate front contacts and thence in two directions: one via the No. 1 back contacts of Reply Pulse relay 1909 to the operating winding of Long Pulse relay 1910 and battery; the other via the No. 2 back contacts of relay 1909 to the operating winding of Short Pulse relay 1911 and battery. Returning again to relay 2508, it will be seen that it extends ground over its No. 2 front contacts for the future operation of Parity Check 1 relay 2504. It also extends a path from ground over its No. 3 front contacts for the operation of the counting chain of FIGS. 27 and 28. It extends ground over its No. 4 front contacts and conductor 2509 to contacts of each of the A digit relays 2700–2704 and the B digit relays 2800–2804 for the future locking thereof. It additionally extends ground over its No. 6 front contacts in two directions: one via conductor 2514 and contacts of the chain relays in FIGS. 27 and 28 to operate Extra Pulse relay 2515, and the other via conductor 2516 to provide a locking circuit therefor. Another path is extended from ground over the No. 7 front contacts of relay 2508 to conductor 2517 for the future extension via contacts of relays 2504, 2505, 2515 and various of the digit-representing relays of FIGS. 27 and 28 to effect operation of individual device-controlling relays hereinafter described. A path is extended from ground over the No. 8 contacts of relay 2508 and thence in two directions: one via the No. 4 back contacts of relay 2504 to the winding of relay 2505 and battery; and the other via the No. 2 front contacts of relay 2515 to the winding of relay 2505 and battery. Ground is also extended over the No. 9 front contacts of relay 2508 and thence in two directions: one to the No. 3 contacts of Pulse Dividing relay 2510 whence it is effective in the manner hereinafter described; and the other via the No. 1 armature of Pulse-Follower relay 2500 and either the front or back contacts associated thereat to effect additional operations in connection with relays 2510 and 2511.

As heretofore stated, Pulse-Follower relay 2500 follows the line pulsing; that is, it is operated for the duration of each line pulse. Accordingly, when the first pulse in the digit train is received, relay 2500 operates and remains operated only during the interval of line continuity interruption. Accordingly, ground is removed from conductor 2501 to initiate action of Timing Capacitor 2603, ground is reapplied to slow release relay 2507 and ground is extended from the No. 1 armature of relay 2500 via conductor 2518 and the No. 2 back continuity contacts of relay 2511 to the operating winding of relay 2510 and battery. Accordingly, relay 2510 operates.

It will be helpful to an understanding of the circuit to recognize that the time interval elapsing between the receipt of the long prepare pulse and the first pulse of the following digit-representing train is insufficient to permit the release of slow release relay 2507. Similarly, the interval between each pulse in the digit-representing train is likewise insufficient to permit such release. Accordingly, relay 2507 continues in an operated condition during the entire train of pulses that represent one bona fide digit and this characteristic is advantageously utilized to provide an increased measure of accuracy. Thus, for example, should a long bogus pulse be received, any following train of pulses would be likely to lag by a sufficient time interval to permit relay 2507 to release thereby resulting in effective resetting of the circuits.

An inspection of FIG. 25 will disclose that relays 2510 and 2511 are arranged to operate as pulse dividers. They are driven by Pulse-Follower relay 2500 in such a manner that in response to the first pulse of a train (not the long prepare pulses), relay 2510 is actuated, at the end of that pulse relay 2511 is actuated, at the beginning of the next pulse relay 2510 is released, and at the end of the second pulse relay 2511 is released. This sequence of operations by pulse-dividing relays 2510 and 2511 continues so long as the pulses are received.

The specific paths by which the alternate operations of relays 2510 and 2511 are accomplished may be traced as follows: relay 2510 is operated from ground over the No. 9 front contacts of relay 2508, the No. 1 front contacts of relay 2500, conductor 2518 and the No. 2 back continuity contacts of relay 2511 to the operating winding of relay 2510. Relay 2510 operates and locks via the No. 2 back continuity contacts of relay 2511 and the No. 3 front contacts of relay 2510 to ground at the No. 9 front contacts of relay 2508. At the end of the pulse, relay 2500 releases thereby transferring ground via the No. 1 back contacts of relay 2500 to conductor 2519 whence it is extended via the No. 4 front contacts of relay 2510 and the No. 3 back continuity contacts of relay 2511 to the operating winding thereof and battery. Relay 2511 operates and locks via its own No. 3 front continuity contacts and the No. 3 front contacts of relay 2510 to ground at the No. 9 front contacts of relay 2508. In addition, relay 2511 provides a new locking path for relay 2510, this locking path extending via the No. 2 front continuity contacts of relay 2511, the No. 4 front contacts of relay 2510, conductor 2519 and the No. 1 back contacts of relay 2500 to ground at the No. 9 front contacts of relay 2508. Both relay 2510 and 2511 are now operated and locked.

When the next pulse is received, the last-traced locking path for relay 2510 is broken by the transfer of ground from conductor 2519 to conductor 2518. Accordingly, relay 2510 releases, thereby interrupting the heretofore-traced alternate locking circuit for relay 2511 at the No. 3 front contacts of relay 2510. However, relay 2511 continues in an operated state by virtue of ground which is conducted to the winding thereof via conductor 2518 and its own No. 3 front contacts. At the end of the pulse, ground is transferred back to conductor 2519 thereby interrupting the last-mentioned locking path for relay 2511 and restoring it to its normal inactive state.

In the meantime, the length of each pulse has been measured by the capacitor timing circuit associated with Long Pulse relay 2604, and the alternative operations that result depending upon whether a pulse is long or short will be presently explained in connection with the operation of the counting chain relays of FIGS. 27 and 28. As each digit-representing pulse is received, a relay-activated condition is progressively moved one step along the counting chain which comprises relays 2705–2709 and 2805–2809. Thus, for example, when relay 2510 operates for the first time, relay 2705 is also operated. When relay 2510 releases, however, relay 2706 is operated and relay 2705 is released. When relay 2510 is reoperated, relay 2707 is actuated and relay 2706 is released, and so on until the end of the chain is reached.

A further inspection of FIGS. 27 and 28 will reveal that the five A-digit relays 2700–2704 and the five B-digit relays 2800–2804 are further identified with designating symbols which both relate to the position of the digit (i.e., A or B) and to the value thereof as expressed by an element in the well-known 2-out-of-5 code. Thus, for example, relay 2700 is further identified with the symbols A0, A signifying that this relay relates to the A digit and 0 relating to the 0 element of the 2-out-of-5 code. Since, as heretofore explained, the digit-representing pulse train is composed of five pulses corresponding in sequential position to elements 0, 1, 2, 4 and 7 in the 2-out-of-5 code, and since two of the five pulses are longer than the others thereby expressing the value of the represented digit, circuits are provided which selectively connect Long Pulse relay 2604 via contacts of the counting chain relays with the digit-representing relays in such manner that relay 2604 is effective to cause the actuation of the two relays in each of the A and B digit group which represent the encoded digits. The manner in which this is accomplished will be explained in detail after the operation of the heretofore-mentioned progressive activation of the counting chain relays has been completed. For the purposes of this description it will be assumed that the received code is represented by the digits 00 although it will be readily seen that other digits could have been employed.

When counting begins, all of relays 2705–2709 and 2805–2809 are in their normal idle conditions. Accordingly, when relay 2510 operates in response to the receipt of the first pulse in the digit-representing train, a path is extended from ground at the No. 3 front contacts of relay 2508 and thence via the No. 2 front contacts of relay 2510, conductor 2520, the No. 1 back contacts of relay 2807, the No. 1 back contacts each of relays 2706–2709, 2805, 2806 and 2808, conductor 2810 and the No. 3 back continuity contacts of relay 2705 to the winding thereof and battery. Relay 2705 operates in this circuit and locks itself to ground over its own No. 3 front continuity contacts, the No. 2 back continuity contacts of relay 2706, the No. 3 back contacts of relay 2707, the No. 2 back continuity contacts of relay 2708, the No. 3 back contacts of relay 2709, the No. 2 back continuity contacts of relay 2805, the No. 3 back continuity contacts of relay 2806, the No. 2 back continuity contacts of relay 2807, the No. 3 back continuity contacts of relay 2808 and the No. 3 front contacts of relay 2508. When the next pulse is received, relay 2510 releases and ground is transferred via the No. 2 back contacts of relay 2510 to conductor 2521 whence it is extended over the No. 2 front contacts of relay 2705 to the operating winding of relay 2706 and battery. Relay 2706 operates thereby interrupting at its No. 2 continuity contacts the heretofore-traced locking path for relay 2705 and locking itself over its own No. 2 front continuity contacts and the remaining portion of the heretofore-traced locking circuit to ground at the No. 3 front contacts of relay 2508. When the third pulse is received, ground is reapplied to conductor 2520 and is extended via the No. 1 back contacts of relay 2807 and the No. 1 front contacts of relay 2706 to the winding of relay 2707 and battery. Relay 2707 operates thereby interrupting at its No. 3 contacts the heretofore-traced locking path for relay 2706 and locking itself over its own No. 3 front contacts. Similar operation continues with the actuated-relay condition being advanced one position along the chain for each received pulse until after relay 2809 is operated and locked. The long pulses which cause the operation of relays 2708, 2709, 2808 and 2809 for the 00 code will, at the same time, effect the operation of their corresponding A- or B-relays as will hereinafter be explained. If ten and only ten digit-representing pulses are received, counting will end with relays 2808 and 2809 in their activated states and the remainder of the counting chain relays released. However, if more than ten digit-representing pulses are received, relays 2808 and 2809 will remain operated and relay 2705 will be reoperated by the eleventh pulse. The path over which this operation is effected may be traced from ground on conductor 2520 (relays 2510 being operated) via the No. 1 back contacts of relays 2807, the No. 1 back contacts of relays 2706–2709, 2805 and 2806, the No. 1 front contacts of relay 2809, conductor 2810 and the No. 3 back continuity contacts of relay 2705 to the winding thereof and battery. Relay 2705, by opening its No. 1 back contacts, releases relay 2808. It, therefore, re-establishes the theretofore-traced locking path to which it locks over its No. 3 front continuity contacts. In addition, it establishes a path for the operation of Extra Pulse relay 2515. This path will be traced from ground at the No. 6 front contacts of relay 2508, conductor 2514, the No. 4 front contacts of relay 2705 and the No. 4 front contacts of relay 2809 to the winding of relay 2515 and battery. Relay 2515 operates and locks over its own No. 3 front contacts and conductor 2516 to ground at the No. 6 front contacts of relay 2508.

Immediately after the tenth pulse has been received and before any possible additional pulse has arrived at the satellite, a parity check is made to determine whether or not two, and only two, of the A-digit and B-digit relays have operated. If such is the case, relay 2504 will operate, but if more or less than two A-digit or B-digit relays are operated, relay 2504 will remain deenergized. Thus, provision is made for checking that the correct number of active code elements have been received. The circuits that accomplish this may be traced from ground at the No. 2 front contacts of relay 2508 and thence via the No. 1 back contacts of relay 2511, conductor 2512, the No. 5 front contacts of relay 2808 (since an eleventh pulse has not yet arrived, relay 2808 is still energized), any one of several alternate paths via serially interconnected contacts of the B-digit relays 2800–2804, conductor 2811, any one of several alternate paths via serially interconnected contacts of the A-digit relays 2700–2704, conductor 2710, the No. 5 front contacts of relay 2809 and the No. 2 front contacts of relay 2505 to the winding of relay 2504 and battery. Relay 2504 will operate in this circuit and at its No. 4 back contacts will interrupt the operating circuit for relay 2505. However, since relay 2505 has a slow release characteristic, its contacts remain closed for a brief additional period, thereby preventing the immediate de-energization of the winding of relay 2504. The significance of this will be later apparent when the path is described which extends via the No. 3 front contacts of relay 2504, the No. 3 back contacts of relay 2505 and the No. 1 back contacts of relay 2515 to conductor 2522.

Now, observing the aforementioned alternate paths via serially interconnected contacts of the A and B digit relays, it will be seen from a visual inspection of FIGURES 27 and 28 that a complete path may not be traced therethrough except when any two, but only two, of the B digit relays and any two, but only two, of the A digit relays are operated. Thus, for example, if a received code represents the two decimal digits 00, the two A-digit relays A–4 and A–7 (2703 and 2704) together with the two B-digit relays B–4 and B–7 (2803 and 2804) will be operated and the aforementioned path could then be traced via the No. 2 front contacts of relay 2804, the No. 3 front contacts of relay 2803, the No. 4 back contacts of relay 2802, the No. 3 back contacts of relay 2801, the No. 2 back contacts of relay 2800, conductor 2811, the No. 2 front contacts of relay 2704, the No. 3 front contacts of relay 2703, the No. 4 back contacts of relay 2702, the No. 3 back contacts of relay 2701 and the No. 2 back contacts of relay 2700 to conductor 2710.

It will now be recalled that normally no eleventh pulse will be received and that, therefore, Extra Pulse relay 2515 will not ordinarily operate. Therefore, if the required number of A and B digit relays have been operated and the aforementioned path completed to operate relay 2504, an activating ground will be extended from the No. 7 front contacts of relay 2508 via conductor 2517, the No. 3 front contacts of relay 2504, the No. 3 back contacts of relay 2505, the No. 1 back contacts of relay 2515 and conductor 2522, whence it is extended to various contacts of B-digit relays 2801–2804.

A consideration of the above will now reveal relays 2504 and 2505 to be effective to check that the required number of long pulses are received in each group of five and that relay 2515 checks that no more than a total of ten are included. Since the operation of the parity check relays depends upon the receipt of at least ten pulses (it being necessary that relay 2809 be operated), the circuits inherently check that at least ten have been received. Only when a total of ten, no more and no less, has been received, and only when two long pulses have been received in each group of five, will the aforementioned path be extended from ground to conductor 2522. Accordingly, the circuits provide an exceedingly high degree of reliability and will not operate when an incorrect code is applied thereto.

If ground is not applied to conductor 2522 within a brief period subsequent to the receipt of the last pulse, the release of slow release relay 2507 will result in the resetting of the circuits without their having effectively responded to the code. Thus, for example, after the last pulse has arrived, relay 2500 releases, removing activating ground from the winding of relay 2507. Although during a digit string ground would be reapplied before the contacts of relay 2507 released, no additional pulse now follows and the contacts of relay 2507 assume their normal idle condition. Accordingly, ground is interrupted at the No. 1 front contacts of relay 2507 thereby unlocking relay 2506 and restoring it to normal. At the No. 4 front contacts of relay 2506 the locking ground for relay 2508 is removed, thereby releasing relay 2508 and restoring the circuits to normal. It should be noted that this release sequence is followed irrespective of whether or not the parity and extra pulse checks indicate the receipt of a bona fide code. However, if the code has been a correct one, the aforementioned path will have been extended to conductor 2522 and, as will hereinafter be seen, will have been effective to produce an activated condition of the related control apparatus for the desired single or two-state device.

As heretofore mentioned, while the coded impulses are being received, Long Pulse relay 2604 is effective via contacts of the pulse counting relays 2705–2709 and 2805–2809 to selectively actuate two of the A-digit relays 2700–2704 and two of the B-digit relays 2800–2804. This is accomplished in the following manner. As each pulse is received, an activated condition is progressively stepped one position along the relay chain and at the same time Long Pulse relay 2604 senses the pulse to determine whether it is short or long. If the pulse is short, the armature of relay 2604 remains at its righthand contacts and the path extended thereover from ground produces no further effect. However, if the pulse is long, the armature of relay 2604 engages the lefthand contacts and a path from ground is extended thereover via the No. 3 back contacts of relay 2502, the No. 2 front contacts of relay 2503, the No. 2 front contacts of relay 2506 and the No. 2 back contacts of relay 2809 to the No. 5 armature of pulse-dividing relay 2510. Since relay 2510 is operated during odd pulses and is released during even ones, the ground will be alternately extended to Odd conductor 2523 and Even conductor 2524, whence it will be further extended via contacts of the operated one of the counting chain relays to the associated digit relay. Thus, for example, if it is again assumed that the A and B digits are 0 and 0, Long Pulse relay 2604 will retain its armature in its unoperated, i.e., righthand, position during receipt of the first three digit-representing pulses and, therefore, no ground will be extended to the No. 5 armature of pulse-dividing relay 2510. However, the fourth and fifth digit-representing pulses will be of the long type and, therefore, before each of these pulses terminates, relay 2604 will move its armature to engage its lefthand contacts and the aforementioned path will be extended to the No. 5 armature of relay 2510. Relay 2510 is released coincident with the beginning of the fourth pulse and, therefore, its armature engages the associated back contacts to extend the ground when applied by relay 2604 over conductor 2524 to the No. 4 front contacts of the fourth counting-chain relay 2708. Since the fourth pulse is effective to cause the actuation of relay 2708, these contacts will be closed and the path will be extended to the winding of A-digit relay 2703. Relay 2703 will operate and lock over its own No. 1 front contacts to ground supplied thereto over conductor 2509 via the No. 4 front contacts of relay 2508. At the end of the fourth pulse, ground is reapplied by relay 2500 to conductor 2501, thereby re-establishing a timing base for the subsequent operation of relay 2604. Accordingly, when the fifth pulse arrives, its length is sensed and, since it has been assumed to be of the long type, the heretofore-traced path from ground is again completed to the No. 5 armature of relay 2510. However, relay 2510 is actuated coincident with the beginning of the fifth pulse and, therefore, ground is extended to conductor 2523 and thence to the No. 4 armature of the fifth pulse-counting relay 2709. Relay 2709 will have been operated in response to the receipt of the fifth pulse and the ground is, therefore, extended over the No. 4 front contacts thereof to the winding of A-digit relay 2704 and battery. Relay 2704 operates and locks over its own No. 1 front contacts to the same ground heretofore described for the locking of relay 2703.

Operation of the B-digit relays 2800–2804 (under the control of long pulse relay 2604) and the last five counting chain relays 2805–2809 is identical to that relating to the A-digit relays 2700–2704 except for the operation of the last B-digit relay 2804. Here an alternate path is established to extend the path supplied if the tenth pulse is of the long variety. This path may be traced from ground over the left-hand contacts of relay 2604 via the No. 3 back contacts of relay 2502, the No. 2 front contacts of relay 2503, the No. 2 front contacts of relay 2506, the No. 2 front contacts of relay 2809, the No. 1 back contacts of relay 2510 and the No. 4 front contacts of relay 2808 (it will be recalled that relay 2808 is not released when relay 2809 is actuated) to the winding of B-digit relay 2804 and battery. Relay 2804 operates and locks over its own No. 1 front contacts.

Now, returning to the operations that result when two A-digit and two B-digit relays are operated and the code checking circuits of FIG. 25 have indicated the code to be bona fide, it will be recalled that ground is extended via contacts of the parity check relays 2504 and 2505 and relay 2515 to conductor 2522, whence it is further extended to contacts of the last four B-digit relays 2801–2804. The contacts of all five of the B-digit relays 2800–2804 are arranged to provide conventional code translation to extend ground to a particular one of the ten output leads B0–B9 that corresponds to the two-out-of-five code elements represented by the two actuated B-digit relays. Since, for the purposes of this illustrative example, it has been assumed that the B digit is 0, the last two B-digit relays 2803 and 2804 will be operated and a path will, therefore, be extended to the B0 lead from conductor 2522 via the No. 6 front contacts of relay 2804 and the No. 7 front contacts of relay 2803. No other one of the B-digit output leads, B0–B9, will be grounded when relays 2803 and 2804 are operated.

The A-digit relays 2700–2704 are similarly effective to provide translation from two-out-of-five to one-out-of-ten code. However, since in this illustrative embodiment only the A digits, 0, 1 and 2, are used, armatures of certain of the A-digit relays which would be required to effect translation for the remaining decimal digits are not included. It will be readily understood, however, that if the number of controlled devices were increased so that additional codes were required, armatures could be readily added to provide for A-digit translation of the numbers 3 to 9. It should also be understood, as mentioned above, that additional sets of digit-representing relays could be added if the number of codes required were such as to necessitate a substantial increase in the digits employed. Thus, for example, a set of C-digit relays could be added and the counting chain could be either extended or could be adapted to a re-entry type to provide the necessary counting capacity.

It will now be recalled that the A and B digits assumed to have been received are 0 and 0, respectively. Ground is, therefore, applied to the B0 lead in FIG. 28 in the manner heretofore described, and another ground is applied via the No. 3 front contacts of relay 2704 and the No. 4 front contacts of relay 2703 to the A0 lead of FIG. 27. Ground appearing on the A0 lead is conducted over the obvious path to the winding of the Tens Digit 0 relay 2100, thereby operating it. Accordingly, the ground applied to the B0 lead is extended via cable 2812 to the No. 1 front contacts of relay 2100 and thence via the No. 2 back contacts of relay 2000 to the winding of relay 2001 and battery. Relay 2001 operates and locks over its own No. 1 front contacts and the No. 2 back contacts of Answer relay 1902 to ground through contacts 1903 of the 2.5-second cam 1904 in Timer 1905. Relay 2001, in closing its No. 2 front contacts, establishes a path for the future operation of relay 2000 from ground at the No. 3 front contacts of the fourth counting chain relay 2708 at the time that relay operates during the next counting sequence. No additional operations result from this grounding of the A0 and B0 leads. Accordingly, when relay 2507 releases a brief interval after receipt of the last digit-representing pulse, the circuits of FIGS. 25–28 are reset to their normal idle conditions to await receipt of the next series of coded impulses.

It will be recalled from the description of the main station circuits that the first two-state device in satellite 1 is arranged for double code transmission. This explains the reason why the first grounding of the A0 and B0 conductors resulted in the operation of relay 2001 rather than in the activation of a device-actuating relay. Therefore, an identical series of impulses, including the long prepare pulse, is transmitted from the main station and is effective at the satellite in the manner heretofore described to result in the application of ground a second time to the A0 and B0 leads. Relay 2100 is again operated by ground extended thereto from the A0 lead and the ground appearing on the B0 lead is, therefore, extended via the No. 1 front contacts of relay 2100 to the No. 2 armature of relay 2000. However, it now finds relay 2000 operated and locked since, during the counting of repeated series of digit-representing pulses, relay 2708 will have been operated and ground will have been extended over the above-traced path from the No. 3 front contacts thereof through the No. 2 front contacts of relay 2001 to the winding of relay 2000 and battery. Relay 2000 will have operated and will have locked over its own No. 1 front contacts to the ground on conductor 2002. Accordingly, the aforementioned ground at the No. 2 armature of relay 2000 will be extended through the associated front contacts thereof via the No. 8 back continuity contacts of relay 2003 to the operating winding thereof and battery. Relay 2003 will thereupon operate. At its No. 1 front contacts it extends ground to conductor 2004. At its No. 2 front contacts it partially completes a path for the future operation of Lock relay 2005. At its No. 3 contacts it partially completes a path for the future shunting down of Memory relay 2006. At its No. 4 front contacts it partially completes a path for the future operation of Memory relay 2006. At its No. 7 front contacts it completes a path from Answer conductor 2007 to conductor 2008. At its No. 9 front contacts it extends the heretofore-traced path from ground via conductor 2009 and the No. 3 back continuity contacts of relay 1900 and thence in two directions: one, to the winding of relay 1906 and battery; the other, through the winding of relay 1900, the No. 1 front contacts of relay 1906 and the No. 4 back contacts of relay 1902 to ground. Thus, so long as ground is extended over the B0 lead, relay 1900 is supplied with ground at both of its winding terminals. However, when the circuits of FIGS. 25–28 release a brief interval after receipt of the last digit-representing pulse, ground is removed from the right-hand terminal of the relay 1900 winding, whereupon it operates in series with relay 1906 over the path which may be traced from ground via the No. 4 back contacts of relay 1902, the No. 1 front contacts of relay 1906, the winding of relay 1900 and the winding of relay 1906 to battery.

Also, as heretofore mentioned, Slow Release relay 2507 releases a brief interval after the receipt of the last digit-representing pulse, whereupon the locking path for relay 2506 is interrupted and ground is reapplied to conductor 2525 over the No. 1 back contacts thereof. When the first pulse in the train was received, relay 2506 operated and removed ground from this conductor, thereby releasing Start relay 1919. Accordingly, when ground is reapplied it is extended over the No. 1 back contacts of relay 1919 and thence via conductor 1920 in two directions: one, to clutch 1921 of timer 1905 and battery; the other, via contacts 1922 of the 18-second cam 1923 of Timer 1905 via resistor 1924 to the Timer Motor 1925. Accordingly, the Timer Motor 1925 and Clutch 1921 are actuated and operation of Timer 1905 begins.

One last operation resulting from the actuation of relay 2003 is the completion of its locking path over its own No. 8 front continuity contacts and the No. 3 front contacts of relay 1906 to ground.

During the aforementioned interval of time when relay 1906 is operated and relay 1900 is released, an alternate path is established for maintaining Pulse-Shortening relay 1901 in an operated condition. This path may be traced from ground over the No. 2 front contacts of relay 1906 and the No. 1 back contacts of relay 1900 to the winding of relay 1901 and battery.

It will be recalled that relay 1901 operates coincident with the operation of relay 2508 and that it remains operated so long as relay 2508 remains in its actuated state. However, as heretofore described, relay 2508 is released soon after the last digit-representing pulse is received and it is desired to establish an alternate path to maintain Pulse Shortening relay 1901 in its operated state until relay 1900 operates. Accordingly, the alternate path via the No. 2 front contacts of relay 1906 is provided to ensure this desired sequence of operations.

When relay 1900 operates, the aforementioned operating path of relay 1901 is interrupted. However, since the armatures of relay 1901 embody a slow release characteristic, a momentary operating path will be established for lock relay 2005 from ground over the No. 1 front contacts of relay 2003, conductor 2004, the No. 2 front contacts of relay 1901, the No. 4 front contacts of relay 1900, the No. 2 front contacts of relay 2003 and the No. 2 back continuity contacts of relay 2005 to resistor 2011 and battery. Relay 2005 operates and locks itself to ground over its own No. 2 front continuity contacts. It transfers ground at its No. 3 contacts to extinguish Green lamp 2012 and light Red lamp 2013. In addition, it extends an obvious path over its No. 1 front contacts from battery to Interposer relay 2014 which is effective through contacts (not shown) to activate the first two-state device. The circuits now await an indication of a change in state by the device, and when this occurs, the movable element of the device condition-indicating contacts 2015 disengages the right-hand stationary contacts and moves to engage the left-hand stationary contacts, thereby transferring ground thereto. Accordingly, a path is extended from ground over the left-hand contacts of element 2015 and thence via the No. 5 front contacts of relay 2003 in two directions: one, via the No. 7 front contacts of relay 2003, conductor 2007, back contacts of relay 1908 and the No. 2 front contacts of relay 1900 to the winding of relay 1902 and battery; the other, via conductor 2008, the No. 6 front contacts of Answer relay 1902, the No. 3 front contacts of relay 1912, the No. 4 front contacts of relay 2003 and the No. 1 back continuity contacts of Memory relay 2006 to the operating winding thereof, resistor 2016 and battery. Relay 2006 operates and locks to ground over its own No. 1 front continuity contacts.

Now, returning to the functions that result from the operation of relay 1902, it will be seen that at its No. 1 continuity contacts it interrupts one of the locking paths for relay 2003 but that relay 2003 continues locked for a brief additional interval via the ground supplied thereto over the No. 3 front contacts of relay 1906. At its No. 3 back contacts relay 1902 interrupts the operating circuit for relay 1912. At its No. 4 contacts relay 1902 interrupts the operating path for relays 1900 and 1906 and connects ground to conductor 1913 at its No. 7 front contacts in order to maintain relays 1910 and 1911 in their operated conditions after relays 1901 and 1906 release. At its No. 5 front contacts it locks itself to ground via the No. 1 front contacts of relay 1910, the No. 2 front contacts of relay 1911 and contacts 1914 of the 12.9-second cam 1915 in Timer 1905. At its No. 6 contacts it extends the ground heretofore traced for the operation of relay 2006. At its No. 8 contacts it partially extends a path which would be completed to shunt down relay 2006 if a trip code had been received and if the device has been deactivated in response thereto.

After a brief interval, the contacts of relay 1912 change position. Accordingly, at the No. 3 back contacts thereof the heretofore-traced path from ground is extended to the operating winding of relay 1916 and battery. At its No. 1 back contacts relay 1912 extends a path from ground via the No. 1 back contacts of Long Pulse 1 relay 1917 and the No. 2 front contacts of Short Pulse 1 relay 1916, to the operating winding of Reply Pulse relay 1909 and battery. Ground is now extended over the No. 1 front contacts of relay 1911, the No. 2 front contacts of relay 1910, the back contacts of No Reply relay 1918, the No. 3 front contacts of relay 1909 and the No. 6 back contacts of relay 2500 to the operating winding of Send relay 2601 and battery. Accordingly, relay 2601 operates and at its No. 1 back continuity contacts opens the line thereby to transmit a reply pulse to the main station.

As heretofore mentioned, the length of the reply pulse indicates the condition of the device in question, a long pulse indicating an activated condition and a short pulse indicating a deactivated condition. Since the device has assumed an activated state, the circuits are arranged to transmit a relatively long pulse (actually a line interruption for an extended period) and this is accomplished by causing the line interruption to continue for a relatively long period measured by the slow release characteristic of Long Pulse relay 1910.

Referring again to relay 1909, it will be seen that when it operates, the heretofore-mentioned operating paths for relays 1910 and 1911 are interrupted. However, an alternate operating path for relay 1911 has been established via the No. 1 front contacts of relay 1916 and relay 1911, therefore, continues in its operated state. No such alternate path has been established for relay 1910 and it, therefore, begins to release. However, its contacts embody a slow release characteristic and a relatively long period of time elapses before these contacts assume their normal deenergized positions. During this interval the heretofore-traced path from ground at the No. 1 front contacts of relay 1911 to the winding of relay 2601 is maintained, and it is not until the No. 2 front contacts of relay 1910 release that the Send relay is de-energized and line continuity is restored. It will, therefore, be seen, as mentioned above, that the duration of line discontinuity is proportional to the interval that elapses between the time that Long Pulse relay 1910 is de-energized and the time at which its contacts disengage.

Not only does the release of relay 1910 effect transmission of the reply pulse over the line but, in addition, it initiates a sequence of resetting operations which are effective to restore the common control circuits of FIG. 19 to their normal idle condition. Thus, relay 1910, at its No. 1 front contacts, interrupts the holding path for Answer relay 1902, thereby effecting its release (the operating path for relay 1902 having already been interrupted at the No. 2 front contacts of relay 1900 when relay 1900 released in response to the operation of relay 1902). The release of relay 1902 results in several circuit restoring operations. Thus, at its No. 3 back contacts it restores ground for the reoperation of relay 1912. At its No. 4 front contacts it interrupts the locking ground for relay 2003, thereby releasing it, and at its No. 6 front contacts it interrupts the holding path for relay 1916. In releasing relay 1916, at its No. 1 front contacts, interrupts the holding path for relay 1911. At its No. 2 front contacts relay 1916 interrupts the operating path for relay 1909 which releases.

The circuits, except for Start relay 1919 and Timer 1905, are now completely reset to their normal idle states and restoration of relay 1919 and the Timer 1905 may be effected in either of two ways. If no other signals are received over the line loop, the Timer 1905 will continue to operate until the 18-second cam 1923 transfers the movable element of contacts 1922 to the upper position. At that time the heretofore-traced operating circuit for the Timer Motor 1925 is interrupted and ground is extended over the upper contacts 1922 via the No. 3 back continuity contacts of start relay 1919 to the winding thereof and battery. Accordingly, relay 1919 operates, thereby locking itself over its own No. 3 front continuity contacts to ground at the No. 1 back contacts of relay 2506. At the same time ground is removed at the No. 1 back contacts of relay 1919 from conductor 1920, thereby de-energizing the Clutch 1921 of the Timer 1905. As heretofore mentioned with respect to the timer at the main station, spring loading is provided to reset the timer cams to their normal idle conditions, and the circuits are now completely restored to normal.

Now it may be assumed that a trip code for the first two-state device in satellite 1 is transmitted from the main station. Since this will also be a double code transmission, the pulse-responsive circuits of FIGS. 25 and 26, together with the counting and translating circuits of FIGS. 27 and 28, will operate in an identical manner to that heretofore described except that the code now employed relates to the digits 0 and 1 instead of the digits 0 and 0. Accordingly, relay 2001 will be operated in response to the receipt of the first transmission of the code, during the second transmission relay 2000 will be operated, and at the conclusion of the second transmission a path from ground will be extended via the B1 lead of FIG. 28 through cable 2812, the No. 2 front contacts of relay 2100, the No. 3 front contacts of relay 2000 and the No. 8 back continuity contacts of relay 2017 to the winding thereof and battery. Relay 2017 operates and locks over its No. 8 front continuity contacts as heretofore described with respect to relay 2003. This initiates operation of the common control circuit of FIG. 19. When relays 1900 and 1901 operate, a shunting path for releasing Lock Relay 2005 is completed from the junction of resistor 2011 and the coil of relay 2005 via the No. 2 front contacts of relay 2017, the No. 4 front contacts of relay 1900, the No. 2 front contacts of relay 1901, conductor 2004 and the No. 1 front contacts of relay 2017 to ground. Accordingly, relay 2005 releases, thereby de-energizing Interposer relay 2014 to effect the deactivation of the first two-state device through contacts not shown. In addition, the release of relay 2005 results in the transfer of ground from the red indicating lamp 2013 to the green indicating lamp 2012. The circuits now await indication that the device has changed its state, and when such an indication is received the movable element of the condition-indicating contacts 2015 moves to the right-hand position, thereby extending a path from ground via the No. 6 front contacts of relay 2017 and thence in two directions: one, over its No. 7 front contacts to lead 2007 via a path similar to that heretofore described for the operation of relay 1902; the other, via the No. 8 front contacts of relay 1902, the No. 2 front contacts of relay 1912 and the No. 3 front contacts of relay 2017 to the junction of resistor 2016 and the winding of Memory relay 2006, thereby shunting down relay 2006 and causing it to release.

After a brief interval, the contacts of relay 1912 move to their de-energized positions, whereupon the heretofore mentioned ground at the No. 2 armature of relay 1912 is transferred to the winding of Long Pulse 1 relay 1917 over the obvious path. Accordingly, ground is extended via the No. 1 back contacts of relay 1912, the No. 1 front contacts of relay 1917 and the No. 2 back contacts of relay 1916 to the winding of relay 1909 and battery. In addition, a path is established from ground over the No. 2 front contacts of relay 1917 to the winding of Long Pulse relay 1910 and battery.

It will be recalled from the description relating to the close operation of the first two-state device that Short Pulse relay 1911 will have been operated at the time relay 1906 was actuated. Accordingly, when relay 1909 operates, the operating path for both the long pulse and short pulse relays 1910 and 1911 is interrupted at the Nos. 1 and 2 back contacts of relay 1909. Although relay 1911 releases, an alternate operating path for relay 1910 is effective to retain it in its operated state for an additional period of time. This alternate path is that heretofore described as extending over the No. 2 front contacts of Long Pulse 1 relay 1917. In operating, relay 1909 at its No. 3 front contacts completes a path for the activation of Send relay 2601 from ground over the No. 1 front contacts of relay 1911, the No. 2 front contacts of relay 1910, the back contacts of relay 1918, the No. 3 front contacts of relay 1909 and the No. 6 back contacts of relay 2500 to the winding of relay 2601 and battery. Since, as mentioned above, relay 1911 is releasing, the continuity of this operating path for relay 2601 is maintained for an interval corresponding to the slow release characteristic of Short Pulse relay 1911. This characteristic is such that the contacts complete their movement after a delay somewhat less than that of the contacts of Long Pulse relay 1910 and, therefore, the period during which Send relay 2601 is operated is less than that heretofore described in connection with the close operation above. Accordingly, interruption of line continuity persists for a relatively short interval, thereby effecting the transmission of a short pulse.

To aid in an understanding of the generation of the long and short pulses, it may be helpful to recognize that when a long pulse is to be transmitted the Short Pulse relay 1911 is retained operated while the Long Pulse relay 1910 releases to control the length of the pulse; whereas, when a short pulse is to be transmitted, Long Pulse relay 1910 is retained in an operated condition while Short Pulse relay 1911 is releasing thereby to effect transmission of a short pulse. Thus, it will be seen that the difference in the long and short pulses results from a difference in the release time of the long and short pulse relays 1910 and 1911.

The remainder of the circuit operations are similar to those heretofore described, with the relay 1902 being released when the contacts of Short Pulse relay 1911 complete their movement. As heretofore explained, the release of relay 1902 is effective to initiate a resetting sequence that results in returning the various relays and circuits to their normal idle conditions. Although the Trip relay 2017 is released, the Memory relay 2006 and the Lock relay 2005 remain in the deactivated state.

It may now be assumed that an inquiry code for the first two-state device at satellite 1 is transmitted from the main station over the line loop. Since, as heretofore mentioned in connection with the description of the circuits of the main station, single code transmission is employed for all inquiries, the code received at the satellite (code 02) is effective to result in the application of ground via the A0 and B2 leads to the circuits of FIG. 21. There the A0 ground is effective to operate relay 2100 and ground on the B2 lead is, therefore, extended via the No. 3 front contacts of relay 2100 and the No. 8 back continuity contacts of Inquiry relay 2018 to the winding thereof and battery. Relay 2018 operates and locks itself over its own No. 8 front continuity contacts to ground via the path heretofore traced for the locking of close and trip relays 2003 and 2017. Ground is also extended via the No. 9 front contacts of relay 2018, conductor 2009 and the No. 3 back continuity contacts of relay 1900 to the winding of relay 1906 and battery, thereby initiating operation of the common control circuits of FIG. 19. As heretofore described, when ground is removed from the B-digit lead (in this case, B2), ground is removed from conductor 2009 and relay 1900 operates. Accordingly, a path for the operation of relay 1902 is completed from ground via the No. 7 front contacts of relay 2018, conductor 2007, back contacts of relay 1908 and the No. 2 front contacts of relay 1900 to the winding of relay 1902 and battery. Paths are now completed for the operation of relays in FIG. 19 which are effective to cause the emission of pulse whose length indicates the condition of the device.

If the device is in its unoperated state, a path will be extended from ground over the right-hand contacts of condition-indicating device 2015, the No. 6 front contacts of relay 2018, the No. 8 front contacts of relay 1902, the No. 2 front contacts of relay 1912 and the No. 3 front contacts of relay 2018 to the junction of the operating winding of Memory relay 2006 and resistor 2016. Since it will now be assumed that the device has not automatically changed condition since it last responded to a trip order, relay 2006 is de-energized and the ground traced to the aforementioned junction produces no effect thereat.

After a brief delay the contacts of relay 1912 complete their travel and transfer the ground at the No. 2 movable element thereof via the associated back contacts to the winding of relay 1917. Since relays 1910 and 1911 will have already been operated by the closing of the No. 4 front contacts of relay 1906, relay 1910 will lock to ground over the No. 2 front contacts of relay 1917. Therefore, when relay 1909 operates in the manner heretofore described, relay 1910 is retained in its operated condition but relay 1911 is released and, in the manner heretofore described, the length of the pulse transmitted over the line loop is the function of the release time of relay 1911. Accordingly, a relatively short pulse is returned to the main station and the circuits reset themselves in the manner described above.

If, when the inquiry code had been received, the device had been in its activated state, the movable element of contacts 2015 would have extended the path from ground but in a different direction. Here it would have passed over the No. 5 front contacts of relay 2018, conductor 2008, the No. 6 front contacts of relay 1902 and thence initially via the No. 3 front contacts of relay 1912 and the No. 4 front contacts of relay 2018 to the back stationary contact associated with the No. 1 movable element of Memory relay 2006. However, if it is assumed that the device has not changed state since it last operated in response to the receipt of a close code, relay 2006 will be operated, its No. 1 front continuity contacts will be closed and the heretofore-traced path will not, therefore, be extended from the No. 1 back continuity contacts to the winding of relay 2006.

Returning to the No. 3 contacts of relay 1912, it will be seen that as soon as these contacts have completed their travel, the above-described path will be diverted to the operating winding of relay 1916, thereby effecting its operation. The No. 1 contacts of relay 1916 will furnish the alternate locking path to hold relay 1911 when relay 1909 releases. Therefore, the pulse transmitted over the line loop will be a function of the release characteristic of relay 1910 and the transmitted pulse will be of the long variety.

*Uninvited Pulse*

It will be recognized that Memory relay 2006 will ordinarily reflect the true state of the device to which it relates. However, due to some unusual condition such as the automatic tripping of a circuit breaker, a device may change its state without having received the appropirate control code. Accordingly, it is possible that after such automatic change a memory relay may reside in a state other than that which represents the condition of its associated device. This may perhaps be more clearly understood when it is recognized that the state of a memory relay represents the condition that its associated device did assume in response to the receipt of the last order code relating thereto. Since, in an interval following the last ordered operation of the device, it may have automatically changed (that is, without authorization from the main station), the device may have gotten out of step with its associated memory relay and provision is advantageously made for effecting a change in the condition of the memory relay, if required, to render it once more representative of the condition of its associated device.

Since no substantial period should elapse between the time and automatic change takes place and the recognition thereof at the main station, provision is made at the satellite to effect transmission of a relatively short pulse over the line loop whenever any unauthorized change takes place to a two-state device. As heretofore mentioned in connection with the main station description, such pulse has been described as being uninvited.

If it may be assumed that the first two-state device in satellite 1 last responded to a close order code by assuming its activated state and that some time thereafter it changed to its deactivated state without having received a corresponding order from the main station, the first change that takes place in the circuits at the satellite is the transfer of ground to the right-hand contacts of condition-indicating device 2015. Accordingly, a path will be extended from ground via the right-hand contacts of device 2015 and thence through the No. 6 back contacts of relay 2017, the No. 2 back contacts of relay 2018, the No. 6 back contacts of relay 2003 and the No. 2 front contacts of relay 2006 to the operating winding of Alarm Group relay 2200 and battery. Relay 2200 operates, thereby extending ground over its No. 1 front contacts to the operating winding of Alarm relay 1926 and battery. Relay 1926 operates and at its No. 1 front contacts extends ground from the No. 2 front contacts of relay 1919 to the winding of Alarm 1 relay 1927 and battery. At its No. 2 front contacts relay 1926 extends ground from the No. 4 front contacts of relay 1919 to the winding of relay 1910 and battery. At its No. 3 front contacts relay 1926 extends ground from the No. 5 front contacts of relay 1919 via the No. 2 back contacts of relay 1909 to the operating winding of relay 1911 and battery. At its No. 4 front contacts relay 1926 extends a path from the stationary element of the No. 1 contacts of relay 1912 via the No. 6 front contacts of relay 1919 to the operating winding of relay 1909 and battery, thereby preparing relay 1909 for operation when relay 1912 releases.

Now, returning to relay 1927, it will be seen that when it operates in the above-described circuit, it opens its back contacts and removes ground from the heretofore traced path via the No. 3 back contacts of relay 1902 to the operating winding of relay 1912. Accordingly, relay 1912 will be de-energized and after a brief delay its contacts will release and the path for the operation of relay 1909 will be completed. The operating path for short pulse relay 1911 will be interrupted and, since long pulse relay 1910 remains energized, the length of the uninvited pulse now to be transmitted will correspond to the delay in release of the short pulse relay 1911 contacts.

When the pulse is received at the main station it is effective, as heretofore described, to initiate a standard rapid roll call and inquiry codes are transmitted in the manner heretofore described. When in FIG. 13 the brushes of the second bank 1312 engage the third stationary terminal, the inquiry code 26 is transmitted in the manner heretofore described. When this code is received at the satellite, it is effective to result in the application of ground to the A2 and B6 conductors in FIGS. 27 and 28. The ground on conductor A2 operates tens digit 2 relay 2101, thereby extending the path for ground on conductor B6 via the No. 7 front contacts of relay 2101 and the No. 3 back transfer contacts of group inquiry relay 2201 to the operating winding thereof and battery. Relay 2201 operates, locking itself over its own No. 3 front transfer contacts to ground via the same path heretofore traced for the locking of relays 2003, 2017 and 2018. The ground on the B6 lead is now further extended via the No. 4 front contacts of relay 2201 to conductor 2009, whence it is effective to activate relay 1906 and initiate operation of the circuits of FIG. 19.

At its No. 2 front contacts relay 2201 extends ground via conductor 2007 and the heretofore-traced path to the winding of relay 1902; and at its No. 1 front contacts it extends ground via the No. 2 front continuity contacts of Alarm Group relay 2200 to conductor 2008; thence via No. 6 front contacts of relay 1902 and a moment later via the No. 3 back contacts of relay 1912 to the operating winding of relay 1916 and battery. The No. 1 contacts of relay 1916 will furnish an alternate locking path to hold relay 1911 when relay 1909 releases. Relay 1910 now releases to impart a long characteristic to the pulse sent to the main station. The common control circuits of FIG. 19 and relay 2201 now revert to their normal states to await the individual inquiry codes which will be transmitted from the main station for each of the two-state devices in satellite 1.

As heretofore described, the first individual code sent out from the main station to satellite 1 is that which relates to a system signal. If it may be assumed for the purposes of this description that a system signal condition does not exist at satellite 1, a short pulse will be returned to the main station and the roll call apparatus will proceed to interrogate the first two-state device at satellite 1 by effecting the transmission of the appropriate inquiry code. Since it has been assumed that this device has automatically changed state and that it initiated the transmission of the uninvited pulse, the series of operations that take place when Inquiry relay 2018 is operated in response to the receipt of the inquiry code are identical to those heretofore described in relation to the receipt of an inquiry code when the device is unoperated except that since the Memory relay 2006 is now operated, the sequence of operations will now include the shunting down of operating potential for relay 2006 thereby to effect its release.

It will be recalled that when relay 2018 is operated, a path is extended for the activation of the common control circuits of FIG. 19. If device condition-indicating contacts 2015 are in a position corresponding to a deactivated state, a path for shunting down relay 2006 will be momentarily established when the sequence of operations arrives at a point at which relay 1902 is operated and the contacts of relay 1912 are still in their operated positions. Thus, for example, such paths may be traced from ground over the right-hand contacts of indicating device 2015, the No. 6 front contacts of relay 2018, the No. 8 front contacts of relay 1902, the No. 2 front contacts of relay 1912 and the No. 3 front contacts of relay 2018 to the junction of resistor 2016 and the winding of Memory relay 2006. Accordingly, relay 2006 is released in order that it may agree with the actual condition of its associated apparatus.

It may now be noted that although the device in question has been de-energized (through automatic means), Lock relay 2005 remains in its active state. The circuits are arranged in this manner in order to permit an operator at a remote point (that is, at a satellite) to reclose a circuit breaker or other control device which may have automatically tripped without adversely affecting apparatus at the main or satellite stations. Of course, if it should be desired that Lock relay 2005 be released, the principles underlying the circuits described could readily be extended to effect such modified operation.

As heretofore explained, the remaining individual items in satellite 1 are interrogated by the roll call apparatus whereupon the roll call is terminated and the circuits are reset to their normal idle states.

*Delayed Completion Operations at Satellite*

It will be recalled that provision is made for controlling devices having starting and stopping delayed characteristics. Thus, for example, in FIG. 21 it will be seen that the second two-state device in satellite 1, though similar to FIG. 20, is nevertheless different with respect to the addition of the No. 10 front contacts to the close relay 2103 and trip relay 2104. In addition, another difference resides in the use of double code transmission for the circuits of FIG. 20 and single code transmission for the circuits of FIG. 21. It should be noted that the circuits of FIGS. 20 and 21 could be readily adapted to employ either single or double code and that there is no interdependency between immediate or delayed answer on the one hand and rapid or delayed completion on the other. The combinations embodied in FIGS. 20 and 21 are merely selected in order to disclose both the single and double code operations and both the immediate and delayed completions of two-state devices.

Now turning more particularly to FIG. 21, it will be noted that representations of close and trip relays similar to relays 2003 and 2017 are depicted within the dashed rectangle 2102. Each of the relays 2103 and 2104 are, however, different from their counterparts of FIG. 20 in that they each include an additional set of contacts over which ground may be selectively extended to conductor 2105.

Operation of circuits of FIG. 21 will be similar to that heretofore described with respect to the selective operation of close, trip or inquiry relays 2103, 2104 and 2106. The ensuing operations that result from the operation of relay 2106 are identical to those heretofore described for relay 2018 but those that result from the operation of relays 2103 and 2104 are slightly different. Thus, for example, when relay 2103 is operated, a path similar to that heretofore traced in FIG. 20 is extended to initiate operation of the common control circuits of FIG. 19. At the same time, however, the No. 10 front contacts of relay 2103 are operated thereby extending a path from ground via conductor 2105 and conductor 1907 to the winding of automatic release relay 1908. Relay 1908 operates and at its front contacts extends a path from ground at the No. 1 back contacts of relay 1901 and the No. 2 front contacts of relay 1900 to the winding of relay 1902. Relay 1902 operates and locks itself in the manner heretofore described thereby interrupting the operating path for relay 1912 and causing it to release as heretofore described. Before it releases, however, a momentary path is extended from ground at the device condition-indicating contacts 2107 and thence over a path via back contacts (not shown) of relay 2104, back contacts (not shown) of relay 2106, front contacts (not shown) of relay 2103, front contacts of relay 1902, the No. 2 front contacts of relay 1912 and front contacts (not shown) of relay 2106 to the junction of resistor 2108 and the operating winding of relay 2109. However, relay 2109 is already deenergized and this shunting path therefore has no effect thereon. A moment later the contacts of relay 1912 complete their release and ground is therefore extended over the No. 2 back contacts thereof to the operating winding of relay 1917. Relay 1917 operates thereby providing a holding ground for relay 1910 which will have already been energized. Relay 1916 does not operate and no ground is therefore extended for maintaining relay 1911 in an operated condition after relay 1909 releases. Accordingly, when relay 1909 opens its Nos. 1 and 2 back contacts, relay 1911 releases thereby to impart a relatively short characteristic to the pulse transmitted over the line loop. As heretofore described, the main station apparatus responds to a relatively short pulse by lighting a white lamp. The circuits of both the main and satellite stations reset themselves to their normal idle conditions and when at last the second two-state device assumes its activated condition, an uninvited pulse is transmitted from the satellite to the main station thereby to initiate a standard rapid roll call. This is accomplished by operations which result when ground is extended via the left-hand contacts of condition-indicating device 2107, back contacts (not shown) of relay 2103, back contacts (not shown) of relay 2106, back contacts (not shown) of relay 2104, back contacts (not shown) of relay 2109, the winding of relay 2200 and battery. As heretofore described, the operation of relay 2200 results in the operation of relay 1926 which in turn is effective to cause the transmission of a short uninvited pulse. The roll call now proceeds in the standard rapid fashion and when it transmits an inquiry code to determine whether or not satellite 1 is the source of the uninvited pulse, it receives an affirmative reply. Accordingly, the individual devices of satellite 1 are separately polled and when the sequence advances to the second two-state device of FIG. 21, the inquiry code is effective to result in the operation of relay 2106. When relay 2106 operates, it extends a path to the common control circuits of FIG. 19 to initiate their operation, relay 2109 is actuated, and a relatively long pulse is transmitted over the line loop to the main station. This relatively long pulse is effective in the manner heretofore described to activate the appropriate red indicating lamp and extinguish the green lamp and the white delayed completion lamp. The roll call proceeds to individually interrogate each of the remaining devices in satellite 1 and when it is terminated, the circuits are returned to their normal idle conditions and are prepared for future control operations.

Similar operations result when a trip code is received for the device of FIG. 21. Here again, ground is extended via conductor 2105 to initiate an immediate reply which is effective to light the appropriate white delayed-completion lamp at the main station. Later, when the device completes its deactivation, an uninvited pulse is generated and a roll call ensues. A reply to the inquiry code is effective to change the condition of the indicating lamps to extinguish both the red and white and to light the green.

It will be noted as heretofore mentioned that the circuits of FIG. 21 are arranged for single code response and that therefore relays corresponding to relays 2000 and 2001 are not provided. Instead, paths are extended directly from the A and B digit leads to the appropriate A-digit relay (such as relay 2100) and via contacts of the A-digit relay to the operating winding of the appropriate close or trip relay.

System Signal Originating at Satellite 1

As heretofore mentioned, a system signal condition may occur at any one of the satellites. If it should occur at satellite 1, a path is extended from ground via the left-hand contacts of System Signal Switch 2110 and the No. 2 back contacts of Memory relay 2111 to the winding of relay 2200 and battery. Relay 2200 operates and in the manner heretofore described is effective to cause the circuits to emit an uninvited pulse over the line loop. When this pulse is received at the main station it is effective to initiate a standard rapid roll call, and during such roll call a code is transmitted which in effect inquires if the first satellite is the source of the uninvited pulse. When an affirmative reply arrives at the main station, it is effective again in the manner heretofore described to cause an individual interrogation of each device at the satellite. The first individual device code transmitted is that which relates to a system signal inquiry at the first satellite and such code is effective to operate inquiry relay 2112. An additional path is now extended from the left-hand contacts of system switch 2110 via the No. 3 front contacts of relay 2112 and conductor 2008 to the common control circuits of FIG. 19. When relay 1902 has operated and before relay 1912 has moved its contacts, a path is extended via the No. 6 front contacts of relay 1902, the No. 3 front contacts of relay 1912, the No. 2 front contacts of relay 2112 and the No. 1 back continuity contacts of Memory relay 2111 to the operating winding thereof, resistor 2113 and battery. Accordingly, relay 2111 operates to record a system signal-originating condition at the first satellite. When the contacts of relay 1912 have fully responded, the heretofore-traced path is alternately extended to the operating winding of relay 1916 and battery. Accordingly, relay 1916 operates and provides the heretofore mentioned path for the continued operation of Short Pulse relay 1911. Therefore when relay 1909 is subsequently energized, it is the Long Pulse relay 1910 that releases and imparts a relatively long characteristic to the impulse transmitted over the line loop. The main station circuits respond in the manner heretofore described, and the relay 2111 remains locked until a subsequent inquiry has found the system signal switch to have reverted to its original non-signal-indicating position.

*Call to the Main Station*

There may be occasions when an attendant at a satellite station desires to signal the main station without reference to any particular device. Thus, for example, he may desire to have the main station operator contact him over another communication facility. Accordingly, provision is made as heretofore described in connection with the main station circuits for the controlled emission of an uninvited pulse to initiate a roll call during which a calling condition originating at the satellite is verified at the main station.

The sequence of operations is initiated by the depression of an outgoing call key. Thus, for example, in FIG. 22 key 2202 is depressed thereby extending a path from ground over the contacts thereof and the No. 1 back contacts of Reply 2 relay 2203 to the winding of Call relay 2204 and of battery. Relay 2204 operates and locks via a path which may be traced from ground over the No. 2 front contacts of a relay 2204 and the No. 1 back contacts of relay 2203. In addition, it extends a path from ground over its No. 3 front contacts and the No. 4 back contacts of Inquiry relay 2205 to the winding of relay 2200 and battery. Relay 2200 operates and in the manner heretofore described is effective to initiate the generation of an uninvited pulse which is transmitted over the line to the main station. A standard rapid roll call ensues and when the heretofore mentioned satellite-interrogating code is received, an affirmative reply is transmitted to indicate that the uninvited pulse originated in the satellite. The roll call proceeds to the individual interrogation of each device thereat and when the brush of the second bank 1312 of the step switch in FIG. 13 has advanced to the seventh bank terminal the inquiry code transmitted from the main station is effective through the counting and decoding circuits of FIGS. 25–28 to extend ground to the Tens Digit 1 relay 2114 and Inquiry relay 2205. Accordingly, relay 2205 operates, locking in the manner heretofore described with respect to other inquiry relays, and ground is extended via its No. 6 front contacts to conductor 2009 whence it is effective to initiate operation of the common control circuits of FIG. 19.

At its No. 4 front contacts relay 2205 transfers the heretofore-traced ground from relay 2200 to conductor 2008 whence it is extended to the No. 6 stationary contacts of relay 1902. At its no. 2 front contacts relay 2205 extends ground to Answer lead 2007 and thence via the heretofore-traced path to the winding of relay 1902; and at its No. 1 front contacts it partially prepares a path for the future operation of Reply 1 relay 2207 when Reply Pulse relay 1909 operates. When, during the sequence of operations the contacts of relay 1912 move to the positions which corresponds to a deenergized condition of the operating winding, the ground heretofore traced to the No. 6 stationary contacts of relay 1902 is further extended via the associated movable element and the No. 3 back contacts of relay 1912 to the winding of Short Pulse 1 relay 1916 and battery. Relay 1916 operates thereby supplying a holding ground for Short Pulse relay 1911 in order to prevent its release when Reply Pulse relay 1909 is energized. Accordingly, the characteristic of the reply pulse will be imparted by Long Pulse relay 1910 and the pulse will therefore be a relatively long one. At this time, the heretofore-mentioned path is completed via the No. 4 front contacts of Reply Pulse relay 1909 and the No. 2 back contacts of relay 2203 to the winding of relay 2206 and battery thereby causing it to operate. When Reply Pulse relay 1909 releases, ground is removed from the No. 2 stationary contact of relay 2203 and relay 2203 operates in series with relay 2206 in a circuit which may be traced from ground over the No. 1 front contacts of Call relay 2204, the front contacts of relay 2206, the winding of relay 2203 and the winding of relay 2206 to battery. When relay 2203 operates, it interrupts at its No. 1 back contacts the heretofore-traced locking circuit for relay 2204. Relay 2204 releases and at its No. 1 front contacts interrupts the heretofore-traced path for the operation of relays 2203 and 2206. Relays 2203 and 2206 release and the circuits are restored to normal.

*General Code at Satellite I*

In the rescription relating to the main station circuits, a section is included which relates to general code operations. It will be recalled therefrom that a general code is employed whenever it is desired to effect the simultaneous response of a plurality of devices to a single code. When a general code is transmitted from the main station, it is recognized at the satellite (or satellites if the general code-responsive devices are located at more than one satellite) and circuits are provided at the satellite or satellites to effect the desired change. Such circuits are shown in the upper section of FIG. 23 within the dashed rectangle 2300.

As heretofore explained in connection with the main station general code circuits, the terms "close" and "trip" as applied to the general code relays are of no significance, the operation of the close relays merely resulting in the completion of one set of operations and that of the trip relays in a different set of operations. Bearing this in mind, it will be later seen that operation of Close relay 2301 will result in the locking of Locking relay 2005 and a corresponding relay in FIG. 21 (not shown), whereas operation of trip relay 2302 will result in the release of both.

Now turning specifically to the operations of the relays, the receipt of a close general code at the satellite is effective to cause the circuits of FIGS. 25–28 to impress ground upon conductors A1 and B9, whereupon the ground on conductor B9 is extended over front contacts No. 4 of relay 2114 and back continuity contacts No. 6 of relay 2301 to the winding thereof and battery. Relay 2301 operates, locks and extends ground in the manner heretofore described to initiate operation of the common control circuits of FIG. 19. In addition, at its No. 1 front contacts relay 2301 extends ground to the winding of No. Reply relay 1918 thereby operating it to prevent the initiation of the reply by the circuits of FIGS. 19 and 26. This is done in order that no satellite except the one most remote from the main station returns a reply indicating receipt of the general code. At its No. 2 front contacts relay 2301 extends ground to the movable element of the No. 4 contacts of relay 1900 from whence it is later extended via the No. 4 contacts and the No. 2 front contacts of relay 1901, conductor 2004 and the No. 5 front contacts of relay 2301 to the operating winding of Master On relay 2303. At its No. 3 front contacts relay 2301 extends ground in two directions: one via conductor 2008 to the No. 6 stationary contact of Answer Relay 1902 and in the other direction via the No. 4 front contacts of relay 2301, conductor 2007 and the back contacts of relay 1903 to the No. 2 stationary contact of relay 1900 whence it is later extended to the winding of Answer relay 1902.

When relays 1900 and 1901 operate, the heretofore-mentioned path is completed and relay 2303 operates. Ground is selectively extended over the Nos. 1 and 2 front contacts of relay 2303 to operate the lock relays of FIGS. 20 and 21. It is extended via the No. 1 front contacts, conductor 2304 and the No. 2 back continuity contacts of relay 2005 to the winding thereof; it is extended over the No. 2 front contacts, conductor 2305 and the No. 2 back continuity contacts (not shown) of the corresponding locking relay in FIG. 21 to the operating winding thereof (not shown). Paths are now completed to operate interposer relays (for example, relay 2014) which in turn are effective to change the states of the associated devices. When the control circuits of FIG. 19 revert to their normal idle conditions, the path for the operation of relay 2303 is interrupted and it, together with relay 2301, are reset to their normal idle conditions. The circuits now await the completion of the desired change whereupon the changes in the device condition-indicating contacts result in the generation of an uninvited pulse which is transmitted to the main station in the manner heretofore described. A rapid roll call of modified character results and each satellite is polled even though in a preceding satellite a changed condition may have been detected. Upon the conclusion of this modified roll call the common control circuits at the main station revert to their normal states. If subsequent thereto an additional device completes its change, another uninvited pulse is transmitted to the main station and yet another modified rapid roll call will ensue.

The operations that result when a general trip code is received are substantially identical to those described in relation to the close code. However, the grounds that are extended by Master Off relay 2306 are conducted via leads 2307 and 2308 to effect release of the heretofore-mentioned lock relays in FIGS. 20 and 21. The remaining operations are similar to those heretofore described and will not be repeated.

System Signal Code

As previously mentioned, it may be necessary at times to effect a crash shutdown or other change, and circuits corresponding to those shown within the dashed rectangle 2309 are provided at each satellite to recognize a crash code and to effect the desired results. Thus, for example, if a crash code is received at satellite 1, it is effective to result in the application of ground to the winding of Trip relay 2310. Relay 2310 operates, locks and extends ground in the manner heretofore described to initiate operation of the common control circuits of FIG. 19. In addition, it extends ground to relay 1918 to prevent a response, and during the sequence of operations ground is applied to Master Off relay 2311 in the manner heretofore described with respect to Master On relay 2303. Accordingly, ground is selectively extended over the Nos. 1 and 2 front contacts of relay 2311 and conductors 2307 and 2308 to release the lock relays of FIGS. 20 and 21 (relay 2005 in FIG. 20 and a corresponding relay, not shown, in FIG. 21).

Although the paths extended from ground by the operation of relay 2311 are used to release the lock relays, it will be apparent that they could be used to effect the selective operation of one, the release of the other or any desired combination depending upon the changes required to fulfill conditions imposed by a crash code condition. Similarly, additional contacts could be added to selectively control other two-state devices as required.

Incoming Call to Satellite

If the operator at the main station desires to contact someone at the satellite, he may activate a distinctive alarm or indicating device at the satellite station by depressing a suitable key at the main station console. When this is done, the main station emits a distinctive code in the manner heretofore described and circuits of FIGS. 25–28 respond by extending ground to Tens Digit 2 relay 2101 and conductor B1. The ground on conductor B1 is correspondingly extended to the winding of Close relay 2312 which operates, thereby extending ground over its No. 1 front contacts to a bell or other type of attention-inviting device. In addition, relay 2312 extends ground over its No. 2 front contacts and then in two directions (similar to those heretofore described with respect to other close relays) to the circuits of FIG. 19. At its No. 5 front contacts it locks itself and at its No. 6 front contacts it extends ground from lead 2313 to conductor 2009 whence it is effective to initiate operation of the common control circuits (FIG. 19). At its No. 4 front contacts, relay 2312 completes an additional locking circuit in order that it may be retained in an operated condition after the common control circuits have been reset and until the 12.9 second cam 1915 has rotated to open its associated contacts 1914. This alternate path may be traced from the No. 4 front contacts of relay 2312 and thence via conductor 2314, the No. 2 back contacts of relay 2507 and conductor 1929 through contacts 1914 to ground. The common control circuits now operate in the manner previously described to effect the generation and transmission of a reply pulse, whereupon they are reset to their normal idle conditions. Relay 2312 is not reset, however, because of the alternate locking circuit traced via conductor 2314. Accordingly, the alarm bell or other attention-inviting device remains activated until the alternate locking circuit is broken by the opening of contacts 1914. At this time, relay 2312 is reset, the bell is retired and the circuit revert to their normal idle states.

Voltage Control

As heretofore stated in connection with the description of the main station circuits, two types of voltage control are provided. The circuits at the main station will differ slightly depending upon which is selected, and the pulsing over the transmission loop will be also different. Thus, for example, when step type voltage control is employed one pulse is transmitted and the length of this pulse is a measure of the degree of change required.

When voltage control operation is initiated at the main station, a distinctive code is transmitted to the satellite. There the circuits of FIGS. 25–28 respond by applying ground to the appropriate A and B digit leads. Since two codes are provided for voltage control, one relating to increase and the other to decrease, one or the other of two B-digit leads will be grounded. If it is assumed that the received code is that which relates to an increase, conductor B2 will be grounded and relay 2400 will operate over its No. 6 back continuity contacts. Relay 2400 will lock over its No. 6 front continuity contacts in the manner heretofore described for relay 2301. Relay 2400 will extend ground over its No. 7 front contacts to initiate operation of the common control circuits of FIG. 19. At its No. 3 contacts it extends ground in one direction via conductor 2008 to the No. 6 stationary contact of relay 1902, and in the other direction over its No. 4 contacts via conductor 2007 and No. 1 back contacts of relay 1908 to the No. 2 stationary contacts of relay 1900 whence it is later extended to the winding of relay 1902. At its No. 5 contacts it locks itself over an additional holding circuit which includes contacts 1914 of the 12.9 second cam 1915. At its No. 2 contacts it extends ground to the operating winding of Device Sending relay 2502 and battery. At its No. 1 contacts it completes a path from the No. 4 stationary contacts of pulse follower relay 2500 via the No. 2 front contacts of relay 2502 to Increase Stepping Device 2401. Accordingly, when pulse follower relay 2500 later operates in response to the telemetering pulse, a path will be extended from ground over the No. 4 front contacts thereof to apply ground either for a controlled variable interval if continuous type control is employed or for one or more brief intervals in the event the step type is used. The circuits of FIG. 19 now proceed to effect the generation of a relatively long pulse which, when received at the main station, is effective to light Proceed Lamp 1633 thereby advising the main station operator that the circuits are ready to respond when control key 1633 is depressed. If the continuous type of control is employed, the transmitted pulse will persist substantially for the period of time the key is depressed, and if it may be initially assumed that this type of control is employed, the satellite circuits will respond in the following manner.

Pulse Follower Relay 2500 will, as its name implies, follow the pulse. Accordingly, the heretofore-mentioned path will be established for the duration of the pulse thereby resulting in the activation of device 2401 for a similar period.

Returning now to the operation of relay 2502, it will be seen that at the Nos. 3 and 4 back contacts thereof paths from Long Pulse relay 2604 are interrupted thereby preventing undesired response by the control circuits of FIG. 25. After the Voltage Control Key 1633 has been depressed for the desired length of time it is released, whereupon relay 2500 correspondingly releases to de-energize device 2401. The circuits now await the opening of contacts 1914 which interrupt the heretofore-described alternate locking circuit for relay 2400, thereby affecting its release (the original locking circuit having been interrupted previously). The circuits are now reset to their normal idle conditions.

Similar operations result when a decrease code is transmitted except that here relay 2402 is operated and Decrease Device 2403 is actuated instead of Increase Device 2401.

If step type voltage control were employed instead of the continuous type, one or more impulses would have been received, Pulse Follower relay 2500 would have operated a corresponding number of times and either the increase or decrease device as the case may be would have been energized correspondingly. Other than this, the operation of the satellite circuits would be identical.

Telemetering

As heretofore explained in connection with the description of the main station circuits, provision is made to briefly utilize the signaling circuits for the transmission of a telemetering pulse whose length is a measure of the telemetered quantity. When the appropriate code is received from the main station, it is effective to actuate relay 2404 which locks itself and extends ground to the common control circuits of FIG. 19 in the manner heretofore described for other such relays. In addition, relay 2404 locks itself over its No. 6 contacts in an alternate circuit which is identical to the corresponding circuit described for relay 2400. At its Nos. 1 and 2 contacts it serially interconnects Sending Contacts 2405 between ground and conductor 2406. When contacts 2405 are closed by a telemetering transmitter (not shown), ground is extended via conductor 2406, conductor 1928 and the No. 6 back contacts of relay 2500 to the operating winding of Send relay 2601 and battery. The line continuity will therefore be interrupted for a period whose duration is directly determined by contacts 2405 under control of the telemetering transmitter.

One additional function performed by relay 2404 is the extension of ground via the No. 3 front contacts thereof to the winding of relay 1918 thereby causing it to operate and interrupt the path leading from the No. 2 stationary contact of relay 1910 and other circuitry to conductor 1928. Thus the common control circuits are prevented from interfering with the exclusive control of Send relay 2601 by contacts 2405.

When the 12.9 second cam 1915 opens its associated contacts 1914, the alternate locking circuit for relay 2404 is interrupted and the relay releases. In the meantime, the common control circuits have reset themselves to their normal idle conditions.

Second Satellite

FIGS. 29 and 30 disclose representations of circuits which may be employed at a second satellite. Since these circuits are almost identical to those of satellite 1, few details are shown. A reference to FIG. 29 will reveal a receiving circuit 2900, sending alarm circuit 2901 and a signaling circuit 2902. These circuits 2900–2902 correspond to the circuits of FIGS. 19 and 25–28.

It will also be seen that a representation of a first two-state device is shown in rectangle 2903, that of a second two-state device in 2904, that of a system signal originating circuit in 3000, of an alarm reporting circuit in 3001, of a general code circuit in 3002, of a system signal order circuit in 3003 and of telemetering circuits in 3004. Of course, it will be apparent that these circuits, except for those relating to a general code and a system signal order, respond to different specific codes than their counterparts in satellite 1. In order that this may be demonstrated clearly, the A and B digit leads have been shown in detail.

Two remaining principal differences reside in the circuits. One of these relates to the operations that result from the receipt of a general code order and the other relates to the coding and type of operation contemplated for the first and second two-state devices 2903 and 2904. Whereas in the circuits of satellite 1 relay 1918 is operated when a general code is received thereby to prevent the emission of an acknowledgement pulse, the circuits of satellite 2 do not include such provision since the satellite has been assumed to be more remote from the main station and since it is therefore desired that it emanate an acknowledgment pulse when a general code order has been received.

The differences that relate to the first and second two-state devices reside in the elimination of double code and delayed answer operations, it having been assumed that both two-state devices in satellite 2 are of the immediate answer single code type.

Other than the above, the circuits of satellite 2 are similar to those of satellite 1 and reference is hereby made to the description of the circuits of satellite 1 for a complete understanding thereof.

Monitor—General Considerations

It will be recalled that the monitor circuits for a given section may be located at any point having access to the section transmission circuits but that in the specific embodiment herein selected for illustrative description it has been assumed that the monitor is located at or near the main station of the succeeding section. It will also be recalled that the monitor provides a visual indication by means of display lamps of the conditions of the several two-state devices controlled from the section main station. Thus, the operator at the succeeding main station is provided with a visual display of the devices of the preceding section.

It will also be recalled that each monitor includes circuits which are used to effectively relay a system signal condition between sections but that no actual control of two-state devices is affected by any of the monitors themselves.

Now turning particularly to the circuits of FIGS. 31–38, it will be seen that they disclose circuits for the monitor. This monitor is the one which is connected to the same transmission circuits as the heretofore described main station and satellites. Accordingly, provision is included for visual display of the conditions of the devices of both satellites.

A moment's reflection will reveal that the monitor circuits must distinguish between the various codes transmitted from the main station together with the replies returned from the satellites in order that the conditions of the monitor indicating lamps may accurately reflect the conditions of the devices in question. Accordingly, in FIG. 31 there is disclosed a signaling circuit similar but slightly different from that shown in FIG. 26. The difference resides in the inclusion of an additional capacitor in the timing circuit for Long Pulse relay 3100 in order that the timing characteristic thereof may be altered so as to distinguish on the one hand between the long and short pulses included in the code pulse trains and on the other hand between the long and short pulses (here of different lengths than those of the code pulse train pulses) transmitted in reply from the satellites.

FIGS. 32, 35 and 37 disclose pulse counting and decoding circuits which are similar to those of satellite 1 except for certain variations which will be discussed during the detailed description of the circuits. FIGS. 36 and 38 include common control circuits which perform various functions in some respects similar to those of FIG. 19; FIGS. 33 and 34 disclose circuits for four two-state devices and for an incoming call to the main station from the first satellite. In addition, it will be noted that FIG. 36 includes certain non-common control relays which perform various special functions as hereinafter more fully described.

Now considering the circuits of FIG. 31 it will be seen that they include a Line relay 3101 similar to relay 2600, a Send relay 3102 similar to relay 2601, a Send Hold relay 3103 similar to relay 2602 together with Long Pulse relay 3100 similar to relay 2604, resistor 3104 similar to resistor 2605, and capacitor 3105 similar to capacitor 2603. When Get Ready For Reply relay 3200 is not operated, the time constant of the resistor 3104–capacitor 3105 combination is such as to impart a characteristic to relay 3100 similar to that of relay 2604. This is accomplished in order that relay 3100 may properly distinguish between the lengths of various pulses that make up the signaling pulse trains. However, since the length of a short reply pulse from a satellite is greater than that of a short code-train pulse, and since the length of a long reply pulse is greater than that of a long code-train pulse, the timing characteristic of relay 3100 is altered when it is desired to distinguish between long and short reply pulses by including capacitor 3201 in parallel with capacitor 3105 over a path which will be hereinafter traced.

For purposes of this description it has been assumed that the first two-state device in satellite 1 is in its inactive state and that therefore Green relay 3300 is energized and that Green Lamp 3301 is activated by current flowing from battery via the No. 3 back contacts of No Reply relay 3302, the No. 3 back contacts of Device Flash Control relay 3303, resistor 3304 and the No. 1 front contacts of relay 3300, to the filament of Green Lamp 3301 and ground.

When a close code is transmitted from the main station, it is effective to cause the common control, pulse counting and decoding circuits to operate in a manner similar to that of the satellite. Accordingly, ground is extended over the A0 and B0 leads in FIGS. 35 and 37. Via the A0 lead it is effective to actuate First Digit 0 relay 3305 and over the B0 lead it is extended via the No. 1 front contacts of relay 3305 and the No. 2 back contacts of Double Transmission 2 relay 3306 to the winding of Double Transmission 1 relay 3307 and battery. Relay 3307 operates and in the manner previously described with respect to relays 2000 and 2001, the circuits are prepared to extend ground from the B0 lead when the code is received for the second time. This ground is extended via the No. 2 front contacts of relay 3306 to the winding of Device Control relay 3308 and battery. Relay 3308 operates. At its No. 6 front contacts it extends a path from ground to the winding of relay 3200 and battery. At its No. 1 front contacts it extends a path from battery via resistor 3600 and conductor 3601 to the filament of White Lamp 3309 and ground. At its No. 2 front contacts it locks itself over a path which may be traced from ground at the contacts of Reply Failure 2 relay 3202, the No. 1 back contacts of Pulse Follower 1 relay 3203, the No. 4 front contacts of relay 3200 and the No. 2 front contacts of relay 3308 to the winding thereof and battery. At its No. 3 front contacts relay 3308 partially completes a path for the future shunting down of No Reply relay 3302 in the event the latter should operate. At its No. 4 front contacts relay 3308 partially completes a path over which relay 3302 may be later operated. At its No. 5 front contacts it partially completes a path over which relay 3202 may later be operated. At its No. 7 contacts, relay 3308 partially extends a path which may subsequently be completed to operate Red relay 3310; and, at its No. 8 front contacts it partially completes a somewhat similar path which may be subsequently completed to operate Green relay 3300.

Now turning to relay 3200, it will be seen that when it operates it partially completes a path over its No. 2 front contacts from ground at the No. 3 front contacts of Pulse Follower relay 3205 to the operating winding of relay 3203. Accordingly, when a reply pulse is received and relay 3205 operates, a path will be established for the operation of relay 3203.

At its No. 5 front contacts relay 3200 effectively connects capacitor 3201 in parallel with capacitor 3105 thereby altering the heretofore-mentioned timing characteristic of relay 3100. At its No. 6 front contacts relay 3200 extends a ground in order that when relay 3203 subsequently operates it will be locked over its own No. 2 front contacts.

At its No. 8 front contacts relay 3200 extends a path from the stationary element of contacts 3801 to the operating winding of relay 3204 and battery. Accordingly, when contacts 3801 close subsequently, relay 3204 operates.

It will be recalled from the description of the common control circuits of satellite 1 that during the sequence of operations following receipt of a code the First Pulse relay 3207 (2506 for satellite 1) will release. However, for an interval of time following the receipt of coded impulses, relay 3207 will be operated and therefore the locking path for Start relay 3800 will have been interrupted at the No. 7 back contacts of relay 3207. This locking path, when completed, may be traced via the No. 7 back contacts of relay 3207 and thence over conductors 3208 and 3206 and the No. 5 front continuity contacts of Start relay 3800 to the operating winding thereof and battery. When the locking path is interrupted, relay 3800 releases and the operating path therefor becomes dependent upon the closing of the upper set of contacts 3804 associated with the 18-second cam 3805. Thus, the circuit may be traced from ground at either the No. 7 back contacts of relay 3207 or the No. 7 front contacts of relay 3200 via conductor 3206 (conductors 3208 and 3206 if the path is traced over the No. 7 back contacts of relay 3207) and thence via the No. 4 back contacts of relay 3809, the aforementioned upper set of contacts 3804 and the No. 5 back continuity contacts of relay 3800 to the operating winding thereof and battery.

It will now be seen that although relays 3200 and 3207 are operated, relay 3800 will remain de-energized until 18 seconds have transpired subsequent to the release of relay 3207. It will also be recalled that relay 3207 will not have released until the end of the coded signal.

The circuits now await the receipt of a reply pulse at which time Long Pulse relay 3100 moves its armature in one direction if the pulse is long and positions its armature differently if the pulse is short. Relay 3205 also responds to the received pulse by operating for the duration thereof and it is effective in the manner heretofore described to initiate operation of certain of the associated relays including Slow Release relay 3209. In addition, it completes a path which may be traced from ground via the No. 1 front contacts of relay 3200 and the No. 5 front contacts of relay 3205 to the operating winding of Read Reply relay 3210 and battery. Relay 3210 operates. In addition, at its No. 3 front contacts relay 3205 extends ground via the No. 2 front contacts of relay 3200 to the winding of relay 3203 and battery. Relay 3203 operates and locks to ground over its own No. 2 front contacts and the No. 6 front contacts of relay 3200.

Now returning to relay 3210, it will be seen that when it operates ground is extended over its No. 2 front contacts to the winding of relay 3211 and battery. Accordingly, relay 3211 operates.

Since it has been assumed that a close code was transmitted, it may be expected that a long pulse will be received to indicate compliance on the part of the satellite apparatus. Accordingly, relay 3100 will move its armature to engage its right-hand contacts thereby extending ground via conductor 3106, the No. 3 back contacts of Parity Check 1 relay 3213 and the No. 1 back contacts of Parity Check 2 relay 3214 to the winding of First Pulse relay 3207 and battery. Relay 3207 operates and locks itself over its own No. 3 front contacts to ground at the No. 1 front contacts of relay 3209. An alternate locking path may be traced over the No. 3 front contacts of relay 3207 and thence via conductor 3215 to ground at the No. 1 front contacts of relay 3211.

At the end of the pulse, relay 3205 releases thereby completing a path from battery via resistor 3212, the No. 3 front contacts of relay 3211, the No. 1 back contacts of relay 3205 and the No. 1 front contacts of relay 3207 to the filament of Red Lamp 3216. In addition, a path is extended from ground over the No. 1 front contacts of relay 3200, the No. 5 back contacts of relay 3205, the No. 1 front contacts of relay 3210, the No. 6 front contacts of relay 3207 and the No. 7 front contacts of relay 3308 to the winding of Red relay 3310 and battery. Accordingly, relay 3310 operates, releasing at its No. 4 back contacts the locking circuit for Green relay 3300 and locking itself over its own No. 4 front contacts to ground at the No. 4 back contacts of Green relay 3300. Therefore, the heretofore-traced path for the activation of Green lamp 3301 is interrupted and instead a path is completed from battery via the No. 3 back contacts of relay 3302, the No. 3 back contacts of relay 3303, resistor 3304 and the No. 1 front contacts of relay 3310 to the filament of Red lamp 3311 and ground. During the brief interval that both the Red relay 3310 and the Green relay 3300 are operated, a path is extended from ground over the No. 3 front contacts of relay 3300 and the No. 3 front contacts of relay 3310 to the winding of Alarm relay 3602 and battery. In addition, a path is completed from ground over the No. 2 front contacts of relay 3300 and the No. 2 front contacts of relay 3310 to the winding of relay 3303 and battery. Relay 3303 operates and locks itself over its own No. 2 front contacts and the No. 1 back contacts of Retire Flashing Lamps relay 3603 to ground. When Alarm relay 3602 operated, it locked itself over its own No. 2 front contacts to ground via the right-hand normally closed contacts of Retire Audible Alarm key 3604. An obvious path is thus extended from ground over the No. 1 front contacts of relay 3602 to operate buzzer 3605. Relay 3303 extends ground over its No. 1 front contacts and the No. 1 back contacts of Flasher 2 relay 3606 to the operating winding of Flasher 1 relay 3607 and battery. Relay 3607 operates, thereby completing a path at its No. 3 front contacts to operate relay 3606. When relay 3606 operates it interrupts the heretofore traced path to the winding of relay 3607 thereby resulting in an alternate operation of relays 3606 and 3607 in the manner heretofore described with respect to relays 1105 and 1106 in the main station circuits. Flasher relay 3608 is arranged to follow relay 3607 over the obvious path and it extends battery over its front contacts via the No. 3 front contacts of relay 3303, resistor 3304 and the No. 1 front contacts of Red relay 3310 to Indicating lamp 3311 thereby imparting a flashing condition thereto.

The flashing condition continues together with the sounding of the buzzer until the Retire Audible Alarm key 3604 and Retire Flashing Lamps key 3609 are depressed to retire Alarm relay 3602 and Device Flash Control relay 3303 over the obvious paths.

Now returning to the operations that result when relay 3205 released, it will be noted that a brief interval thereafter relays 3209 and 3210 release. Relays 3207 and 3211 release, and locking ground is removed from relay 3308. When relay 3308 releases, it interrupts the heretofore traced path for the operation of relay 3200 and it extinguishes White Lamp 3309. The circuits are now reset to their normal idle states, the Satellite Reply Lamp 3216 having remained lit only for a brief interval of time due to the release of relay 3211. Of course, Red Indicating Lamp 3311 will continue to flash and buzzer 3605 will continue to operate until the heretofore mentioned keys 3604 and 3609 are depressed. At that time, the buzzer will be retired and Red Indicating Lamp 3311 will change from a flashing to a steady state.

Now if it may be assumed that a trip code is transmitted from the main station to effect deactivation of the first two-state device in satellite 1, the code is effective at the monitor to initiate operation of the pulse counting and decoding circuits which extend ground to the A0 and B1 leads (FIGS. 35 and 37). These grounds result in the activation of relay 3307 in order that when the code is repeated and relay 3306 is operated ground may be extended from the B1 lead to operate relay 3308. Operations similar to those previously described take place up until the point at which the circuits await the reply pulse from satellite 1. A difference in operations, however, now results since instead of receiving a relatively long pulse as was the case when the close code was received, a relatively short pulse will be received to indicate that the first two-state device at satellite 1 has properly responded to the trip code by assuming a deactivated state. Relay 3100 will not therefore change the position of its armature and ground will continue to be extended over the left-hand contacts thereof. However, it will be seen that since relay 3200 is operated, this ground is not effectively extended to perform any operation and therefore First Pulse relay 3207 will not operate. Therefore, a path will be extended from ground over the No. 1 front contacts of relay 3200, and at the end of the pulse via the No. 5 back contacts of relay 3205, the No. 1 front contacts of relay 3210, the No. 6 back contacts of relay 3207 and the No. 8 front contacts of relay 3308 to the winding of Green relay 3300 and battery. Relay 3300 operates thereby releasing Red relay 3310 and locking itself over its own No. 4 front contacts to ground at the No. 4 back contacts of relay 3310. For a brief interval, the contacts of relay 3310 remain in their operated states and therefore the previously-traced paths are established for the operation of Alarm relay 3602 and Device Flash Control relay 3303. Buzzer 3605 will therefore be activated, Red Lamp 3311 will be retired and a flashing condition will be imparted to Green Lamp 3301, all in the manner previously described in detail with respect to the closing operations.

Ordinarily, when an inquiry code is transmitted over the communication circuit it will find the related device to be resident in the state represented by the indicating lamp display. The reason for this is that when a device changes state without having received an order to do so it is effective to cause an uninvited pulse to be transmitted ot the main station and a roll call is initiated to discover the identity of the changed device and to correspondingly modify the lamp display. However, there may arise an unusual condition which results in the loss of a pulse and it is therefore possible that the condition as shown by the lamp display is different from that which actually exists. Therefore, provision is made at the monitor for the circuits thereat to respond to each inquiry code received in the manner now to be described.

When an inquiry code is received, it is effective to operate the device relay of the device in question (i.e., a relay corresponding to relay 3308). The circuits are activated in the manner heretofore described and then await receipt of either a long or a short pulse depending upon whether the condition of the device is active or inactive. If the red relay is operated (i.e., a relay corresponding to relay 3310) and the reply pulse is long, First Pulse relay 3207 is operated, relay 3100 moves its armature to its right-hand contacts, and ground is conducted over the previously-traced path to the winding of the red relay and battery. Since the red relay is already operated, no change is effected therein and the circuits reset themselves to their normal idle states. Similarly, if the green relay (i.e., a relay corresponding to relay 3300) is operated and a short pulse is received, relay 3100 retains its armature in engagement with its left-hand stationary contact, First Pulse relay 3207 remains de-energized, and heretofore-traced path from ground is extended to the winding of the green relay. Since the green relay is already energized, no change is effected therein and the circuits reset themselves to their normal idle states. If on the other hand the received pulse indicates that a change has occurred, operation will be similar to that heretofore described with respect to a close or a trip operation. Thus, for example, if Green relay 3300 is operated and an inquiry code relating to the first two-state device at the first satellite is received, relay 3308 will operate and if the reply pulse is long, thereby indicating that the device is actually energized, ground will be extended by Long Pulse relay 3100 and thence via conductor 3106 and the heretofore-traced path to operate First Pulse relay 3207. Accordingly, when relay 3205 releases at the end of the pulse, a path is completed to the operating winding of Red relay 3310 thereby operating it, releasing Green relay 3300, imparting a flashing condition to Red lamp 3311, extinguishing Green lamp 3301, and activating buzzer 3605.

As heretofore mentioned, provision is made for recognition of a no-reply condition by the monitor circuits. Thus, for example, if a close, trip or inquiry code is received and thereafter no reply arrives, the circuits will respond by extinguishing the then-lighted indicating lamp relating to the device, thus resulting in deactivated states of both the related lamps. This is accomplished in the following manner.

It will be recalled that when the first pulse of a code is received, Start relay 3800 is released by the removal of ground from conductor 3208 at the No. 7 back contacts of relay 3207. Accordingly, when the last pulse of the code is terminated and shortly thereafter relay 3207 releases, ground is reapplied to conductor 3208 whence it is extended via conductor 3206 and the No. 4 back contacts of relay 3800 to clutch 3806 of timer 3803 and battery. This ground is also extended via the normally closed contacts 3804 of cam 3805 and resistor 3807 to the motor 3808 of timer 3803 and battery. The timer is activated and initiates movement of its associated cams.

The remainder of the circuits will have assumed the conditions previously described when a code is received, and they now await receipt of a reply pulse. However, since it has been assumed that none arrives, the timer continues to operate and at the end of 9.4 seconds contacts 3801 close. Ground is therefore extended over these contacts and thence via the No. 8 front contacts of relay 3200 to the winding of Reply Failure 1 relay 3204 and battery. Relay 3204 operates. At its No. 2 front contacts it extends a path from ground via the No. 4 front contacts of relay 3308 to the winding of No Reply relay 3302, resistor 3312 and battery. At its No. 1 front contacts relay 3204 completes a path from ground via the No. 2 front contacts of relay 3302, the No. 5 front contacts of relay 3303 and the No. 1 front contacts of relay 3204 to the winding of Reply Failure 2 relay 3202 and battery. Relay 3202 operates and at its back contacts interrupts the locking circuit for relay 3308 which, before its interruption, could be traced from ground via the back contacts of relay 3202, the No. 1 back contacts of relay 3203, the No. 4 front contacts of relay 3200 and the No. 2 front contacts of relay 3308 to the winding thereof. Relay 3308 releases, thereby interrupting the operating circuit for relay 3200. Relay 3200 releases, interrupting the operating path for relay 3204 which also releases and interrupts the operating path for relay 3202. Except for relay 3302, the circuits reset themselves to their normal idle conditions and the indicating lamps remain unlit until such time as relay 3302 is released.

An inspection of the circuits associated with relay 3302 will reveal that it can only be released by being shunted down over the No. 3 front contacts of relay 3308 and the No. 2 front contacts of relay 3211. Therefore, relay 3302 will remain energized until a trip, close or inquiry code relating to the associated device is received and a reply returned.

Now considering the second two-state device, it will be seen that a representation of circuits therefor is shown within the dashed rectangle 3313. These circuits will be identical to those for the first two-state device. It will be noted, however, that since the second two-state device is arranged for single code transmission, the double transmission relays 3306 and 3307 are not required and that lead 3314 is connected directly from contacts of the First Digit 0 relay 3305 to the operating winding of the device relay (not shown but identical to relay 3308) in rectangle 3313. Since operation of these circuits (except for the double code features) is identical to that of the first device circuits, they will not be described in detail. It may be helpful, however, to understand that no unusual operations result from the delayed completion characteristics of the second two-state device. Thus, for example, if a close code is transmitted for the second two-state device at satellite 1, the reply indicates that the order has not been carried out. However, since the green relay is operated, and as heretofore described with respect to the circuits of the first device the short reply pulse results in the application of ground to the operating winding of the green relay, no change is effected. Subsequently, when the device completes its operation and an uninvited pulse is sent to the main station, a roll call results in the manner heretofore described and the monitor indicating lights change at the time a reply is received to the appropriate inquiry code. The detailed manner in which this is accomplished is explained above and reference thereto is hereby made for a complete understanding of circuit operations.

Representations of circuits for the first and second two-state devices of the second satellite are shown in dashed rectangles 3400 and 3401. Since these circuits are identical to those heretofore described, no additional explanation will be made. However, it should be noted that the leads 3315 and 3316 are extended over appropriately different paths in accordance with the codes employed.

It will be recalled that provision is made for certain single-state conditions as, for example, the previously mentioned passage of the fluid separating device along a pipeline. When it is desired to monitor such condition, circuits such as those represented by the dashed rectangle 3402 are included. Such circuits are identical to those shown for the first two-state device of the first satellite except that a link 3403 is employed to interconnect the adjacent cross connecting terminals. Accordingly, Device Lamp Reset key 3404 is effective to extend a path from ground to the winding of the green relay (not shown) corresponding to relay 3300 to reset it after the condition has been recognized by the attendant.

In operation, an uninvited pulse is sent to the main station whenever an outgoing call or scraper passage condition exists at satellite 1. This results in a roll call during which an inquiry code relating to the outgoing call or scraper passage condition is transmitted. The device relay of the circuits in rectangle 3402 (i.e., the relay corresponding to relay 3308) recognizes this inquiry code and responds thereto by operating and initiating additional operations similar to those heretofore described. Red lamp 3405 flashes and buzzer 3605 is actuated. Since, when the outgoing call or scraper passage condition terminates no roll call results, some means is required for resetting the related circuits at the monitor station and key 3404 is provided for this purpose.

*Incoming Call From Main Station to Monitor*

It will be recalled that apparatus is provided at the main station for signaling the monitor in order that the attendant thereat may realize that he should perform some function such as calling the main station over an outside facility. The corresponding circuits at the monitor are shown in FIGS. 36 and 38 and operate in the following manner.

When the appropriate code is received, ground is extended via conductor B5 over the No. 4 front contacts of First Digit 1 relay 3317 to the winding of Attention relay 3610 and battery. Relay 3610 operates and at its No. 2 front contacts locks to ground supplied over the contacts of Long Pulse relay 3809, the contacts of Short Pulse relay 3810, the No. 2 back contacts of Alarm 1 relay 3811 and the winding of Lock Check relay 3812 to the No. 2 front contacts of attention relay 3610. At this time relay 3812 operates.

Relay 3610 extends a path at its No. 3 front contacts to the winding of Attention Flash relay 3611 and battery. Relay 3611 operates, locking itself over its No. 1 front contacts to ground via the No. 2 back contacts of Retire Flashing Lamps relay 3603. In addition, it further extends the path traced from ground over the No. 3 front contacts of relay 3610 and thence via the No. 2 front contacts of relay 3611 to the winding of Attention Alarm relay 3612 and battery. Relay 3612 operates and locks over its No. 2 front contacts to ground at the right-hand normally closed contacts of Retire Audible Alarm key 3604. At its No. 1 front contacts it extends ground via the No. 1 back contacts of Flasher 2 relay 3606 to the winding of Flasher 1 relay 3607 and battery thereby initiating operation of the flasher relays in a manner similar to that heretofore described. Accordingly, battery is alternately applied and removed from Indicating lamp 3613 over a path which, when completed, may be traced from battery via resistor 3614, the No. 1 back contacts of relay 3607 and the No. 3 front contacts of relay 3611 to the filament of lamp 3613 and ground. Alarm Bell 3615 is actuated periodically over a path which may be traced from ground via the No. 3 back contacts of relay 3607, the No. 2 front contacts of relay 3606, and the No. 3 front contacts of relay 3612 to bell 3615 and battery.

As heretofore mentioned, a reply is returned to the main station to acknowledge receipt of the code by the monitor. This is accomplished in a manner partly similar to that in which the circuits of the satellites return their reply pulses and the similarities and differences will become apparent as the following discussion proceeds.

Now returning to the operations that took place while the code was being received, it will be recognized that in response to the receipt of the first pulse, relay 3207 will have operated. Relay 3800 will have been released in a manner similar to that heretofore described and at its No. 7 back contacts will have extended ground via the Nos. 2 and 3 front contacts of Memory Setting relay 3616 to the windings of Long Pulse relay 3809 and Short Pulse relay 3810. When Lock Check relay 3812 operated, it will have interrupted the circuits which will have extended from ground over parallel paths through the No. 3 back contacts of relay 3800 and the No. 1 back contacts of Alarm 1 relay 3811 and thence via the No. 3 back contacts of relay 3812 to the winding of relay 3616 and battery. The contacts of relay 3616 begin to release and after a brief pause complete the travel to their released positions. A path is then extended from ground via the No. 1 front contacts of relay 3812 and the No. 5 back continuity contacts of relay 3616 to the winding of Send relay 3102 and battery. Relay 3102 operates to interrupt line continuity.

In addition to establishing the previously traced path for operating relay 3102, Memory Setting relay 3616 interrupts at its Nos. 2 and 3 front contacts the operating paths for relays 3809 and 3810. Accordingly, relay 3809 begins to release, but relay 3810 remains operated in a circuit which may be traced from ground at the No. 1 front contacts of relay 3610 via the No. 3 back continuity contacts of relay 3616 to the winding of relay 3810 and battery. Therefore, the operating circuit of relay 3812 and the locking circuit of relay 3610 remain complete until the contacts of Long Pulse relay 3809 disengage. Since these contacts have a relatively slow release characteristic, relays 3812 and 3610 remain operated for a relatively long interval thereby imparting a long characteristic to the reply pulse return to the main station. This is accomplished by the retention of ground at the operating winding of relay 3102 via the heretofore-traced path over the No. 1 front contacts of relay 3812 for the duration of its operation. When relay 3809 releases, it interrupts the path to the operating winding of relay 3812 and to the locking winding of relay 3610 thereby causing both relays to release. Relay 3610 in releasing releases relay 3810. Relay 3812 in releasing disconnects ground at its No. 1 contacts from the previously traced path via the No. 5 back continuity contacts of relay 3616 to the operating winding of relay 3102 thus de-energizing relay 3102 and restoring line continuity. Relay 3616 reoperates over a path to ground at the No. 1 back contacts of relay 3811 via the No. 3 back contacts of relay 3812.

The circuits now await the completion of the 18-second interval at which time Start relay 3800 is reoperated by ground conducted to the winding thereof via the No. 7 back contacts of relay 3207, conductors 3208 and 3206, the No. 4 back contacts of Start relay 3800, the normally open contacts 3804 of cam 3805 and the No. 5 back continuity contacts of relay 3800 to the winding thereof and battery. Start relay 3800 operates in this circuit and locks itself over its own No. 5 front continuity contacts to the previously-traced ground appearing on lead 3206.

The circuits are now reset to their normal idle conditions except for the flasher and bell circuits which may be reset in the conventional manner.

Outgoing Call to Main Station

Occasions may arise when a main station attendant desires to signal the main station of the preceding section. Accordingly, provision is made for operation of a key at the monitor which results in the emission of an uninvited pulse to the main station where it is effective to initiate a roll call. Inquiry codes are transmitted in the conventional manner to determine the origin of the pulse and when the appropriate inquiry code is sent, apparatus at the monitor responds by returning a relatively long pulse thereby indicating that the condition originated in the monitor and that it relates to an outgoing call thereat. This is accomplished in the following manner.

To initiate the sequence of operations, the Call Main Station key 3813 is depressed thereby extending a path from ground over the contacts thereof to the winding of Call Main Station relay 3814, resistor 3815 and battery. Relay 3814 operates and locks itself to ground over its own No. 3 front contacts. At its No. 1 front contacts it extends a path via the No. 2 back contacts of relay 3617 and the No. 1 back contacts of relay 3816 to the operating winding of relay 3817 and battery. At its No. 4 front contacts relay 3814 extends a path from ground via the No. 2 front contacts of relay 3817 and the No. 6 front contacts of relay 3800 to the winding of Long Pulse relay 3809 and battery. This path may be further traced from the No. 6 front contacts of relay 3800 via the Nos. 2 and 3 front contacts of relay 3616 to the winding of Short Pulse relay 3810 and battery. Relays 3809, 3810 and 3817 all operate. Relay 3811 then operates over a path from ground via the No. 3 front contacts of relay 3800 and the No. 1 front contacts of relay 3817 to the winding of relay 3811 and battery. Accordingly, ground which heretofore extended to the winding of relay 3616 from ground at the No. 1 back contacts of relay 3811 is removed and relay 3616 releases. However, in the meantime, ground is extended to operate Send relay 3102 via the contacts of relays 3809 and 3810, the No. 2 front contacts of relay 3811, the No. 1 back contacts of relay 3812 and the No. 5 back continuity contacts of relay 3616 to the winding of relay 3102. Accordingly, when relay 3810 releases (in response to the release of relay 3616) the period during which relay 3102 is operated is determined by the slow release characteristic of relay 3810; and since it has a shorter characteristic than that of Long Pulse relay 3809, the pulse transmitted to the main station is of relatively brief duration.

Relay 3809 is retained in its operated state by ground which is conducted thereto via the No. 4 front contacts of relay 3814, the No. 2 front contacts of relay 3817 and the No. 6 front contacts of relay 3800. Accordingly, relay 3809 together with relays 3811, 3814 and 3817 remain in an operated condition to await receipt of an inquiry code during the ensuing roll call.

When during the roll call the inquiry code relating to a calling condition at the monitor is transmitted over the signaling circuit, First Pulse relay 3207 operates thereby removing ground from the winding of Start relay 3800 over the heretofore described path. Accordingly, relay 3811 is released by the removal of ground from its operating path at the No. 3 front contacts of relay 3800, and at its No. 2 back contacts prepares a circuit to which relay 3617 locks when it subsequently operates.

Not only is the inquiry code effective to initiate the release of Start relay 3800 but it is additionally effective to extend ground via the No. 5 front contacts of relay 3317 to the winding of relay 3617 and battery. Relay 3617 operates and at its No. 3 front contacts locks to ground via the winding of relay 3812, the No. 2 back contacts of relay 3811 and serially connected contacts of relays 3810 and 3809. Relay 3812 also operates in this locking circuit thereby completing a path from ground via its No. 2 front contacts and the No. 4 front contacts of relay 3617 to the winding of relay 3816 and battery. At the same time the heretofore-traced path for the operation of relay 3616 is interrupted at the No. 3 back contacts of relay 3812 and relay 3616 releases. Accordingly, the previously-described operating paths for the long and short pulse relays 3809 and 3810 are interrupted and relay 3809 begins to release. However, Short Pulse relay 3810 is retained in its operated state by ground which is extended thereto via the No. 1 front contacts of relay 3617 and the No. 3 back continuity contacts of relay 3616. The path for the operation of Send relay 3102 is therefore maintained for a relatively extended interval and a long pulse is returned to the main station.

The circuits are now returned to their normal idle states. Except for relays 3814 and 3816, the various relays are reset in a manner similar to that previously described in the section pertaining to an incoming call from the main station. When relay 3812 releases, a path is extended from ground over its No. 2 back contacts and the No. 3 front contacts of Release relay 3816 to the junction of resistor 3815 and the coil of relay 3814. Relay 3814 is thus shunted down and releases. In releasing, it interrupts at its No. 5 front contacts the locking circuit for relay 3816 thereby causing the latter to release. The circuits are now returned to their normal idle conditions to await subsequent operations.

System Signal Inquiry

As heretofore explained in the section relating to the main station, a system signal condition may arise in a succeeding section. In this event, the main station of the succeeding section is effective to ground two leads corresponding to leads 1405 and 1406. These two leads which are grounded are shown in FIG. 36 and are identified as 3618 and 3619. The monitor circuits respond in the manner hereinafter described in detail by emitting a short uninvited pulse which is effective at the main station to initiate a standard rapid roll call. Since a system signal condition actually exists, replies received to the first two inquiry codes both constitute long pulses and the main station responds in the manner previously described by emitting a crash code to its own satellites and by grounding conductors 1405 and 1406.

Now turning to the specific operations that result from the grounding of conductors 3618 and 3619, it will be seen that the ground on conductor 3619 is extended via the No. 5 back contacts of Crash Inquiry relay 3620 and the No. 2 back continuity contacts of Memory relay 3621 to the winding of Alarm relay 3817 and battery. Relay 3817 operates and extends a path from ground on conductor 3618 via its No. 4 front contacts and the No. 8 front contacts of Start relay 3800 to the winding of Short pulse relay 3810 and battery. In addition, a path is extended from the No. 8 front contacts of relay 3800 via the Nos. 3 and 2 front contacts of relay 3616 to the winding of Long Pulse relay 3809 and battery.

Relay 3811 operates in the circuit which may be traced from ground via the No. 3 front contacts of relay 3800 and the No. 1 front contacts of relay 3817 to the winding of relay 3811 and battery. In operating, relay 3811 removes ground from the winding of relay 3616 thereby causing it to release. When relay 3616 releases, a path is completed for the operation of Send relay 3102 from ground via serially interconnected contacts of relays 3809 and 3810, the No. 2 front contacts of relay 3811, the No. 1 back contacts of relay 3812 and the No. 5 back continuity contacts of relay 3616 to the winding of Send relay 3102 and battery. Line continuity is thus interrupted. However, since the operating path for Long Pulse relay 3809 is broken at the No. 3 contacts of relay 3616, Long Pulse relay 3809 releases to open the operating circuit for Send relay 3102. Accordingly, in the manner previously explained, a relatively long pulse is transmitted over the line to the main station. Relays 3810, 3811 and 3817 now remain energized to await further circuit operations which take place when the system signal inquiry codes are received from the main station.

When the first of such codes is received from the main station, it is effective in the manner previously described to initiate the release of Start relay 3800. Relay 3811 therefore releases and reoperates Memory Setting relay 3616. Relay 3800 not only de-energizes relay 3811 but in addition extends a path over its No. 7 back contacts to the Nos. 2 and 3 front contacts of relay 3616 whence it is further extended to the windings of relay 3809 and 3810. When the counting and decoding circuits of FIGS. 35 and 36 have fully responded, they are effective to apply ground via the No. 7 front contacts of relay 3317 to the winding of Crash Inquiry relay 3620 thereby operating it. Relay 3620 locks over its own No. 2 front contacts and the heretofore-traced path to ground at the contacts of relay 3809. At the same time, Lock Check relay 3812 operates thereby interrupting at its No. 3 back contacts the operating path for relay 3616. However, during the brief interval that elapses before the contacts of relay 3616 complete their travel, a path is completed from conductor 3619 via the No. 5 front contacts of relay 3620, the No. 4 front contacts of relay 3616, the No. 2 front contacts of relay 3620 and the No. 1 back continuity contacts of Memory relay 3621 to the winding thereof, resistor 3622 and battery. Relay 3621 operates and locks to ground over its own No. 1 front continuity contacts.

When the contacts of relay 3616 complete their travel, a path is completed for the operation of Send relay 3102. This path may be traced from ground at the No. 1 front contacts of relay 3812 via the No. 5 back continuity contacts of relay 3616 to the winding of relay 3102 and battery. Relay 3102 operates and interrupts line continuity. In the meantime, the previously traced operating circuits for relays 3809 and 3810 will have been broken at the Nos. 2 and 3 front contacts of relay 3616, but an alternate operating path will have been established for relay 3610 from ground on conductor 3619 via the No. 5 front contacts of relay 3620 and the No. 3 back continuity contacts of relay 3616. Accordingly, after a brief time interval corresponding to the slow release characteristic of Long Pulse relay 3809, the operating and locking circuits for relays 3812 and 3620 are broken, these relays release, Send relay 3102 is released, and line continuity is restored. Thus, the pulse which is returned to the main station is of the long variety.

The main station circuits respond to the long pulse by again transmitting the same inquiry code which is effective to reapply ground via the No. 7 front contacts of relay 3317 to the operating winding of relay 3620. Relay 3620 reoperates and locks over its No. 2 front contacts and the previously traced circuit, thereby energizing Lock Check relay 3812 which in turn removes ground from the winding of relay 3616 to cause its release. In the meantime, long and short pulse relays 3809 and 3810 will have been operated over paths which may be traced from ground at the No. 7 back contacts of relay 3800 via the Nos. 2 and 3 front contacts of relay 3616 to the windings of relays 3809 and 3810.

When the contacts of relay 3616 complete their release, a path will be completed for the actuation of Send relay 3102 from ground via the No. 1 front contacts of Lock Check relay 3812 and the No. 5 back continuity contacts of relay 3616 to the winding of relay 3102 and battery. At the same time, the previously-traced operating circuits for relays 3809 and 3810 will have been broken at the Nos. 2 and 3 front contacts of relay 3616. However, Short Pulse relay 3810 again remains operated by ground which is conducted thereto over the above-traced alternate path. Accordingly, after a brief time interval corresponding to the slow release characteristic of relay 3809, the operating and locking circuits for relays 3812 and 3620 are broken, these relays release, Send relay 3102 is released, and line continuity is restored. Thus, another relatively long pulse will have been transmitted over the line to the main station.

The main station circuits now respond by transmitting a code which has heretofore been denominated a system signal order.

System Signal Order

As mentioned in connection with the description of the main station circuits, a system signal order may be initiated by any one of several occurrences. These include the origination of a system signal condition at any one of the satellite stations within the section at hand, the occurrence of a system signal condition in a preceding section, and the occurrence of a system signal condition in a succeeding section, all in the manner hereinbefore described. Irrespective of where the system signal condition originates, the monitor will respond in an identical manner to the system signal order code. In the event the condition originated in either the preceding section or the section at hand, the main station of the succeeding section will respond to operations by the monitor to transmit a corresponding system signal order code over its section. However, if the condition originated in a succeeding section, the main station of the succeeding section will not respond to operations in the monitor by transmitting a system signal order code since it will have already done so. The manner in which these differences of operation are carried out is explained in detail in the section relating to the description of the main station circuits.

Now turning specifically to the circuits of the monitor, it will be apparent that when a system signal order code is received thereat, the first pulse is effective to cause the operation of First Pulse relay 3207 and the consequent release of Start relay 3800. Accordingly, short and long pulse relays 3809 and 3810 are operated. When the last pulse of the code has been received, the counting and decoding circuits of FIGS. 35 and 37 are effective to introduce ground via the No. 6 front contacts of relay 3317 to the winding of relay 3623 which operates, locking itself over its No. 3 front contacts to ground on front contacts of relay 3809 via the path previously traced. Relay 3812 operates, removing ground from the operating winding of relay 3616 and applying ground over the No. 5 back contacts of relay 3616 to the operating winding of Send relay 3102. Since no alternate operating paths are provided for long and short pulse relays 3809 and 3810, the release of relay 3616 causes both relays 3809 and 3810 to become deenergized. As mentioned before, the contacts of relay 3810 open first thereby interrupting the operating path for relay 3812 after a relatively short interval. Relay 3812 in turn interrupts the operating path for Send relay 3102 and line continuity is restored. Thus, a relatively short pulse is transmitted over the signalling circuits to the main station.

In the meantime, ground will have been applied for a brief interval (that is for the duration of the operation of relay 3623 which releases when relay 3810 releases) over the No. 2 front contacts of relay 3623 to conductor 3624. This conductor corresponds to conductor 1407, and the ground applied thereto is effective to cause the removal of ground from conductors 3618 and 3619 and the application of ground to conductor 3625. Conductor 3625 corresponds to conductor 1416 in the main station circuits, and application of ground thereto is effective during the brief interval before relay 3616 releases to shunt down and release Memory relay 3621. The path over which this is accomplished may be traced from conductor 3625 via the No. 5 front contacts of relay 3623, the No. 1 front contacts of relay 3616 and the No. 1 front contacts of relay 3623 to the junction of resistor 3622 and the winding of relay 3621.

The circuits will reset themselves to their normal idle conditions. The long and short pulse relays 3809 and 3810 will have been released, thereby releasing relays 3812 and 3623 in the manner described. The Memory Setting relay 3616 will have been thereupon reoperated, and at the end of the heretofore mentioned 18-second interval Start relay 3800 will have been reoperated.

Initiation of Roll Call From Monitor

Occasions may arise when a main station attendant desires to check the conditions of the various devices located in the preceding section. Accordingly, provision is made at the monitor for the initiation of a roll call of the devices within the section to which the monitor appertains. The apparatus by which this is accomplished includes Roll Call Start Key 3818 which, when depressed, extends a path from ground to the winding of Roll Call relay 3819 and battery. Relay 3819 operates and extends a ground over its front contacts to the winding of Roll Call 1 relay 3820. Relay 3820 operates. When key 3818 is released, relay 3819 also releases and ground is transferred from the winding of relay 3820. However, relay 3820 is of the slow release type and for a brief interval ground is extended via the back contacts of relay 3819, the No. 2 front contacts of relay 3820 and the No. 2 front contacts of relay 3800 to the winding of Send relay 3102 and battery. At the end of the interval, the contacts of relay 3820 complete their travel thereby interrupting the continuity of the operating circuit of relay 3102 and relay 3102 releases. The characteristics of relay 3820 are such as to result in the maintenance of the operating circuit for relay 3102 during an interval such that a relatively long pulse is transmitted and it will be recalled that the receipt of a long pulse at the main station results in a complete roll call thereat rather than one of the rapid variety.

Relays 3819 and 3820 will now have reset themselves and the circuits will respond to the receipt of the various inquiry codes and replies in the manner heretofore described.

In the event that the circuits are operating at the time key 3818 is depressed, Start relay 3800 will be de-energized (since First Pulse relay 3207 will have been operated) and in that event relay 3820 will lock to ground at the No. 1 back contacts of relay 3800 over its own No. 1 front contacts. Subsequently, when the circuit operations have been completed and the 18-second interval has transpired after which relay 3800 is reoperated, the heretofore-traced path to the winding of Send relay 3102 will be completed for an interval determined by the slow release characteristic of relay 3820 in the manner described.

Mutilated Code Check

It will be recalled from the description of the satellite circuits that provision is made to check each group of pulses received in order to determine that the correct number are present and that two pulses in each group are of the relatively long type. It will also be recalled that provision is therein made to check for the possible presence of an extra pulse and that the circuits will respond effectively only when all of the various tests have been satisfied. Somewhat similar provision is included in the circuits of the monitor, relays 3213, 3214 and 3217 severally corresponding to relays 2504, 2505 and 2515. However, since the individual devices are controlled from the satellites but not from the monitor, the operation of the parity check and extra pulse relays is employed to produce different results in the monitor than in the satellites. In the satellites no ground was effectively extend to the B0–B9 leads unless the various checks were satisfied, and therefore if a mutilated code was received the circuits simply did not respond to change the condition of the device. However since as mentioned before, the devices are not controlled through the monitor, it is desired to call the attention of the attendant to the fact that a mutilated code has been received. Therefore additional relays 3626 and 3627 are included. These relays recognize a mutilated code condition and are effective to sound a buzzer and light a lamp to alert the station attendant.

When the first pulse of a code is received, relay 3500 operates and a path is extended from ground via the left-hand contacts of Retire Audible Alarm Key 3604 and the No. 5 front contacts of relay 3500 to the winding of relay 3627 and battery. Relay 3627 operates and since relay 3214 will have already been operated, relay 3627 locks over its No. 2 front contacts and the No. 4 front contacts of relay 3214 to ground at the left-hand contacts of key 3604. When the 10 digit-representing pulses have been received, a parity check is made in the manner heretofore explained in regard to the satellite circuits. If this check is satisfied, relay 3213 operates before slow release relay 3209 releases and therefore an operating circuit is not completed for relay 3626. However, if the parity check is not satisfied, relay 3213 does not operate; and when relay 3209 releases, a path is completed from ground via the left-hand contacts of key 3604, the No. 2 back contacts of relay 3209, the No. 2 back contacts of relay 3213 and the No. 1 front contacts of relay 3627 to the operating winding of relay 3626 and battery. Relay 3626 operates and locks via contacts of the multilated code release key 3628 to ground over the left-hand contacts of key 3604. At its No. 1 front contacts relay 3626 extends an operating path from ground to Buzzer 3605 and at its No. 3 front contacts its extends a path from battery via resistor 3600 to the filament of Mutilated Code Lamp 3629.

When Off-Normal relay 3218 releases after the last pulse has been received, relay 3214 releases thereby interrupting the locking circuit for relay 3627. Relay 3626, however, remains operated until it is reset either by the depression of key 3628 or key 3604.

If the parity check proves satisfactory but more than the proper number of pulses is received, Extra Pulse relay 3217 operates and at its No. 4 front contacts extends ground from the aforementioned left-hand contacts of key 3604 to the operating winding of relay 3626 and battery. Relay 3626 operates, locking itself over the previously described path, actuating buzzer 3605 and lighting lamp 3629. Relay 3626, together with buzzer 3605 and lamp 3629, may be retired by the depression of either key 3628 or 3604.

While we have illustrated our invention by a particular embodiment thereof, the invention is not limited in its application to the specific apparatus and particular arrangement therein disclosed. Various applications, modifications and arrangements of the invention will readily occur to those skilled in the art.

The terms and expressions which we have employed in reference to the invention are used as terms of description and not of limitation, and we have no intention in the use of such terms and expressions of excluding equivalents of the features shown and described or parts thereof, but on the contrary, intend to include therein any and all equivalents, modifications and adaptations which may be employed without departing from the spirit of the invention.

What is claimed is:

1. A control system comprising a main station and a plurality of satellite stations, a signaling transmission circuit interconnecting said main and satellite stations, a plurality of devices located at each of said satellite stations, each of said devices being adjustable to one of two different states at a given time, means at said main station to apply different coded signals to said circuit for selectively adjusting each of said devices at each of said satellite stations to a desired one of said two different states, means at each of said satellite stations responsive to said coded signals received from said circuit for adjusting each of said last-mentioned devices to said desired one of said two different states, means at each of said satellite stations effective when one of said devices is adjusted to a state unlike said last-mentioned desired one state by a condition other than by said coded signals of said signal means at said main station for transmitting on said circuit a common code signal to said main station, means responsive to the receipt of said common code signal from said circuit at said main station for automatically generating and sequentially transmitting on said circuit to said satellite stations a series of coded signals, each relating to a different one of said satellite stations and effectively inquiring about the location of said one device, means at each of said satellite stations responsive to the receipt from said circuit of the respective last-mentioned coded signals in such manner that only the coded signals relating to the satellite station at which said one device is located activates said last-mentioned means at said last-mentioned satellite station for generating and transmitting on said circuit to said main station a further common code signal identifying said last-mentioned station as the location of said one device, and means at said main station automatically responsive to said further common code signal for automatically generating and transmitting on said circuit coded signals relating to the plurality of devices located at said satellite station including said one device for identifying said unlike state of said last-mentioned one device.

2. A control system comprising a main station, a first satellite station and a second satellite station, a signaling transmission circuit interconnecting said main and satellite stations, a plurality of devices located at each of said satellite stations, each of said devices being adjustable to one of two different states at a given time, means at said main station to apply different coded signals to said circuit for selectively adjusting each of said devices at each of said satellite stations to a desired one of said two different states, means at said satellite stations responsive to said coded signals received from said circuit for adjusting each of said last-mentioned devices to said desired one of said two different states, means at said first satellite station effective when one of said devices thereat is adjusted to a state unlike said last-mentioned desired one state by a condition other than by said coded signals of said signal means at said main station for transmitting on said circuit a common code signal to said main station, means responsive to the receipt of said common code signal from said circuit at said main station for automatically generating and transmitting on said circuit a coded signal relating only to said first satellite station and effectively inquiring whether said one device is located thereat, means at said first satellite station responsive to the receipt of said last-mentioned coded signal thereat when said one device is located at said first satellite station for generating and transmitting on said circuit to said main station a further common code signal indicating said one device is located at said first satellite station, and means at said main station automatically responsive to said further common code signal for automatically generating and transmitting on said circuit a plurality of coded signals relating only to the plurality of devices located at said first satellite station for identifying said unlike state of said one device thereat.

3. A control system comprising a main station, a first satellite station and a second satellite station, a signaling transmission circuit interconnecting said main and satellite stations, a plurality of devices located at each of said satellite stations, each of said devices being adjustable to one of two different states at a given time, means at said main station to apply different coded signals to said circuit for selectively adjusting each of said devices to either a desired one of said two different states, means at said satellite stations responsive to said coded signals received from said circuit for adjusting said devices to said desired one of said two different states, means at said satellite stations effective when one of said devices is adjusted to a state unlike said last-mentioned desired one state by a condition other than by said coded signals of said means at said main station for transmitting a common code signal to said main station, means automatically responsive to the receipt of said common code signal from said circuit at said main station for automatically generating and transmitting on said circuit to said satellite stations inquiry coded signals for ascertaining the instant states of said devices thereat including said unlike state of said one device.

4. A control system comprising a main station, a first satellite station and a second satellite station, a signaling transmission circuit interconnecting said main and satellite stations, a plurality of devices located at each of said satellite stations, each of said devices being adjustable to one of two different states at a given time, means at said main station to apply different coded signals to said circuit for selectively adjusting each of said devices to a desired one of said two states, means at each of said satellite stations responsive to said coded signals received from said circuit for adjusting each of said devices to said desired one of said two different states, means at each of said satellite stations effective when one of said devices is adjusted to a state unlike said last-mentioned desired one state by a condition other than by said coded signals of said signal means at said main station for transmitting a common code signal on said circuit to said main station, means responsive to the receipt of said common code signal from said circuit at said main station for automatically generating and transmitting on said circuit to said satellite stations a coded signal relating only to said first satellite station and inquiring whether said one device is located thereat, means at said first satellite station responsive to the receipt of said coded signal from said circuit when said one of said devices is not located at said first satellite station for generating and transmitting on said circuit to said main station another common code signal indicating said one device is not located at said first satellite station, means at said main station responsive to the receipt of said last-mentioned common code signal for automatically generating and transmitting on said circuit to said satellite stations a coded signal relating only to said second satellite station and inquiring whether said one device is located thereat, and means at said main station automatically responsive to a further common code signal received on said circuit from said second satellite station and indicating said one device is located thereat for automatically generating and transmitting on said circuit to said second satellite station a plurality of coded signals relating only to the plurality of devices located at said second satellite station to identify said unlike state of said one device thereat.

5. A control system comprising a main station, a first satellite station, and a second satellite station, a signaling transmission circuit interconnecting said main and satellite stations, a plurality of devices located at each of said satellite stations, each of said devices being adjustable to one of two different states at a given time, means at said main station to apply different coded signals to said circuit for selectively adjusting each of said devices to a desired one of said two states, means at each of said satellite stations responsive to said coded signals received from said circuit for adjusting each of said devices to said desired one of said two different states, means at each of said satellite stations effective when one of said devices is adjusted to a state unlike said last-mentioned desired one state by a condition other than by said coded signals of said signal means at said main station for transmitting a common code signal on said circuit to said main station, means at main station responsive to the receipt of said common code signal for automatically generating and selectively transmitting on said circuit to said satellite stations a coded signal relating only to said first satellite station and inquiring whether said one device is located thereat, means at said first satellite station responsive to the receipt of said last-mentioned coded signal from said circuit when said one of said devices is not located at said first satellite station for generating and transmitting on said circuit to said main station another common code signal indicating said one device is not located at said first satellite station, means at said main station responsive to the receipt of said last-mentioned common code signal for automatically generating and transmitting to said satellite stations a coded signal relating only to said second satellite station and inquiring whether said one device is located thereat, means at said second satellite station responsive to the receipt of said last-mentioned coded signal from said circuit when said one of said devices is located at said second satellite station for generating and transmitting on said circuit to said main station a further common code signal indicating said one device is located at said second satellite station, and means at said main station automatically responsive to said further common code signal for automatically generating and transmitting to said second satellite station inquiry coded signals for ascertaining the instant states of said devices thereat including the unlike state of said one device.

6. A control system comprising a main station, a first satellite station and a second satellite station, a signalling transmission circuit interconnecting said main and satellite stations, a plurality of devices located at each of said satellite stations, each of said devices being adjustable to one of two different states at a given time, means at said main station to apply different coded signals to said circuit for selectively adjusting each of said devices to a desired one of said two states, means at said satellite stations responsive to said coded signals received from said circuit for adjusting each of said devices to said desired one of said two different states, means at each of said satellite stations effective when one of said devices is adjusted to a state unlike said last-mentioned desired one state by a condition other than by said coded signals of said signal means at said main station for transmitting a common code signal on said signal to said main station, means at said main station responsive to the receipt of said common code signal for automatically generating and transmitting on said circuit to said satellite stations a coded signal relating only to said first satellite station and inquiring whether said one device is located thereat, means at said first satellite station responsive to the receipt of said last-mentioned coded signal when said one of said devices is not located at said first satellite station for generating and transmitting on said circuit to said main station another common code signal indicating said one device is not located at said first satellite station, means at said main station responsive to the receipt of said last-mentioned common code signal from said circuit for automatically generating and transmitting on said circuit to said satellite stations a coded signal relating only to said second satellite station and inquiring whether said one device is located thereat, means at said second satellite station responsive to the receipt of said last-mentioned coded signal from said circuit when said one device is located at said second satellite station for generating and transmitting on said circuit to said main station a further common code signal indicating said one device is located thereat, and means at said main station responsive to the receipt of said last-mentioned common code signal from said circuit for automatically generating and transmitting on said circuit to said second satellite station a plurality of coded signals each relating to a different one of the devices located at said second satellite station for obtaining additional common code signals indicating the instant states of the respective last-mentioned devices including the unlike state of said one device.

7. A control system comprising a main station, a first satellite station and a second satellite station, a signaling transmission circuit interconnecting said main and satellite stations, a plurality of devices located at each of said satellite stations, each of said devices being adjustable to one of two different states at a given time, means at said main station to apply different coded signals to said circuit for selectively adjusting each of said devices to a desired one of said two states, means at said satellite stations responsive to said coded signals received from said circuit for adjusting each of said devices to said desired one of said two different states, means at each of said satellite stations effective when one of said devices is adjusted to a state unlike said last-mentioned desired one state by a condition other than by said coded signals of said signal means at said main station for transmitting a common code signal on said circuit to said main station, means at said main station responsive to the receipt of said common code signal for automatically generating and transmitting on said circuit to said satellite stations a coded signal relating only to said first satellite station and inquiring whether said one device is located thereat, means at said first satellite station responsive to the receipt of said last-mentioned coded signal from said circuit when said one device is located at said first satellite station for generating and transmitting to said main station a further common code signal, and means at said main station responsive to the receipt of said further common code signal for automatically generating and transmitting on said circuit to said satellite stations a plurality of coded signals, each relating to a different one of the devices located at said first satellite station for obtaining other common code signals indicating the instant states of the respective last-mentioned devices including the unlike state of said one device.

8. Apparatus comprising a plurality of controllable two-position keys located at a first geographical point, a first plurality of devices located at a second point geographically spaced from said first point, a second plurality of devices located at a third point geographically spaced from said first and second points, each of said devices adjustable into one of a plurality of predetermined states at a given time, a signaling transmission circuit interconnecting said keys and said first and second pluralities of devices, control means at said first point operatively connected with certain positions of said keys to transmit coded signals on said circuit to said first and second pluralities of devices for selectively adjusting said last-mentioned devices into desired states of said plurality of predetermined states, roll-call means at said first point connected to said control means and keys and operable to transmit coded signals on said circuit for selectively sensing the instant states of said respective devices in each of said first and second pluralities of devices, means connected to each of said first and second pluralities of devices for transmitting a predetermined code signal on said circuit when one device of only one of said first and second pluralities of devices effects an unauthorized change from said desired state to another state of said plurality of predetermined states, and means at said main station automatically responsive to said predetermined code signal received on said circuit thereat for automatically activating said roll-call means to automatically transmit coded signals on said circuit for sensing the instant states of said devices in said one of said first and second plurality of devices including the other state of said last-mentioned one device.

9. The apparatus according to claim 8 in which said means connected to each of said first and second pluralities of devices transmits two of said predetermined code signals on said circuit when one device of each of said first and second pluralities of devices effects an unauthorized change from said desired state to said other state, and said activating means at said main station is automatically responsive to said two predetermined code signals received on said circuit thereat for automatically activating said roll-call means to automatically transmit two pluralities of coded signals for sensing the instant states of said devices in said first and second pluralities of devices including the other states of said one device at each of said last-mentioned pluralities of devices.

10. Apparatus comprising a plurality of controllable two-position keys located at a first geographical point, a first plurality of devices located at a second point geographically spaced from said first point, a second plurality of devices located at a third point geographically spaced from said first and second points, each of said devices adjustable into one of a plurality of predetermined states at a given time, a signaling transmission circuit interconnecting said keys and said first and second pluralities of devices, control means at said first point operatively connected with certain positions of said keys to transmit coded signals on said circuit to said first and second pluralities of devices for selectively adjusting said last-mentioned devices into desired states of said plurality of predetermined states, and roll-call means at said first point connected to said keys and control means and automatically activated by a predetermined code signal transmitted on said circuit, when one of said devices effects an unauthorized change from the desired state to another state of said plurality of states, for automatically generating and transmitting coded signals on said circuit for sequentially sensing the instant states of said devices including the other state of said one device.

11. Apparatus comprising a main station and a plurality of satellite stations, a signaling transmission line interconnecting said main and satellite stations, a plurality of devices located at each of said satellite stations, each of said devices adjustable to one of two different states at a given time, means comprising a plurality of two-position keys at said main station for adjusting each of said devices at each of said satellite stations to a desired state of said two states, means at each of said satellite stations for adjusting each of said devices to said desired state, means at said main station controlled by the respective positions of said keys at a given instant for generating and transmitting on said line to said satellite stations a plurality of coded signals, each distinctive to a different one of said plurality of devices for causing the desired adjustments of the respective last-mentioned devices, said means at said satellite stations activated by said plurality of coded signals received from said line for adjusting said last-mentioned devices to said desired states, and means at said main station automatically activated by a predetermined code signal received from said line when one of said devices at one of said satellite stations is adjusted to a state different from said desired state by a condition other than that responsive to said coded signals of said signal means at said main station for automatically causing said signal means to automatically generate and transmit on said line inquiry coded signals distinctive to the respective devices located at said last-mentioned one satellite station, said last-mentioned inquiry coded signals serving to identify the instantaneously adjusted states of the respective devices including said one device at said last-mentioned one satellite station.

12. Apparatus comprising a main station, a first satellite station, a second satellite station, a signaling transmission line interconnecting said main and satellite stations, a first plurality of devices located at said first satellite station, a second plurality of devices located at said second satellite station, each of said devices adjustable to one of two different states at a given time, means comprising a plurality of two-position keys at said main station for selectively adjusting each of said devices to a desired state of said two states, means at each of said satellite stations for adjusting each of said devices to said desired state, means at said main station controlled by the respective positions of said keys at a given instant for generating and transmitting on said line to said satellite stations a first plurality of distinctive coded signals severally relating to a different device of said first plurality of devices for causing the desired adjustments of said last-mentioned devices, and a second plurality of distinctive coded signals severally relating to a different device of said second plurality of devices for causing the desired adjustments of said last-mentioned devices, said means at said satellite stations activated by said first and second pluralities of distinctive coded signals received from said line for adjusting said devices of said first and second plurality of devices to said desired states, and roll-call means at said main station automatically responsive to a predetermined code signal received from said line for automatically causing said signal means to automatically generate and transmit on said line inquiry coded signals distinctive to said devices, when one of said devices is adjusted to a state different from said desired state by a condition other than that in response to said coded signals of said signal means at said main station, for identifying the instantaneously adjusted states of the respective devices including the different state of said one device.

13. Apparatus comprising a main station, a first satellite station, a second satellite station, a signaling transmission line interconnecting said main and satellite stations, a first plurality of devices located at said first satellite station, a second plurality of devices located at said second satellite station, each of said devices adjustable to one of two different states at a given time, means comprising a plurality of two-position keys at said main station for selectively adjusting each of said devices to a desired state of said two states, means at each of said satellite stations for adjusting each of said devices to said desired state, means at said main station controlled by the respective positions of said keys at a given instant for generating and transmitting on said line to said satellite stations a first plurality of distinctive coded signals each relating to a different device of said first plurality of devices for causing the desired adjustments of the respective last-mentioned devices, and a second plurality of distinctive coded signals each relating to a different device of said second plurality of devices for causing the desired adjustments of the respective last-mentioned devices, said means at said satellite stations activated by said first and second pluralities of coded signals received from said line for adjusting said devices of said first and second plurality of devices to said desired states, and roll-call means at said main station automatically responsive to a predetermined code signal received from said line for automatically causing said signal means to automatically generate and transmit on said line inquiry coded signals distinctive to said devices, when one of said last-mentioned devices is adjusted to a state different from the desired state by a condition other than that in response to said coded signals of said signal means, for identifying the different state of said one device.

14. Apparatus comprising a main station, a first satellite station, a second satellite station, a signaling transmission line interconnecting said main and satellite stations, a first plurality of devices located at said first satellite station, a second plurality of devices located at said second satellite station, each of said devices adjustable to one of two different states at a given time, means comprising a plurality of two-position keys at said main station for selectively adjusting each of said devices to a desired state of said two states, means at each of said satellite stations for adjusting each of said devices to said desired state of two states, means at said main station controlled by the respective positions of said keys at a given instant for generating and transmitting on said line to said satellite stations a first plurality of distinctive coded signals each relating to a different device of said first plurality of devices for causing the desired adjustments of said last-mentioned respective devices, and a second plurality of distinctive coded signals each relating to a different device of said second plurality of devices for causing the desired adjustments of said last-mentioned respective devices, said means at said satellite stations activated by said first and second plurality of coded signals for adjusting said devices to said desired states, and roll-call means at said main station automatically responsive at one time to a predetermined coded signal received from said line for causing said signal means to generate and transmit initially to said line a first plurality of inquiry coded signals to identify the instantaneously adjusted states of the respective devices including said one device of said first plurality of devices, said roll-call means also automatically responsive at another time to a different predetermined code signal for generating and transmitting both said last-mentioned first plurality of inquiry coded signals and a second plurality of inquiry coded signals to identify the instantaneously adjusted states of the respective devices included in said first and second pluralities of devices.

15. Apparatus comprising a main station, a first satellite station, a second satellite station, a signaling transmission line interconnecting said main and satellite stations, a first plurality of devices located at said first satellite station, a second plurality of devices located at said second satellite station, each of said devices adjustable to one of two different states at a given time, means at said main station for selectively adjusting each of said devices to a desired state of said two states, means at each of said satellite stations for adjusting each of said devices to said desired state, means at said main station for generating and transmitting on said line to said satellite stations a first plurality of distinctive coded signals each relating to a different device of said first plurality of devices for causing the desired adjustments of the last-mentioned respective devices, and a second plurality of distinctive coded signals each relating to a different device of said second plurality of devices for causing the desired adjustments of the last-mentioned respective devices, said means at said satellite stations activated by said first and second plurality of coded signals as controlled by said main station adjusting means for adjusting said devices to said desired states, means at said satellite stations effective when one of said devices is adjusted to a state different from said desired state by a condition other than that caused by said coded signals of said signal means at said main station for transmitting a first common code signal on said line to said main station, means at said satellite stations effective when at least two of said devices are adjusted simultaneously to desired states by said adjusting means in response to a code signal received from said line for transmitting a second common code signal on said line to said main station, and roll-call means at said main station automatically responsive to said first-mentioned common code signal received from said line for transmitting on said line inquiry coded signals for identifying the instantaneously adjusted states of the respective devices including said one device at said last-mentioned one satellite station, said roll-call means further automatically responsive to said second common code signal for transmitting on said line said last-mentioned one plurality of other inquiry coded signals for identifying the instantaneously adjusted states of the respective devices at one of said satellite stations and also for transmitting on said line a second plurality of further inquiry coded signals for identifying the instantaneously adjusted states of the respective devices at the other of said satellite stations, said last-mentioned identifications of the last-mentioned states of said respective devices at said one and other satellite stations also including the instantaneously adjusted states of said two devices.

16. The apparatus according to claim 15 in which said roll-call means responsive to said second common code transmits a first plurality of inquiry coded signals for identifying the instantaneously adjusted states of the respective devices including one of said two devices at said first satellite station, and thereafter also transmits a second plurality of inquiry coded signals for identifying the instantaneously adjusted states of the respective devices including the other of said two devices at said second satellite station.

17. A control system comprising a plurality of sections, each having a main station, a plurality of satellite stations and a transmission line interconnecting said main and satellite stations, a plurality of monitor stations, a first monitor station connected to the main and satellite stations of one of said system sections for constituting a first system section, a second monitor station connected to the main station and satellite stations of another of said system sections for constituting a second system section, said first monitor station also connected to said last-mentioned main station, said second monitor station also connected to the main station of a further one of said system sections, said last-mentioned main station together with its associated satellite stations constituting a third system section, a plurality of devices located at each of said satellite stations, each of said devices adjustable to one of two different states at a given time, means at each of said satellite stations to adjust each device to a desired state of said two states, means at each of said main stations to transmit coded signals to activate each of said adjusting means for selectively adjusting each of said devices in the associated system section to a desired one of said two states, means at each of said satellite stations of said first system section responsive to an occurrence of an unexpected condition in one of said devices in said last-mentioned section for generating and transmitting an emergency code signal to said main station connected in said last-mentioned section, and means located at said last-mentioned main station for activating said first monitor station to transmit a preselected code signal for alerting said main station of said second system section of the occurrence of said unexpected condition.

18. The control system according to claim 17 which includes means at each of said satellites of said second system section responsive to an occurrence of an unexpected condition in one of said devices in said last-mentioned section for generating and transmitting an emergency code signal to said main station of said last-mentioned system section, means at said last-mentioned main station for activating said first monitor station to transmit a predetermined code signal for alerting said main station of said first system section of the occurrence of said last-mentioned unexpected condition, and means at said main station of said last-mentioned second system section for activating said second monitor station to transmit another predetermined code signal for alerting said main station of said third system section of the occurrence of said unexpected condition.

19. The control system according to claim 17 which includes means at each of said satellite stations of said third system section responsive to an occurrence of an unexpected condition in one of said devices in said last-mentioned section for generating and transmitting an emergency code signal to said main station of said last-mentioned system section, and means at said last-mentioned main station for activating said second monitor station to transmit a further predetermined code signal for alerting said main station of said second system section of the occurrence of said last-mentioned unexpected condition.

20. Apparatus comprising a main station and a plurality of satellite stations, a signaling transmission line interconnecting said main and satellite stations, a plurality of devices located at each of said satellite stations, each of said devices being adjustable from one to another of two different states at a given time, certain of said devices being relatively slow in changing from said one of said two different states to the other of said two different states, others of said devices being relatively fast in changing from one of said two different states to the other of said two different states, means at said main station for selectively generating and transmitting on said line to said satellite stations a plurality of coded signals severally relating to said one and another states of said certain and other devices, means at each satellite station responsive to the receipt from said line of one of said coded signals relating to one of said other devices for causing said last-mentioned one other device to change from said one to said other state and substantially simultaneously therewith to transmit on said line to said main station a preselected code signal indicating said last-mentioned other state of said last-mentioned one other device after said last-mentioned one other device has fully changed to said last-mentioned other state in response to said last-mentioned one coded signal, said last-mentioned means also responsive to the receipt from said line of a different one of said coded signals relating to one of said certain devices for causing said last-mentioned one certain device to change from said one state to said other state and substantially simultaneously therewith to transmit on said line to said main station another preselected code signal indicating said last-mentioned one certain device has started to change from said last-mentioned one to said other state but before said last-mentioned one certain device has fully changed to said last-mentioned other state.

21. The apparatus according to claim 20 in which said last-mentioned means subsequently transmits a further preselected code signal on said line to said main station after said last-mentioned one certain device has fully changed to said last-mentioned other state for indicating said last-mentioned one certain device has fully changed to said last-mentioned other state in response to said last-mentioned different coded signal.

22. Apparatus comprising a main station, a plurality of satellite stations, and a monitor station, a plurality of devices located at each of said satellite stations, each of said devices being adjustable to one of two different states at a given time, means comprising a signaling transmission line for interconnecting said monitor station with said main station and said satellite stations, means at said main station for selectively generating and transmitting on said line to said satellite stations and said monitor station a plurality of coded electric signals severally relating to desired states of said devices and severally effective to cause said devices to adjust to said desired states, means at each of said satellite stations responsive to the receipt of one of said plurality of coded electric signals from said line thereat for causing the corresponding one of said devices to adjust to the desired state and for transmitting a predetermined code signal relating to said last-mentioned desired state on said line to said main and monitor stations, means at said main station responsive to said predetermined code signal received from said line thereat for indicating the desired state of said corresponding one device at said main station, and means at said monitor station responsive to the receipt from said line thereat of said one coded electric signal and said predetermined code signal for identifying said corresponding one device and for identifying said desired state of said corresponding one device at said monitor station, said last-mentioned desired state of said corresponding one device being simultaneously indicated at both said main and monitor stations.

23. A control system comprising a plurality of sections each having a main station, at least one satellite station and a signaling transmission line interconnecting said main and satellite stations, a plurality of monitor stations, a first monitor station connected to the main and satellite stations of one of said sections for constituting a first system section, a second monitor station connected to the main and satellite stations of another of said sections for constituting a second system section, said first monitor station also connected to said last-mentioned main station, said second monitor station also connected to the main station of a further one of said sections, said last-mentioned main station and its associated satellite station constituting a third system section, a plurality of devices located at each of said satellite stations, each of said devices adjustable to one of two different states at a given time, means at each of said main stations to selectively transmit coded signals on the associated line to associated devices for adjusting said last-mentioned devices to desired states of two different states, means at each satellite station responsive to said coded signals for adjusting said associated devices to said desired states, means at each of said satellite stations for transmitting an emergency code signal on the associated line to the associated main station for indicating an occurrence of an emergency condition at one device of an associated satellite station, means at said main station of said third system section responsive to said emergency code signal when said emergency condition occurs at one device located at said satellite station in said last-mentioned system section for acknowledging the occurrence of a system code signal in said last-mentioned system section, said last-mentioned means also activating said second monitor station to transmit a preselected code signal to said main station of said second system section for alerting said last-mentioned main station of the occurrence of said system signal, and means at said last-mentioned main station responsive to said last-mentioned preselected code signal for activating said first monitor station to transmit another preselected code signal to said main station of said first system section for alerting said last-mentioned main station of the occurrence of said system signal.

24. The system according to claim 23 which includes means at said main station of said second system section responsive to said emergency code signal when said emergency condition occurs at one device located at said satellite station in said last-mentioned system section for acknowledging the occurrence of a system code signal in said last-mentioned system section, said last-mentioned means also activating said first monitor station to transmit a preselected code signal for alerting said main station of said first system section of the occurrence of said last-mentioned system signal, said last-mentioned means also activating said second monitor station to transmit another preselected code signal for alerting said main station of said third system section of the occurrence of said last-mentioned system signal.

25. The system according to claim 23 which includes means at the main station of said first system section responsive to said emergency code signal when said emergency condition occurs at said one device located at said satellite station in said last-mentioned section for acknowledging the occurrence of a system code signal in said last-mentioned system section, said last-mentioned means also activating said first monitor station to transmit a further preselected code signal for alerting said main station of said second system section of the occurrence of said last-mentioned system signal, and means at said last-mentioned main station responsive to said last-mentioned preselected code signal for acknowledging the occurrence of said last-mentioned system signal and for activating said second monitor station to transmit an additional preselected code signal for alerting said main station of said third system section of the occurrence of said last-mentioned system signal.

26. A control system comprising two independent sections, a first section having a main station, a satellite station, and a signaling transmission line connecting said stations, a second section having a main station, a satellite station, a signaling transmission line connecting said last-mentioned main and satellite stations, and a monitor station, means interconnecting said monitor station to said main station of said first section and to said main and satellite stations of said second section, a plurality of devices located at each of said satellite stations, each of said devices adjustable to one of two different states at a given time, means at each of said satellite stations to adjust each device to a desired one of said two states, means at each main station to transmit coded signals on the associated line to activate each of said adjusting means for selectively adjusting each of said devices within the associated section to a desired one of said two states, means at each of said satellite stations responsive to an occurrence of an unexpected condition in one of said devices thereat for transmitting to said main station an emergency code signal on said line within the associated section in which said last-mentioned one device is located, and means at said last-mentioned main station responsive to said emergency code signal to activate said monitor station for transmitting a preselected code signal on said interconnecting means to the main station of the other of said last-mentioned first and second sections.

27. A control system comprising two normally independent sections, a first section having a main station, and two satellite stations, and a signaling line connecting said main and satellite stations, a second section having a main station, two satellite stations, a signaling transmission line connecting said last-mentioned main and satellite stations, and a monitor station, means interconnecting said monitor station to said main station in said first section and to said main station of said second section, a plurality of devices located at each of said satellite stations, each of said devices being adjustable to one of two different states at a given time, means at each of said satellite stations to adjust each of said devices thereat to a desired one of said two states, means at each of said main stations to transmit coded signals on the associated line to activate each of said adjusting means for selectively adjusting each of said devices within the associated section to a desired one of said two states, means at said monitor station to transmit coded signals, means at each of said satellite stations responsive to an occurrence of an unexpected condition in one of said devices thereat for transmitting an emergency code signal on said line to said main station within the associated section in which said last-mentioned one device is located, means at said last-mentioned main station responsive to said emergency signal to activate said signal means thereat to transmit coded signals on the associated line for selectively adjusting certain devices within the associated section to other desired states of said two different states, said last-mentioned signal means also activating said signal means at said monitor station for transmitting a preselected code signal on said interconnecting means to the main station of the other of said last-mentioned first and second sections, and means at said last-mentioned main station responsive to said preselected code signal to activate said signal means thereat to transmit coded signals on the associated line for selectively adjusting certain devices within said last-mentioned other section to other desired states of said two different states.

(References on following page)

References Cited in the file of this patent

UNITED STATES PATENTS

| | | |
|---|---|---|
| 2,164,379 | Boswau | July 4, 1939 |
| 2,183,155 | Snavely et al. | Dec. 15, 1939 |
| 2,273,231 | Snavely et al. | Feb. 17, 1942 |
| 2,276,680 | Allen | Mar. 17, 1942 |
| 2,314,692 | Derr | Mar. 23, 1943 |
| 2,443,351 | Green | June 15, 1948 |
| 2,444,078 | Weaver | June 29, 1948 |
| 2,616,959 | Breese et al. | Nov. 4, 1952 |
| 2,672,600 | Cary | Mar. 16, 1954 |